United States Patent
Brannon et al.

(10) Patent No.: US 10,592,692 B2
(45) Date of Patent: *Mar. 17, 2020

(54) DATA PROCESSING SYSTEMS FOR CENTRAL CONSENT REPOSITORY AND RELATED METHODS

(71) Applicant: OneTrust, LLC, Atlanta, GA (US)

(72) Inventors: Jonathan Blake Brannon, Smyrna, GA (US); Kevin Jones, Atlanta, GA (US); Dylan D. Patton-Kuhl, Atlanta, GA (US); Bryan Patrick Kveen, Atlanta, GA (US); Nicholas Ian Pavlichek, Atlanta, GA (US); Eliza Rose Crawford, Chamblee, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,749

(22) Filed: Sep. 6, 2019

(65) Prior Publication Data

US 2020/0004985 A1 Jan. 2, 2020

Related U.S. Application Data

(63) Continuation of application No. 16/409,673, filed on May 10, 2019, now Pat. No. 10,452,864, which is a
(Continued)

(51) Int. Cl.
*G06F 21/62* (2013.01)
*G06F 16/951* (2019.01)
(Continued)

(52) U.S. Cl.
CPC ........ *G06F 21/6245* (2013.01); *G06F 16/951* (2019.01); *G06F 16/955* (2019.01); *G06F 17/243* (2013.01)

(58) Field of Classification Search
CPC .......................... G06F 21/6245; G06F 16/955
(Continued)

(56) References Cited

U.S. PATENT DOCUMENTS

| 5,193,162 A | 3/1993 | Bordsen et al. |
| 5,276,735 A | 1/1994 | Boebert et al. |

(Continued)

FOREIGN PATENT DOCUMENTS

| EP | 1394698 | 3/2004 |
| EP | 2031540 | 3/2009 |

(Continued)

OTHER PUBLICATIONS

Qing-jiang, Kong, Wang Xiao-hao, and Zhang Jun. "The (P, a, K) anonymity model for privacy protection of personal information in the social networks." 2011 6th IEEE Joint International Information Technology and Artificial Intelligence Conference. vol. 2. IEEE, 2011.pp. 420-423 (Year: 2011).*

(Continued)

*Primary Examiner* — Satish Rampuria
(74) *Attorney, Agent, or Firm* — Brient IP Law, LLC

(57) ABSTRACT

A data processing central consent repository system may be configured to, for example: (1) identify a form used to collect one or more pieces of personal data, (2) determine a data asset of a plurality of data assets of the organization where input data of the form is transmitted, (3) add the data asset to the third-party data repository with an electronic link to the form, (4) in response to a user submitting the form, create a unique subject identifier to submit to the third-party data repository and, along with the form data provided by the user in the form, to the data asset, (5) submit the unique subject identifier and the form data provided by the user to the third-party data repository and the data asset, and (6)
(Continued)

digitally store the unique subject identifier and the form data in the third-party data repository and the data asset.

16 Claims, 65 Drawing Sheets

Related U.S. Application Data continuation of application No. 16/159,635, filed on Oct. 13, 2018, now Pat. No. 10,289,867, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017, provisional application No. 62/572,096, filed on Oct. 13, 2017, provisional application No. 62/728,435, filed on Sep. 7, 2018.

(51) Int. Cl.
*G06F 16/955* (2019.01)
*G06F 17/24* (2006.01)

(58) Field of Classification Search
USPC .................................. 717/101–103, 124–135
See application file for complete search history.

(56) References Cited

U.S. PATENT DOCUMENTS

| | | | |
|---|---|---|---|
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,761,529 A | 6/1998 | Raji |
| 5,764,906 A | 6/1998 | Edelstein et al. |
| 6,016,394 A | 1/2000 | Walker |
| 6,122,627 A | 9/2000 | Carey et al. |
| 6,148,342 A | 11/2000 | Ho |
| 6,253,203 B1 | 6/2001 | OFlaherty et al. |
| 6,272,631 B1 | 8/2001 | Thomlinson et al. |
| 6,275,824 B1 | 8/2001 | OFlaherty et al. |
| 6,374,252 B1 | 4/2002 | Althoff et al. |
| 6,427,230 B1 | 7/2002 | Goiffon et al. |
| 6,442,688 B1 | 8/2002 | Moses et al. |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,662,192 B1 | 12/2003 | Rebane |
| 6,757,888 B1 | 6/2004 | Knutson et al. |
| 6,816,944 B2 | 11/2004 | Peng |
| 6,826,693 B1 | 11/2004 | Yoshida et al. |
| 6,901,346 B2 | 5/2005 | Tracy et al. |
| 6,904,417 B2 | 6/2005 | Clayton et al. |
| 6,925,443 B1 | 8/2005 | Baggett, Jr. et al. |
| 6,938,041 B1 | 8/2005 | Brandow et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,013,290 B2 | 3/2006 | Ananian |
| 7,017,105 B2 | 3/2006 | Flanagin et al. |
| 7,039,654 B1 | 5/2006 | Eder |
| 7,047,517 B1 | 5/2006 | Brown et al. |
| 7,051,036 B2 | 5/2006 | Rosnow et al. |
| 7,058,970 B2 | 6/2006 | Shaw |
| 7,069,427 B2 | 6/2006 | Adler et al. |
| 7,076,558 B1 | 7/2006 | Dunn |
| 7,124,101 B1 | 10/2006 | Mikurak |
| 7,127,705 B2 | 10/2006 | Christfort et al. |
| 7,127,741 B2 | 10/2006 | Bandini et al. |
| 7,139,999 B2 | 11/2006 | Bowman-Amuah |
| 7,143,091 B2 | 11/2006 | Charnock et al. |
| 7,167,842 B1 | 1/2007 | Josephson, II et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,251,624 B1 | 7/2007 | Lee et al. |
| 7,260,830 B2 | 8/2007 | Sugimoto |
| 7,284,232 B1 | 10/2007 | Bates et al. |
| 7,287,280 B2 | 10/2007 | Young |
| 7,290,275 B2 | 10/2007 | Baudoin et al. |
| 7,302,569 B2 | 11/2007 | Betz et al. |
| 7,313,575 B2 | 12/2007 | Carr et al. |
| 7,313,699 B2 | 12/2007 | Koga |
| 7,330,850 B1 | 2/2008 | Seibel et al. |
| 7,343,434 B2 | 3/2008 | Kapoor et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,412,402 B2 | 8/2008 | Cooper |
| 7,430,585 B2 | 9/2008 | Sibert |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,548,968 B1 | 6/2009 | Bura et al. |
| 7,552,480 B1 | 6/2009 | Voss |
| 7,584,505 B2 | 9/2009 | Mondri et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,790 B2 | 10/2009 | Levy |
| 7,607,120 B2 | 10/2009 | Sanyal et al. |
| 7,613,700 B1 | 11/2009 | Lobo et al. |
| 7,620,644 B2 | 11/2009 | Cote et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,653,592 B1 | 1/2010 | Flaxman et al. |
| 7,657,694 B2 | 2/2010 | Mansell et al. |
| 7,665,073 B2 | 2/2010 | Meijer et al. |
| 7,668,947 B2 | 2/2010 | Hutchinson et al. |
| 7,673,282 B2 | 3/2010 | Amaru et al. |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,707,224 B2 | 4/2010 | Chastagnol et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |

(56) References Cited

U.S. PATENT DOCUMENTS

| | | |
|---|---|---|
| 7,730,142 B2 | 6/2010 | Levasseur et al. |
| 7,752,124 B2 | 7/2010 | Green et al. |
| 7,756,987 B2 | 7/2010 | Wang et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,827,523 B2 | 11/2010 | Ahmed et al. |
| 7,853,468 B2 | 12/2010 | Callahan et al. |
| 7,853,470 B2 | 12/2010 | Sonnleithner et al. |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,917,963 B2 | 3/2011 | Goyal et al. |
| 7,921,152 B2 | 4/2011 | Ashley et al. |
| 7,953,725 B2 | 5/2011 | Burris et al. |
| 7,958,494 B2 | 6/2011 | Chaar et al. |
| 7,966,310 B2 | 6/2011 | Sullivan et al. |
| 7,966,599 B1 | 6/2011 | Malasky et al. |
| 7,966,663 B2 | 6/2011 | Strickland et al. |
| 7,975,000 B2 | 7/2011 | Dixon et al. |
| 7,991,559 B2 | 8/2011 | Dzekunov et al. |
| 8,019,881 B2 | 9/2011 | Sandhu et al. |
| 8,032,721 B2 | 10/2011 | Murai |
| 8,037,409 B2 | 10/2011 | Jacob et al. |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,095,923 B2 | 1/2012 | Harvey et al. |
| 8,146,074 B2 | 3/2012 | Ito et al. |
| 8,150,717 B2 | 4/2012 | Whitmore |
| 8,156,158 B2 | 4/2012 | Rolls et al. |
| 8,166,406 B1 | 4/2012 | Goldfeder et al. |
| 8,176,177 B2 | 5/2012 | Sussman et al. |
| 8,176,334 B2 | 5/2012 | Vainstein |
| 8,180,759 B2 | 5/2012 | Hamzy |
| 8,239,244 B2 | 8/2012 | Ginsberg et al. |
| 8,250,051 B2 | 8/2012 | Bugir et al. |
| 8,286,239 B1 | 10/2012 | Sutton |
| 8,316,237 B1 | 11/2012 | Felsher et al. |
| 8,346,929 B1 | 1/2013 | Lai |
| 8,364,713 B2 | 1/2013 | Pollard |
| 8,380,743 B2 | 2/2013 | Convertino et al. |
| 8,381,180 B2 | 2/2013 | Rostoker |
| 8,418,226 B2 | 4/2013 | Gardner |
| 8,423,954 B2 | 4/2013 | Ronen et al. |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,468,244 B2 | 6/2013 | Redlich et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,516,076 B2 | 8/2013 | Thomas |
| 8,561,153 B2 | 10/2013 | Grason et al. |
| 8,565,729 B2 | 10/2013 | Moseler et al. |
| 8,571,909 B2 | 10/2013 | Miller et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,620,952 B2 | 12/2013 | Bennett et al. |
| 8,621,637 B2 | 12/2013 | Al-Harbi et al. |
| 8,627,114 B2 | 1/2014 | Resch et al. |
| 8,640,110 B2 | 1/2014 | Kopp et al. |
| 8,656,456 B2 | 2/2014 | Maxson et al. |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,700,699 B2 | 4/2014 | Shen et al. |
| 8,706,742 B1 | 4/2014 | Ravid et al. |
| 8,712,813 B2 | 4/2014 | King |
| 8,713,098 B1 | 4/2014 | Adya et al. |
| 8,744,894 B2 | 6/2014 | Christiansen et al. |
| 8,763,071 B2 | 6/2014 | Sinha et al. |
| 8,767,947 B1 | 7/2014 | Ristock et al. |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,809 B2 | 7/2014 | Falkenburg et al. |
| 8,805,707 B2 | 8/2014 | Schumann, Jr. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,819,617 B1 | 8/2014 | Koenig et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,843,487 B2 | 9/2014 | McGraw et al. |
| 8,856,534 B2 | 10/2014 | Khosravi et al. |
| 8,862,507 B2 | 10/2014 | Sandhu et al. |
| 8,875,232 B2 | 10/2014 | Blom et al. |
| 8,893,286 B1 | 11/2014 | Oliver |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,935,198 B1 | 1/2015 | Phillips et al. |
| 8,935,266 B2 | 1/2015 | Wu |
| 8,935,804 B1 | 1/2015 | Clark et al. |
| 8,943,076 B2 | 1/2015 | Stewart et al. |
| 8,943,548 B2 | 1/2015 | Drokov et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,977,234 B2 | 3/2015 | Chava |
| 8,978,158 B2 | 3/2015 | Rajkumar et al. |
| 8,983,972 B2 | 3/2015 | Kriebel et al. |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,003,295 B2 | 4/2015 | Baschy |
| 9,003,552 B2 | 4/2015 | Goodwin et al. |
| 9,021,469 B2 | 4/2015 | Hilerio et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,047,463 B2 | 6/2015 | Porras |
| 9,047,582 B2 | 6/2015 | Hutchinson et al. |
| 9,069,940 B2 | 6/2015 | Hars |
| 9,076,231 B1 | 7/2015 | Hill et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,111,295 B2 | 8/2015 | Tietzen et al. |
| 9,123,339 B1 | 9/2015 | Shaw et al. |
| 9,129,311 B2 | 9/2015 | Schoen et al. |

(56) References Cited

U.S. PATENT DOCUMENTS

| | | |
|---|---|---|
| 9,135,261 B2 | 9/2015 | Maunder et al. |
| 9,152,820 B1 | 10/2015 | Pauley, Jr. et al. |
| 9,158,655 B2 | 10/2015 | Wadhwani et al. |
| 9,170,996 B2 | 10/2015 | Lovric et al. |
| 9,172,706 B2 | 10/2015 | Krishnamurthy et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,224,009 B1 | 12/2015 | Liu et al. |
| 9,231,935 B1 | 1/2016 | Bridge et al. |
| 9,232,040 B2 | 1/2016 | Barash et al. |
| 9,235,476 B2 | 1/2016 | McHugh et al. |
| 9,241,259 B2 | 1/2016 | Daniela et al. |
| 9,245,126 B2 | 1/2016 | Christodorescu et al. |
| 9,253,609 B2 | 2/2016 | Hosier, Jr. |
| 9,286,282 B2 | 3/2016 | Ling, III et al. |
| 9,288,118 B1 | 3/2016 | Pattan |
| 9,317,715 B2 | 4/2016 | Schuette et al. |
| 9,336,332 B2 | 5/2016 | Davis et al. |
| 9,336,400 B2 | 5/2016 | Milman et al. |
| 9,338,188 B1 | 5/2016 | Ahn |
| 9,344,424 B2 | 5/2016 | Tenenboym et al. |
| 9,348,802 B2 | 5/2016 | Massand |
| 9,355,157 B2 | 5/2016 | Mohammed et al. |
| 9,356,961 B1 | 5/2016 | Todd et al. |
| 9,369,488 B2 | 6/2016 | Woods et al. |
| 9,384,199 B2 | 7/2016 | Thereska et al. |
| 9,384,357 B2 | 7/2016 | Patil et al. |
| 9,386,104 B2 | 7/2016 | Adams et al. |
| 9,396,332 B2 | 7/2016 | Abrams et al. |
| 9,401,900 B2 | 7/2016 | Levasseur et al. |
| 9,411,982 B1 | 8/2016 | Dippenaar et al. |
| 9,424,021 B2 | 8/2016 | Zamir |
| 9,460,307 B2 | 10/2016 | Breslau et al. |
| 9,462,009 B1 | 10/2016 | Kolman et al. |
| 9,465,800 B2 | 10/2016 | Lacey |
| 9,473,535 B2 | 10/2016 | Sartor |
| 9,477,523 B1 | 10/2016 | Warman et al. |
| 9,477,660 B2 | 10/2016 | Scott et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,507,960 B2 | 11/2016 | Bell et al. |
| 9,521,166 B2 | 12/2016 | Wilson |
| 9,549,047 B1 | 1/2017 | Fredinburg et al. |
| 9,552,395 B2 | 1/2017 | Bayer et al. |
| 9,553,918 B1 | 1/2017 | Manion et al. |
| 9,558,497 B2 | 1/2017 | Carvalho |
| 9,571,509 B1 | 2/2017 | Satish et al. |
| 9,571,526 B2 | 2/2017 | Sartor |
| 9,571,991 B1 | 2/2017 | Brizendine et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,661 B1 | 4/2017 | Finkelstein |
| 9,621,357 B2 | 4/2017 | Williams et al. |
| 9,621,566 B2 | 4/2017 | Gupta et al. |
| 9,642,008 B2 | 5/2017 | Wyatt et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,672,053 B2 | 6/2017 | Tang et al. |
| 9,691,090 B1 | 6/2017 | Barday |
| 9,705,840 B2 | 7/2017 | Pujare et al. |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,697 B2 | 9/2017 | Walker |
| 9,762,553 B2 | 9/2017 | Ford et al. |
| 9,767,309 B1 | 9/2017 | Patel et al. |
| 9,785,795 B2 | 10/2017 | Grondin et al. |
| 9,798,749 B2 | 10/2017 | Saner |
| 9,798,826 B2 | 10/2017 | Wilson et al. |
| 9,800,605 B2 | 10/2017 | Baikalov et al. |
| 9,804,928 B2 | 10/2017 | Davis et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,825,928 B2 | 11/2017 | Lelcuk et al. |
| 9,838,407 B1 | 12/2017 | Oprea et al. |
| 9,838,839 B2 | 12/2017 | Vudali et al. |
| 9,842,349 B2 | 12/2017 | Sawczuk et al. |
| 9,852,150 B2 | 12/2017 | Sharpe et al. |
| 9,860,226 B2 | 1/2018 | Thormaehlen |
| 9,864,735 B1 | 1/2018 | Lamprecht |
| 9,877,138 B1 | 1/2018 | Franklin |
| 9,882,935 B2 | 1/2018 | Barday |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,898,613 B1 | 2/2018 | Swerdlow et al. |
| 9,898,769 B2 | 2/2018 | Barday |
| 9,912,625 B2 | 3/2018 | Mutha et al. |
| 9,916,703 B2 | 3/2018 | Douillard et al. |
| 9,923,927 B1 | 3/2018 | McClintock et al. |
| 9,934,544 B1 | 4/2018 | Whitfield et al. |
| 9,942,276 B2 | 4/2018 | Sartor |
| 9,946,897 B2 | 4/2018 | Lovin |
| 9,953,189 B2 | 4/2018 | Cook et al. |
| 9,961,070 B2 | 5/2018 | Tang |
| 9,973,585 B2 | 5/2018 | Ruback et al. |
| 9,983,936 B2 | 5/2018 | Dornemann et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,025,804 B2 | 7/2018 | Vranyes et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,061,847 B2 | 8/2018 | Mohammed et al. |
| 10,073,924 B2 | 9/2018 | Karp et al. |
| 10,075,451 B1 | 9/2018 | Hall et al. |
| 10,091,312 B1 | 10/2018 | Khanwalkar et al. |
| 10,102,533 B2 | 10/2018 | Barday |
| 10,122,760 B2 | 11/2018 | Terrill et al. |
| 10,129,211 B2 | 11/2018 | Heath |
| 10,140,666 B1 | 11/2018 | Wang et al. |
| 10,142,113 B2 | 11/2018 | Zaidi et al. |
| 10,158,676 B2 | 12/2018 | Barday |
| 10,165,011 B2 | 12/2018 | Barday |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,212,175 B2 | 2/2019 | Seul et al. |
| 10,250,594 B2 | 4/2019 | Chathoth et al. |
| 10,268,838 B2 | 4/2019 | Yadgiri et al. |
| 10,284,604 B2 | 5/2019 | Barday et al. |
| 10,289,866 B2 | 5/2019 | Barday et al. |
| 10,289,867 B2 | 5/2019 | Barday et al. |
| 10,289,870 B2 | 5/2019 | Barday et al. |
| 10,318,761 B2 | 6/2019 | Barday et al. |
| 10,324,960 B1 | 6/2019 | Skvortsov et al. |
| 10,326,768 B2 | 6/2019 | Verweyst et al. |
| 10,346,635 B2 | 7/2019 | Kumar et al. |

(56) References Cited

U.S. PATENT DOCUMENTS

| | | | |
|---|---|---|---|
| 10,348,726 B2 | 7/2019 | Caluwaert | |
| 10,361,857 B2 | 7/2019 | Woo | |
| 10,387,952 B1 | 8/2019 | Sandhu et al. | |
| 10,452,866 B2 | 10/2019 | Barday et al. | |
| 10,481,763 B2 | 11/2019 | Bartkiewicz et al. | |
| 10,510,031 B2 | 12/2019 | Barday et al. | |
| 2002/0103854 A1 | 8/2002 | Okita | |
| 2002/0129216 A1 | 9/2002 | Collins | |
| 2002/0161594 A1 | 10/2002 | Bryan et al. | |
| 2003/0041250 A1 | 2/2003 | Proudler | |
| 2003/0097451 A1 | 5/2003 | Bjorksten et al. | |
| 2003/0097661 A1 | 5/2003 | Li et al. | |
| 2003/0115142 A1 | 6/2003 | Brickell et al. | |
| 2003/0130893 A1* | 7/2003 | Farmer | G06F 21/6254 705/14.63 |
| 2003/0131001 A1* | 7/2003 | Matsuo | G06F 21/34 |
| 2003/0131093 A1 | 7/2003 | Aschen et al. | |
| 2004/0025053 A1 | 2/2004 | Hayward | |
| 2004/0088235 A1 | 5/2004 | Ziekle et al. | |
| 2004/0098366 A1 | 5/2004 | Sinclair et al. | |
| 2004/0098493 A1* | 5/2004 | Rees | G06F 21/6218 709/229 |
| 2004/0111359 A1 | 6/2004 | Hudock | |
| 2004/0186912 A1 | 9/2004 | Harlow et al. | |
| 2004/0193907 A1 | 9/2004 | Patanella | |
| 2005/0022198 A1 | 1/2005 | Olapurath et al. | |
| 2005/0033616 A1 | 2/2005 | Vavul et al. | |
| 2005/0076294 A1 | 4/2005 | Dehamer et al. | |
| 2005/0114343 A1 | 5/2005 | Wesinger, Jr. et al. | |
| 2005/0144066 A1 | 6/2005 | Cope et al. | |
| 2005/0197884 A1 | 9/2005 | Mullen, Jr. | |
| 2005/0246292 A1 | 11/2005 | Sarcanin | |
| 2005/0278538 A1 | 12/2005 | Fowler | |
| 2006/0031078 A1 | 2/2006 | Pizzinger et al. | |
| 2006/0075122 A1 | 4/2006 | Lindskog et al. | |
| 2006/0149730 A1 | 7/2006 | Curtis | |
| 2006/0156052 A1 | 7/2006 | Bodnar et al. | |
| 2006/0253597 A1 | 11/2006 | Mujica | |
| 2007/0027715 A1 | 2/2007 | Gropper et al. | |
| 2007/0130101 A1 | 6/2007 | Anderson et al. | |
| 2007/0157311 A1 | 7/2007 | Meier et al. | |
| 2007/0179793 A1 | 8/2007 | Bagchi et al. | |
| 2007/0180490 A1 | 8/2007 | Renzi et al. | |
| 2007/0192438 A1 | 8/2007 | Goei | |
| 2007/0266420 A1 | 11/2007 | Hawkins et al. | |
| 2007/0283171 A1 | 12/2007 | Breslin et al. | |
| 2008/0015927 A1 | 1/2008 | Ramirez | |
| 2008/0028435 A1 | 1/2008 | Strickland et al. | |
| 2008/0047016 A1 | 2/2008 | Spoonamore | |
| 2008/0120699 A1 | 5/2008 | Spear | |
| 2008/0235177 A1 | 9/2008 | Kim et al. | |
| 2008/0270203 A1 | 10/2008 | Holmes et al. | |
| 2008/0282320 A1 | 11/2008 | Denovo et al. | |
| 2008/0288271 A1 | 11/2008 | Faust | |
| 2009/0022301 A1 | 1/2009 | Mudaliar | |
| 2009/0037975 A1 | 2/2009 | Ishikawa et al. | |
| 2009/0158249 A1 | 6/2009 | Tomkins et al. | |
| 2009/0172705 A1 | 7/2009 | Cheong | |
| 2009/0182818 A1 | 7/2009 | Krywaniuk | |
| 2009/0187764 A1 | 7/2009 | Astakhov et al. | |
| 2009/0204452 A1 | 8/2009 | Iskandar et al. | |
| 2009/0204820 A1 | 8/2009 | Brandenburg et al. | |
| 2009/0216610 A1 | 8/2009 | Chorny | |
| 2009/0249076 A1 | 10/2009 | Reed et al. | |
| 2009/0303237 A1 | 12/2009 | Liu et al. | |
| 2010/0082533 A1 | 4/2010 | Nakamura et al. | |
| 2010/0100398 A1 | 4/2010 | Auker et al. | |
| 2010/0121773 A1 | 5/2010 | Currier et al. | |
| 2010/0192201 A1 | 7/2010 | Shimoni et al. | |
| 2010/0205057 A1 | 8/2010 | Hook et al. | |
| 2010/0228786 A1 | 9/2010 | Török | |
| 2010/0235915 A1 | 9/2010 | Memon et al. | |
| 2010/0268628 A1 | 10/2010 | Pitkow et al. | |
| 2010/0281313 A1 | 11/2010 | White et al. | |
| 2010/0287114 A1 | 11/2010 | Bartko et al. | |
| 2010/0333012 A1 | 12/2010 | Adachi et al. | |
| 2011/0010202 A1 | 1/2011 | Neale | |
| 2011/0137696 A1 | 6/2011 | Meyer et al. | |
| 2011/0191664 A1 | 8/2011 | Sheleheda et al. | |
| 2011/0208850 A1 | 8/2011 | Sheleheda et al. | |
| 2011/0209067 A1 | 8/2011 | Bogess et al. | |
| 2011/0231896 A1 | 9/2011 | Tovar | |
| 2011/0283365 A1* | 11/2011 | Moritz | G06F 21/10 726/28 |
| 2012/0084349 A1 | 4/2012 | Lee et al. | |
| 2012/0102543 A1 | 4/2012 | Kohli et al. | |
| 2012/0110674 A1 | 5/2012 | Belani et al. | |
| 2012/0116923 A1 | 5/2012 | Irving et al. | |
| 2012/0131438 A1 | 5/2012 | Li et al. | |
| 2012/0143650 A1 | 6/2012 | Crowley et al. | |
| 2012/0144499 A1 | 6/2012 | Tan et al. | |
| 2012/0259752 A1 | 10/2012 | Agee | |
| 2012/0323700 A1 | 12/2012 | Aleksandrovich et al. | |
| 2012/0330869 A1 | 12/2012 | Durham | |
| 2013/0018954 A1 | 1/2013 | Cheng | |
| 2013/0085801 A1 | 4/2013 | Sharpe et al. | |
| 2013/0103485 A1 | 4/2013 | Postrel | |
| 2013/0111323 A1 | 5/2013 | Taghaddos et al. | |
| 2013/0171968 A1 | 7/2013 | Wang | |
| 2013/0218829 A1 | 8/2013 | Martinez | |
| 2013/0219459 A1 | 8/2013 | Bradley | |
| 2013/0254649 A1 | 9/2013 | Oneill | |
| 2013/0254699 A1 | 9/2013 | Bashir et al. | |
| 2013/0282466 A1 | 10/2013 | Hampton | |
| 2013/0298071 A1 | 11/2013 | Wine | |
| 2013/0311224 A1 | 11/2013 | Heroux et al. | |
| 2013/0318207 A1 | 11/2013 | Dotter | |
| 2013/0326112 A1 | 12/2013 | Park et al. | |
| 2013/0332362 A1 | 12/2013 | Ciurea | |
| 2013/0340086 A1 | 12/2013 | Blom | |
| 2014/0006355 A1 | 1/2014 | Kirihata | |
| 2014/0006616 A1 | 1/2014 | Aad et al. | |
| 2014/0012833 A1 | 1/2014 | Humprecht | |
| 2014/0019561 A1 | 1/2014 | Belity et al. | |
| 2014/0032259 A1 | 1/2014 | Lafever et al. | |
| 2014/0032265 A1 | 1/2014 | Paprocki | |
| 2014/0040134 A1 | 2/2014 | Ciurea | |
| 2014/0040161 A1 | 2/2014 | Berlin | |
| 2014/0047551 A1 | 2/2014 | Nagasundaram et al. | |
| 2014/0052463 A1 | 2/2014 | Cashman et al. | |
| 2014/0074645 A1 | 3/2014 | Ingram | |
| 2014/0089027 A1 | 3/2014 | Brown | |
| 2014/0089039 A1 | 3/2014 | McClellan | |
| 2014/0108173 A1 | 4/2014 | Cooper et al. | |
| 2014/0143011 A1 | 5/2014 | Mudugu et al. | |
| 2014/0188956 A1 | 7/2014 | Subba et al. | |
| 2014/0196143 A1 | 7/2014 | Fliderman et al. | |
| 2014/0208418 A1 | 7/2014 | Libin | |
| 2014/0244309 A1 | 8/2014 | Francois | |
| 2014/0244325 A1 | 8/2014 | Cartwright | |
| 2014/0244399 A1 | 8/2014 | Orduna et al. | |
| 2014/0258093 A1 | 9/2014 | Gardiner et al. | |
| 2014/0278663 A1 | 9/2014 | Samuel et al. | |
| 2014/0283027 A1 | 9/2014 | Orona et al. | |
| 2014/0283106 A1 | 9/2014 | Stahura et al. | |
| 2014/0288971 A1 | 9/2014 | Whibbs, III | |
| 2014/0289862 A1 | 9/2014 | Gorfein et al. | |
| 2014/0324480 A1 | 10/2014 | Dufel et al. | |
| 2014/0337466 A1 | 11/2014 | Li et al. | |
| 2014/0344015 A1 | 11/2014 | Puértolas-Montañés et al. | |
| 2015/0012363 A1 | 1/2015 | Grant et al. | |
| 2015/0019530 A1 | 1/2015 | Felch | |
| 2015/0033112 A1 | 1/2015 | Norwood et al. | |
| 2015/0066577 A1 | 3/2015 | Christiansen et al. | |
| 2015/0106867 A1 | 4/2015 | Liang | |
| 2015/0106948 A1 | 4/2015 | Holman et al. | |
| 2015/0106949 A1 | 4/2015 | Holman et al. | |
| 2015/0169318 A1 | 6/2015 | Nash | |
| 2015/0178740 A1 | 6/2015 | Borawski et al. | |
| 2015/0199541 A1* | 7/2015 | Koch | G06F 21/31 726/29 |
| 2015/0229664 A1 | 8/2015 | Hawthorn et al. | |
| 2015/0235050 A1 | 8/2015 | Wouhaybi et al. | |
| 2015/0242778 A1 | 8/2015 | Wilcox et al. | |

(56) References Cited

U.S. PATENT DOCUMENTS

| | | |
|---|---|---|
| 2015/0254597 A1 | 9/2015 | Jahagirdar |
| 2015/0261887 A1 | 9/2015 | Joukov |
| 2015/0264417 A1 | 9/2015 | Spitz et al. |
| 2015/0269384 A1 | 9/2015 | Holman et al. |
| 2015/0310227 A1 | 10/2015 | Ishida et al. |
| 2015/0310575 A1 | 10/2015 | Shelton |
| 2015/0356362 A1 | 12/2015 | Demos |
| 2015/0379430 A1 | 12/2015 | Dirac et al. |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0099963 A1 | 4/2016 | Mahaffey et al. |
| 2016/0103963 A1 | 4/2016 | Mishra |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0188450 A1 | 6/2016 | Appusamy et al. |
| 2016/0232534 A1 | 8/2016 | Lacey et al. |
| 2016/0234319 A1 | 8/2016 | Griffin |
| 2016/0261631 A1 | 9/2016 | Vissamsetty et al. |
| 2016/0262163 A1 | 9/2016 | Gonzalez Garrido et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0041324 A1 | 2/2017 | Ionutescu et al. |
| 2017/0068785 A1 | 3/2017 | Experton et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0142158 A1 | 5/2017 | Laoutaris et al. |
| 2017/0142177 A1 | 5/2017 | Hu |
| 2017/0161520 A1 | 6/2017 | Lockhart, III et al. |
| 2017/0171235 A1 | 6/2017 | Mulchandani et al. |
| 2017/0177324 A1 | 6/2017 | Frank et al. |
| 2017/0180505 A1 | 6/2017 | Shaw et al. |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2018/0039975 A1 | 2/2018 | Hefetz |
| 2018/0041498 A1 | 2/2018 | Kikuchi |
| 2018/0046753 A1 | 2/2018 | Shelton |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0165637 A1 | 6/2018 | Romero et al. |
| 2018/0198614 A1 | 7/2018 | Neumann |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0307859 A1 | 10/2018 | Lafever et al. |
| 2018/0352003 A1 | 12/2018 | Winn et al. |
| 2018/0357243 A1 | 12/2018 | Yoon |
| 2018/0374030 A1 | 12/2018 | Barday et al. |
| 2019/0012672 A1 | 1/2019 | Francesco |
| 2019/0130132 A1 | 5/2019 | Barbas et al. |
| 2019/0156058 A1 | 5/2019 | Van Dyne et al. |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0294818 A1 | 9/2019 | Barday et al. |

FOREIGN PATENT DOCUMENTS

| | | |
|---|---|---|
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

Bayardo, Roberto J., and Ramakrishnan Srikant. "Technological solutions for protecting privacy." Computer 36.9 (2003): pp. 115-118. (Year: 2003).*

Dokholyan, Rachel S., et al. "Regulatory and ethical considerations for linking clinical and administrative databases." American heart journal 157.6 (2009): pp. 971-982. (Year: 2009).*

Final Office Action, dated Sep. 25, 2019, from corresponding U.S. Appl. No. 16/278,119.

Barker, "Personalizing Access Control by Generalizing Access Control," ACM, pp. 149-158 (Year: 2010).

Final Written Decision Regarding Post-Grant Review in Case PGR2018-00056 for U.S. Pat. No. 9,691,090 B1, Oct. 10, 2019.

Gustarini, et al, "Evaluation of Challenges in Human Subject Studies "In-the-Wild" Using Subjects' Personal Smartphones," ACM, pp. 1447-1456 (Year: 2013).

Kirkam, et al, "A Personal Data Store for an Internet of Subjects," IEEE, pp. 92-97 (Year: 2011).

Notice of Allowance, dated Oct. 10, 2019, from corresponding U.S. Appl. No. 16/277,539.

Notice of Allowance, dated Oct. 3, 2019, from corresponding U.S. Appl. No. 16/511,700.

Office Action, dated Oct. 8, 2019, from corresponding U.S. Appl. No. 16/552,765.

Zannone, et al, "Maintaining Privacy on Derived Objects," ACM, pp. 10-19 (Year 2005).

Office Action, dated Oct. 16, 2019, from corresponding U.S. Appl. No. 16/557,392.

Notice of Allowance, dated Dec. 5, 2017, from corresponding U.S. Appl. No. 15/633,703.

Notice of Allowance, dated Dec. 6, 2017, from corresponding U.S. Appl. No. 15/619,451.

Notice of Allowance, dated Dec. 6, 2017, from corresponding U.S. Appl. No. 15/619,459.

Notice of Allowance, dated Feb. 13, 2019, from corresponding U.S. Appl. No. 16/041,563.

Notice of Allowance, dated Feb. 14, 2019, from corresponding U.S. Appl. No. 16/226,272.

Notice of Allowance, dated Feb. 19, 2019, from corresponding U.S. Appl. No. 16/159,632.

Notice of Allowance, dated Feb. 27, 2019, from corresponding U.S. Appl. No. 16/041,468.

Notice of Allowance, dated Feb. 27, 2019, from corresponding U.S. Appl. No. 16/226,290.

Notice of Allowance, dated Jan. 18, 2018, from corresponding U.S. Appl. No. 15/619,478.

Notice of Allowance, dated Jan. 18, 2019 from corresponding U.S. Appl. No. 16/159,635.

(56) References Cited

OTHER PUBLICATIONS

Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 17, 2019, from corresponding U.S. Appl. 16/055,961.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 31, 2019, from corresponding U.S. Appl. No. 16/221,153.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 21, 2019, from corresponding U.S. Appl. No. 16/404,439.
Notice of Allowance, dated Jun. 27, 2018, from corresponding U.S. Appl. No. 15/882,989.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 2, 2018, from corresponding U.S. Appl. No. 15/858,802.
Notice of Allowance, dated Mar. 25, 2019, from corresponding U.S. Appl. No. 16/054,780.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated May 21, 2018, from corresponding U.S. Appl. No. 15/896,790.
Notice of Allowance, dated May 28, 2019, from corresponding U.S. Appl. No. 16/277,568.
Notice of Allowance, dated May 5, 2017, from corresponding U.S. Appl. No. 15/254,901.
Notice of Allowance, dated Nov. 2, 2018, from corresponding U.S. Appl. No. 16/054,762.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Olenski, Steve, For Consumers, Data Is a Matter of Trust, CMO Network, Apr. 18, 2016, https://www.forbes.com/sites/steveolenski/2016/04/18/for-consumers-data-is-a-matter-of-trust/#2e48496278b3.
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Popescu-Zeletin, "The Data Access and Transfer Support in a Local Heterogeneous Network (HMINET)", IEEE, pp. 147-152 (Year: 1979).
Restriction Requirement, dated Apr. 10, 2019, from corresponding U.S. Appl. No. 16/277,715.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.

(56) References Cited

OTHER PUBLICATIONS

Restriction Requirement, dated Nov. 21, 2016, from corresponding U.S. Appl. No. 15/254,901.
Restriction Requirement, dated Oct. 17, 2018, from corresponding U.S. Appl. No. 16/055,984.
Restriction Requirement, dated Sep. 9, 2019, from corresponding U.S. Appl. No. 16/505,426.
Salim et al, "Data Retrieval and Security using Lightweight Directory Access Protocol", IEEE, pp. 685-688 (Year: 2009).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Srivastava, Agrima, et al, Measuring Privacy Leaks in Online Social Networks, International Conference on Advances in Computing, Communications and Informatics (ICACCI), 2013.
Stern, Joanna, "iPhone Privacy Is Broken . . . and Apps Are to Blame", The Wall Street Journal, wsj.com, May 31, 2019.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
The Cookie Collective, Optanon Cookie Policy Generator, The Cookie Collective, Year 2016, http://web.archive.org/web/20160324062743/https:/optanon.com/.
TRUSTe Announces General Availability of Assessment Manager for Enterprises to Streamline Data Privacy Management with Automation, PRNewswire, Mar. 4, 2015.
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Weaver et al, "Understanding Information Preview in Mobile Email Processing", ACM, pp. 303-312, 2011 (Year: 2011).
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/03689.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 19, 2018, from corresponding International Application No. PCT/US2018/046939.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
www.truste.com (1), 200150207, Internet Archive Wayback Machine, www.archive.org,2_7_2015.
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).

(56) References Cited

OTHER PUBLICATIONS

Zeldovich, Nickolai, et al, Making Information Flow Explicit in HiStar, OSDI '06: 7th USENIX Symposium on Operating Systems Design and Implementation, USENIX Association, p. 263-278.
Zhang et al, "Data Transfer Performance Issues for a Web Services Interface to Synchrotron Experiments", ACM, pp. 59-65 (Year: 2007).
Zhang et al, "Dynamic Topic Modeling for Monitoring Market Competition from Online Text and Image Data", ACM, pp. 1425-1434 (Year: 2015).
Notice of Allowance, dated Sep. 12, 2019, from corresponding U.S. Appl. No. 16/512,011.
Office Action, dated Sep. 16, 2019, from corresponding U.S. Appl. No. 16/277,715.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Li, Ninghui, et al, t-Closeness: Privacy Beyond k-Anonymity and I-Diversity, IEEE, 2014, p. 106-115.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Maret et al, "Multimedia Information Interchange: Web Forms Meet Data Servers", IEEE, pp. 499-505 (Year: 1999).
McGarth et al, "Digital Library Technology for Locating and Accessing Scientific Data", ACM, pp. 188-194 (Year: 1999).
Mudepalli et al, "An efficient data retrieval approach using blowfish encryption on cloud CipherText Retrieval in Cloud Computing" IEEE, pp. 267-271 (Year: 2017).
Newman, "Email Archive Overviews using Subject Indexes", ACM, pp. 652-653, 2002 (Year: 2002).
Notice of Allowance, dated Apr. 12, 2017, from corresponding U.S. Appl. No. 15/256,419.
Notice of Allowance, dated Apr. 2, 2019, from corresponding U.S. Appl. No. 16/160,577.
Notice of Allowance, dated Apr. 25, 2018, from corresponding U.S. Appl. No. 15/883,041.
Notice of Allowance, dated Apr. 8, 2019, from corresponding U.S. Appl. No. 16/228,250.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 9, 2018, from corresponding U.S. Appl. No. 15/882,989.
Notice of Allowance, dated Dec. 10, 2018, from corresponding U.S. Appl. No. 16/105,602.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 31, 2018, from corresponding U.S. Appl. No. 16/159,634.
Abdullah et al, "The Mapping Process of Unstructured Data to the Structured Data", ACM, pp. 151-155 (Year: 2013).
Acar, Gunes, et al, The Web Never Forgets, Computer and Communications Security, ACM, Nov. 3, 2014, pp. 674-689.
Aghasian, Elan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Antunes et al, "Preserving Digital Data in Heterogeneous Environments", ACM, pp. 345-348, 2009 (Year: 2009).
Avepoint, Automating Privacy Impact Assessments, AvePoint, Inc.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, Inc.
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bhargav-Spantzel et al., Receipt Management—Transaction History based Trust Establishment, 2007, ACM, p. 82-91.

(56) References Cited

OTHER PUBLICATIONS

Bhuvaneswaran et al, "Redundant Parallel Data Transfer Schemes for the Grid Environment", ACM, pp. 18 (Year: 2006).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).
Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dunkel et al, "Data Organization and Access for Efficient Data Mining", IEEE, pp. 522-529 (Year: 1999).
Dwork, Cynthia, Differential Privacy, Microsoft Research, p. 1-12.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Falahrastegar, Marjan, et al, Tracking Personal Identifiers Across the Web, Medical Image Computing and computer-Assisted Intervention—Miccai 2015, 18th International Conference, Oct. 5, 2015, Munich, Germany.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Mar. 5, 2019, from corresponding U.S. Appl. No. 16/055,961.
Final Office Action, dated Nov. 29, 2017, from corresponding U.S. Appl. No. 15/619,237.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year: 2010).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Hacigümüs, Hakan, et al, Executing SQL over Encrypted Data in the Database-Service-Provider Model, ACM, Jun. 1, 2002, pp. 216-227.
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.
IAPP, Daily Dashboard, PIA Tool Stocked With New Templates for Dpi, Infosec, International Association of Privacy Professionals, Apr. 22, 2014.
IAPP, ISO/IEC 27001 Information Security Management Template, Resource Center, International Association of Privacy Professionals.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Mar. 14, 2019, from corresponding International Application No. PCT/US2018/055736.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 27, 2017, from corresponding U.S. Appl. No. 15/626,052.
Notice of Allowance, dated Sep. 28, 2018, from corresponding U.S. Appl. No. 16/041,520.
Notice of Allowance, dated Sep. 4, 2018, from corresponding U.S. Appl. No. 15/883,041.
Notice of Filing Date for Petition for Post-Grant Review of related U.S. Pat. No. 9,691,090 dated Apr. 12, 2018.
Office Action, dated Apr. 18, 2018, from corresponding U.S. Appl. No. 15/894,819.
Office Action, dated Apr. 22, 2019, from corresponding U.S. Appl. No. 16/241,710.
Office Action, dated Apr. 5, 2019, from corresponding U.S. Appl. No. 16/278,119.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Office Action, dated Aug. 19, 2019, from corresponding U.S. Appl. No. 16/278,122.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 27, 2019, from corresponding U.S. Appl. No. 16/410,296.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 6, 2019, from corresponding U.S. Appl. No. 16/404,491.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 3, 2018, from corresponding U.S. Appl. No. 16/055,998.

(56) References Cited

OTHER PUBLICATIONS

Office Action, dated Dec. 31, 2018, from corresponding U.S. Appl. No. 16/160,577.
Office Action, dated Feb. 15, 2019, from corresponding U.S. Appl. No. 16/220,899.
Office Action, dated Feb. 26, 2019, from corresponding U.S. Appl. No. 16/228,250.
Office Action, dated Jan. 18, 2019, from corresponding U.S. Appl. No. 16/055,984.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jul. 18, 2019, from corresponding U.S. Appl. No. 16/410,762.
Office Action, dated Jul. 21, 2017, from corresponding U.S. Appl. No. 15/256,430.
Office Action, dated Jul. 23, 2019, from corresponding U.S. Appl. No. 16/436,616.
Office Action, dated Jun. 24, 2019, from corresponding U.S. Appl. No. 16/410,336.
Office Action, dated Jun. 27, 2019, from corresponding U.S. Appl. No. 16/404,405.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 25, 2019, from corresponding U.S. Appl. No. 16/278,121.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 4, 2019, from corresponding U.S. Appl. No. 16/237,083.
Office Action, dated May 16, 2018, from corresponding U.S. Appl. No. 15/882,989.
Office Action, dated May 17, 2019, from corresponding U.S. Appl. No. 16/277,539.
Office Action, dated May 2, 2018, from corresponding U.S. Appl. No. 15/894,809.
Office Action, dated May 2, 2019, from corresponding U.S. Appl. No. 16/104,628.
Office Action, dated Nov. 1, 2017, from corresponding U.S. Appl. No. 15/169,658.
Office Action, dated Nov. 15, 2018, from corresponding U.S. Appl. No. 16/059,911.
Office Action, dated Nov. 23, 2018, from corresponding U.S. Appl. No. 16/042,673.
Office Action, dated Oct. 10, 2018, from corresponding U.S. Appl. No. 16/041,563.
Goni, Kyriaki, "Deletion Process_Only you can see my history: Investigating Digital Privacy, Digital Oblivion, and Control on Personal Data Through an Interactive Art Installation," ACM, 2016, retrieved online Oct. 3, 2019, pp. 324-333. Retrieved from the Internet URL: http://delivery.acm.org/10.1145/2920000/291.
Notice of Allowance, dated Nov. 14, 2019, from corresponding U.S. Appl. No. 16/436,616.
Notice of Allowance, dated Nov. 5, 2019, from corresponding U.S. Appl. No. 16/560,965.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Office Action, dated Nov. 15, 2019, from corresponding U.S. Appl. No. 16/552,758.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Restriction Requirement, dated Nov. 15, 2019, from corresponding U.S. Appl. No. 16/586,202.
Restriction Requirement, dated Nov. 5, 2019, from corresponding U.S. Appl. No. 16/563,744.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Office Action, dated Dec. 2, 2019, from corresponding U.S. Appl. No. 16/560,963.
Notice of Allowance, dated Dec. 4, 2019, from corresponding U.S. Appl. No. 16/594,670.
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Final Office Action, dated Dec. 9, 2019, from corresponding U.S. Appl. No. 16/410,336.
Joonbakhsh et al, "Mining and Extraction of Personal Software Process measures through IDE Interaction logs," ACM/IEEE, 2018, retrieved online Dec. 2, 2019, pp. 78-81. Retrieved from the Internet: URL: http://delivery.acm.org/10.1145/3200000/3196462/p78-joonbakhsh.pdf?(Year: 2018).
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 13, 2019, from corresponding U.S. Appl. No. 16/512,033.
Notice of Allowance, dated Dec. 16, 2019, from corresponding U.S. Appl. No. 16/505,461.
Notice of Allowance, dated Dec. 18, 2019, from corresponding U.S. Appl. No. 16/659,437.
Notice of Allowance, dated Dec. 9, 2019, from corresponding U.S. Appl. No. 16/565,261.
Office Action, dated Dec. 11, 2019, from corresponding U.S. Appl. No. 16/578,712.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 19, 2019, from corresponding U.S. Appl. No. 16/410,866.
Restriction Requirement, dated Dec. 9, 2019, from corresponding U.S. Appl. No. 16/565,395.
Binns, et al, "Data Havens, or Privacy Sans Frontières? A Study of International Personal Data Transfers," ACM, pp. 273-274 (Year: 2002).
Emerson, et al, "A Data Mining Driven Risk Profiling Method for Road Asset Management," ACM, pp. 1267-1275 (Year: 2013).
Guo, et al, "OPAL: A Passe-partout for Web Forms," ACM, pp. 353-356 (Year: 2012).
Hodge, et al, "Managing Virtual Data Marts with Metapointer Tables," pp. 1-7 (Year: 2002).
Islam, et al, "Mixture Model Based Label Association Techniques for Web Accessibility," ACM, pp. 67-76 (Year: 2010).
Notice of Allowance, dated Dec. 23, 2019, from corresponding U.S. Appl. No. 16/656,835.
Notice of Allowance, dated Dec. 31, 2019, from corresponding U.S. Appl. No. 16/404,399.
Notice of Allowance, dated Jan. 2, 2020, from corresponding U.S. Appl. No. 16/410,296.

(56) References Cited

OTHER PUBLICATIONS

Office Action, dated Dec. 23, 2019, from corresponding U.S. Appl. No. 16/593,639.
Qiu, et al, "Design and Application of Data Integration Platform Based on Web Services and XML," IEEE, pp. 253-256 (Year: 2016).
Santhisree, et al, "Web Usage Data Clustering Using Dbscan Algorithm and Set Similarities," IEEE, pp. 220-224 (Year: 2010).
Yu, et al, "Performance and Fairness Issues in Big Data Transfers," ACM, pp. 9-11 (Year: 2014).
Zhu, et al, "Dynamic Data Integration Using Web Services," IEEE, pp. 1-8 (Year: 2004).
Notice of Allowance, dated Jan. 14, 2020, from corresponding U.S. Appl. No. 16/277,715.
Notice of Allowance, dated Jan. 8, 2020, from corresponding U.S. Appl. No. 16/600,879.
Office Action, dated Jan. 7, 2020, from corresponding U.S. Appl. No. 16/572,182.
Final Office Action, dated Jan. 21, 2020, from corresponding U.S. Appl. No. 16/410,762.
Final Office Action, dated Jan. 23, 2020, from corresponding U.S. Appl. No. 16/505,430.
Office Action, dated Jan. 24, 2020, from corresponding U.S. Appl. No. 16/505,426.
Office Action, dated Jan. 24, 2020, from corresponding U.S. Appl. No. 16/700,049.

\* cited by examiner

FIG. 9

| | Assets 905 | Managing Organi... 910 | Hosting Location 915 | Type 920 | Processing Activi... 925 | Status 930 |
|---|---|---|---|---|---|---|
| ☐ | 4th Asset | Sabourin DM79 | Tunisia | Database | ... | New |
| ☐ | 5th Asset | Sabourin DM79 | United Arab Emira... | ... | ... | In Discovery |
| ☐ | 7th Asset | Sabourin DM79 | Algeria | Application | ... | In Discovery |
| ☐ | Asset 1 | Sabourin DM79 | Afghanistan | Database | ... | In Discovery |
| ☐ | Asset 2 | Sabourin DM79 | United Arab Emira... | ... | ... | In Discovery |
| ☐ | ThirdAsset | Sabourin DM79 | United Kingdom | ... | ... | |

+ New Assets

Showing 1-6 of 6

Sidebar: Data Mapping — Dashboard, Asset Template, Processing Template, Assessments, Assets, Processing Activities, Data Elements, Asset Map, Scan Results Header: OneTrust | Sabourin DM79 | Hello Jason SITEADMIN79

Send Assessments(0) | Delete(0)

First, which service do you want to try?

Why we suggest trying one product at a time.

I want to try:
○ Email Marketing — What's included? | Pricing
○ Online Survey — What's included? | Pricing
○ Event Marketing — What's included? | Pricing

Tell us about yourself.

First Name: [                    ]
Last Name: [                    ]
Organization Name: [                    ]
Country: [United States ▼]
State: [Choose State ▼]
Phone Number: [          ]  So we can get in touch about our free coaching.
Email: [                    ]  We'll send you an email to confirm your trial and verify your address.
Website: [                    ]

Verify Your Identity

Name: Joe Lopez

To verify your identity, please answer the following questions.
- Which of the following STREETS have you NEVER lived or used as your address?
  ○
  ○
  ○
  ○
  ○ ALL OF THE ABOVE
- With which of the following PEOPLE are you most closely associated?
  ○
  ○
  ○
  ○
  ○ NONE OF THE ABOVE
- Which of the following CITIES have you PREVIOUSLY OR CURRENTLY used as your address?
  ○
  ○
  ○
  ○
  ○ NONE OF THE ABOVE

| Section A: Employee Information | | | | |
|---|---|---|---|---|
| Last name<br>DOE | First name<br>JOHN | M.I. | Social Security no.[2] (required)<br>123-45-6789 | |
| Home address-Street and PO Box if applicable<br>123 MAIN STREET | | | | |
| City<br>ATLANTA | County<br>FULTON | | State<br>GA | ZIP code<br>30309 |
| Marital Status<br>☒ Single  ☐ Married  ☐ Domestic Partner | Primary phone no.<br>555-555-5555 | Secondary phone no. | | |
| Employee email address<br>JDOE@ACME.COM | | | | |
| Employer name<br>ACME CORP | | | Group no. (if known) | |
| Employer street address<br>123 EAST PARKWAY | | | | |
| City<br>ATLANTA | Country<br>FULTON | | State<br>GA | ZIP code<br>30309 |
| Employment status:<br>☒ Full time  ☐ Part time | Income reported by:<br>☒ W-2  ☐ 1099  ☐ Other: | No. of hours worked per week | | |
| Date of hire<br>(MM/DD/YYYY) | Date of full-time employment<br>(MM/DD/YYYY) | Date waiting period begins<br>(MM/DD/YYYY) | | |

| Section B: Applicable Type | |
|---|---|
| Select one | |
| ☐ New enrollment<br>☐ open enrollment<br>　(not applicable for<br>　Life and Disability)<br>☐ Rehire - Rehire date: | ☐ COBRA -<br>Select qualifying event<br>☐ Left employment<br>☐ Loss of dependent child status<br>☐ Medicare | ☐ Reduction in hours<br>☐ Divorce or legal separation<br>☐ Covered employee's Medicare entitlement | ☐ Death | Qualifying event date |

[1] A small group must have at least one eligible employee, in addition to the bussiness owner. A spouse cannot be the only eligible employee.
[2] Blue Cross and Blue Shield of Georga ist required by the Internal Revenue Service to collect this information.

Scenario #1: User Uplods PDF
- The system maps values to the now defined structure.

| Value | Object |
|---|---|
| John | First Name |
| Doe | Last Name |
| 123456789 | Social Security No. |
| 123 Main Street | Address |
| Atlanta | City |
| Fulton | County |
| GA | State |
| 30309 | Zip Code |
| Single | Marital Status |
| 5555555555 | Primary Phone Number |
| Jdoe@acme.com | Employee Email Address |
| Acme Corp | Employer Name |
| 123 East Parkway | Employer Street Address |
| Atlanta | City |
| Fulton | County |
| GA | State |
| 30309 | Zip Code |
| Full Time | Employment Status |
| W-2 | Employment Reported by |

FIG. 61

- The system created groupings are added

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employer Email Address | Employee Information |
| Acme Corp | Employer Name | Employer |
| 123 East Parkway | Employee Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

FIG. 61 CONT.

- Additional potential mappings are also included

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123456789 | Tax Identification Number | Employee Information |
| 123456789 | Account Number | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employee Email Address | Employee Information |
| Acme Corp | Employer Name | Employer |
| 123 East Parkway | Employer Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

FIG. 61 CONT.

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123456789 | Tax Identification Number | Employee Information |
| 123456789 | Account Number | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employee Email Address | Employee Information |
| Acme Corp | Employer Name | Employer |
| 123 East Parkway | Employer Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

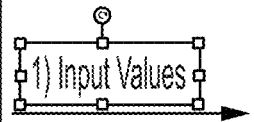

FIG. 62

| Data Element | Data Category | Classification |
|---|---|---|
| Contact details | Contact Information | PII |
| Home Address | Contact Information | PII |
| Phone Numbers | Contact Information | PII |
| Details / description of role | Employment Information | PII |
| Employer Identification Number | Employment Information | Sensitive Personal Data |
| 1-9 Forms | Employment Information | Sensitive Personal Data |
| Job status - full time / part time | Employment Information | PII |
| Office location | Employment Information | PII |
| Salary / wage | Employment Information | |
| Start date | Employment Information | |
| Tax Identification Number | Government Identifiers | Sensitive Personal Data |
| Health insurance details | Personal Health Information | Sensitive Personal Data |
| Health Plan Account Number | Personal Health Information | Sensitive Personal Data |
| Date of Birth | Personal Identification | PII |
| First Name | Personal Identification | Partial PII |
| Full Name | Personal Identification | PII |
| Last Name | Personal Identification | PII |
| Gender | Personal Identification | Partial PII |
| Marital Status | Personal Identification | Personal Data |
| Account Number | User Account Information | Sensitive Personal Data |

2) Database of Personal Data classification

FIG. 62 CONT.

3) Mapping Results

| Value | Object | Context | Category | Classification | Confidence | Score |
|---|---|---|---|---|---|---|
| Employee Information | Context | | | | | |
| John | First Name | Employee Information | Personal Identification | Partial PII | 70% | 2 |
| Doe | Last Name | Employee Information | Personal Identification | Partial PII | 70% | 2 |
| John Doe | Full Name | Employee Information | Personal Identification | PII | 80% | 6 |
| 123456789 | Social Security No | Employee Information | Personal Identification | Sensitive PII | 90% | 9 |
| 123456789 | Tax Identification Number | Employee Information | Personal Identification | Sensitive PII | 30% | 9 |
| 123456789 | Account Number | Employee Information | Personal Identification | Sensitive PII | 30% | 9 |
| 123 Main Street | Address | Employee Information | Location | Partial PII | 80% | 2 |
| Atlanta | City | Employee Information | Location | Partial PII | 80% | 2 |
| Fulton | County | Employee Information | Location | Partial PII | 80% | 2 |
| GA | State | Employee Information | Location | Partial PII | 80% | 2 |
| 30309 | Zip Code | Employee Information | Location | Partial PII | 80% | 2 |
| Single | Marital Status | Employee Information | Marital Status | Sensitive PII | 90% | 6 |
| 5555555555 | Primary Phone Number | Employee Information | Contact | PII | 60% | 5 |
| Jdoe@acme.com | Employer Email Address | Employee Information | Contact | Partial PII | 90% | 1 |
| Acme Corp | Employer Name | Employer | Entity Name | Partial PII | 90% | 1 |
| 123 East Parkway | Employee Street Address | Employer | Location | Non-PII | 90% | 0 |
| Atlanta | City | Employer | Location | Non-PII | 80% | 0 |
| Fulton | County | Employer | Location | Non-PII | 80% | 0 |
| GA | State | Employer | Location | Non-PII | 80% | 0 |
| 30309 | Zip Code | Employer | Location | Non-PII | 80% | 0 |
| Full Time | Employment Status | Employment | Employment Status | Sensitive PII | 90% | 7 |

4) Finalized Document Results
Document Score = 45
Document Category = Sensitive

FIG. 62 CONT.

DATA PROCESSING SYSTEMS FOR CENTRAL CONSENT REPOSITORY AND RELATED METHODS

CROSS REFERENCE TO RELATED APPLICATIONS

This application is a continuation-in-part of U.S. patent application Ser. No. 16/409,673, filed May 10, 2019, which is a continuation of U.S. patent application Ser. No. 16/159,635, filed Oct. 13, 2018, now U.S. Pat. No. 10,289,867, issued May 14, 2019, which claims priority from U.S. Provisional Patent Application Ser. No. 62/572,096, filed Oct. 13, 2017 and U.S. Provisional Patent Application Ser. No. 62/728,435, filed Sep. 7, 2018, and is also a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839, filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; and (3) U.S. Provisional Patent Application Ser. No. 62/348,695, filed Jun. 10, 2016. The disclosures of all of the above patent applications are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and industry requirements. However, there is an increasing need for improved systems and methods to manage personal data in a manner that complies with such policies.

Similarly, as individuals have become more aware of the risks associated with the theft or misuse of their personal data, they have sought additional tools to help them manage which entities process their personal data. There is currently a need for improved tools that would allow individuals to minimize the number of entities that process their personal data—especially entities that the individual doesn't actively do business with.

SUMMARY

A computer-implemented data processing method for identifying one or more pieces of personal data that are not associated with the one or more privacy campaigns of a particular entity, in particular embodiments, comprises: (1) accessing, by one or more processors, via one or more computer networks, to one or more data assets of the particular entity; (2) scanning, by one or more processors, the one or more data assets to generate a catalog of one or more privacy campaigns and one or more pieces of personal information associated with one or more individuals; (3) storing, by one or more processors, the generated catalog in computer memory; (4) scanning, by one or more processors, one or more data assets based at least in part on the generated catalog to identify a first portion of the one or more pieces of personal data that are one or more pieces of personal data that are not associated with the one or more privacy campaigns; (5) generating, by one or more processors, an indication that the first portion of one or more pieces of personal data that are not associated with the one or more privacy campaigns of the particular entity is to be removed from the one or more data assets; (6) presenting, by one or more processors, the indication to one or more individuals associated with the particular entity; and (7) removing, by one or more processors, the first portion of the one or more pieces of personal data that are not associated with the one or more privacy campaigns of the particular entity from the one or more data assets.

A computer-implemented data processing method for removing one or more pieces of personal data that are not associated with the one or more privacy campaigns of a particular entity, in particular embodiments, comprises: (1) accessing, by one or more processors, via one or more computer networks, one or more data models that map an association between (i) one or more pieces of personal data associated with one or more individuals stored within one or more data assets of the particular entity and (ii) one or more privacy campaigns of the particular entity; (2) analyzing, by one or more processors, the one or more data models to identify a first portion of the one or more pieces of personal data that are one or more pieces of personal data that are not associated with the one or more privacy campaigns; and (3) automatically removing the first portion of the one or more pieces of personal data that are not associated with the one or more privacy campaigns of the particular entity from the one or more data assets.

Various embodiments are also described in the following listing of concepts:

1. A computer-implemented data processing method for identifying one or more pieces of personal data that are not associated with one or more privacy campaigns of a particular entity, the method comprising:

accessing, by one or more processors, via one or more computer networks, one or more data assets of the particular entity;

scanning, by one or more processors, the one or more data assets to generate a catalog of one or more privacy campaigns and one or more pieces of personal information associated with one or more individuals;

storing, by one or more processors, the generated catalog in computer memory;

scanning, by one or more processors, one or more data assets based at least in part on the generated catalog to identify a first portion of the one or more pieces of personal data that are one or more pieces of personal data that are not associated with the one or more privacy campaigns;

generating, by one or more processors, an indication that the first portion of one or more pieces of personal data that are not associated with the one or more privacy campaigns of the particular entity is to be removed from the one or more data assets;

presenting, by one or more processors, the indication to one or more individuals associated with the particular entity; and removing, by one or more processors, the first portion of the one or more pieces of personal data that are not associated with the one or more privacy campaigns of the particular entity from the one or more data assets.

2. The computer-implemented data processing method of Concept 1, wherein the first portion of the one or more pieces of personal data that are not associated with the one or more privacy campaigns of the particular entity are automatically removed from the one or more data assets.

3. The computer-implemented data processing method of Concept 1, further comprising:

determining that one or more privacy campaigns have been terminated within the one or more data assets of the particular entity;

scanning the one or more data assets based at least in part on the generated catalog to identify the one or more pieces of personal data that are associated with the terminated one or more privacy campaigns; and generating an indication that the one or more pieces of personal data that are associated with the terminated one or more privacy campaigns are included in the first portion of the one or more pieces of personal data.

4. The computer-implemented data processing method of Concept 3, further comprising:

determining that one or more privacy campaigns of the particular entity have not been utilized in a period of time; and terminating the one or more privacy campaigns of the particular entity that have not been utilized in the period of time.

5. The computer-implemented data processing method of Concept 4, wherein the period of time is ninety or more days.

6. The computer-implemented data processing method of Concept 1, wherein presenting the indication to the one or more individuals associated with the particular entity further comprises:

receiving, by one or more processors, a selection, by the one or more individuals associated with the particular entity, of a first set of the one or more pieces of personal data of the first portion of the one or more pieces of personal data to retain based on one or more bases to retain the first set of the one or more pieces of personal data;

prompting, by one or more processors, the one or more individuals to provide one or more bases to retain the first set of the one or more pieces of personal data of the first portion of the one or more pieces of personal data that are not associated with the one or more privacy campaigns;

receiving, by one or more processors, the provided one or more bases to retain the first set of the one or more pieces of personal data of the first portion of the one or more pieces of personal data from the one or more individuals associated with the particular entity;

retaining, by one or more processors, the first set of the one or more pieces of personal data of the first portion of the one or more pieces of personal data from the one or more individuals associated with the particular entity; and removing a second set of the one or more pieces of personal data of the first portion of the one or more pieces of personal data that are not associated with the one or more privacy campaigns from the one or more data assets, wherein the second set of the one or more pieces of personal data is different from the first set of the one or more pieces of personal data and the first portion of the one or more pieces of personal data comprise the first set of the one or more pieces of personal data and the second set of the one or more pieces of personal data.

7. The computer-implemented data processing method of Concept 6, further comprising:

in response to receiving the provided one or more bases to retain the first set of the one or more pieces of personal data from the one or more individuals associated with the particular entity, submitting the provided one or more bases to retain the first set of the one or more pieces of personal data to one or more second individuals associated with the particular entity for authorization.

8. The computer-implemented data processing method of Concept 6, wherein the second set of the one or more pieces of personal data does not include one or more pieces of personal data.

9. A computer-implemented data processing method for removing one or more pieces of personal data that are not associated with one or more privacy campaigns of a particular entity, the method comprising:

accessing, by one or more processors, via one or more computer networks, one or more data models that map an association between (i) one or more pieces of personal data associated with one or more individuals stored within one or more data assets of the particular entity and (ii) one or more privacy campaigns of the particular entity;

analyzing, by one or more processors, the one or more data models to identify a first portion of the one or more pieces of personal data that are one or more pieces of personal data that are not associated with the one or more privacy campaigns; and automatically removing the first portion of the one or more pieces of personal data that are not associated with the one or more privacy campaigns of the particular entity from the one or more data assets.

10. The computer-implemented data processing method of Concept 9, further comprising:

receiving, by one or more processors, an indication of a new privacy campaign initiated by the particular entity;

in response to receiving the indication of the new privacy campaign initiated by the particular entity, modifying the one or more data models to map an association between (i) one or more pieces of personal data associated with one or more individuals obtained in connection with the new privacy campaign and (ii) the new privacy campaign initiated by the particular entity.

11. The computer-implemented data processing method of Concept 9, further comprising:

generating an indication that the first portion of the one or more pieces of personal data that are not associated with the one or more privacy campaigns of the particular entity is to be removed from the one or more data assets of the particular entity; and presenting the indication to one or more individuals associated with the particular entity.

12. The computer-implemented data processing method of Concept 9, further comprising:

determining that one or more privacy campaigns have been terminated within the one or more data assets of the particular entity;

analyzing, by one or more processors, the one or more data models to identify one or more pieces of personal data that are one or more pieces of personal data that are associated with the terminated one or more privacy campaigns; and generating an indication that the one or more pieces of personal data that are associated with the terminated one or more privacy campaigns are included in the first portion of the one or more pieces of personal data.

13. The computer-implemented data processing method of Concept 12, further comprising:

determining that one or more privacy campaigns of the particular entity have not been utilized in a period of time; and terminating the one or more privacy campaigns of the particular entity have not been utilized in the period of time.

14. The computer-implemented data processing method of Concept 13, wherein the period of time is ninety or more days.

15. A computer-implemented data processing method for generating a privacy data report of a particular entity, the method comprising:

accessing, by one or more processors, via one or more computer networks, one or more data models that map an association between (i) one or more pieces of personal information of one or more individuals stored within one or more data assets of the particular entity and (ii) one or more privacy campaigns of the particular entity;

accessing, by one or more processors, a data collection policy of the particular entity that is based at least in part on one or more collection parameters defining how one or more pieces of personal data of one or more individuals is collected by the particular entity and one or more storage parameters associated with storing the one or more pieces of personal data of the one or more individuals, and one or more data retention metrics of the particular entity that are based at least in part on the collection and storage by the particular entity of the one or more pieces of personal data of one or more individuals;

analyzing, by or more processors, the one or more data models to identify one or more pieces of personal data that are not associated with the one or more privacy campaigns;

generating, by one or more processors, a privacy data report based at least in part on (i) analyzing the one or more data models to identify one or more pieces of personal data that are not associated with the one or more privacy campaigns, (ii) the data collection policy of the particular entity, and (iii) the one or more data retention metrics of the particular entity; and providing, by one or more processors, the privacy data report to one or more individuals associated with the particular entity.

16. The computer-implemented data processing method of Concept 15, wherein the privacy data report comprises a comparison of the data collection policy and the one or more data retention metrics of the particular entity to one or more industry standard data collection policies and one or more industry standard data retention metrics.

17. The computer-implemented data processing method of Concept 15, wherein generating the privacy data report further comprises:

calculating a data risk score for the particular entity based at least in part on (i) analyzing the one or more data models to identify one or more pieces of personal data that are not associated with the one or more privacy campaigns, (ii) the data collection policy of the particular entity, and (iii) the one or more data retention metrics of the particular entity.

18. The computer-implemented data processing method of Concept 17, further comprising:

comparing the data risk score for the particular entity to a threshold data risk score;

determining that the data risk score for the particular entity is less than the threshold data risk score;

in response to determining that the data risk score for the particular entity is less than the threshold risk score, generating a notification to indicate that the data risk score for the particular entity is less than the threshold risk score; and providing the notification to the one or more individuals associated with the particular entity.

19. The computer-implemented data processing method of Concept 17, further comprising:

comparing the data risk score for the particular entity to a threshold data risk score;

determining that the data risk score for the particular entity is greater than or equal to the threshold data risk score;

in response to determining that the data risk score for the particular entity is greater than the threshold risk score, generating a notification to indicate that the data risk score for the particular entity is greater than the threshold risk score; and providing the notification to the one or more individuals associated with the particular entity.

20. The computer-implemented data processing method of Concept 15, wherein the one or more data retention metrics comprise at least one data retention metric selected from a group consisting of:

a storage location of the one or more pieces of personal data;

a period of time the one or more pieces of personal data are stored by the particular entity;

a number of the one or more privacy campaigns accessing the one or more pieces of personal data; and an amount of the one or more pieces of personal data being collected by the particular entity.

A computer-implemented data processing method for generating a privacy data report of a particular entity, in particular embodiments, comprises: (1) accessing, by one or more processors, via one or more computer networks, one or more data models that map an association between (i) one or more pieces of personal information of one or more individuals stored within one or more data assets of the particular entity and (ii) one or more privacy campaigns of the particular entity; (2) accessing, by one or more processors, (i) a data collection policy of the particular entity that based at least in part on one or more collection parameters defining how one or more pieces of personal data of one or more individuals is collected by the particular entity and one or more storage parameters associated with storing the one or more pieces of personal data of the one or more individuals, and (ii) one or more data retention metrics of the particular entity that are based at least in part on the collection and storage by the particular entity of the one or more pieces of personal data of one or more individuals; (3) analyzing, by or more processors, the one or more data models to identify one or more pieces of personal data that are not associated with the one or more privacy campaigns; (4) generating, by one or more processors, a privacy data report based at least in part on (i) analyzing the one or more data models to identify one or more pieces of personal data that are not associated with the one or more privacy campaigns, (ii) the data collection policy of the particular entity, and (iii) the one or more data retention metrics of the particular entity; and (5) providing, by one or more processors, the privacy data report to one or more individuals associated with the particular entity.

A data management computer system for confirming a deletion of personal data associated with a data subject from one or more computer systems associated with an entity, in particular embodiments, comprises: (1) one or more computer processors; and (2) computer memory operatively coupled to the one or more processors, wherein the one or more computer processors are adapted for: (a) receiving an indication that the entity has completed an erasure of one or more pieces of personal data associated with the data subject under a right of erasure; (b) in response to receiving the indication that the entity (e.g., one or more computer systems associated with the entity) has completed the erasure, initiating a test interaction between a test data subject and the entity, the test interaction requiring a response from the entity to the test data subject; (c) in response to initiating the test interaction, determining whether one or more system associated with the entity have transmitted the response to the test data subject; and (d) in response to determining that the one or more systems associated with the entity have transmitted the response, (i) determining that the entity has not completed the erasure of the one or more pieces of personal data associated with the test data subject, and (ii) automatically taking one or more actions with regard to the personal data associated with the test data subject.

A data management computer system for confirming a deletion of personal data associated with a data subject from one or more computer systems associated with an entity, in particular embodiments, comprises: (1) one or more computer processors; and (2) computer memory operatively coupled to the one or more processors, wherein the one or more computer processors are adapted for: (a) receiving an indication that the entity has completed an erasure of one or more pieces of personal data associated with a test data subject under a right of erasure; (b) in response to receiving the indication that the entity has completed the erasure, initiating a test interaction between a test data subject and the entity, the test interaction requiring a response from the entity to the test data subject; (c) in response to initiating the test interaction, determining whether one or more system associated with the entity have initiated a test interaction response to the data subject based at least in part on the test interaction; and (d) in response to determining that the one or more systems associated with the entity have initiated the test interaction response, (i) determining that the entity has not completed the erasure of the one or more pieces of personal data associated with the data subject, and (ii) automatically taking one or more actions with regard to the personal data associated with the data subject.

A computer-implemented data processing method, in particular embodiments, comprises: (1) providing a communication to the entity, wherein the communication, (a) comprises a unique identifier associated with the data subject, (b) is performed without using a personal communication data platform, and (c) prompts the entity to provide a response by contacting the data subject via a personal communication data platform; (2) in response to providing the communication to the entity, determining whether the data subject has received a response via the personal communication data platform; (3) in response to determining that the data subject has received the response via the personal communication data platform, determining that the entity has not complied with the data subject's request for deletion of their personal data by the entity; (4) in response to determining that the entity has not complied with the data subject's request for deletion, generating an indication that the entity has not complied with the data subject's request for deletion of their personal data by the entity; and (5) digitally storing the indication that the entity has not complied with the data subject's request for deletion of their personal data in computer memory.

Various embodiments are also described in the following listing of concepts:

1. A data management computer system for confirming a deletion of personal data associated with a data subject from one or more computer systems associated with an entity, the system comprising:

one or more computer processors; and computer memory operatively coupled to the one or more processors, wherein the one or more computer processors are adapted for:

receiving an indication that the one or more computer systems have completed an erasure of one or more pieces of personal data associated with the data subject;

in response to receiving the indication that the one or more computer systems have completed the erasure, initiating a test interaction between the data subject and the entity, the test interaction requiring a response from the entity to the data subject;

in response to initiating the test interaction, determining whether one or more computer systems associated with the entity have initiated a test interaction response to the data subject based at least in part on the test interaction; and in response to determining that the one or more computer systems associated with the entity have initiated the test interaction response:

determining whether the one or more computer systems have completed the erasure of the one or more pieces of personal data associated with the data subject; and automatically taking one or more actions with regard to the personal data associated with the data subject.

2. The data management computer system of Concept 1, wherein the one or more actions comprise:

identifying the one or more pieces of personal data associated with the data subject that remain stored in the one or more computer systems of the entity;

flagging the one or more pieces of personal data associated with the data subject that remain stored in the one or more computer systems of the entity; and providing the flagged one or more pieces of personal data associated with the data subject that remain stored in the one or more computer systems of the entity to an individual associated with the entity.

3. The data management computer system of Concept 1, wherein:

initiating the test interaction between the data subject and the entity comprises substantially automatically completing a contact-request form hosted by the entity on behalf of the data subject.

4. The data management computer system of Concept 3, wherein:

substantially automatically completing the contact-request form comprises providing one or more pieces of identifying data associated with the data subject, the one or more pieces of identifying data comprising data other than contact data.

5. The data management computer system of Concept 4, wherein determining whether the one or more system associated with the entity have generated the test interaction response, further comprises:

determining whether the one or more computer systems of the entity have attempted to contact the data subject in response to submission of the contact-request form.

6. The data management computer system of Concept 1, wherein the method further comprises initiating a test interaction between the data subject and the entity in response to determining that a certain period of time has elapsed from a time that the data subject provided the request to delete the data subject's personal data.

7. The data management computer system of Concept 6, wherein the test interaction is automatically initiated by the computer system.

8. The data management computer system of Concept 1, wherein the one or more actions comprise:

generating a report indicating that one or more pieces of personal data associated with the data subject remain stored in the one or more computer systems of the entity; and providing the report to an individual associated with the entity.

9. A data management computer system for confirming deletion of personal data within one or more computer systems associated with an entity, the system comprising:

one or more computer processors; and computer memory operatively coupled to the one or more processors, wherein the one or more computer processors are adapted for:

receiving an indication that the one or more computer systems have completed an erasure of one or more pieces of personal data associated with a test data subject;

in response to receiving the indication that the one or more computer systems have completed the erasure, initiating a test interaction between a test data subject and the entity, the test interaction requiring a response from the entity to the test data subject;

in response to initiating the test interaction, determining whether the one or more computer systems associated with the entity have transmitted the response to the test data subject;

in response to determining that the one or more computer systems associated with the entity have transmitted the response:

determining whether the one or more computer systems have completed the erasure of the one or more pieces of personal data associated with the test data subject; and automatically taking one or more actions with regard to the personal data associated with the test data subject.

10. The data management computer system of Concept 9, wherein the one or more actions comprise:

identifying the one or more pieces of personal data associated with the test data subject that remain stored in the one or more computer systems of the entity;

flagging the one or more pieces of personal data associated with the test data subject that remain stored in the one or more computer systems of the entity; and providing the flagged one or more pieces of personal data associated with the test data subject that remain stored in the one or more computer systems of the entity to an individual associated with the entity.

11. The data management computer system of Concept 9, wherein:

initiating the test interaction between the test data subject and the entity comprises substantially automatically completing a contact-request form hosted by the entity on behalf of the test data subject.

12. The data management computer system of Concept 11, wherein:

substantially automatically completing the contact-request form comprises providing one or more pieces of identifying data associated with the test data subject, the one or more pieces of identifying data comprising data other than contact data.

13. The data management computer system of Concept 12, further comprising:

determining whether the one or more computer systems associated with the entity have generated the response and transmitted the response to the test data subject comprises determining whether the one or more computer systems have attempted to contact the test data subject in response to submission of the contact-request form.

14. The data management computer system of Concept 13, wherein the method further comprises initiating a test interaction between the data subject and the entity in response to determining that a certain period of time has elapsed from a time that the data subject provided the request to delete the data subject's personal data.

15. The data management computer system of Concept 14, wherein the test interaction is automatically initiated by the computer system.

16. The data management computer system of Concept 9, wherein the one or more actions comprise:

generating a report indicating that one or more pieces of personal data associated with the test data subject that remain stored in the one or more computer systems of the entity; and providing the report to an individual associated with the entity.

17. A computer-implemented data processing method for monitoring compliance by a particular entity with a data subject's request to delete the data subject's personal data from one or more computer systems associated with a particular entity, the method comprising:

providing a communication to the entity, wherein the communication:

(a) comprises a unique identifier associated with the data subject;

(b) is performed without using a personal communication data platform, and (c) prompts the entity to provide a response by contacting the data subject via a personal communication data platform;

in response to providing the communication to the entity, determining whether the data subject has received a response via the personal communication data platform;

in response to determining that the data subject has received the response via the personal communication data platform, determining whether the one or more computer systems have executed the data subject's request for deletion of the data subject's personal data;

in response to determining that the one or more computer systems have not complied with the data subject's request for deletion, generating an indication that the one or more computer systems have not complied with the data subject's request for deletion of the data subject's personal data; and digitally storing in computer memory the indication that the one or more computer systems have not complied with the data subject's request for deletion of the data subject's personal data.

18. The computer-implemented data processing method of Concept 17, further comprising:

identifying one or more pieces of personal data associated with the data subject that are stored in the one or more computer systems of the entity;

flagging the one or more pieces of personal data associated with the data subject that are stored in the one or more computer systems of the entity; and providing the flagged one or more pieces of personal data associated with the data subject that are stored in the one or more computer systems of the entity to an individual associated with the entity.

19. The computer-implemented data processing method of Concept 17, further comprising:

generating a report based at least in part on the indication that the entity has not complied with the data subject's request for deletion of their personal data in computer memory; and providing the generated report to an individual associated with the entity.

20. The computer-implemented data processing method of Concept 19, wherein the individual associated with the entity is a privacy officer of the entity.

A computer-implemented method for updating risk remediation data for an entity, in particular embodiments, comprises: (1) accessing risk remediation data for an entity that identifies one or more actions to remediate a risk in response to identifying one or more data assets of the entity potentially affected by one or more risk triggers; (2) receiving an indication of an update to the one or more data assets; (3) identifying one or more updated risk triggers for an entity based at least in part on the update to the one or more data assets; (4) determining, by using one or more data models associated with the risk remediation data, one or more updated actions to remediate the one or more updated risk triggers; (5) analyzing the one or more updated risk triggers to determine a relevance of the risk posed to the entity by the one or more updated risk triggers; and (6) updating the risk remediation data to include the one or more updated actions to remediate the risk in response to identifying the one or more updated risk triggers.

A computer-implemented method for updating risk remediation data of an entity, in particular embodiments, comprises: (1) receiving an indication of an update to the first data asset of the entity receiving an indication of an update to the first data asset of the entity; (2) identifying one or more risk triggers for an entity based at least in part on the update to the first data asset of the entity; (3) identifying a second data asset of the entity potentially affected by the one or more risk triggers based at least in part on an association of the first data asset and the second data asset; (4) determining, by using one or more data models, one or more first updated actions to remediate the one or more updated risk triggers for the first data asset; (5) determining, by using one or more data models, one or more second updated actions to remediate the one or more updated risk triggers for the second data asset; and (6) generating risk remediation data of the entity to include the one or more first updated actions and the one or more second updated actions to remediate the one or more potential risk triggers.

A computer-implemented method for generating risk remediation data for an entity, in particular embodiments, comprises: (1) accessing aggregate risk remediation data for a plurality of identified risk triggers from one or more organizations; (2) analyzing the aggregate risk remediation data to determine a remediation outcome for each of the plurality of identified risk triggers and an associated entity response to the particular identified risk trigger of the plurality of identified risk triggers; (3) in response to analyzing the aggregate risk remediation data to determine a remediation outcome for each of the plurality of identified risk triggers and an associated entity response to the particular identified risk trigger of the plurality of identified risk triggers, generating one or more risk remediation data models; and (4) generating risk remediation data for the entity based at least in part on the one or more risk remediation data models and one or more data assets of the entity.

Various embodiments are also described in the following listing of concepts:

1. A computer-implemented data processing method for updating risk remediation data for an entity, the method comprising:

accessing risk remediation data for an entity that identifies one or more actions to remediate a risk in response to identifying one or more data assets of the entity potentially affected by one or more risk triggers;

receiving an indication of an update to the one or more data assets;

identifying one or more updated risk triggers for an entity based at least in part on the update to the one or more data assets;

determining, by using one or more data models associated with the risk remediation data, one or more updated actions to remediate the one or more updated risk triggers;

analyzing the one or more updated risk triggers to determine a relevance of the risk posed to the entity by the one or more updated risk triggers; and updating the risk remediation data to include the one or more updated actions to remediate the risk in response to identifying the one or more updated risk triggers.

2. The computer-implemented data processing method of Concept 1, further comprising:

determining, based at least in part on the one or more data assets and the relevance of the risk, whether to take one or more updated actions in response to the one or more updated risk triggers; and taking the one or more updated actions to remediate the risk in response to identifying the one or more updated risk triggers.

3. The computer-implemented data processing method of Concept 1, wherein updating the risk remediation data is performed automatically.

4. The computer-implemented data processing method of Concept 1, wherein the one or more updated risk triggers comprises the one or more data assets being physically located in one or more particular locations.

5. The computer-implemented data processing method of Concept 4, wherein the one or more particular locations comprise a single physical location.

6. The computer-implemented data processing method of Concept 1, wherein analyzing the one or more updated risk triggers to determine the relevance of the risk posed to the entity by the one or more updated risk triggers further comprises:

calculating a risk level based at least in part on the one or more updated risk triggers;

in response to calculating the risk level, comparing the risk level to a threshold risk level for the entity; and in response to determining that the risk level is greater than or equal to the threshold risk level, updating the risk remediation data to include the one or more updated actions to remediate the risk in response to identifying the one or more updated risk triggers.

7. The computer-implemented data processing method of Concept 6, wherein calculating the risk level based at least in part on the one or more updated risk triggers further comprises comparing the one or more updated risk triggers to (i) one or more previously identified risk triggers, and (ii) one or more previously implemented actions to the one or more previously identified risk triggers.

8. The computer-implemented data processing method of Concept 1, the method further comprising generating at least one data model of the one or more data models by:

receiving aggregate risk remediation data for a plurality of identified risk triggers from one or more organizations;

analyzing the aggregate risk remediation data to determine a remediation outcome for each of the plurality of identified risk triggers and an associated entity response to the particular identified risk trigger of the plurality of identified risk triggers; and in response to analyzing the aggregate risk remediation data to determine a remediation outcome for each of the plurality of identified risk triggers and an associated entity response to the particular identified risk trigger of the plurality of identified risk triggers, generating the at least one data model of the one or more data models.

9. The computer-implemented data processing method of Concept 8, wherein the risk remediation data implements the at least one data model of the one or more data models.

10. The computer-implemented data processing method of Concept 8, wherein the one or more organizations comprises the entity.

11. A computer-implemented data processing method for updating risk remediation data of an entity, the method comprising:

receiving an indication of an update to the first data asset of the entity;

identifying one or more risk triggers for an entity based at least in part on the update to the first data asset of the entity;

identifying a second data asset of the entity potentially affected by the one or more risk triggers based at least in part on an association of the first data asset and the second data asset;

determining, by using one or more data models, one or more first updated actions to remediate the one or more updated risk triggers for the first data asset;

determining, by using one or more data models, one or more second updated actions to remediate the one or more updated risk triggers for the second data asset; and generating risk remediation data of the entity to include the one or more first updated actions and the one or more second updated actions to remediate the one or more potential risk triggers.

12. The computer-implemented data processing method of Concept 11, further comprising:

determining a first data asset risk level based at least in part on the one or more updated risk triggers for the first data asset;

determining to take the one or more first updated actions to remediate the one or more updated risk triggers for the first data asset based at least in part on the first data asset risk level; and in response, taking the first updated actions to remediate the one or more updated risk triggers for the first data asset.

13. The computer-implemented data processing method of Concept 12, further comprising:

comparing the first data asset risk level to a threshold data asset risk level; and in response to determining that the first data asset risk level is greater than or equal to the threshold data asset risk level, taking the first updated actions to remediate the one or more updated risk triggers for the first data asset.

14. The computer-implemented data processing method of Concept 11, wherein the one or more first updated actions to remediate the one or more updated risk triggers for the first data asset is the one or more second updated actions to remediate the one or more updated risk triggers for the second data asset.

15. The computer-implemented data processing method of Concept 11, wherein the one or more first updated actions to remediate the one or more updated risk triggers for the first data asset is different from the one or more second updated actions to remediate the one or more updated risk triggers for the second data asset.

16. The computer-implemented data processing method of Concept 11, wherein generating the risk remediation data of the entity to include the one or more first updated actions and the one or more second updated actions to remediate the one or more potential risk triggers is performed automatically.

17. The computer-implemented data processing method of Concept 11, wherein the one or more risk triggers comprises one or more of the first data asset and the second data asset being physically located in a particular one or more locations.

18. The computer-implemented data processing method of Concept 17, wherein the one or more risk triggers comprises the first data asset being located in a first physical location and the second data asset being located in the first physical location.

19. A computer-implemented data processing method for generating risk remediation data for an entity, the method comprising:

accessing aggregate risk remediation data for a plurality of identified risk triggers from one or more organizations;

analyzing the aggregate risk remediation data to determine a remediation outcome for each of the plurality of identified risk triggers and an associated entity response to the particular identified risk trigger of the plurality of identified risk triggers;

in response to analyzing the aggregate risk remediation data to determine a remediation outcome for each of the plurality of identified risk triggers and an associated entity response to the particular identified risk trigger of the plurality of identified risk triggers, generating one or more risk remediation data models; and generating risk remediation data for the entity based at least in part on the one or more risk remediation models and one or more data assets of the entity.

20. The computer-implemented data processing method of Concept 19, further comprising updating the generated risk remediation data automatically.

A computer-implemented method for managing a plurality of data assets of an organization with a third-party data repository, in particular embodiments, comprises: (1) identifying a form used to collect one or more pieces of personal data; (2) determining one or more data assets of a plurality of data assets of the organization where input data of the form is transmitted; (3) adding the one or more data assets to the third-party data repository with an electronic link to the form; (4) in response to a user submitting the form, creating a unique subject identifier associated with the user; (5) transmitting the unique subject identifier (i) to the third-party data repository and (ii) along with the form data provided by the user in the form, to the data asset; and (6) digitally storing the unique subject identifier (i) in the third-party data repository and (ii) along with the form data provided by the user in the form, in the data asset.

A computer-implemented method for or managing a plurality of data assets of an organization with a unique subject identifier database, in particular embodiments, comprises: (1) receiving an indication of completion of a form associated with the organization by a data subject; (2) determining, based at least in part on searching a unique subject identifier database, whether a unique subject identifier has been generated for the data subject; (3) in response to determining that a unique subject identifier has not been generated for the data subject, generating a unique subject identifier for the data subject; and (4) storing the unique subject identifier for the data subject in the unique subject identifier database, wherein the unique subject identifier database electronically links each respective unique subject identifier to each of: (i) the form associated with the organization submitted by the data subject of each respective unique subject identifier, and (ii) one or more data assets that utilize form data of the form received from the data subject.

A computer-implemented method for managing a plurality of data assets of an organization with a unique subject identifier database that, in particular embodiments, comprises: (1) receiving an indication of completion of a form associated with the organization by a data subject; (2) determining, based at least in part on searching a unique subject identifier database, whether a unique subject identifier has been generated for the data subject; (3) in response to determining that a unique subject identifier has been generated for the data subject, accessing the unique subject identifier database; (4) identifying the unique subject identifier of the data subject based at least in part on form data provided by the data subject in the completion of the form associated with the organization; and (5) updating the unique subject identifier database to include an electronic link between the unique subject identifier of the data subject and each of (i) the form submitted by the data subject of each respective unique subject identifier, and (ii) one or more data assets that utilize the form data of the form received from the data subject.

Various embodiments are also described in the following listing of concepts:

1. A computer-implemented data processing method for managing a plurality of data assets of an organization shared with a third-party data repository, the method comprising:

identifying a form used to collect one or more pieces of personal data;

determining one or more data assets of a plurality of data assets of the organization where input data of the form is transmitted;

adding the one or more data assets to the third-party data repository with an electronic link to the form;

in response to a user submitting the form, creating a unique subject identifier associated with the user;

transmitting the unique subject identifier to the third-party data repository along with the form data provided by the user in the form, to the data asset; and digitally storing the unique subject identifier in the third-party data repository and along with the form data provided by the user in the form, in the data asset.

2. The computer-implemented data processing method of Concept 1, further comprising:

receiving a data subject access request from the user;

accessing the third-party data repository to identify the unique subject identifier of the user;

determining which one or more data assets of the plurality of data assets of the organization include the unique subject identifier; and accessing personal data of the user stored in each of the one or more data assets of the plurality of data assets of the organization that include the unique subject identifier.

3. The computer-implemented data processing method of Concept 2, wherein the data subject access request comprises a type of data subject access request, and wherein the type of data subject access request is selected from a group consisting of:

a subject's rights request, and a data subject deletion request.

4. The computer-implemented data processing method of Concept 3, wherein the type of data subject access request is a data subject deletion request and further comprising:

in response to accessing the personal data of the user stored in each of the one or more data assets of the plurality of data assets of the organization that include the unique subject identifier, deleting the personal data of the user stored in each of the one or more data assets of the plurality of data assets of the organization that include the unique subject identifier.

5. The computer-implemented data processing method of Concept 3, wherein the type of data subject access request is a data subject deletion request and the method further comprises:

in response to accessing the personal data of the user stored in each of the one or more data assets of the plurality of data assets, automatically determining that a first portion of personal data of the user stored in the one or more data assets has one or more legal bases for continued storage;

in response to determining that the first portion of personal data of the user stored in the one or more data assets has one or more legal bases for continued storage, automatically maintaining storage of the first portion of personal data of the user stored in the one or more data assets;

automatically facilitating deletion of a second portion of personal data of the user stored in the one or more data assets for which one or more legal bases for continued storage cannot be determined, wherein the first portion of the personal data of the user stored in the one or more data assets is different from the second portion of personal data of the user stored in the one or more data assets; and automatically marking as free one or more memory addresses associated with the second portion of personal data of the user stored in the one or more data assets associated with the user.

6. The computer-implemented data processing method of Concept 1, wherein identifying a form used to collect one or more pieces of personal data is performed by using one or more web site scanning tools.

7. The computer-implemented data processing method of Concept 1, wherein the third-party data repository comprises a link to each of the one or more data assets of the plurality of data assets of the organization that include the unique subject identifier of the user.

8. The computer-implemented data processing of Concept 1, wherein the third-party data repository stores the unique subject identifier in a database of a plurality of unique subject identifiers.

9. A computer-implemented data processing method for managing a plurality of data assets of an organization with a unique subject identifier database, the method comprising:

receiving an indication of completion of a form associated with the organization by a data subject;

determining, based at least in part on searching a unique subject identifier database, whether a unique subject identifier has been generated for the data subject;

in response to determining that a unique subject identifier has not been generated for the data subject, generating a unique subject identifier for the data subject; and storing the unique subject identifier for the data subject in the unique subject identifier database, wherein the unique subject identifier database electronically links each respective unique subject identifier to each of: (i) the form associated with the organization submitted by the data subject of each respective unique subject identifier, and (ii) one or more data assets that utilize form data of the form received from the data subject.

10. The computer-implemented data processing method of Concept 9, further comprising:

receiving a data subject access request from the data subject;

accessing the unique subject identifier database to identify the unique subject identifier of the data subject;

determining which one or more data assets of the plurality of data assets of the organization include the unique subject identifier of the data subject; and accessing personal data of the data subject stored in each of the one or more data assets of the plurality of data assets of the organization that include the unique subject identifier.

11. The computer-implemented data processing method of Concept 10, wherein the data subject access request comprises a type of data subject access request, and wherein the type of data subject access request is selected from a group consisting of:

a subject's rights request, and a data subject deletion request.

12. The computer-implemented data processing method of Concept 11, wherein the type of data subject access request is a data subject deletion request and further comprising:

in response to accessing the personal data of the data subject stored in each of the one or more data assets of the plurality of data assets of the organization that include the unique subject identifier, deleting the personal data of the data subject stored in each of the one or more data assets of the plurality of data assets of the organization that include the unique subject identifier.

13. The computer-implemented data processing method of Concept 9, further comprising:

in response to determining that a unique subject identifier has been generated for the data subject, accessing the unique subject identifier database; and identifying the unique subject identifier of the data subject based at least in part on form data provided by the data subject in the completion of the form associated with the organization.

14. The computer-implemented data processing method of Concept 13, further comprising:

updating the unique subject identifier database to include an electronic link between the unique subject identifier of the data subject and each of (i) the form submitted by the data subject of each respective unique subject identifier, and (ii) one or more data assets that utilize the form data of the form received from the data subject.

15. A computer-implemented data processing method for managing a plurality of data assets of an organization with a unique subject identifier database, the method comprising:

receiving an indication of completion of a form associated with the organization by a data subject;

determining, based at least in part on searching a unique subject identifier database, whether a unique subject identifier has been generated for the data subject;

in response to determining that a unique subject identifier has been generated for the data subject, accessing the unique subject identifier database;

identifying the unique subject identifier of the data subject based at least in part on form data provided by the data subject in the completion of the form associated with the organization; and updating the unique subject identifier database to include an electronic link between the unique subject identifier of the data subject and each of (i) the form submitted by the data subject of each respective unique subject identifier, and (ii) one or more data assets that utilize the form data of the form received from the data subject.

16. The computer-implemented data processing method of Concept 15, further comprising:

receiving a data subject access request from the data subject;

accessing the unique subject identifier database to identify the unique subject identifier of the data subject;

determining which one or more data assets of the plurality of data assets of the organization include the unique subject identifier of the data subject; and accessing personal data of the data subject stored in each of the one or more data assets of the plurality of data assets of the organization that include the unique subject identifier.

17. The computer-implemented data processing method of Concept 16, wherein the data subject access request comprises a type of data subject access request, and wherein the type of data subject access request is selected from a group consisting of:

a subject's rights request, and a data subject deletion request.

18. The computer-implemented data processing method of Concept 17, wherein the type of data subject access request is a data subject deletion request and further comprising:

in response to accessing the personal data of the data subject stored in each of the one or more data assets of the plurality of data assets of the organization that include the unique subject identifier, deleting the personal data of the data subject stored in each of the one or more data assets of the plurality of data assets of the organization that include the unique subject identifier.

19. The computer-implemented data processing method of Concept 17, wherein the type of data subject access request is a data subject deletion request and the method further comprises:

in response to accessing the personal data of the data subject stored in each of the one or more data assets of the plurality of data assets, automatically determining that a first portion of personal data of the data subject stored in the one or more data assets has one or more legal bases for continued storage;

in response to determining that the first portion of personal data of the data subject stored in the one or more data assets has one or more legal bases for continued storage, automatically maintaining storage of the first portion of personal data of the data subject stored in the one or more data assets;

automatically facilitating deletion of a second portion of personal data of the data subject stored in the one or more data assets for which one or more legal bases for continued storage cannot be determined, wherein the first portion of the personal data of the data subject stored in the one or more data assets is different from the second portion of personal data of the data subject stored in the one or more data assets; and automatically marking one or more memory addresses associated with the second portion of personal data of the data subject stored in the one or more data assets associated with the data subject as free.

20. The computer-implemented data processing of Concept 1, wherein the unique subject identifier database is a part of a third-party data repository.

A computer-implemented method for assessing a risk associated with one or more data transfers between one or more data assets (e.g., two or more data assets), in particular embodiments, comprises: (1) creating a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

A computer-implemented method for assessing a risk associated with one or more data transfers between one or more data assets, in particular embodiments, comprises: (1) accessing a data transfer record for a data transfer between a first asset in a first location and a second asset in a second location; (2) accessing a set of data transfer rules that are associated with the data transfer record, wherein the set of data transfer rules comprise (a) one or more privacy law framework of the one or more of the first location and the second location, and (b) one or more entity framework of one or more of (i) an entity associated with the one or more first data asset and (ii) an entity associated with the one or more second data asset; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

A computer-implemented method for assessing a risk associated with one or more data transfers between one or more data assets, in particular embodiments, comprises: (1) accessing a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; (6) digitally storing the risk score for the data transfer; (7) comparing the risk score for the data transfer to a threshold risk score; (8) determining that the risk score for the data transfer is a greater risk than the threshold risk score; and (9) in response to determining that the risk score for the data transfer is a greater risk than the threshold risk score, taking one or more action.

Various embodiments are also described in the following listing of concepts:

1. A computer-implemented data processing method for assessing a risk associated with one or more data transfers between one or more data assets, the method comprising:

creating a data transfer record for a data transfer between a first asset in a first location and a second asset in a second location;

accessing a set of data transfer rules that are associated with the data transfer record;

performing a data transfer assessment based at least in part on applying the set of data transfer rules on the data transfer record;

identifying one or more data transfer risks associated with the data transfer record, based at least in part on the data transfer assessment;

calculating a risk score for the data transfer based at least in part on the one or more data transfer risks associated with the data transfer record; and digitally storing the risk score for the data transfer.

2. The computer-implemented data processing method of Concept 1, wherein the method further comprises:

comparing the risk score for the data transfer to a threshold risk score;

determining that the risk score for the data transfer is a greater risk than the threshold risk score; and in response to determining that the risk score for the data transfer is a greater risk than the threshold risk score, taking one or more action.

3. The computer-implemented data processing method of Concept 2, wherein the one or more action is selected from a group consisting of:

providing the data transfer record to one or more individuals for review of the data transfer record; and automatically terminating the data transfer.

4. The computer-implemented data processing method of Concept 2, wherein the one or more action comprises:

generating a secure link between one or more processors associated with the first asset in the first location and one or more processors associated with the second asset in the second location; and providing the data transfer via the secure link between the one or more processors associated with the first asset in the first location and the one or more processors associated with the second asset in the second location.

5. The computer-implemented data processing method of Concept 1, wherein calculating a risk score for the data transfer based at least in part on the one or more data transfer risks associated with the data transfer record further comprises:

determining a weighting factor for each of the one or more data transfer risks;

determining a risk rating for each of the one or more data transfer risks; and calculating the risk level for the data transfer based upon, for each respective one of the one or more data transfer risks, the risk rating for the respective data transfer risk and the weighting factor for the respective data transfer risk.

6. The computer-implemented data processing method of Concept 1, wherein the one or more data transfer risks are selected from a group consisting of:

a source location of the first location of the one or more first data asset of the data transfer;

a destination location of the second location of the one or more second data asset of the data transfer;

one or more type of data being transferred as part of the data transfer;

a time of the data transfer; and an amount of data being transferred as part of the data transfer.

7. The computer-implemented data processing method of Concept 1, wherein the set of data transfer rules are automatically updated.

8. The computer-implemented data processing method of Concept 1, wherein the set of data transfer rules comprise:

one or more privacy law framework of the one or more of the first location and the second location; and one or more entity framework of one or more of (i) an entity associated with the one or more first data asset and (ii) an entity associated with the one or more second data asset.

9. A computer-implemented data processing method for assessing a risk associated with one or more data transfers between one or more data assets, the method comprising:

accessing a data transfer record for a data transfer between a first asset in a first location and a second asset in a second location;

accessing a set of data transfer rules that are associated with the data transfer record, wherein the set of data transfer rules comprise:

one or more privacy law framework of the one or more of the first location and the second location, and one or more entity framework of one or more of (i) an entity associated with the one or more first data asset and (ii) an entity associated with the one or more second data asset;

performing a data transfer assessment based at least in part on applying the set of data transfer rules on the data transfer record;

identifying one or more data transfer risks associated with the data transfer record, based at least in part on the data transfer assessment;

calculating a risk score for the data transfer based at least in part on the one or more data transfer risks associated with the data transfer record; and digitally storing the risk score for the data transfer.

10. The computer-implemented data processing method of Concept 9, wherein the method further comprises:

comparing the risk score for the data transfer to a threshold risk score;

determining that the risk score for the data transfer is a greater risk than the threshold risk score; and in response to determining that the risk score for the data transfer is a greater risk than the threshold risk score, taking one or more action.

11. The computer-implemented data processing method of Concept 10, wherein the one or more action is selected from a group consisting of:

providing the data transfer record to one or more individuals for review of the data transfer record; and automatically terminating the data transfer.

12. The computer-implemented data processing method of Concept 10, wherein the one or more action comprises:

generating a secure link between one or more processors associated with the first asset in the first location and one or more processors associated with the second asset in the second location; and providing the data transfer via the secure link between the one or more processors associated with the first asset in the first location and the one or more processors associated with the second asset in the second location.

13. The computer-implemented data processing method of Concept 9, wherein calculating a risk score for the data transfer based at least in part on the one or more data transfer risks associated with the data transfer record further comprises:

determining a weighting factor for each of the one or more data transfer risks;

determining a risk rating for each of the one or more data transfer risks; and calculating the risk level for the data transfer based upon, for each respective one of the one or more data transfer risks, the risk rating for the respective data transfer risk and the weighting factor for the respective data transfer risk.

14. The computer-implemented data processing method of Concept 9, wherein the one or more data transfer risks are selected from a group consisting of:

a source location of the first location of the one or more first data asset of the data transfer;

a destination location of the second location of the one or more second data asset of the data transfer;

one or more type of data being transferred as part of the data transfer;

a time of the data transfer; and an amount of data being transferred as part of the data transfer.

15. The computer-implemented data processing method of Concept 9, wherein the set of data transfer rules are automatically updated.

16. A computer-implemented data processing method for assessing a risk associated with one or more data transfers between one or more data assets, the method comprising:

accessing a data transfer record for a data transfer between a first asset in a first location and a second asset in a second location;

accessing a set of data transfer rules that are associated with the data transfer record;

performing a data transfer assessment based at least in part on applying the set of data transfer rules on the data transfer record;

identifying one or more data transfer risks associated with the data transfer record, based at least in part on the data transfer assessment;

calculating a risk score for the data transfer based at least in part on the one or more data transfer risks associated with the data transfer record;

digitally storing the risk score for the data transfer;

comparing the risk score for the data transfer to a threshold risk score;

determining that the risk score for the data transfer is a greater risk than the threshold risk score; and in response to determining that the risk score for the data transfer is a greater risk than the threshold risk score, taking one or more action.

17. The computer-implemented data processing method of Concept 16, wherein the one or more action is selected from a group consisting of:

providing the data transfer record to one or more individuals for review of the data transfer record; and automatically terminating the data transfer.

18. The computer-implemented data processing method of Concept 16, wherein the one or more data transfer risks are selected from a group consisting of:

a source location of the first location of the one or more first data asset of the data transfer;

a destination location of the second location of the one or more second data asset of the data transfer;

one or more type of data being transferred as part of the data transfer;

a time of the data transfer; and an amount of data being transferred as part of the data transfer.

19. The computer-implemented data processing method of Concept 16, wherein the one or more action comprises:

generating a secure link between one or more processors associated with the first asset in the first location and one or more processors associated with the second asset in the second location; and providing the data transfer via the secure link between the one or more processors associated with the first asset in the first location and the one or more processors associated with the second asset in the second location.

20. The computer-implemented data processing method of Concept 16, further comprising:

transferring the data between the first asset in the first location and the second asset in the second location.

A computer-implemented data processing method for automatically classifying personal information in an electronic document and generating a sensitivity score for the electronic document based on the classification, in particular embodiments, comprises: (1) receiving, by one or more processors, the electronic document for analysis; (2) using one or more natural language processing techniques, by one or more processors, to decompose data from the electronic document into (i) one or more structured objects and (ii) one or more values for each of the one or more structured objects; (3) classifying, by one or more processors, each of the one or more structured objects in the electronic document based on one or more attributes of the one or more structured objects; (4) categorizing, by one or more processors, each of the one or more structured objects based on a sensitivity of the one or more structured objects; (5) rating, by one or more processors, the accuracy of the categorization; and (6) generating, by one or more processors, a sensitivity score for the electronic document based at least in part on the categorized one or more structured objects and the associated one or more values.

A computer-implemented data processing method for automatically classifying personal information in an electronic document and generating a sensitivity score for the electronic document based on the classification, in particular embodiments, comprises: (1) receiving, by one or more processors, the electronic document for analysis; (2) sorting, using one or more natural language processing techniques, data from the electronic document into (i) one or more structured objects and (ii) one or more values for each of the one or more structured objects; (3) classifying, by one or more processors, each of the one or more structured objects in the electronic document based on one or more attributes of the one or more structured objects; (4) categorizing, by one or more processors, each of the one or more structured objects based on a sensitivity of the one or more structured objects; (5) generating, by one or more processors, a sensitivity score for the electronic document based at least in part on the categorized one or more structured objects and the associated one or more values; (6) parsing the classification of one or more structured objects; (7) identifying each of the one or more structured objects having an empty associated value; and (8) modifying the classification of one or more structured objects to remove the identified one or more structured objects from the classification.

A computer-implemented data processing method for automatically classifying personal information in an electronic document and generating a sensitivity score for the electronic document based on the classification, in particular embodiments, comprises: (1) receiving, by one or more processors, the electronic document for analysis; (2) using one or more natural language processing techniques, by one or more processors, to decompose data from the electronic document into (i) one or more structured objects and (ii) one or more values for each of the one or more structured objects; (3) classifying, by one or more processors, each of the one or more structured objects in the electronic document based on one or more attributes of the one or more structured objects; (4) categorizing, by one or more processors, each of the one or more structured objects based on a sensitivity of the one or more structured objects; and (5) generating, by one or more processors, a sensitivity score for the electronic document based at least in part on the categorized one or more structured objects and the associated one or more values.

Various embodiments are also described in the following listing of concepts:

1. A computer-implemented data processing method for automatically classifying personal information in an electronic document and generating a sensitivity score for the electronic document based on the classification, the method comprising:

receiving, by one or more processors, the electronic document for analysis;

using one or more natural language processing techniques, by one or more processors, to decompose data from the electronic document into:

one or more structured objects; and one or more values for each of the one or more structured objects;

classifying, by one or more processors, each of the one or more structured objects in the electronic document based on one or more attributes of the one or more structured objects;

categorizing, by one or more processors, each of the one or more structured objects based on a sensitivity of the one or more structured objects;

rating, by one or more processors, the accuracy of the categorization; and generating, by one or more processors, a sensitivity score for the electronic document based at least in part on the categorized one or more structured objects and the associated one or more values.

2. The computer-implemented data processing method of Concept 1, wherein generating the sensitivity score for the electronic document comprises:

assigning a relative sensitivity rating to each of the one or more structured objects; and calculating the sensitivity score based on the one or more values and the relative sensitivity rating for each of the one or more structured objects.

3. The computer-implemented data processing method of Concept 1, further comprising:

parsing the classification of one or more structured objects;

identifying each of the one or more structured objects having an empty associated value; and modifying the classification of one or more structured objects to remove the identified one or more structured objects from the classification.

4. The computer-implemented data processing method of Concept 1, wherein rating the accuracy of the categorization comprises:

receiving a second electronic document that is related to the electronic document;

using one or more natural language processing techniques, by one or more processors, to decompose data from the second electronic document into;

one or more second structured objects; and one or more second values for each of the one or more structured objects;

classifying, by one or more processors, each of the one or more second structured objects in the second electronic document based on one or more second attributes of the one or more second structured objects;

categorizing, by one or more processors, each of the one or more second structured objects based on a sensitivity of the one or more second structured objects; and comparing the categorization of the one or more structured objects with the categorization of the one or more second structured objects; and rating the accuracy based on the comparison.

5. The computer-implemented data processing method of Concept 1, wherein the one or more natural language process techniques is selected from a group comprising:

one or more optical character recognition techniques; and one or more audio processing techniques.

6. The computer-implemented data processing method of Concept 1, wherein the one or more attributes of the one or more structured objects comprise a position within the electronic document of each of the one or more structured objects in the electronic document.

7. The computer-implemented data processing method of Concept 1, wherein the sensitivity of the one or more structured objects is automatically determined based at least in part on one or more government regulations directed toward the type of information associated with the particular one or more structured objects.

8. The computer-implemented data processing of Concept 1, wherein rating the accuracy of the categorization of each of the one or more structured objects further comprises:

determining a character type for each of the one or more structured objects;

determining a character type for each value associated with each of the one or more structured objects;

comparing the character type for each value associated with each of the one or more structured objects and the character type for each of the one or more structed objects; and rating the accuracy of the categorization of each of the one or more structured objects based at least in part on comparing the character type for each value associated with each of the one or more structured objects and the character type for each of the one or more structed objects.

9. A computer-implemented data processing method for automatically classifying personal information in an electronic document and generating a sensitivity score for the electronic document based on the classification, the method comprising:

receiving, by one or more processors, the electronic document for analysis;

sorting, using one or more natural language processing techniques, data from the electronic document into;

one or more structured objects; and one or more values for each of the one or more structured objects;

classifying, by one or more processors, each of the one or more structured objects in the electronic document based on one or more attributes of the one or more structured objects;

categorizing, by one or more processors, each of the one or more structured objects based on a sensitivity of the one or more structured objects;

generating, by one or more processors, a sensitivity score for the electronic document based at least in part on the categorized one or more structured objects and the associated one or more values;

parsing the classification of one or more structured objects;

identifying each of the one or more structured objects having an empty associated value; and modifying the classification of one or more structured objects to remove the identified one or more structured objects from the classification.

10. The computer-implemented data processing method of Concept 9, wherein generating the sensitivity score for the electronic document comprises:

assigning a relative sensitivity rating to each of the one or more structured objects; and calculating the sensitivity score based on the one or more values and the relative sensitivity rating for each of the one or more structured objects.

11. The computer-implemented data processing method of Concept 1, wherein rating the accuracy of the categorization comprises:

receiving a second electronic document that is related to the electronic document;

sorting, using one or more natural language processing techniques, the second electronic document into;

one or more second structured objects; and one or more second values for each of the one or more structured objects;

classifying, by one or more processors, each of the one or more second structured objects in the second electronic document based on one or more second attributes of the one or more second structured objects;

categorizing, by one or more processors, each of the one or more second structured objects based on a sensitivity of the one or more second structured objects; and generating, by one or more processors, a second sensitivity score for the second electronic document based at least in part on the categorized one or more second structured objects and the associated one or more second values;

parsing the classification of one or more second structured objects;

identifying each of the one or more second structured objects having an empty associated value; and modifying the classification of one or more second structured objects to remove the identified one or more second structured objects from the classification.

12. The computer-implemented data processing method of Concept 9, wherein the one or more natural language process techniques is selected from a group comprising:

one or more optical character recognition techniques; and one or more audio processing techniques.

13. The computer-implemented data processing method of Concept 9, wherein the one or more attributes of the one or more structured objects comprise a position within the electronic document of each of the one or more structured objects in the electronic document.

14. The computer-implemented data processing method of Concept 9, wherein the sensitivity of the one or more structured objects is automatically determined based at least in part on one or more government regulations directed toward the type of information associated with the particular one or more structured objects.

15. A computer-implemented data processing method for automatically classifying personal information in an electronic document and generating a sensitivity score for the electronic document based on the classification, the method comprising:

receiving, by one or more processors, the electronic document for analysis;

using one or more natural language processing techniques, by one or more processors, to decompose data from the electronic document into;

one or more structured objects; and one or more values for each of the one or more structured objects;

classifying, by one or more processors, each of the one or more structured objects in the electronic document based on one or more attributes of the one or more structured objects;

categorizing, by one or more processors, each of the one or more structured objects based on a sensitivity of the one or more structured objects; and generating, by one or more processors, a sensitivity score for the electronic document based at least in part on the categorized one or more structured objects and the associated one or more values.

16. The computer-implemented data processing method of Concept 15, wherein generating the sensitivity score for the electronic document comprises:

assigning a relative sensitivity rating to each of the one or more structured objects; and calculating the sensitivity score based on the one or more values and the relative sensitivity rating for each of the one or more structured objects.

17. The computer-implemented data processing method of Concept 15, wherein rating the accuracy of the categorization comprises:

receiving a second electronic document that is related to the electronic document;

using one or more natural language processing techniques, by one or more processors, to decompose data from the second electronic document into;

one or more second structured objects; and one or more second values for each of the one or more structured objects;

classifying, by one or more processors, each of the one or more second structured objects in the second electronic document based on one or more second attributes of the one or more second structured objects;

categorizing, by one or more processors, each of the one or more second structured objects based on a sensitivity of the one or more second structured objects; and comparing the categorization of the one or more structured objects with the categorization of the one or more second structured objects; and rating the accuracy based on the comparison.

18. The computer-implemented data processing method of Concept 15, wherein the one or more natural language process techniques is selected from a group comprising:

one or more optical character recognition techniques; and one or more audio processing techniques.

19. The computer-implemented data processing method of Concept 15, wherein the one or more attributes of the one or more structured objects comprise a position within the electronic document of each of the one or more structured objects in the electronic document.

20. The computer-implemented data processing method of Concept 1, wherein the sensitivity of the one or more structured objects is automatically determined based at least in part on one or more government regulations directed toward the type of information associated with the particular one or more structured objects.

BRIEF DESCRIPTION OF THE DRAWINGS

Various embodiments of a data model generation and population system are described below. In the course of this description, reference will be made to the accompanying drawings, which are not necessarily drawn to scale, and wherein:

FIGS. 4-10 depict various exemplary visual representations of data models according to particular embodiments.

FIGS. 14-25 depict exemplary screen displays and graphical user interfaces (GUIs) according to various embodiments of the system, which may display information associated with the system or enable access to, or interaction with, the system by one or more users (e.g., to configure a questionnaire for populating one or more inventory attributes for one or more data models, complete one or more assessments, etc.).

FIGS. 30-31 depict exemplary screen displays and graphical user interfaces (GUIs) according to various embodiments of the system, which may display information associated with the system or enable access to, or interaction with, the system by one or more users (e.g., for the purpose of submitting a data subject access request or other suitable request).

Figure 32:
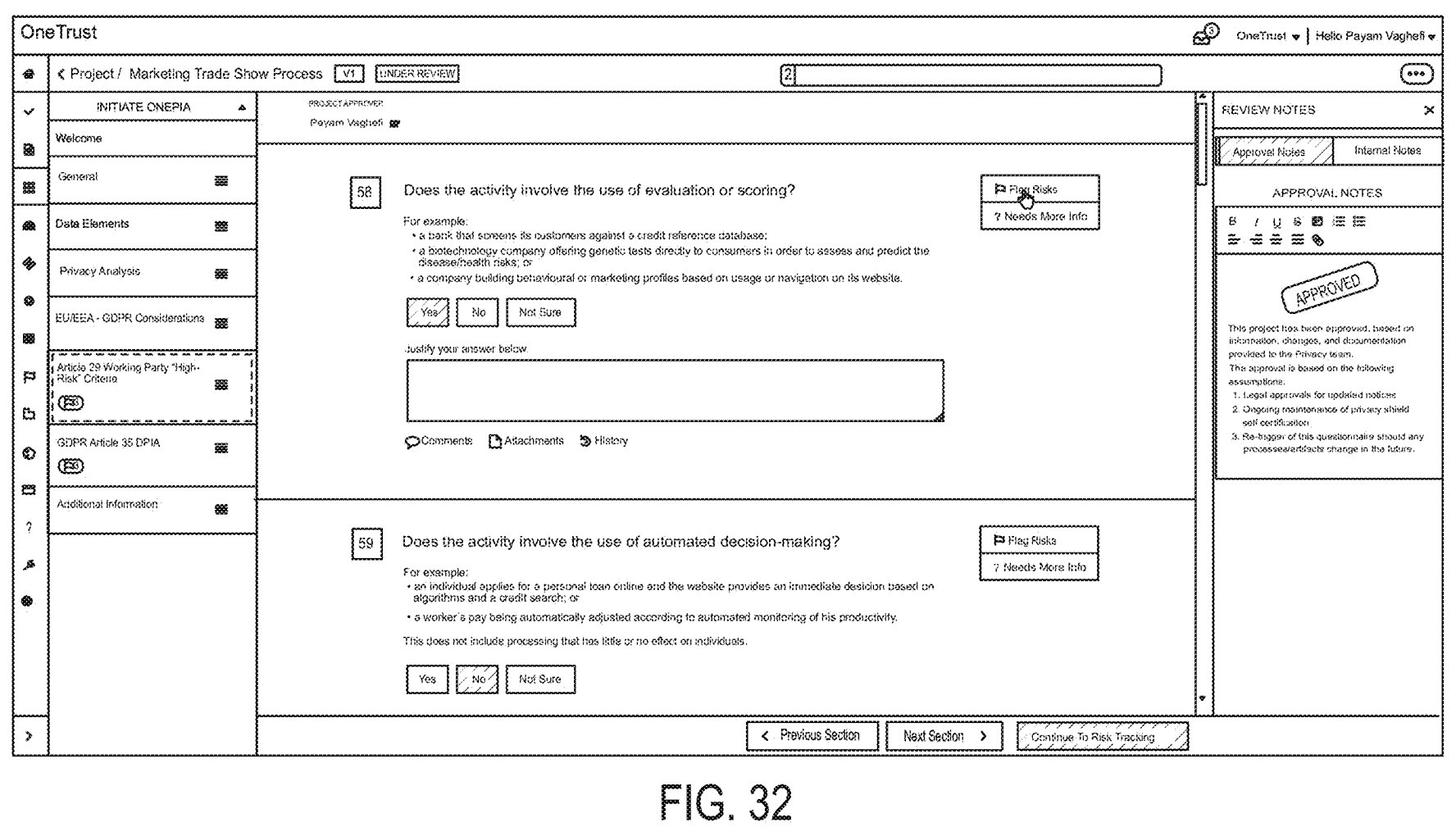
Figure 33:
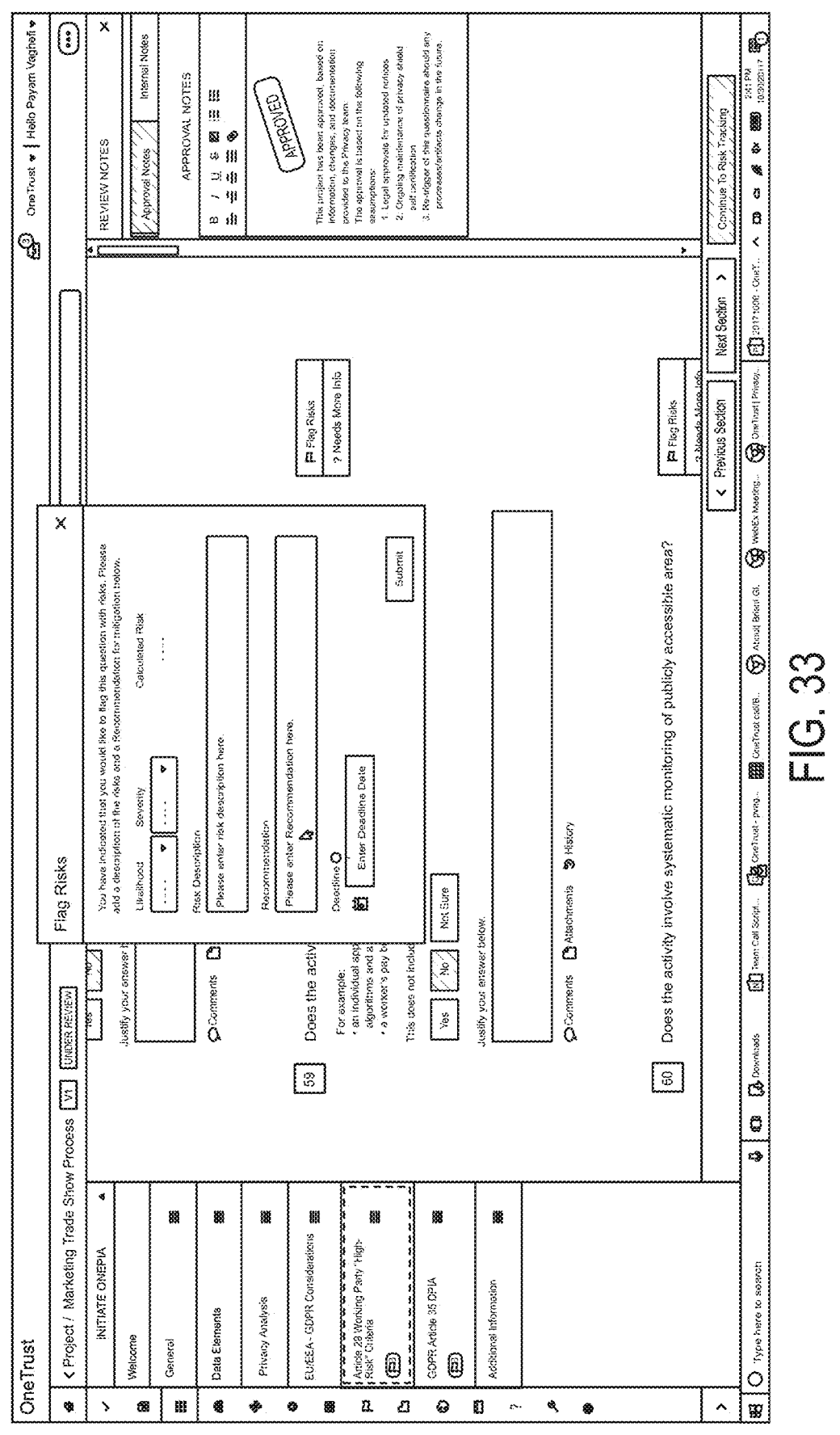
Figure 34:
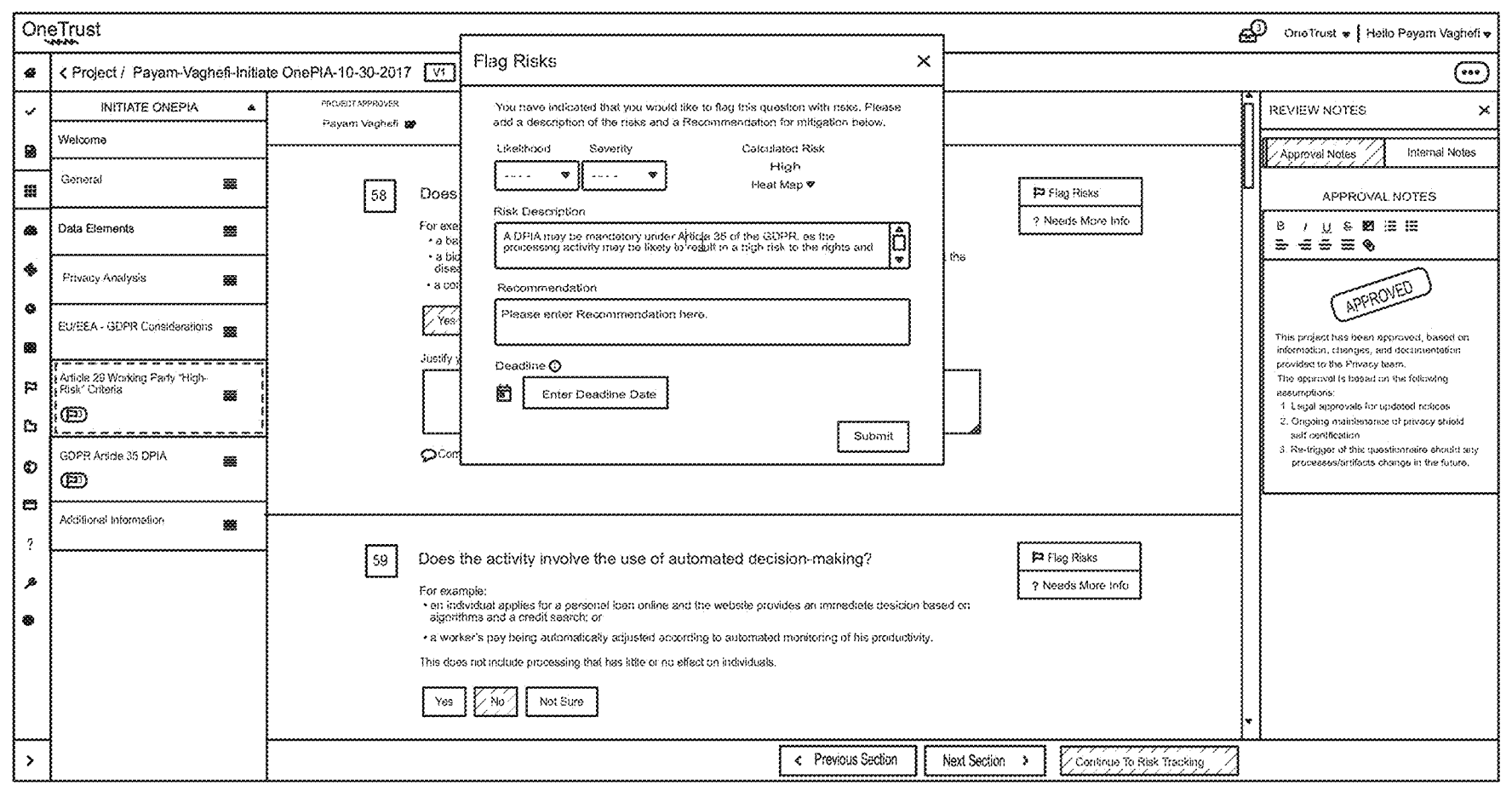
Figure 35:
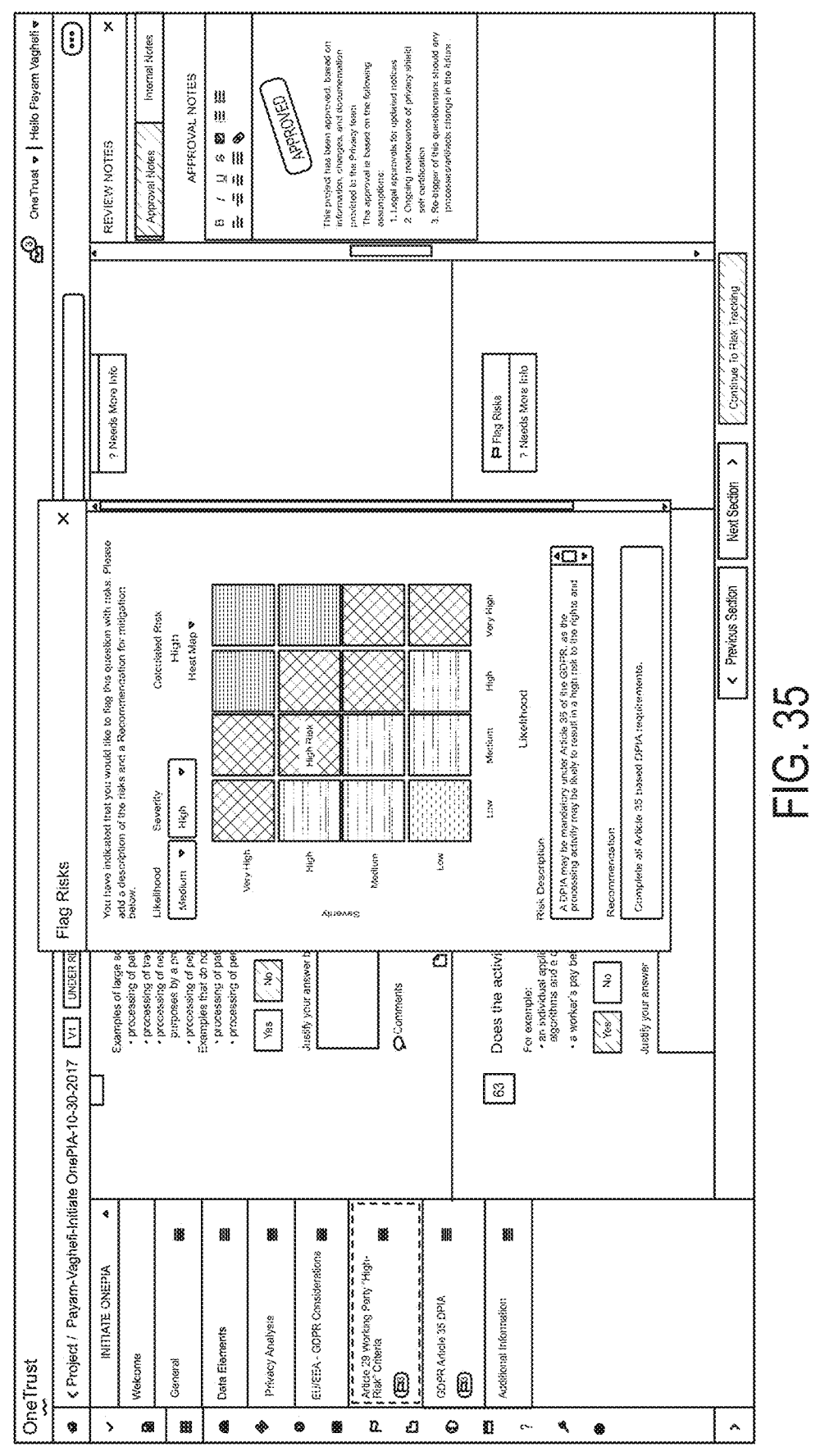

FIGS. 32-35 depict exemplary screen displays and graphical user interfaces (GUIs) according to various embodiments of the system, which may display information associated with the system or enable access to, or interaction with, the system by one or more users (e.g., for the purpose of flagging one or more risks associated with one or more particular questionnaire questions).

FIG. 40 depicts an exemplary screen display and graphical user interface (GUI) according to various embodiments of the system, which may display information associated with the system or enable access to, or interaction with, the system by one or more users.

Figure 45:
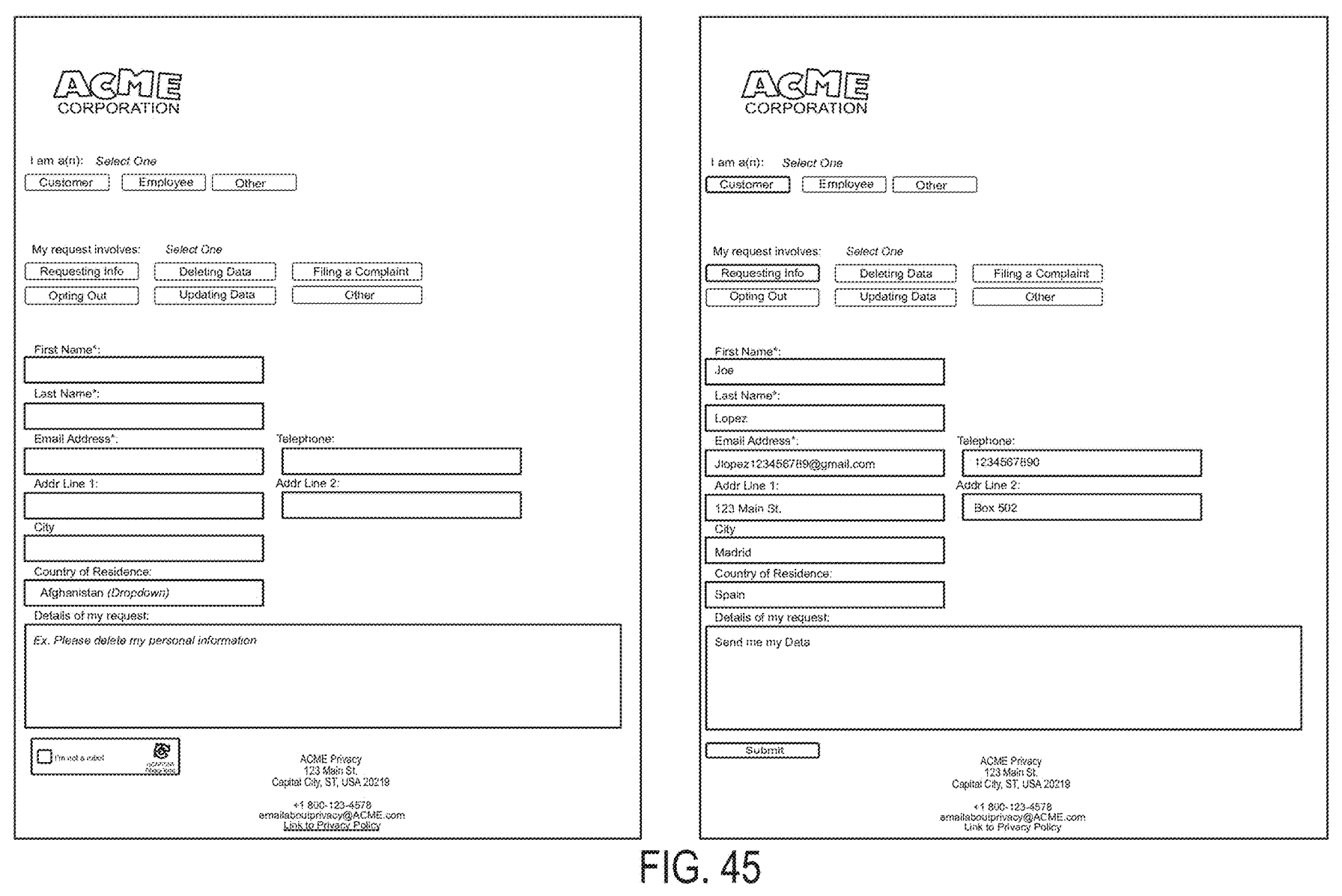

FIGS. 45-49 depict various exemplary screen displays and user interfaces that a user of various embodiments of the system may encounter (FIGS. 47 and 48 collectively show four different views of a Data Subject Request Queue).

FIG. 56 is a screenshot of a document from which the system described herein may be configured to automatically classify personal information.

FIG. 61 depicts a visual representation of the system mapping values into an object structure according to the classification and categorization created as shown in FIGS. 57-59.

FIG. 62 depicts a visual representation of the mapped results of an automatic classification of personal information in a document described herein.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A data model generation and population system, according to particular embodiments, is configured to generate a data model (e.g., one or more data models) that maps one or more relationships between and/or among a plurality of data assets utilized by a corporation or other entity (e.g., individual, organization, etc.) in the context, for example, of one or more business processes. In particular embodiments, each of the plurality of data assets (e.g., data systems) may include, for example, any entity that collects, processes, contains, and/or transfers data (e.g., such as a software application, "internet of things" computerized device, database, web site, data-center, server, etc.). For example, a first data asset may include any software or device (e.g., server or servers) utilized by a particular entity for such data collection, processing, transfer, storage, etc.

Figure 4:
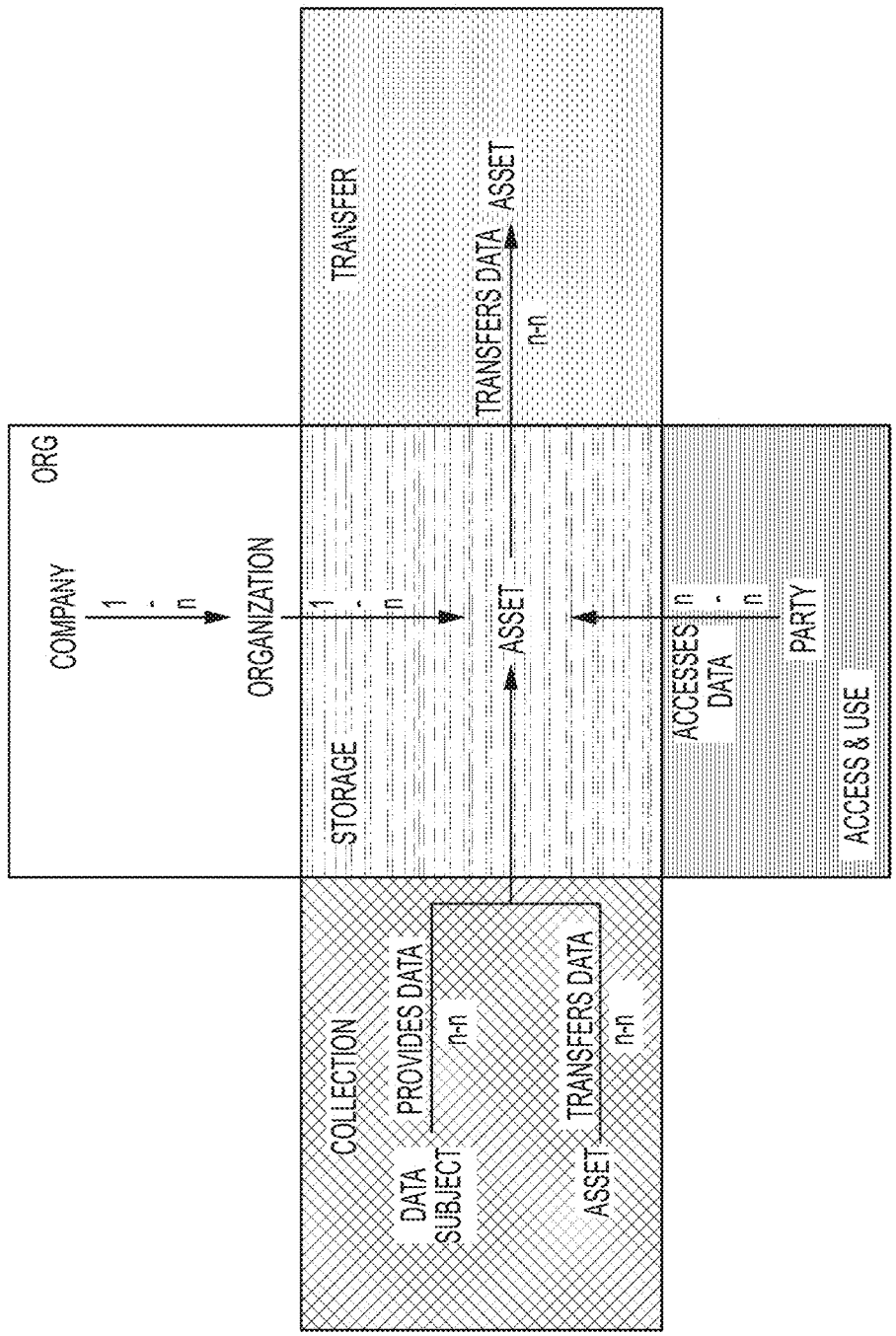
Figure 5:
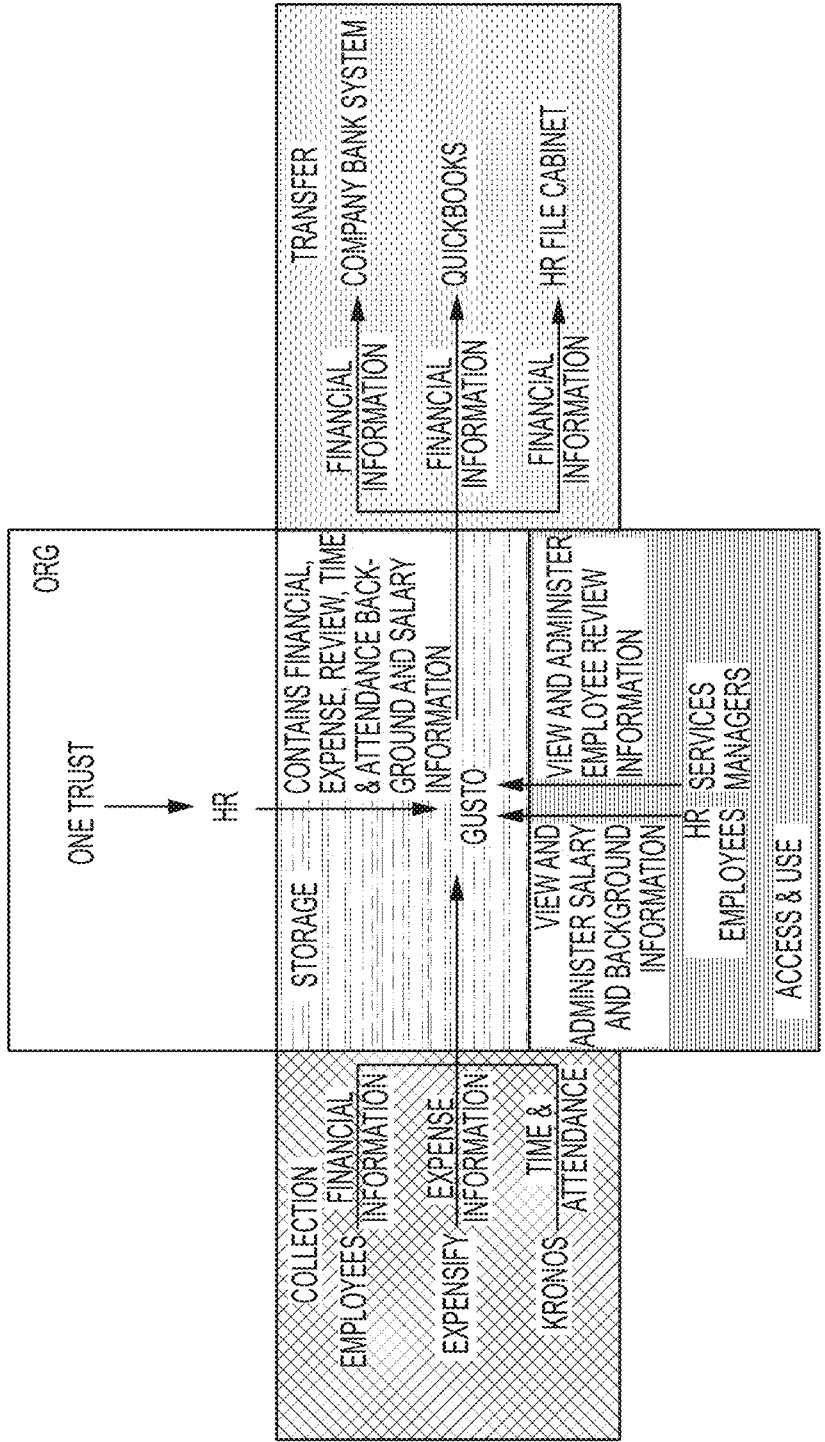
Figure 6:
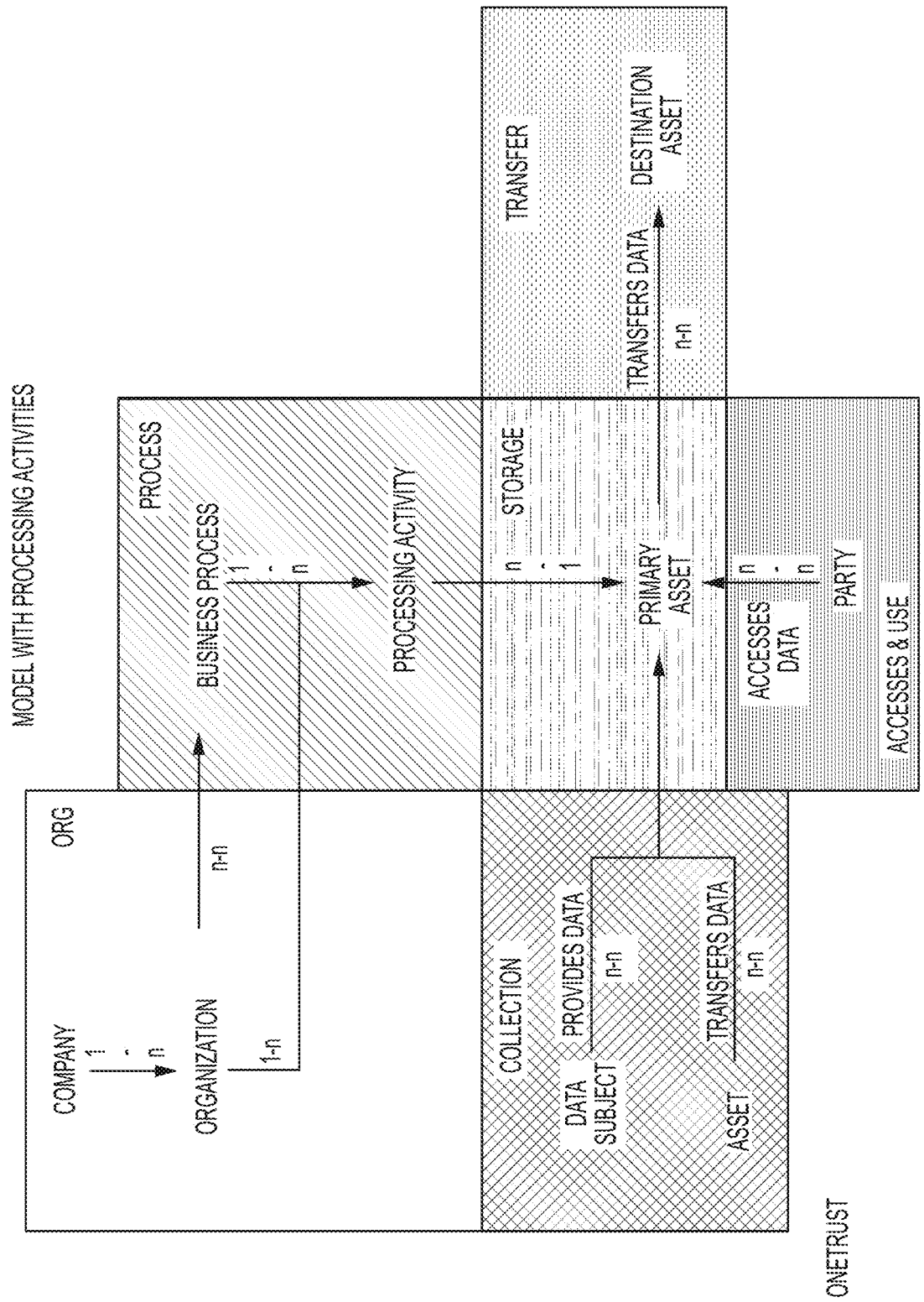
Figure 7:
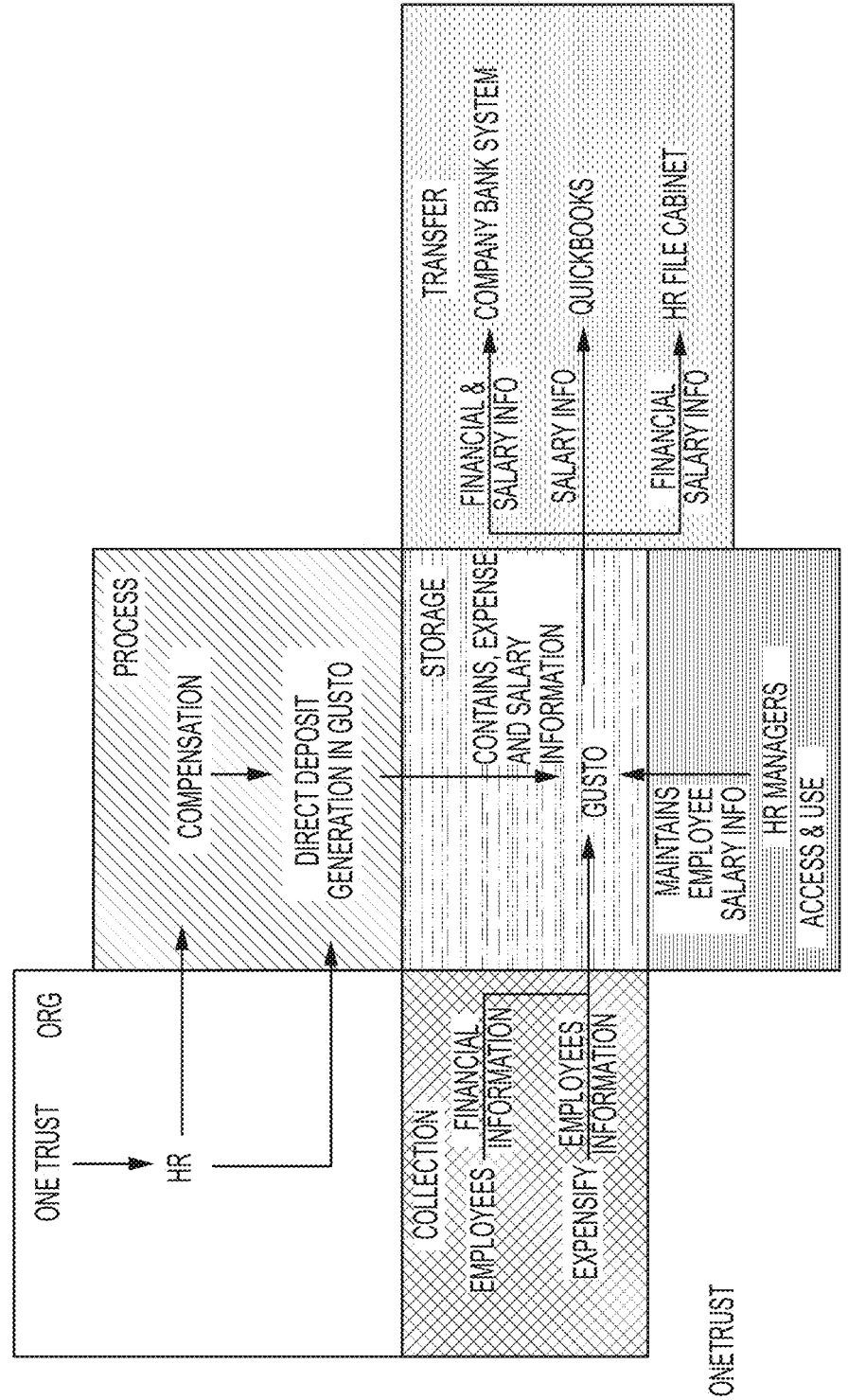

As shown in FIGS. 4 and 5, in various embodiments, the data model may store the following information: (1) the organization that owns and/or uses a particular data asset (a primary data asset, which is shown in the center of the data model in FIG. 4); (2) one or more departments within the organization that are responsible for the data asset; (3) one or more software applications that collect data (e.g., personal data) for storage in and/or use by the data asset (e.g., or one or more other suitable collection assets from which the personal data that is collected, processed, stored, etc. by the primary data asset is sourced); (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets. As shown in FIGS. 6 and 7, the system may also optionally store information regarding, for example, which business processes and processing activities utilize the data asset.

In particular embodiments, the data model stores this information for each of a plurality of different data assets and may include links between, for example, a portion of the model that provides information for a first particular data asset and a second portion of the model that provides information for a second particular data asset.

In various embodiments, the data model generation and population system may be implemented in the context of any suitable privacy management system that is configured to ensure compliance with one or more legal or industry standards related to the collection and/or storage of private information. In various embodiments, a particular organization, sub-group, or other entity may initiate a privacy campaign or other activity (e.g., processing activity) as part of its business activities. In such embodiments, the privacy campaign may include any undertaking by a particular organization (e.g., such as a project or other activity) that includes the collection, entry, and/or storage (e.g., in memory) of any personal data associated with one or more individuals. In particular embodiments, a privacy campaign may include any project undertaken by an organization that includes the use of personal data, or any other activity that could have an impact on the privacy of one or more individuals.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies).

In particular embodiments, when generating a data model, the system may, for example: (1) identify one or more data assets associated with a particular organization; (2) generate a data inventory for each of the one or more data assets, where the data inventory comprises information such as: (a) one or more processing activities associated with each of the one or more data assets, (b) transfer data associated with each of the one or more data assets (data regarding which data is transferred to/from each of the data assets, and which data assets, or individuals, the data is received from and/or transferred to, (c) personal data associated with each of the one or more data assets (e.g., particular types of data collected, stored, processed, etc. by the one or more data assets), and/or (d) any other suitable information; and (3) populate the data model using one or more suitable techniques.

In particular embodiments, the one or more techniques for populating the data model may include, for example: (1) obtaining information for the data model by using one or more questionnaires associated with a particular privacy campaign, processing activity, etc.; (2) using one or more intelligent identity scanning techniques discussed herein to identify personal data stored by the system and map such data to a suitable data model, data asset within a data model, etc.; (3) obtaining information for the data model from a third-party application (or other application) using one or more application programming interfaces (API); and/or (4) using any other suitable technique.

In particular embodiments, the system is configured to generate and populate a data model substantially on the fly (e.g., as the system receives new data associated with particular processing activities). In still other embodiments, the system is configured to generate and populate a data model based at least in part on existing information stored by the system (e.g., in one or more data assets), for example, using one or more suitable scanning techniques described herein.

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. By generating and populating a data model of one or more data assets that are involved in the collection, storage and processing of such personal data, the system may be configured to create a data model that facilitates a straightforward retrieval of information stored by the organization as desired. For example, in various embodiments, the system may be configured to use a data model in substantially automatically responding to one or more data access requests by an individual (e.g., or other organization). In still other embodiments, such data model generation and population may improve the functionality of an entity's computing systems by enabling a more streamlined retrieval of data from the system and eliminating redundant storage of identical data. Various embodiments of a system for generating and populating a data model are described more fully below.

In particular embodiments, a Cross-Border Visualization Generation System is configured to: (1) identify one or more data assets associated with a particular entity; (2) analyze the one or more data assets to identify one or more data elements stored in the identified one or more data assets; (3) define a plurality of physical locations and identify, for each of the identified one or more data assets, a respective particular physical location of the plurality of physical locations; (4) analyze the identified one or more data elements to determine one or more data transfers between the one or more data systems in different particular physical locations; (5) determine one or more regulations that relate to the one or more data transfers; and (6) generate a visual representation of the one or more data transfers based at least in part on the one or more regulations.

In various embodiments, a Data Model Adaptive Execution System may be configured to take one or more suitable actions to remediate an identified risk trigger in view of one or more regulations (e.g., one or more legal regulations, one or more binding corporate rules, etc.). For example, in order to ensure compliance with one or more legal or industry standards related to the collection and/or storage of private information (e.g., personal data), an entity may be required to modify one or more aspects of a way in which the entity collects, stores, and/or otherwise processes personal data (e.g., in response to a change in a legal or other requirement). In order to identify whether a particular change or other risk trigger requires remediation, the system may be configured to assess a relevance of the risk posed by the potential risk trigger and identify one or more processing activities or data assets that may be affected by the risk.

The system may, for example: (1) identify and/or detect one or more potential risk triggers; (2) assess and analyze the potential risk triggers to determine a relevance of the risk posed by the risk triggers; (3) use data modelling techniques to identify particular processing activities and/or data assets that may be affected by the risk; (4) determine based on a relevance of the risk and the affected systems/processes whether to take one or more actions; and (5) take a suitable action in response to the risk triggers, if necessary.

The risk triggers may include, for example a change in legal or industry standards/regulations related to the collection, storage, and/or processing of personal data, a data breach, or any other suitable risk trigger. The suitable actions to remediate the risk may include, for example, generating a report and providing it to a privacy officer or other individual, automatically modifying an encryption level of particular data stored by the system, quarantining particular data, etc.

In various embodiments, a system may be configured to substantially automatically determine whether to take one or more actions in response to one or more identified risk triggers (e.g., data breaches, changes in regulations, etc.). For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

The system may, for example: (1) compare the potential risk trigger to one or more previous risks triggers experienced by the particular entity at a previous time; (2) identify a similar previous risk trigger (e.g., one or more previous risk triggers related to a similar change in regulation, breach of data, type of issue identified, etc.); (3) determine the relevance of the current risk trigger based at least in part on a determined relevance of the previous risk trigger; and (4) determine whether to take one or more actions to the current risk trigger based at least in part on one or more determined actions to take in response to the previous, similar risk trigger.

Similarly, in particular embodiments, the system may be configured to substantially automatically determine one or more actions to take in response to a current potential risk trigger based on one or more actions taken by one or more similarly situated entities to one or more previous, similar risk triggers. For example, the system may be configured to: (1) compare the potential risk trigger to one or more previous risk triggers experienced by one or more similarly situated entities at a previous time; (2) identify a similar previous risk trigger (e.g., one or more previous risk triggers related to a similar change in regulation, breach of data, and/or type of issue identified, etc. from the one or more previous risk triggers experienced by the one or more similarly-situated entities at the previous time; (3) determine the relevance of the current risk trigger based at least in part on a determined relevance of the previous risk trigger (e.g., a relevance determined by the one or more similarly situated entities); and (4) determine one or more actions to take in response to the current risk trigger based at least in part on one or more previously determined actions to take in response to the previous, similar risk trigger (e.g., one or more determined actions by the one or more similarly situated entities at the previous time).

In particular embodiments, a Data Access Webform Crawling System is configured to: (1) identify a webform used to collect one or more pieces of personal data; (2) robotically complete the identified webform; (3) analyze the completed webform to determine one or more processing activities that utilize the one or more pieces of personal data collected by the webform; (4) identify a first data asset in the data model that is associated with the one or more processing activities; (5) modify a data inventory for the first data asset in the data model to include data associated with the webform; and (6) modify the data model to include the modified data inventory for the first data asset.

In addition, various systems and computer-implemented methods are described for: (1) analyzing electronic correspondence associated with a data subject (e.g., the emails within one or more email in-boxes associated with the data subject); (2) based on the analysis, identifying one or more entities (e.g., corporate entities) that that the data subject does not actively do business with (e.g., as evidenced by the fact that the data subject no longer opens emails from the entity, or has set up a rule to automatically delete emails received from the entity); (3) in response to identifying the entity as an entity that the data subject no longer actively does business with, at least substantially automatically generating a data subject access request and, optionally, automatically submitting the data subject access request to the entity.

The system may, for example, be configured to determine whether the data subject actively does business with a particular entity (e.g., purchases products from, or uses one or more services from the entity) based at least in part on one or more determined interactions of the data subject with one or more e-mails, or other electronic correspondence, from the entity (e.g., whether the data subject reads the one or more e-mails, selects one or more links within the e-mails, deletes the e-mails without reading them, has set up a rule to auto-delete emails from the entity, has set up a rule to re-route emails from the entity to a particular folder, or other location, designated for promotional materials (e.g., unwanted promotional materials), and/or has set up a rule to associate emails from the entity with metadata indicating that the correspondence is promotional in nature or should be re-routed or auto-deleted. The system may then substantially automatically generate and/or submit a data subject access request on behalf of the data subject that includes a request to be forgotten (e.g., a request for the entity to delete some or all of the data subject's personal data that the entity is processing).

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, the organization or entity may not have or may no longer have a legal basis to continue to store the data. As such, organizations and entities may require improved systems and methods to identify such orphaned data, and take corrective action, if necessary (e.g., to ensure that the organization may not be in violation of one or more legal or industry regulations).

In various embodiments, an orphaned personal data identification system may be configured to generate a data model (e.g., one or more data models) that maps one or more relationships between and/or among a plurality of data assets utilized by a corporation or other entity (e.g., individual, organization, etc.) in the context, for example, of one or more business processes or processing activities. In particular embodiments, the system is configured to generate and populate a data model substantially on the fly (e.g., as the system receives new data associated with particular processing activities). In still other embodiments, the system is configured to generate and populate a data model based at least in part on existing information stored by the system (e.g., in one or more data assets), for example, using one or more suitable scanning techniques. In still other embodiments, the system is configured to access an existing data model that maps personal data stored by one or more organization systems to particular associated processing activities.

In various embodiments, the system may analyze the data model to identify personal data that has been collected and stored using one or more computer systems operated and/or utilized by a particular organization where the personal data is not currently being used as part of any privacy campaigns, processing activities, etc. undertaken by the particular organization. This data may be described as orphaned data. In some circumstances, the particular organization may be exposed to an increased risk that the data may be accessed by a third party (e.g., cybercrime) or that the particular organization may not be in compliance with one or more legal or industry requirements related to the collection, storage, and/or processing of this orphaned data.

Additionally, in some implementations, in response to the termination of a particular privacy campaign, processing activity, (e.g., manually or automatically), the system may be configured to analyze the data model to determine whether any of the personal data that has been collected and stored by the particular organization is now orphaned data (e.g., whether any personal data collected and stored as part of the now-terminated privacy campaign is being utilized by any other processing activity, has some other legal basis for its continued storage, etc.).

In additional implementations in response to determining that a particular privacy campaign, processing activity, etc. has not been utilized for a period of time (e.g., a day, month, year), the system may be configured to terminate the particular privacy campaign, processing activity, etc. or prompt one or more individuals associated with the particular organization to indicate whether the particular privacy campaign, processing activity, etc. should be terminated or otherwise discontinued.

For example, a particular processing activity may include transmission of a periodic advertising e-mail for a particular company (e.g., a hardware store). As part of the processing activity, the particular company may have collected and stored e-mail addresses for customers that elected to receive (e.g., consented to the receipt of) promotional e-mails. In response to determining that the particular company has not sent out any promotional e-mails for at least a particular amount of time (e.g., for at least a particular number of months), the system may be configured to: (1) automatically terminate the processing activity; (2) identify any of the personal data collected as part of the processing activity that is now orphaned data (e.g., the e-mail addresses); and (3) automatically delete the identified orphaned data. The processing activity may have ended for any suitable reason (e.g., because the promotion that drove the periodic e-mails has ended). As may be understood in light of this disclosure, because the particular organization no longer has a valid basis for continuing to store the e-mail addresses of the customers once the e-mail addresses are no longer being used to send promotional e-mails, the organization may wish to substantially automate the removal of personal data stored in its computer systems that may place the organization in violation of one or more personal data storage rules or regulations.

When the particular privacy campaign, processing activity, etc. is terminated or otherwise discontinued, the system may use the data model to determine if any of the associated personal data that has been collected and stored by the particular organization is now orphaned data.

In various embodiments, the system may be configured to identify orphaned data of a particular organization and automatically delete the data. In some implementations, in response to identifying the orphaned data, the system may present the data to one or more individuals associated with the particular organization (e.g., a privacy officer) and prompt the one or more individuals to indicate why the orphaned data is being stored by the particular organization. The system may then enable the individual to provide one or more valid reasons for the data's continued storage, or enable the one or more individuals to delete the particular orphaned data. In some embodiments, the system may automatically delete the orphaned data if, for example: (1) in response to determining that a reason provided by the individual is not a sufficient basis for the continued storage of the personal data; (2) the individual does not respond to the request to provide one or more valid reasons in a timely manner; (3) etc. In some embodiments, one or more other individuals may review the response provided indicating why the orphaned data is being stored, and in some embodiments, the one or more other individuals can delete the particular orphaned data.

In various embodiments, the system may be configured to review the data collection policy (e.g., how data is acquired, security of data storage, who can access the data, etc.) for the particular organization as well as one or more data retention metrics for the organization. For example, the one or more data retention metrics may include how much personal data is being collected, how long the data is held, how many privacy campaigns or other processes are using the personal data, etc. Additionally, the system may compare the particular organization's data collection policy and data retention metrics to the industry standards (e.g., in a particular field, based on a company size, etc.). In various embodiments, the system may be configured to generate a report that includes the comparison and provide the report to the particular organization (e.g., in electronic format).

In particular embodiments, the system may be configured advise the particular organization to delete data and identify particular data that should be deleted. In some embodiments, the system may automatically delete particular data (e.g., orphaned data). Further, the system may be configured to calculate and provide a risk score for particular data or the organization's data collection policy overall. In particular embodiments, the system may be configured to calculate the risk score based on the combinations of personal data elements in the data inventory of the organization (e.g., where an individual's phone number is stored in one location and their mailing address is stored in another location), and as such the risk may be increased because the additional pieces of personal information can make the stored data more sensitive.

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, such data may not have or may no longer have a legal basis for the organization or entity to continue to store the data. As such, organizations and entities may require improved systems and methods to maintain an inventory of data assets utilized to process and/or store personal data for which a data subject has provided consent for such storage and/or processing.

In various embodiments, the system is configured to provide a third-party data repository system to facilitate the receipt and centralized storage of personal data for each of a plurality of respective data subjects, as described herein. Additionally, the third-party data repository system is configured to interface with a centralized consent receipt management system.

In particular embodiments, the system may be configured to use one or more website scanning tools to, for example, identify a form (e.g., a webform) and locate a data asset where the input data is transmitted (e.g., Salesforce). Additionally, the system may be configured to add the data asset to the third-party data repository (e.g., and/or data map/data inventory) with a link to the form. In response to a user inputting form data (e.g., name, address, credit card information, etc.) of the form and submitting the form, the system may, based on the link to the form, create a unique subject identifier to submit to the third-party data repository and, along with the form data, to the data asset. Further, the system may use the unique subject identifier of a user to access and update each of the data assets of the particular organization. For example, in response to a user submitting a data subject access request to delete the user's personal data that the particular organization has stored, the system may use the unique subject identifier of the user to access and delete the user's personal data stored in all of the data assets (e.g., Salesforce, Eloqua, Marketo, etc.) utilized by the particular organization.

The system may, for example: (1) generate, for each of a plurality of data subjects, a respective unique subject identifier in response to submission, by each data subject, of a particular form; (2) maintain a database of each respective unique subject identifier; and (3) electronically link each respective unique subject identifier to each of: (A) a form initially submitted by the user; and (B) one or more data assets that utilize data received from the data subject via the form.

In various embodiments, the system may be configured to, for example: (1) identify a form used to collect one or more pieces of personal data, (2) determine a data asset of a plurality of data assets of the organization where input data of the form is transmitted, (3) add the data asset to the third-party data repository with an electronic link to the form, (4) in response to a user submitting the form, create a unique subject identifier to submit to the third-party data repository and, along with the form data provided by the user in the form, to the data asset, (5) submit the unique subject identifier and the form data provided by the user in the form to the third-party data repository and the data asset, and (6) digitally store the unique subject identifier and the form data provided by the user in the form in the third-party data repository and the data asset.

In some embodiments, the system may be further configured to, for example: (1) receive a data subject access request from the user (e.g., a data subject rights' request, a data subject deletion request, etc.), (2) access the third-party data repository to identify the unique subject identifier of the user, (3) determine which data assets of the plurality of data assets of the organization include the unique subject identifier, (4) access personal data of the user stored in each of the data assets of the plurality of data assets of the organization that include the unique subject identifier, and (5) take one or more actions based on the data subject access request (e.g., delete the accessed personal data in response to a data subject deletion request).

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an entity. In particular, under various privacy and security policies, a data subject may be entitled to a right to erasure of any personal data associated with that data subject that has been at least temporarily stored by the entity (e.g., a right to be forgotten). In various embodiments, under the right to erasure, an entity (e.g., a data controller on behalf of another organization) may be obligated to erase personal data without undue delay under one or more of the following conditions: (1) the personal data is no longer necessary in relation to a purpose for which the data was originally collected or otherwise processed; (2) the data subject has withdrawn consent on which the processing of the personal data is based (e.g., and there is no other legal grounds for such processing); (3) the personal data has been unlawfully processed; (4) the data subject has objected to the processing and there is no overriding legitimate grounds for the processing of the data by the entity; and/or (5) for any other suitable reason or under any other suitable conditions.

In particular embodiments, a personal data deletion system may be configured to: (1) at least partially automatically identify and delete personal data that an entity is required to erase under one or more of the conditions discussed above; and (2) perform one or more data tests after the deletion to confirm that the system has, in fact, deleted any personal data associated with the data subject.

In particular embodiments, in response to a data subject submitting a request to delete their personal data from an entity's systems, the system may, for example: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., deleting a directory entry associated with the data); and/or (3) using any other suitable technique for deleting the personal data. In particular embodiments, as part of this process, the system may use any suitable data modelling technique to efficiently determine where all of the data subject's personal data is stored.

In various embodiments, the system may be configured to store (e.g., in memory) an indication that the data subject has requested to delete any of their personal data stored by the entity has been processed. Under various legal and industry policies/standards, the entity may have a certain period of time (e.g., a number of days) in order to comply with the one or more requirements related to the deletion or removal of personal data in response to receiving a request from the data subject or in response to identifying one or more of the conditions requiring deletion discussed above. In response to the receiving of an indication that the deletion request for the data subject's personal data has been processed or the certain period of time (described above) has passed, the system may be configured to perform a data test to confirm the deletion of the data subject's personal data.

In particular embodiments, when performing the data test, the system may be configured to provide an interaction request to the entity on behalf of the data subject. In particular embodiments, the interaction request may include, for example, a request for one or more pieces of data associated with the data subject (e.g., account information, etc.). In various embodiments, the interaction request is a request to contact the data subject (e.g., for any suitable reason). The system may, for example, be configured to substantially automatically complete a contact-request form (e.g., a webform made available by the entity) on behalf of the data subject. In various embodiments, when automatically completing the form on behalf of the data subject, the system may be configured to only provide identifying data, but not provide any contact data. In response to submitting the interaction request (e.g., submitting the webform), the system may be configured to determine whether the one or more computers systems have generated and/or transmitted a response to the data subject. The system may be configured to determine whether the one or more computers systems have generated and/or transmitted the response to the data subject by, for example, analyzing one or more computer systems associated with the entity to determine whether the one or more computer systems have generated a communication to the data subject (e.g., automatically) for transmission to an e-mail address or other contact method associated with the data subject, generated an action-item for an individual to contact the data subject at a particular contact number, etc.

In response to determining that the one or more computer systems has generated and/or transmitted the response to the data subject, the system may be configured to determine that the one or more computer systems has not complied with the data subject's request for deletion of their personal data from the one or more computers systems associated with the entity. In response, the system may generate an indication that the one or more computer systems has not complied with the data subject's request for deletion of their personal data from the one or more computers systems have, and store the indication in computer memory.

To perform the data test, for example, the system may be configured to: (1) access (e.g., manually or automatically) a form for the entity (e.g., a web-based "Contact Us" form); (2) input a unique identifier associated with the data subject (e.g., a full name or customer ID number) without providing contact information for the data subject (e.g., mailing address, phone number, email address, etc.); and (3) input a request, within the form, for the entity to contact the data subject to provide information associated with the data subject (e.g., the data subject's account balance with the entity). In response to submitting the form to the entity, the system may be configured to determine whether the data subject is contacted (e.g., via a phone call or email) by the one or more computer systems (e.g., automatically). In response to determining that the data subject has been contacted following submission of the form, the system may determine that the one or more computer systems have not fully deleted the data subject's personal data (e.g., because the one or more computer systems must still be storing contact information for the data subject in at least one location).

In particular embodiments, the system is configured to generate one or more test profiles for one or more test data subjects. For each of the one or more test data subjects, the system may be configured to generate and store test profile data such as, for example: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable test data. The system may then be configured to at least initially consent to processing or collection of personal data for the one or more test data subjects by the entity. The system may then request deletion, by the entity, of any personal data associated with a particular test data subject. In response to requesting the deletion of data for the particular test data subject, the system may then take one or more actions using the test profile data associated with the particular test data subjects in order to confirm that the one or more computers systems have, in fact, deleted the test data subject's personal data (e.g., any suitable action described herein). The system may, for example, be configured to: (1) initiate a contact request on behalf of the test data subject; (2) attempt to login to one or more user accounts that the system had created for the particular test data subject; and/or (3) take any other action, the effect of which could indicate a lack of complete deletion of the test data subject's personal data.

In response to determining that the one or more computer systems have not fully deleted a data subject's (or test data subject's) personal data, the system may then be configured, in particular embodiments, to: (1) flag the data subject's personal data for follow up by one or more privacy officers to investigate the lack of deletion; (2) perform one or more scans of one or more computing systems associated with the entity to identify any residual personal data that may be associated with the data subject; (3) generate a report indicating the lack of complete deletion; and/or (4) take any other suitable action to flag for follow-up the data subject, personal data, initial request to be forgotten, etc.

The system may, for example, be configured to test to ensure the data has been deleted by: (1) submitting a unique token of data through a form to a system (e.g., mark to); (2) in response to passage of an expected data retention time, test the system by calling into the system after the passage of the data retention time to search for the unique token. In response to finding the unique token, the system may be configured to determine that the data has not been properly deleted.

In various embodiments, a system may be configured to substantially automatically determine whether to take one or more actions in response to one or more identified risk triggers. For example, an identified risk trigger may be that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In some embodiments, when a change or update is made to one or more processing activities and/or data assets (e.g., a database associated with a particular organization), the system may use data modeling techniques to update the risk remediation data for use in facilitating an automatic assessment of and/or response to future identified risk triggers. In various embodiments, when a privacy campaign, processing activity, etc. of the particular organization is modified (e.g., add, remove, or update particular information), then the system may use the risk remediation data for use in facilitating an automatic assessment of and/or response to future identified risk triggers.

In particular embodiments, the system may, for example, be configured to: (1) access risk remediation data for an entity that identifies one or more suitable actions to remediate a risk in response to identifying one or more data assets of the entity that may be affected by one or more potential risk triggers; (2) receive an indication of an update to the one or more data assets; (3) identify one or more potential updated risk triggers for an entity; (4) assess and analyze the one or more potential updated risk triggers to determine a relevance of a risk posed to the entity by the one or more potential updated risk triggers; (5) use one or more data modeling techniques to identify one or more data assets associated with the entity that may be affected by the risk; and (6) update the risk remediation data to include the one or more actions to remediate the risk in response to identifying the one or more potential updated risk triggers.

In any embodiment described herein, an automated classification system may be configured to substantially automatically classify one or more pieces of personal information in one or more documents (e.g., one or more text-based documents, one or more spreadsheets, one or more PDFs, one or more webpages, etc.). In particular embodiments, the system may be implemented in the context of any suitable privacy compliance system, which may, for example, be configured to calculate and assign a sensitivity score to a particular document based at least in part on one or more determined categories of personal information (e.g., personal data) identified in the one or more documents. As understood in the art, the storage of particular types of personal information may be governed by one or more government or industry regulations. As such, it may be desirable to implement one or more automated measures to automatically classify personal information from stored documents (e.g., to determine whether such documents may require particular security measures, storage techniques, handling, whether the documents should be destroyed, etc.).

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
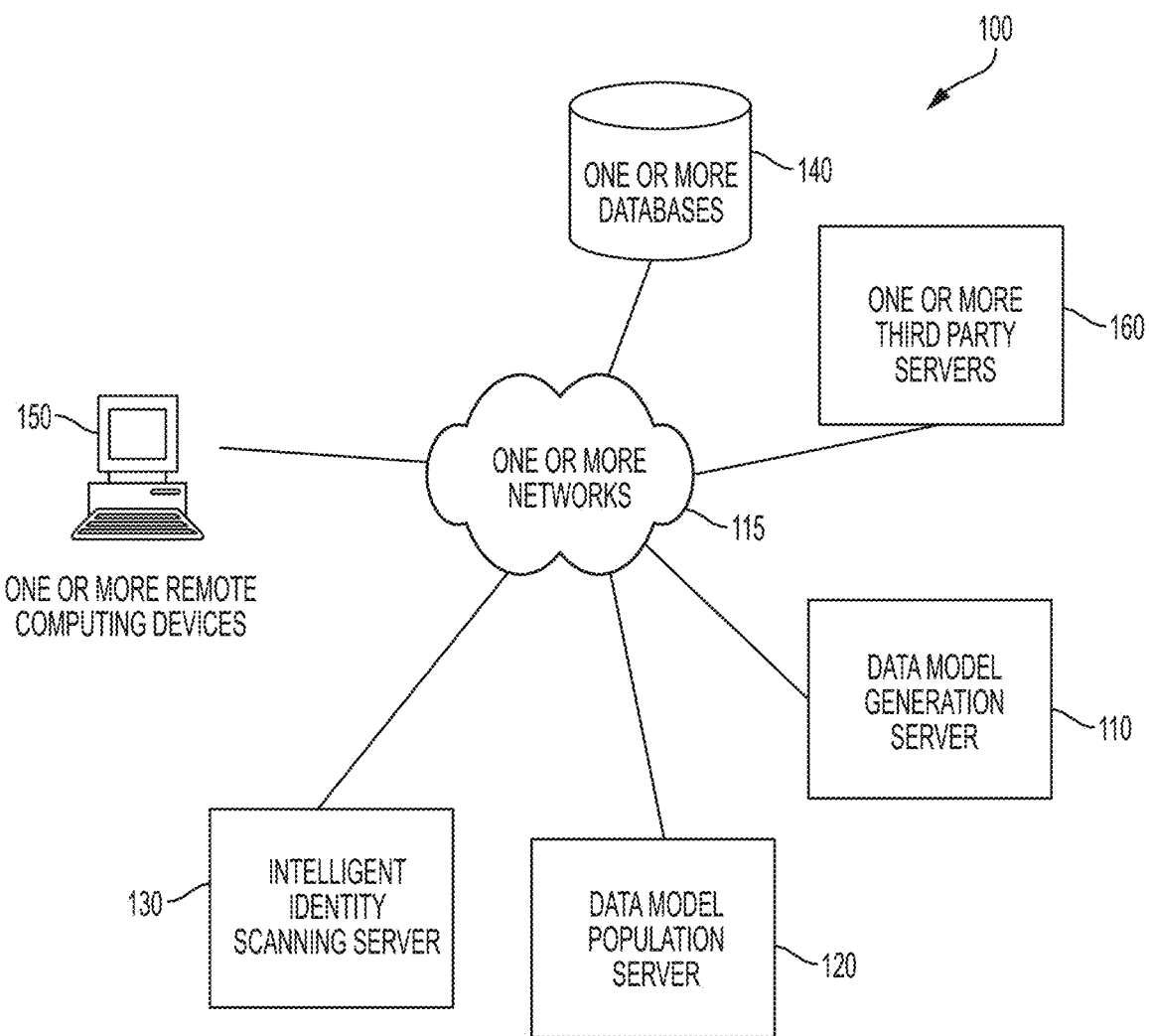
FIG. 1 depicts a data model generation and population system according to particular embodiments.

FIG. 1 is a block diagram of a Data Model Generation and Population System 100 according to a particular embodiment. In various embodiments, the Data Model Generation and Population System 100 is part of a privacy compliance system (also referred to as a privacy management system), or other system, which may, for example, be associated with a particular organization and be configured to aid in compliance with one or more legal or industry regulations related to the collection and storage of personal data. In some embodiments, the Data Model Generation and Population System 100 is configured to: (1) generate a data model based on one or more identified data assets, where the data model includes a data inventory associated with each of the one or more identified data assets; (2) identify populated and unpopulated aspects of each data inventory; and (3) populate the unpopulated aspects of each data inventory using one or more techniques such as intelligent identity scanning, questionnaire response mapping, APIs, etc.

As may be understood from FIG. 1, the Data Model Generation and Population System 100 includes one or more computer networks 115, a Data Model Generation Server 110, a Data Model Population Server 120, an Intelligent Identity Scanning Server 130, One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160 are shown as separate servers, it should be understood that in other embodiments, one or more of these servers and/or computing devices may comprise a single server, a plurality of servers, one or more cloud-based servers, or any other suitable configuration. It should be further understood that although any particular name given to any particular server in the course of this description should not be understood to imply any limit to any functionality that such a server may provide to the system. For example, a scanning server may be implemented along with one or more other servers to generate, automate, execute, and/or fulfill one or more data subject access requests. Similarly, a data model population server may be configured to execute one or more scanning steps described herein, etc.

The one or more computer networks 115 may include any of a variety of types of wired or wireless computer networks such as the Internet, a private intranet, a public switch telephone network (PSTN), or any other type of network. The communication link between The Intelligent Identity Scanning Server 130 and the One or More Third Party Servers 160 may be, for example, implemented via a Local Area Network (LAN) or via the Internet. In other embodiments, the One or More Databases 140 may be stored either fully or partially on any suitable server or combination of servers described herein.

Figure 2:
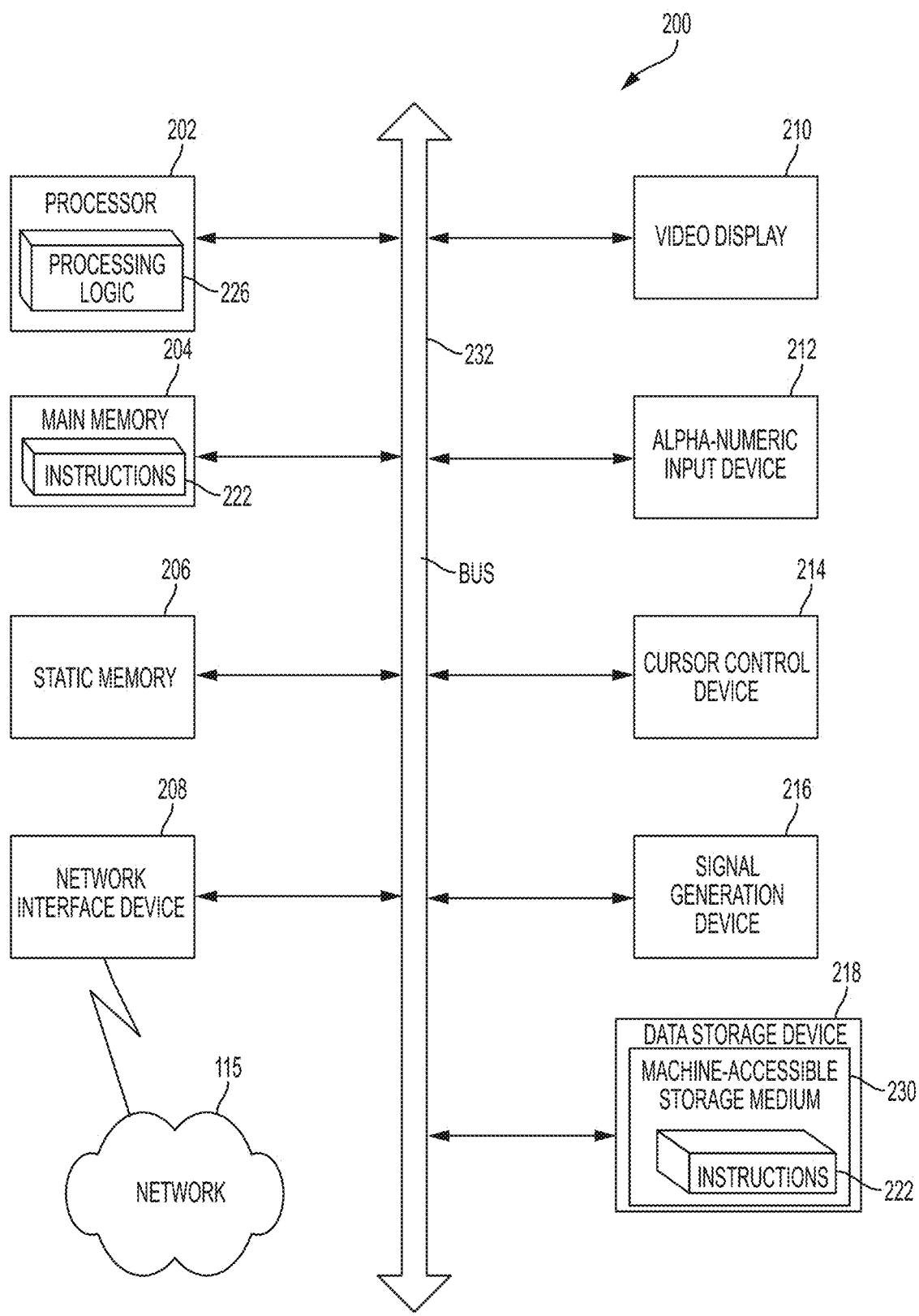
FIG. 2 is a schematic diagram of a computer (such as the data model generation server 110, or data model population server 120) that is suitable for use in various embodiments of the data model generation and population system shown in FIG. 1.

FIG. 2 illustrates a diagrammatic representation of a computer 200 that can be used within the Data Model Generation and Population System 100, for example, as a client computer (e.g., one or more remote computing devices 130 shown in FIG. 1), or as a server computer (e.g., Data Model Generation Server 110 shown in FIG. 1). In particular embodiments, the computer 200 may be suitable for use as a computer within the context of the Data Model Generation and Population System 100 that is configured to generate a data model and map one or more relationships between one or more pieces of data that make up the model.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a Data Model Generation and Population System 100 may be implemented in the context of any suitable system (e.g., a privacy compliance system). For example, the Data Model Generation and Population System 100 may be implemented to analyze a particular company or other organization's data assets to generate a data model for one or more processing activities, privacy campaigns, etc. undertaken by the organization. In particular embodiments, the system may implement one or more modules in order to at least partially ensure compliance with one or more regulations (e.g., legal requirements) related to the collection and/or storage of personal data. Various aspects of the system's functionality may be executed by certain system modules, including a Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400. These modules are discussed in greater detail below.

Although these modules are presented as a series of steps, it should be understood in light of this disclosure that various embodiments of the Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400 described herein may perform the steps described below in an order other than in which they are presented. In still other embodiments, the Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400 may omit certain steps described below. In various other embodiments, the Data Model Generation Module 300, Data Model Population Module 1100, Data Population Questionnaire Generation Module 1200, Intelligent Identity Scanning Module 2600, Data Subject Access Request Fulfillment Module 2900, Cross-Border Visualization Generation Module 3600, Adaptive Execution on a Data Model Module 3900, E-mail Scanning Module 4100, Webform Crawling Module 4300, and Data Asset and Webform Management Module 4400 may perform steps in addition to those described (e.g., such as one or more steps described with respect to one or more other modules, etc.).

In particular embodiments, the steps that the system executes when executing any of the modules described herein may be performed by any suitable computer server or combination of computer servers (e.g., any suitable computing device, server, or combination of computing device and/or server described herein).

Data Model Generation Module

In particular embodiments, a Data Model Generation Module 300 is configured to: (1) generate a data model (e.g., a data inventory) for one or more data assets utilized by a particular organization; (2) generate a respective data inventory for each of the one or more data assets; and (3) map one or more relationships between one or more aspects of the data inventory, the one or more data assets, etc. within the data model. In particular embodiments, a data asset (e.g., data system, software application, etc.) may include, for example, any entity that collects, processes, contains, and/or transfers data (e.g., such as a software application, "internet of things" computerized device, database, website, datacenter, server, etc.). For example, a first data asset may include any software or device (e.g., server or servers) utilized by a particular entity for such data collection, processing, transfer, storage, etc.

In particular embodiments, a particular data asset, or collection of data assets, may be utilized as part of a particular data processing activity (e.g., direct deposit generation for payroll purposes). In various embodiments, a data model generation system may, on behalf of a particular organization (e.g., entity), generate a data model that encompasses a plurality of processing activities. In other embodiments, the system may be configured to generate a discrete data model for each of a plurality of processing activities undertaken by an organization.

Figure 3:
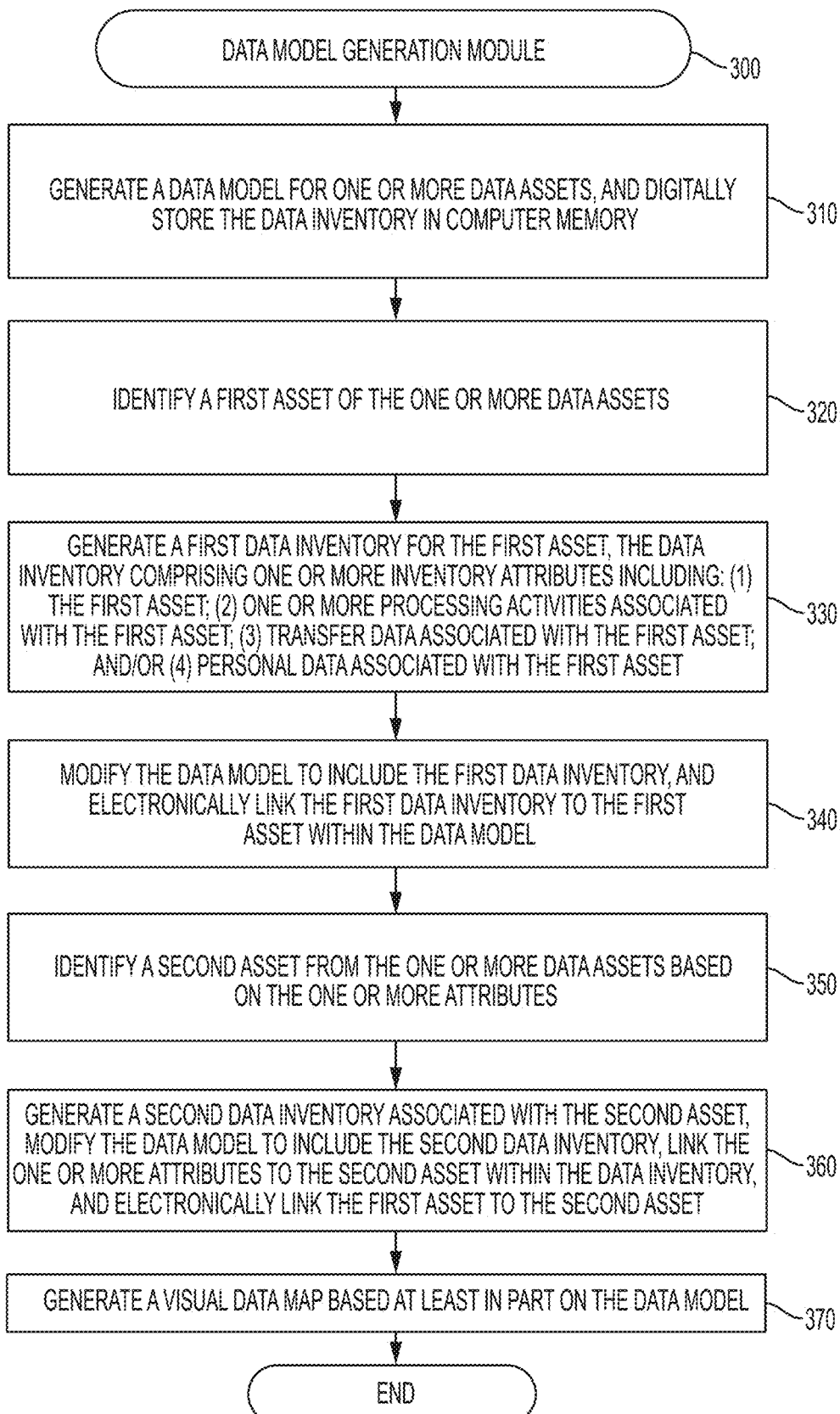
FIG. 3 is a flowchart showing an example of steps performed by a Data Model Generation Module according to particular embodiments.

Turning to FIG. 3, in particular embodiments, when executing the Data Model Generation Module 300, the system begins, at Step 310, by generating a data model for one or more data assets and digitally storing the data model in computer memory. The system may, for example, store the data model in the One or More Databases 140 described above (or any other suitable data structure). In various embodiments, generating the data model comprises generating a data structure that comprises information regarding one or more data assets, attributes and other elements that make up the data model. As may be understood in light of this disclosure, the one or more data assets may include any data assets that may be related to one another. In particular embodiments, the one or more data assets may be related by virtue of being associated with a particular entity (e.g., organization). For example, the one or more data assets may include one or more computer servers owned, operated, or utilized by the entity that at least temporarily store data sent, received, or otherwise processed by the particular entity.

In still other embodiments, the one or more data assets may comprise one or more third party assets which may, for example, send, receive and/or process personal data on behalf of the particular entity. These one or more data assets may include, for example, one or more software applications (e.g., such as Expensify to collect expense information, QuickBooks to maintain and store salary information, etc.).

Continuing to step 320, the system is configured to identify a first data asset of the one or more data assets. In particular embodiments, the first data asset may include, for example, any entity (e.g., system) that collects, processes, contains, and/or transfers data (e.g., such as a software application, "internet of things" computerized device, database, website, data-center, server, etc.). For example, the first data asset may include any software or device utilized by a particular organization for such data collection, processing, transfer, etc. In various embodiments, the first data asset may be associated with a particular processing activity (e.g., the first data asset may make up at least a part of a data flow that relates to the collection, storage, transfer, access, use, etc. of a particular piece of data (e.g., personal data)). Information regarding the first data asset may clarify, for example, one or more relationships between and/or among one or more other data assets within a particular organization. In a particular example, the first data asset may include a software application provided by a third party (e.g., a third party vendor) with which the particular entity interfaces for the purpose of collecting, storing, or otherwise processing personal data (e.g., personal data regarding customers, employees, potential customers, etc.).

In particular embodiments, the first data asset is a storage asset that may, for example: (1) receive one or more pieces of personal data form one or more collection assets; (2) transfer one or more pieces of personal data to one or more transfer assets; and/or (3) provide access to one or more pieces of personal data to one or more authorized individuals (e.g., one or more employees, managers, or other authorized individuals within a particular entity or organization). In a particular embodiment, the first data asset is a primary data asset associated with a particular processing activity around which the system is configured to build a data model associated with the particular processing activity.

In particular embodiments, the system is configured to identify the first data asset by scanning a plurality of computer systems associated with a particular entity (e.g., owned, operated, utilized, etc. by the particular entity). In various embodiments, the system is configured to identify the first data asset from a plurality of data assets identified in response to completion, by one or more users, of one or more questionnaires.

Advancing to Step 330, the system generates a first data inventory of the first data asset. The data inventory may comprise, for example, one or more inventory attributes associated with the first data asset such as, for example: (1) one or more processing activities associated with the first data asset; (2) transfer data associated with the first data asset (e.g., how and where the data is being transferred to and/or from); (3) personal data associated with the first data asset (e.g., what type of personal data is collected and/or stored by the first data asset; how, and from where, the data is collected, etc.); (4) storage data associated with the personal data (e.g., whether the data is being stored, protected and deleted); and (5) any other suitable attribute related to the collection, use, and transfer of personal data. In other embodiments, the one or more inventory attributes may comprise one or more other pieces of information such as, for example: (1) the type of data being stored by the first data asset; (2) an amount of data stored by the first data asset; (3) whether the data is encrypted; (4) a location of the stored data (e.g., a physical location of one or more computer servers on which the data is stored); etc. In particular other embodiments, the one or more inventory attributes may comprise one or more pieces of information technology data related to the first data asset (e.g., such as one or more pieces of network and/or infrastructure information, IP address, MAC address, etc.).

In various embodiments, the system may generate the data inventory based at least in part on the type of first data asset. For example, particular types of data assets may have particular default inventory attributes. In such embodiments, the system is configured to generate the data inventory for the first data asset, which may, for example, include one or more placeholder fields to be populated by the system at a later time. In this way, the system may, for example, identify particular inventory attributes for a particular data asset for which information and/or population of data is required as the system builds the data model.

As may be understood in light of this disclosure, the system may, when generating the data inventory for the first data asset, generate one or more placeholder fields that may include, for example: (1) the organization (e.g., entity) that owns and/or uses the first data asset (a primary data asset, which is shown in the center of the data model in FIG. 4); (2) one or more departments within the organization that are responsible for the first data asset; (3) one or more software applications that collect data (e.g., personal data) for storage in and/or use by the first data asset (e.g., or one or more other suitable collection assets from which the personal data that is collected, processed, stored, etc. by the first data asset is sourced); (4) one or more particular data subjects (or categories of data subjects) that information is collected from for use by the first data asset; (5) one or more particular types of data that are collected by each of the particular applications for storage in and/or use by the first data asset; (6) one or more individuals (e.g., particular individuals or types of individuals) that are permitted to access and/or use the data stored in, or used by, the first data asset; (7) which particular types of data each of those individuals are allowed to access and use; and (8) one or more data assets (destination assets) that the data is transferred to from the first data asset, and which particular data is transferred to each of those data assets.

As may be understood in light of this disclosure, the system may be configured to generate the one or more placeholder fields based at least in part on, for example: (1) the type of the first data asset; (2) one or more third party vendors utilized by the particular organization; (3) a number of collection or storage assets typically associated with the type of the first data asset; and/or (4) any other suitable factor related to the first data asset, its one or more inventory attributes, etc. In other embodiments, the system may substantially automatically generate the one or more placeholders based at least in part on a hierarchy and/or organization of the entity for which the data model is being built. For example, a particular entity may have a marketing division, legal department, human resources department, engineering division, or other suitable combination of departments that make up an overall organization. Other particular entities may have further subdivisions within the organization. When generating the data inventory for the first data asset, the system may identify that the first data asset will have both an associated organization and subdivision within the organization to which it is assigned. In this example, the system may be configured to store an indication in computer memory that the first data asset is associated with an organization and a department within the organization.

Next, at Step 340, the system modifies the data model to include the first data inventory and electronically links the first data inventory to the first data asset within the data model. In various embodiments, modifying the data model may include configuring the data model to store the data inventory in computer memory, and to digitally associate the data inventory with the first data asset in memory.

FIGS. 4 and 5 show a data model according to a particular embodiment. As shown in these figures, the data model may store the following information for the first data asset: (1) the organization that owns and/or uses the first data asset; (2) one or more departments within the organization that are responsible for the first data asset; (3) one or more applications that collect data (e.g., personal data) for storage in and/or use by the first data asset; (4) one or more particular data subjects that information is collected from for use by the first data asset; (5) one or more collection assets from which the first asset receives data (e.g., personal data); (6) one or more particular types of data that are collected by each of the particular applications (e.g., collection assets) for storage in and/or use by the first data asset; (7) one or more individuals (e.g., particular individuals, types of individuals, or other parties) that are permitted to access and/or use the data stored in or used by the first data asset; (8) which particular types of data each of those individuals are allowed to access and use; and (9) one or more data assets (destination assets) the data is transferred to for other use, and which particular data is transferred to each of those data assets. As shown in FIGS. 6 and 7, the system may also optionally store information regarding, for example, which business processes and processing activities utilize the first data asset.

As noted above, in particular embodiments, the data model stores this information for each of a plurality of different data assets and may include one or more links between, for example, a portion of the model that provides information for a first particular data asset and a second portion of the model that provides information for a second particular data asset.

Advancing to Step 350, the system next identifies a second data asset from the one or more data assets. In various embodiments, the second data asset may include one of the one or more inventory attributes associated with the first data asset (e.g., the second data asset may include a collection asset associated with the first data asset, a destination asset or transfer asset associated with the first data asset, etc.). In various embodiments, as may be understood in light of the exemplary data models described below, a second data asset may be a primary data asset for a second processing activity, while the first data asset is the primary data asset for a first processing activity. In such embodiments, the second data asset may be a destination asset for the first data asset as part of the first processing activity. The second data asset may then be associated with one or more second destination assets to which the second data asset transfers data. In this way, particular data assets that make up the data model may define one or more connections that the data model is configured to map and store in memory.

Returning to Step 360, the system is configured to identify one or more attributes associated with the second data asset, modify the data model to include the one or more attributes, and map the one or more attributes of the second data asset within the data model. The system may, for example, generate a second data inventory for the second data asset that comprises any suitable attribute described with respect to the first data asset above. The system may then modify the data model to include the one or more attributes and store the modified data model in memory. The system may further, in various embodiments, associate the first and second data assets in memory as part of the data model. In such embodiments, the system may be configured to electronically link the first data asset with the second data asset. In various embodiments, such association may indicate a relationship between the first and second data assets in the context of the overall data model (e.g., because the first data asset may serve as a collection asset for the second data asset, etc.).

Next, at Step 370, the system may be further configured to generate a visual representation of the data model. In particular embodiments, the visual representation of the data model comprises a data map. The visual representation may, for example, include the one or more data assets, one or more connections between the one or more data assets, the one or more inventory attributes, etc.

In particular embodiments, generating the visual representation (e.g., visual data map) of a particular data model (e.g., data inventory) may include, for example, generating a visual representation that includes: (1) a visual indication of a first data asset (e.g., a storage asset), a second data asset (e.g., a collection asset), and a third data asset (e.g., a transfer asset); (2) a visual indication of a flow of data (e.g., personal data) from the second data asset to the first data asset (e.g., from the collection asset to the storage asset); (3) a visual indication of a flow of data (e.g., personal data) from the first data asset to the third data asset (e.g., from the storage asset to the transfer asset); (4) one or more visual indications of a risk level associated with the transfer of personal data; and/or (5) any other suitable information related to the one or more data assets, the transfer of data between/among the one or more data assets, access to data stored or collected by the one or more data assets, etc.

In particular embodiments, the visual indication of a particular asset may comprise a box, symbol, shape, or other suitable visual indicator. In particular embodiments, the visual indication may comprise one or more labels (e.g., a name of each particular data asset, a type of the asset, etc.). In still other embodiments, the visual indication of a flow of data may comprise one or more arrows. In particular embodiments, the visual representation of the data model may comprise a data flow, flowchart, or other suitable visual representation.

In various embodiments, the system is configured to display (e.g., to a user) the generated visual representation of the data model on a suitable display device.

Exemplary Data Models and Visual Representations of Data Models (e.g., Data Maps)

FIGS. 4-10 depict exemplary data models according to various embodiments of the system described herein. FIG. 4, for example, depicts an exemplary data model that does not include a particular processing activity (e.g., that is not associated with a particular processing activity). As may be understood from the data model shown in this figure, a particular data asset (e.g., a primary data asset) may be associated with a particular company (e.g., organization), or organization within a particular company, sub-organization of a particular organization, etc. In still other embodiments, the particular asset may be associated with one or more collection assets (e.g., one or more data subjects from whom personal data is collected for storage by the particular asset), one or more parties that have access to data stored by the particular asset, one or more transfer assets (e.g., one or more assets to which data stored by the particular asset may be transferred), etc.

As may be understood from FIG. 4, a particular data model for a particular asset may include a plurality of data elements. When generating the data model for the particular asset, a system may be configured to substantially automatically identify one or more types of data elements for inclusion in the data model, and automatically generate a data model that includes those identified data elements (e.g., even if one or more of those data elements must remain unpopulated because the system may not initially have access to a value for the particular data element). In such cases, the system may be configured to store a placeholder for a particular data element until the system is able to populate the particular data element with accurate data.

As may be further understood from FIG. 4, the data model shown in FIG. 4 may represent a portion of an overall data model. For example, in the embodiment shown in this figure, the transfer asset depicted may serve as a storage asset for another portion of the data model. In such embodiments, the transfer asset may be associated with a respective one or more of the types of data elements described above. In this way, the system may generate a data model that may build upon itself to comprise a plurality of layers as the system adds one or more new data assets, attributes, etc.

As may be further understood from FIG. 4, a particular data model may indicate one or more parties that have access to and/or use of the primary asset (e.g., storage asset). In such embodiments, the system may be configured to enable the one or more parties to access one or more pieces of data (e.g., personal data) stored by the storage asset.

As shown in FIG. 4, the data model may further comprise one or more collection assets (e.g., one or more data assets or individuals from which the storage asset receives data such as personal data). In the exemplary data model (e.g., visual data map) shown in this figure, the collection assets comprise a data subject (e.g., an individual that may provide data to the system for storage in the storage asset) and a collection asset (e.g., which may transfer one or more pieces of data that the collection asset has collected to the storage asset).

FIG. 5 depicts a portion of an exemplary data model that is populated for the primary data asset Gusto. Gusto is a software application that, in the example shown in FIG. 5, may serve as a human resources service that contains financial, expense, review, time and attendance, background, and salary information for one or more employees of a particular organization (e.g., GeneriTech). In the example of FIG. 5, the primary asset (e.g., Gusto) may be utilized by the HR (e.g., Human Resources) department of the particular organization (e.g., GeneriTech). Furthermore, the primary asset, Gusto, may collect financial information from one or more data subjects (e.g., employees of the particular organization), receive expense information transferred from Expensify (e.g., expensing software), and receive time and attendance data transferred from Kronos (e.g., timekeeping software). In the example shown in FIG. 5, access to the information collected and/or stored by Gusto may include, for example: (1) an ability to view and administer salary and background information by HR employees, and (2) an ability to view and administer employee review information by one or more service managers. In the example shown in this figure, personal and other data collected and stored by Gusto (e.g., salary information, etc.) may be transferred to a company banking system, to QuickBooks, and/or to an HR file cabinet.

As may be understood from the example shown in FIG. 5, the system may be configured to generate a data model based around Gusto that illustrates a flow of personal data utilized by Gusto. The data model in this example illustrates, for example, a source of personal data collected, stored and/or processed by Gusto, a destination of such data, an indication of who has access to such data within Gusto, and an organization and department responsible for the information collected by Gusto. In particular embodiments, the data model and accompanying visual representation (e.g., data map) generated by the system as described in any embodiment herein may be utilized in the context of compliance with one or more record keeping requirements related to the collection, storage, and processing of personal data.

FIGS. 6 and 7 depict an exemplary data model and related example that is similar, in some respects, to the data model and example of FIGS. 4 and 5. In the example shown in FIGS. 6 and 7, the exemplary data model and related example include a specific business process and processing activity that is associated with the primary asset (Gusto). In this example, the business process is compensation and the specific processing activity is direct deposit generation in Gusto. As may be understood from this figure, the collection and transfer of data related to the storage asset of Gusto is based on a need to generate direct deposits through Gusto in order to compensate employees. Gusto generates the information needed to conduct a direct deposit (e.g., financial and salary information) and then transmits this information to: (1) a company bank system for execution of the direct deposit; (2) Quickbooks for use in documenting the direct deposit payment; and (3) HR File cabinet for use in documenting the salary info and other financial information.

As may be understood in light of this disclosure, when generating such a data model, particular pieces of data (e.g., data attributes, data elements) may not be readily available to the system. In such embodiment, the system is configured to identify a particular type of data, create a placeholder for such data in memory, and seek out (e.g., scan for and populate) an appropriate piece of data to further populate the data model. For example, in particular embodiments, the system may identify Gusto as a primary asset and recognize that Gusto stores expense information. The system may then be configured to identify a source of the expense information (e.g., Expensify).

Figure 8:
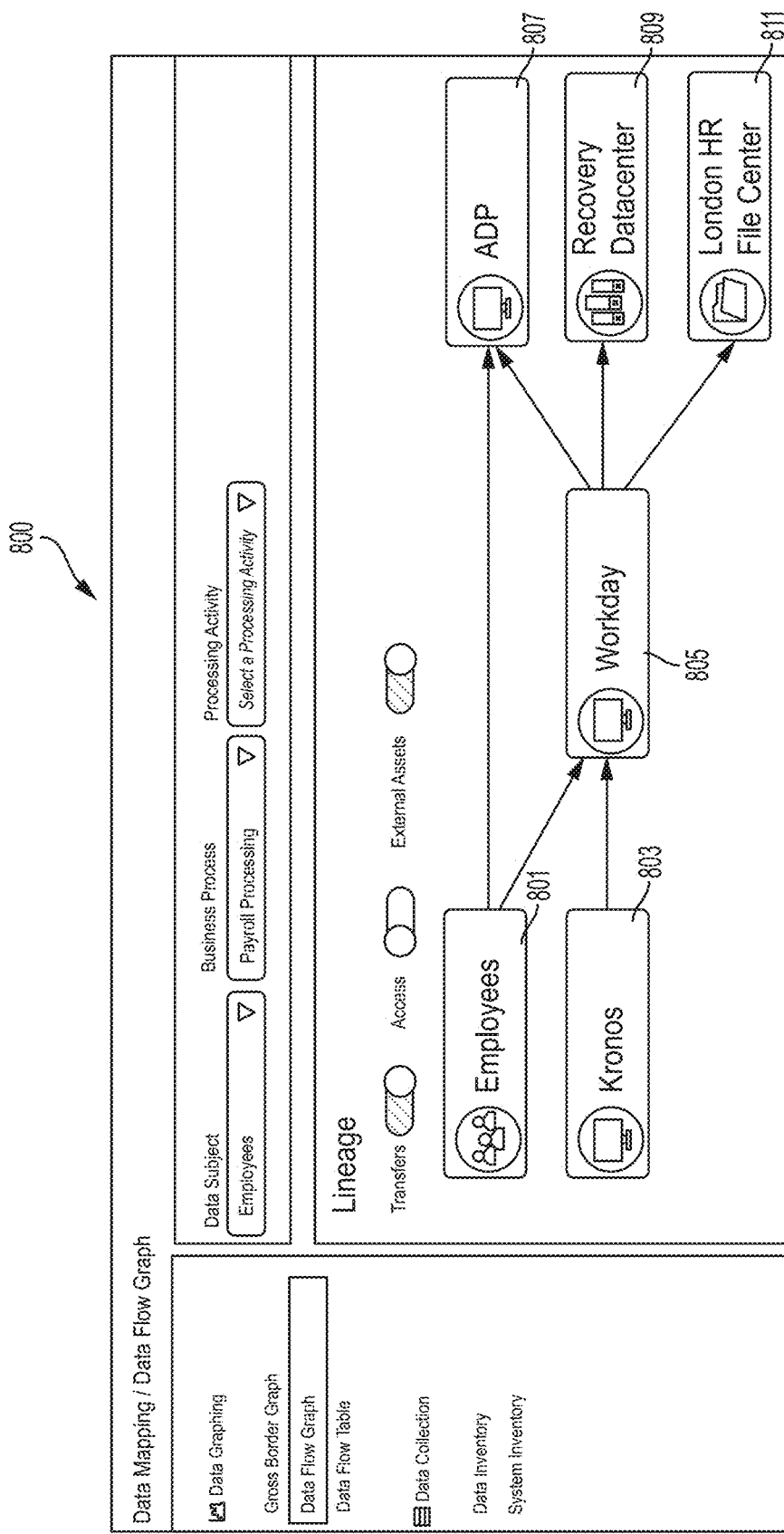

FIG. 8 depicts an exemplary screen display 800 that illustrates a visual representation (e.g., visual data map) of a data model (e.g., a data inventory). In the example shown in FIG. 8, the data map provides a visual indication of a flow of data collected from particular data subjects (e.g., employees 801). As may be understood from this figure, the data map illustrates that three separate data assets receive data (e.g., which may include personal data) directly from the employees 801. In this example, these three data assets include Kronos 803 (e.g., a human resources software application), Workday 805 (e.g., a human resources software application), and ADP 807 (e.g., a human resources software application and payment processor). As shown in FIG. 8, the transfer of data from the employees 801 to these assets is indicated by respective arrows.

As further illustrated in FIG. 8, the data map indicates a transfer of data from Workday 805 to ADP 807 as well as to a Recovery Datacenter 809 and a London HR File Center 811. As may be understood in light of this disclosure, the Recovery Datacenter 809 and London HR File Center 811 may comprise additional data assets in the context of the data model illustrated by the data map shown in FIG. 8. The Recover Datacenter 809 may include, for example, one or more computer servers (e.g., backup servers). The London HR File Center 811 may include, for example, one or more databases (e.g., such as the One or More Databases 140 shown in FIG. 1). AS shown in FIG. 8, each particular data asset depicted in the data map may be shown along with a visual indication of the type of data asset. For example, Kronos 803, Workday 805, and ADP 807 are depicted adjacent a first icon type (e.g., a computer monitor), while Recover Datacenter 809 and London HR File Center 811 are depicted adjacent a second and third icon type respectively (e.g., a server cluster and a file folder). In this way, the system may be configured to visually indicate, via the data model, particular information related to the data model in a relatively minimal manner.

FIG. 9 depicts an exemplary screen display 900 that illustrates a data map of a plurality of assets 905 in tabular form (e.g., table form). As may be understood from this figure, a table that includes one or more inventory attributes of each particular asset 905 in the table may indicate, for example: (1) a managing organization 910 of each respective asset 905; (2) a hosting location 915 of each respective asset 905 (e.g., a physical storage location of each asset 905); (3) a type 920 of each respective asset 905, if known (e.g., a database, software application, server, etc.); (4) a processing activity 925 associated with each respective asset 905; and/or (5) a status 930 of each particular data asset 905. In various embodiments, the status 930 of each particular asset 905 may indicate a status of the asset 905 in the discovery process. This may include, for example: (1) a "new" status for a particular asset that has recently been discovered as an asset that processes, stores, or collects personal data on behalf of an organization (e.g., discovered via one or more suitable techniques described herein); (2) an "in discovery" status for a particular asset for which the system is populating or seeking to populate one or more inventory attributes, etc.

Figure 10:
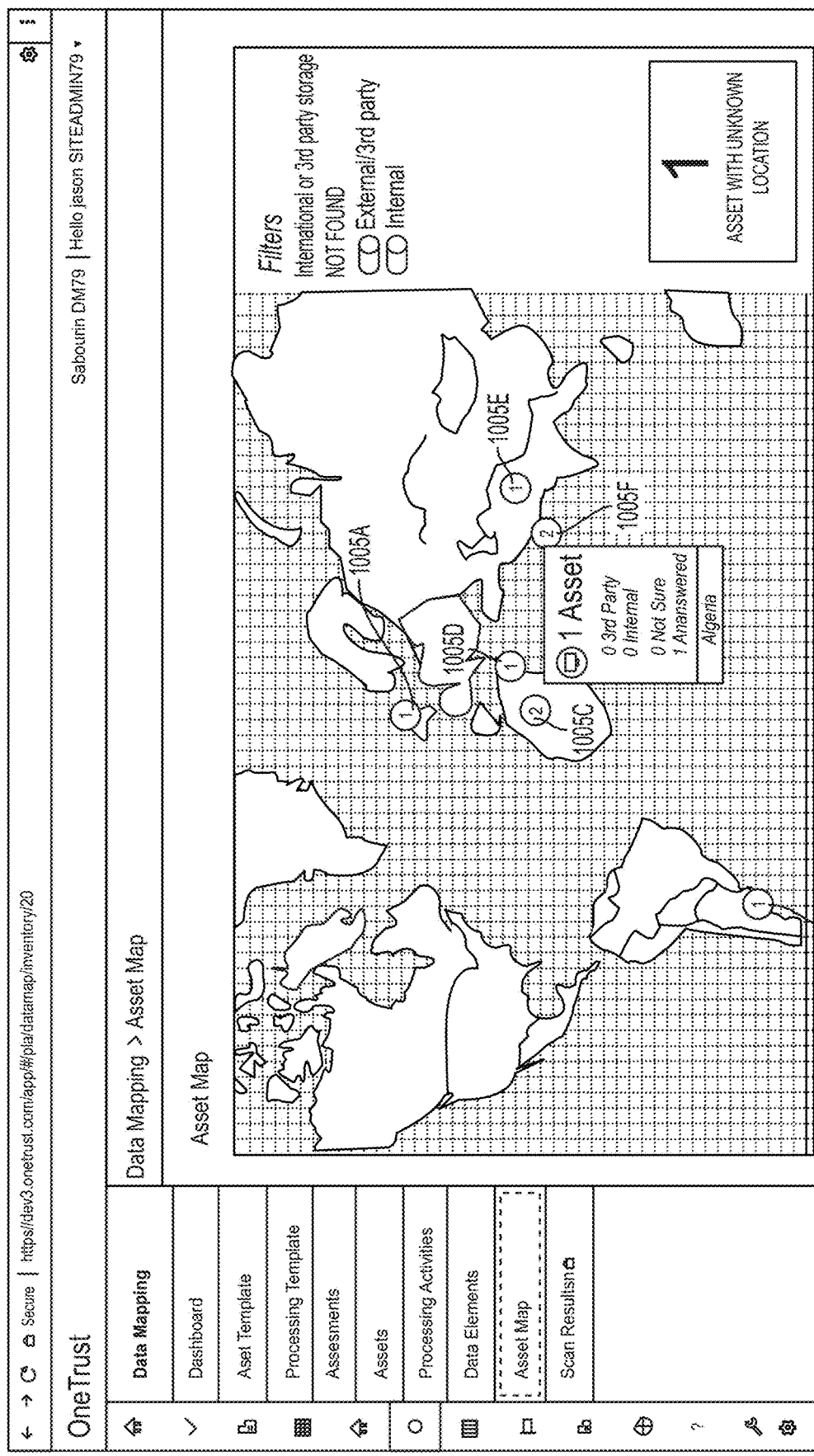

FIG. 10 depicts an exemplary data map 1000 that includes an asset map of a plurality of data assets 1005A-F, which may, for example, be utilized by a particular entity in the collection, storage, and/or processing of personal data. As may be understood in light of this disclosure, the plurality of data assets 1005A-F may have been discovered using any suitable technique described herein (e.g., one or more intelligent identity scanning techniques, one or more questionnaires, one or more application programming interfaces, etc.). In various embodiments, a data inventory for each of the plurality of data assets 1005A-F may define, for each of the plurality of data assets 1005A-F a respective inventory attribute related to a storage location of the data asset.

As may be understood from this figure, the system may be configured to generate a map that indicates a location of the plurality of data assets 1005A-F for a particular entity. In the embodiment shown in this figure, locations that contain a data asset are indicated by circular indicia that contain the number of assets present at that location. In the embodiment shown in this figure, the locations are broken down by country. In particular embodiments, the asset map may distinguish between internal assets (e.g., first party servers, etc.) and external/third party assets (e.g., third party owned servers or software applications that the entity utilizes for data storage, transfer, etc.).

In some embodiments, the system is configured to indicate, via the visual representation, whether one or more assets have an unknown location (e.g., because the data model described above may be incomplete with regard to the location). In such embodiments, the system may be configured to: (1) identify the asset with the unknown location; (2) use one or more data modeling techniques described herein to determine the location (e.g., such as pinging the asset, generating one or more questionnaires for completion by a suitable individual, etc.); and (3) update a data model associated with the asset to include the location.

Data Model Population Module

In particular embodiments, a Data Model Population Module 1100 is configured to: (1) determine one or more unpopulated inventory attributes in a data model; (2) determine one or more attribute values for the one or more unpopulated inventory attributes; and (3) modify the data model to include the one or more attribute values.

Figure 11:
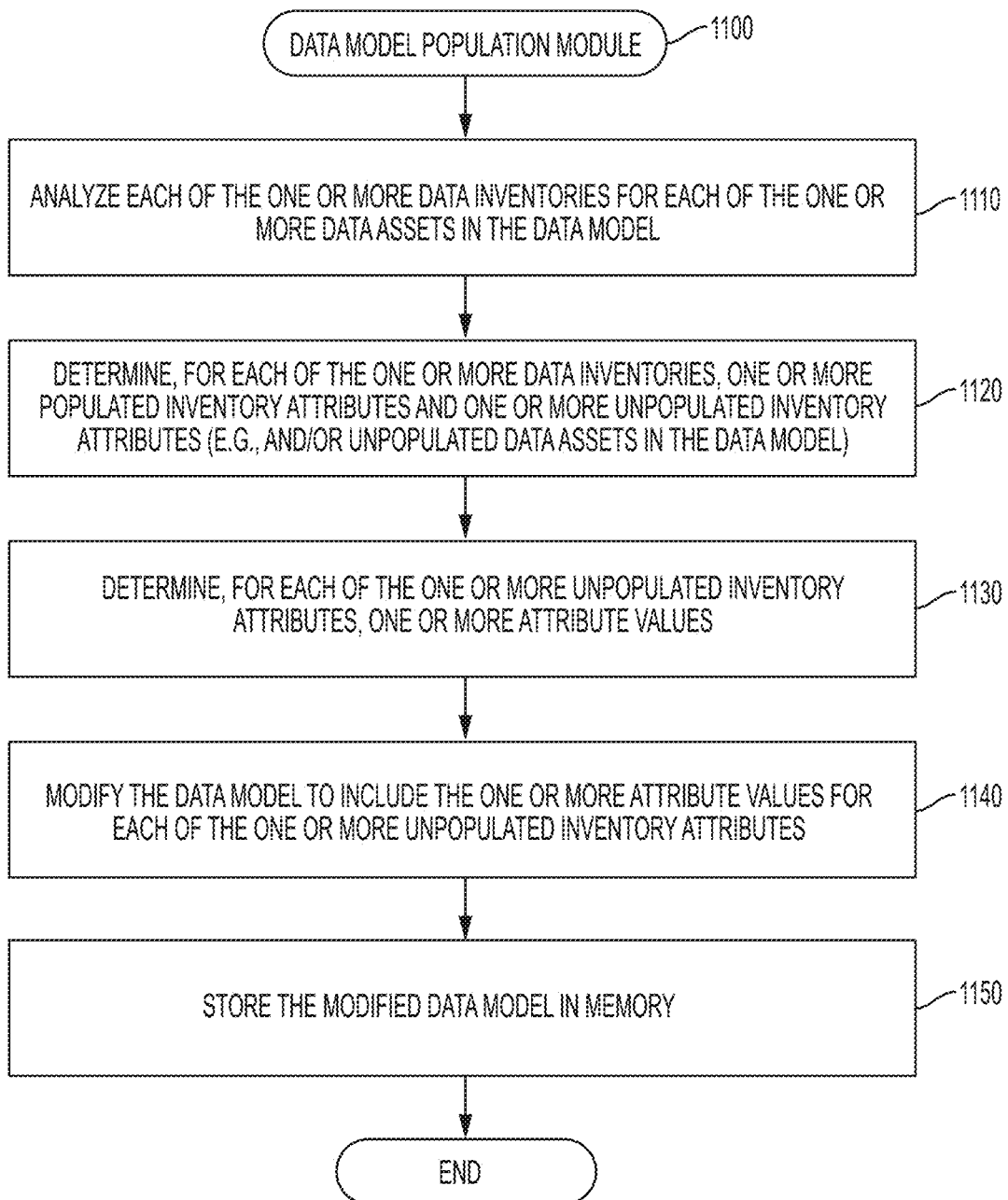
FIG. 11 is a flowchart showing an example of steps performed by a Data Model Population Module.

Turning to FIG. 11, in particular embodiments, when executing the Data Model Population Module 1100, the system begins, at Step 1110, by analyzing one or more data inventories for each of the one or more data assets in the data model. The system may, for example, identify one or more particular data elements (e.g., inventory attributes) that make up the one or more data inventories. The system may, in various embodiments, scan one or more data structures associated with the data model to identify the one or more data inventories. In various embodiments, the system is configured to build an inventory of existing (e.g., known) data assets and identify inventory attributes for each of the known data assets.

Continuing to Step 1120, the system is configured to determine, for each of the one or more data inventories, one or more populated inventory attributes and one or more unpopulated inventory attributes (e.g., and/or one or more unpopulated data assets within the data model). As a particular example related to an unpopulated data asset, when generating and populating a data model, the system may determine that, for a particular asset, there is a destination asset. In various embodiments, the destination asset may be known (e.g., and already stored by the system as part of the data model). In other embodiments, the destination asset may be unknown (e.g., a data element that comprises the destination asset may comprise a placeholder or other indication in memory for the system to populate the unpopulated inventory attribute (e.g., data element).

As another particular example, a particular storage asset may be associated with a plurality of inventory assets (e.g., stored in a data inventory associated with the storage asset). In this example, the plurality of inventory assets may include an unpopulated inventory attribute related to a type of personal data stored in the storage asset. The system may, for example, determine that the type of personal data is an unpopulated inventory asset for the particular storage asset.

Returning to Step 1130, the system is configured to determine, for each of the one or more unpopulated inventory attributes, one or more attribute values. In particular embodiments, the system may determine the one or more attribute values using any suitable technique (e.g., any suitable technique for populating the data model). In particular embodiments, the one or more techniques for populating the data model may include, for example: (1) obtaining data for the data model by using one or more questionnaires associated with a particular privacy campaign, processing activity, etc.; (2) using one or more intelligent identity scanning techniques discussed herein to identify personal data stored by the system and then map such data to a suitable data model; (3) using one or more application programming interfaces (API) to obtain data for the data model from another software application; and/or (4) using any other suitable technique. Exemplary techniques for determining the one or more attribute values are described more fully below. In other embodiments, the system may be configured to use such techniques or other suitable techniques to populate one or more unpopulated data assets within the data model.

Next, at Step 1140, the system modifies the data model to include the one or more attribute values for each of the one or more unpopulated inventory attributes. The system may, for example, store the one or more attributes values in computer memory, associate the one or more attribute values with the one or more unpopulated inventory attributes, etc. In still other embodiments, the system may modify the data model to include the one or more data assets identified as filling one or more vacancies left within the data model by the unpopulated one or more data assets.

Continuing to Step 1150, the system is configured to store the modified data model in memory. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Data Model Population Questionnaire Generation Module

In particular embodiments, a Data Population Questionnaire Generation Module 1200 is configured to generate a questionnaire (e.g., one or more questionnaires) comprising one or more questions associated with one or more particular unpopulated data attributes, and populate the unpopulated data attributes based at least in part on one or more responses to the questionnaire. In other embodiments, the system may be configured to populate the unpopulated data attributes based on one or more responses to existing questionnaires.

In various embodiments, the one or more questionnaires may comprise one or more processing activity questionnaires (e.g., privacy impact assessments, data privacy impact assessments, etc.) configured to elicit one or more pieces of data related to one or more undertakings by an organization related to the collection, storage, and/or processing of personal data (e.g., processing activities). In particular embodiments, the system is configured to generate the questionnaire (e.g., a questionnaire template) based at least in part on one or more processing activity attributes, data asset attributes (e.g., inventory attributes), or other suitable attributes discussed herein.

Figure 12:
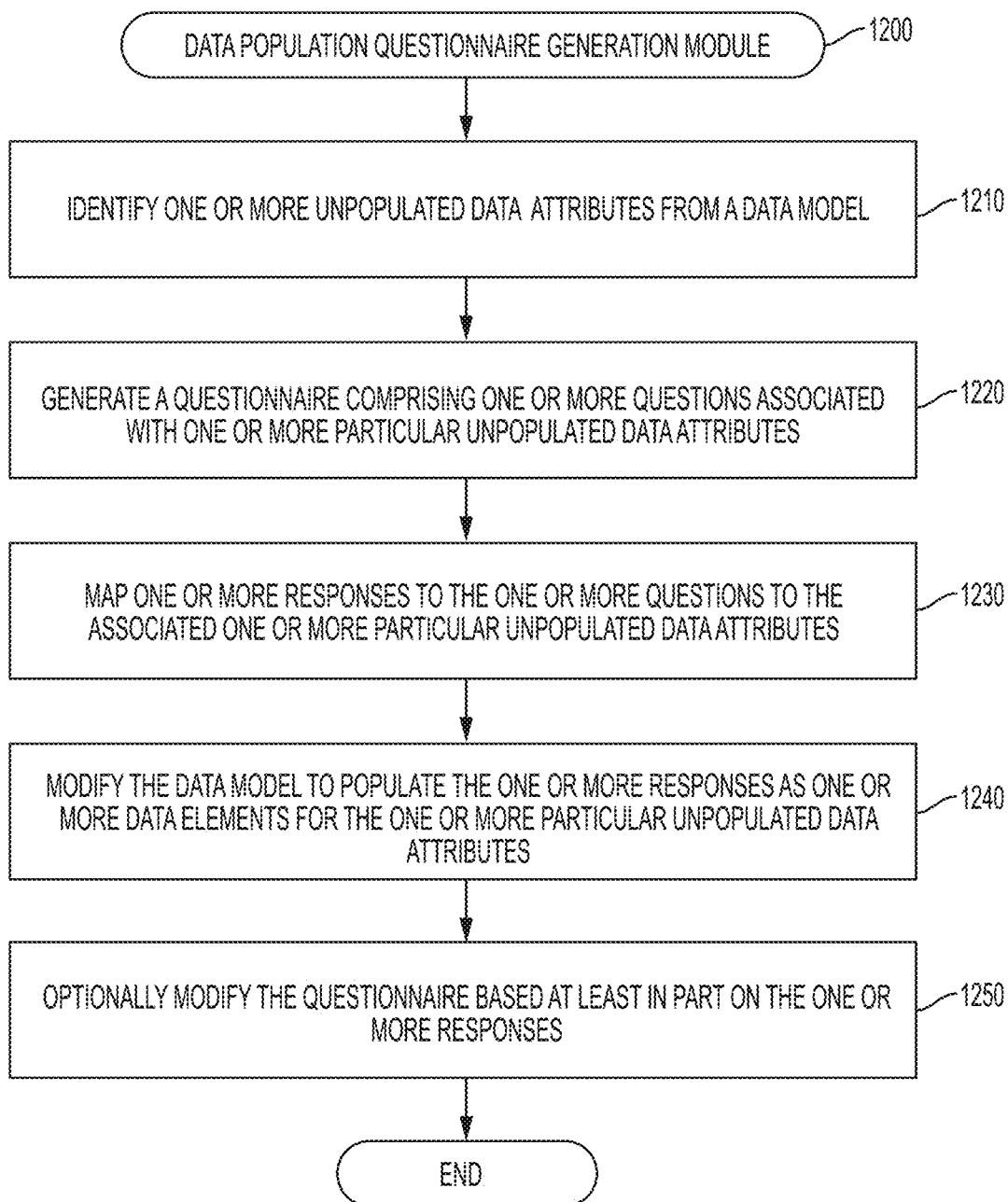
FIG. 12 is a flowchart showing an example of steps performed by a Data Population Questionnaire Generation Module.

Turning to FIG. 12, in particular embodiments, when executing the Data Population Questionnaire Generation Module 1200, the system begins, at Step 1210, by identifying one or more unpopulated data attributes from a data model. The system may, for example, identify the one or more unpopulated data attributes using any suitable technique described above. In particular embodiments, the one or more unpopulated data attributes may relate to, for example, one or more processing activity or asset attributes such as: (1) one or more processing activities associated with a particular data asset; (2) transfer data associated with the particular data asset (e.g., how and where the data stored and/or collected by the particular data asset is being transferred to and/or from); (3) personal data associated with the particular data assets asset (e.g., what type of personal data is collected and/or stored by the particular data asset; how, and from where, the data is collected, etc.); (4) storage data associated with the personal data (e.g., whether the data is being stored, protected and deleted); and (5) any other suitable attribute related to the collection, use, and transfer of personal data by one or more data assets or via one or more processing activities. In other embodiments, the one or more unpopulated inventory attributes may comprise one or more other pieces of information such as, for example: (1) the type of data being stored by the particular data asset; (2) an amount of data stored by the particular data asset; (3) whether the data is encrypted by the particular data asset; (4) a location of the stored data (e.g., a physical location of one or more computer servers on which the data is stored by the particular data asset); etc.

Continuing to Step 1220, the system generates a questionnaire (e.g., a questionnaire template) comprising one or more questions associated with one or more particular unpopulated data attributes. As may be understood in light of the above, the one or more particulate unpopulated data attributes may relate to, for example, a particular processing activity or a particular data asset (e.g., a particular data asset utilized as part of a particular processing activity). In various embodiments, the one or more questionnaires comprise one or more questions associated with the unpopulated data attribute. For example, if the data model includes an unpopulated data attribute related to a location of a server on which a particular asset stores personal data, the system may generate a questionnaire associated with a processing activity that utilizes the asset (e.g., or a questionnaire associated with the asset). The system may generate the questionnaire to include one or more questions regarding the location of the server.

Returning to Step 1230, the system maps one or more responses to the one or more questions to the associated one or more particular unpopulated data attributes. The system may, for example, when generating the questionnaire, associate a particular question with a particular unpopulated data attribute in computer memory. In various embodiments, the questionnaire may comprise a plurality of question/answer pairings, where the answer in the question/answer pairings maps to a particular inventory attribute for a particular data asset or processing activity.

In this way, the system may, upon receiving a response to the particular question, substantially automatically populate the particular unpopulated data attribute. Accordingly, at Step 1240, the system modifies the data model to populate the one or more responses as one or more data elements for the one or more particular unpopulated data attributes. In particular embodiments, the system is configured to modify the data model such that the one or more responses are stored in association with the particular data element (e.g., unpopulated data attribute) to which the system mapped it at Step 1230. In various embodiments, the system is configured to store the modified data model in the One or More Databases 140, or in any other suitable location. In particular embodiments, the system is configured to store the data model for later use by the system in the processing of one or more data subject access requests. In other embodiments, the system is configured to store the data model for use in one or more privacy impact assessments performed by the system.

Continuing to optional Step 1250, the system may be configured to modify the questionnaire based at least in part on the one or more responses. The system may, for example, substantially dynamically add and/or remove one or more questions to/from the questionnaire based at least in part on the one or more responses (e.g., one or more response received by a user completing the questionnaire). For example, the system may, in response to the user providing a particular inventory attribute or new asset, generates additional questions that relate to that particular inventory attribute or asset. The system may, as the system adds additional questions, substantially automatically map one or more responses to one or more other inventory attributes or assets. For example, in response to the user indicating that personal data for a particular asset is stored in a particular location, the system may substantially automatically generate one or more additional questions related to, for example, an encryption level of the storage, who has access to the storage location, etc.

In still other embodiments, the system may modify the data model to include one or more additional assets, data attributes, inventory attributes, etc. in response to one or more questionnaire responses. For example, the system may modify a data inventory for a particular asset to include a storage encryption data element (which specifies whether the particular asset stores particular data in an encrypted format) in response to receiving such data from a questionnaire. Modification of a questionnaire is discussed more fully below with respect to FIG. 13.

Data Model Population Via Questionnaire Process Flow

Figure 13:
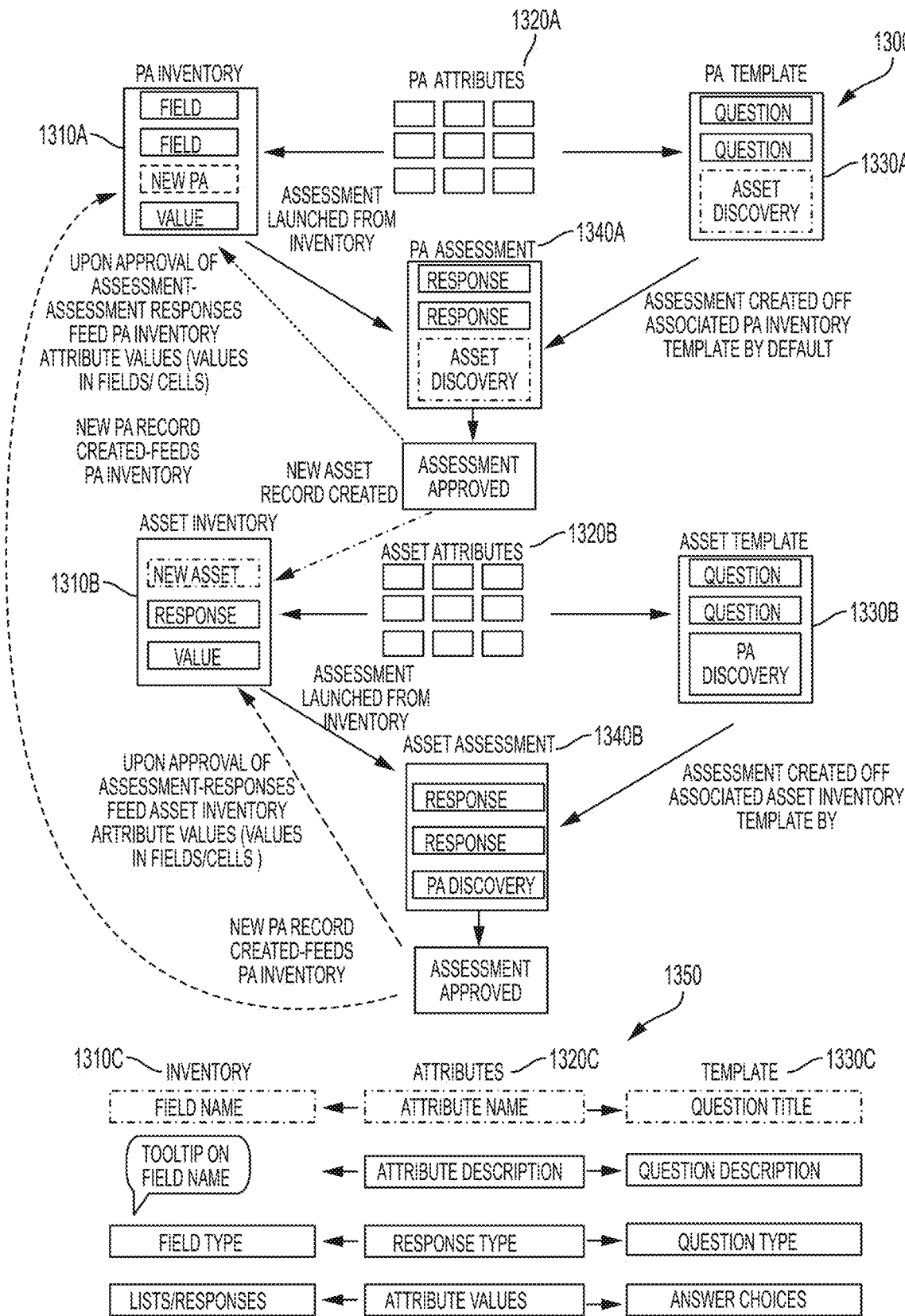
FIG. 13 is a process flow for populating a data inventory according to a particular embodiment using one or more data mapping techniques.

FIG. 13 depicts an exemplary process flow 1300 for populating a data model (e.g., modifying a data model to include a newly discovered data asset, populating one or more inventory attributes for a particular processing activity or data asset, etc.). In particular, FIG. 13 depicts one or more exemplary data relationships between one or more particular data attributes (e.g., processing activity attributes and/or asset attributes), a questionnaire template (e.g., a processing activity template and/or a data asset template), a completed questionnaire (e.g., a processing activity assessment and/or a data asset assessment), and a data inventory (e.g., a processing activity inventory and/or an asset inventory). As may be understood from this figure the system is configured to: (1) identify new data assets; (2) generate an asset inventory for identified new data assets; and (3) populate the generated asset inventories. Systems and methods for populating the generated inventories are described more fully below.

As may be understood from FIG. 13, a system may be configured to map particular processing activity attributes 1320A to each of: (1) a processing activity template 1330A; and (2) a processing activity data inventory 1310A. As may be understood in light of this disclosure, the processing activity template 1330A may comprise a plurality of questions (e.g., as part of a questionnaire), which may, for example, be configured to elicit discovery of one or more new data assets. The plurality of questions may each correspond to one or more fields in the processing activity inventory 1310A, which may, for example, define one or more inventory attributes of the processing activity.

In particular embodiments, the system is configured to provide a processing activity assessment 1340A to one or more individuals for completion. As may be understood from FIG. 13, the system is configured to launch the processing activity assessment 1340A from the processing activity inventory 1310A and further configured to create the processing activity assessment 1340A from the processing activity template 1330. The processing activity assessment 1340A may comprise, for example, one or more questions related to the processing activity. The system may, in various embodiments, be configured to map one or more responses provided in the processing activity assessment 1340A to one or more corresponding fields in the processing activity inventory 1310A. The system may then be configured to modify the processing activity inventory 1310A to include the one or more responses, and store the modified inventory in computer memory. In various embodiments, the system may be configured to approve a processing activity assessment 1340A (e.g., receive approval of the assessment) prior to feeding the processing activity inventory attribute values into one or more fields and/or cells of the inventory.

As may be further understood from FIG. 13, in response to creating a new asset record (e.g., which the system may create, for example, in response to a new asset discovery via the processing activity assessment 1340A described immediately above, or in any other suitable manner), the system may generate an asset inventory 1310B (e.g., a data asset inventory) that defines a plurality of inventory attributes for the new asset (e.g., new data asset).

As may be understood from FIG. 13, a system may be configured to map particular asset attributes 1320B to each of: (1) an asset template 1330BA; and (2) an asset inventory 1310A. As may be understood in light of this disclosure, the asset template 1330B may comprise a plurality of questions (e.g., as part of a questionnaire), which may, for example, be configured to elicit discovery of one or more processing activities associated with the asset and/or one or more inventory attributes of the asset. The plurality of questions may each correspond to one or more fields in the asset inventory 1310B, which may, for example, define one or more inventory attributes of the asset.

In particular embodiments, the system is configured to provide an asset assessment 1340B to one or more individuals for completion. As may be understood from FIG. 13, the system is configured to launch the asset assessment 1340B from the asset inventory 1310B and further configured to create the asset assessment 1340B from the asset template 1330B. The asset assessment 1340B may comprise, for example, one or more questions related to the data asset. The system may, in various embodiments, be configured to map one or more responses provided in the asset assessment 1340B to one or more corresponding fields in the asset inventory 1310B. The system may then be configured to modify the asset inventory 1310B (e.g., and/or a related processing activity inventory 1310A) to include the one or more responses, and store the modified inventory in computer memory. In various embodiments, the system may be configured to approve an asset assessment 1340B (e.g., receive approval of the assessment) prior to feeding the asset inventory attribute values into one or more fields and/or cells of the inventory.

FIG. 13 further includes a detail view 1350 of a relationship between particular data attributes 1320C with an exemplary data inventory 1310C and a questionnaire template 1330C. As may be understood from this detail view 1350, a particular attribute name may map to a particular question title in a template 1330C as well as to a field name in an exemplary data inventory 1310C. In this way, the system may be configured to populate (e.g., automatically populate) a field name for a particular inventory 1310C in response to a user providing a question title as part of a questionnaire template 1330C. Similarly, a particular attribute description may map to a particular question description in a template 1330C as well as to a tooltip on a fieldname in an exemplary data inventory 1310C. In this way, the system may be configured to provide the tooltip for a particular inventory 1310C that includes the question description provided by a user as part of a questionnaire template 1330C.

As may be further understood from the detail view 1350 of FIG. 13, a particular response type may map to a particular question type in a template 1330C as well as to a field type in an exemplary data inventory 1310C. A particular question type may include, for example, a multiple choice question (e.g., A, B, C, etc.), a freeform response, an integer value, a drop down selection, etc. A particular field type may include, for example, a memo field type, a numeric field type, an integer field type, a logical field type, or any other suitable field type. A particular data attribute may require a response type of, for example: (1) a name of an organization responsible for a data asset (e.g., a free form response); (2) a number of days that data is stored by the data asset (e.g., an integer value); and/or (3) any other suitable response type.

In still other embodiments, the system may be configured to map a one or more attribute values to one or more answer choices in a template 1330C as well as to one or more lists and/or responses in a data inventory 1310C. The system may then be configured to populate a field in the data inventory 1310C with the one or more answer choices provided in a response to a question template 1330C with one or more attribute values.

Exemplary Questionnaire Generation and Completion User Experience

Figure 14:
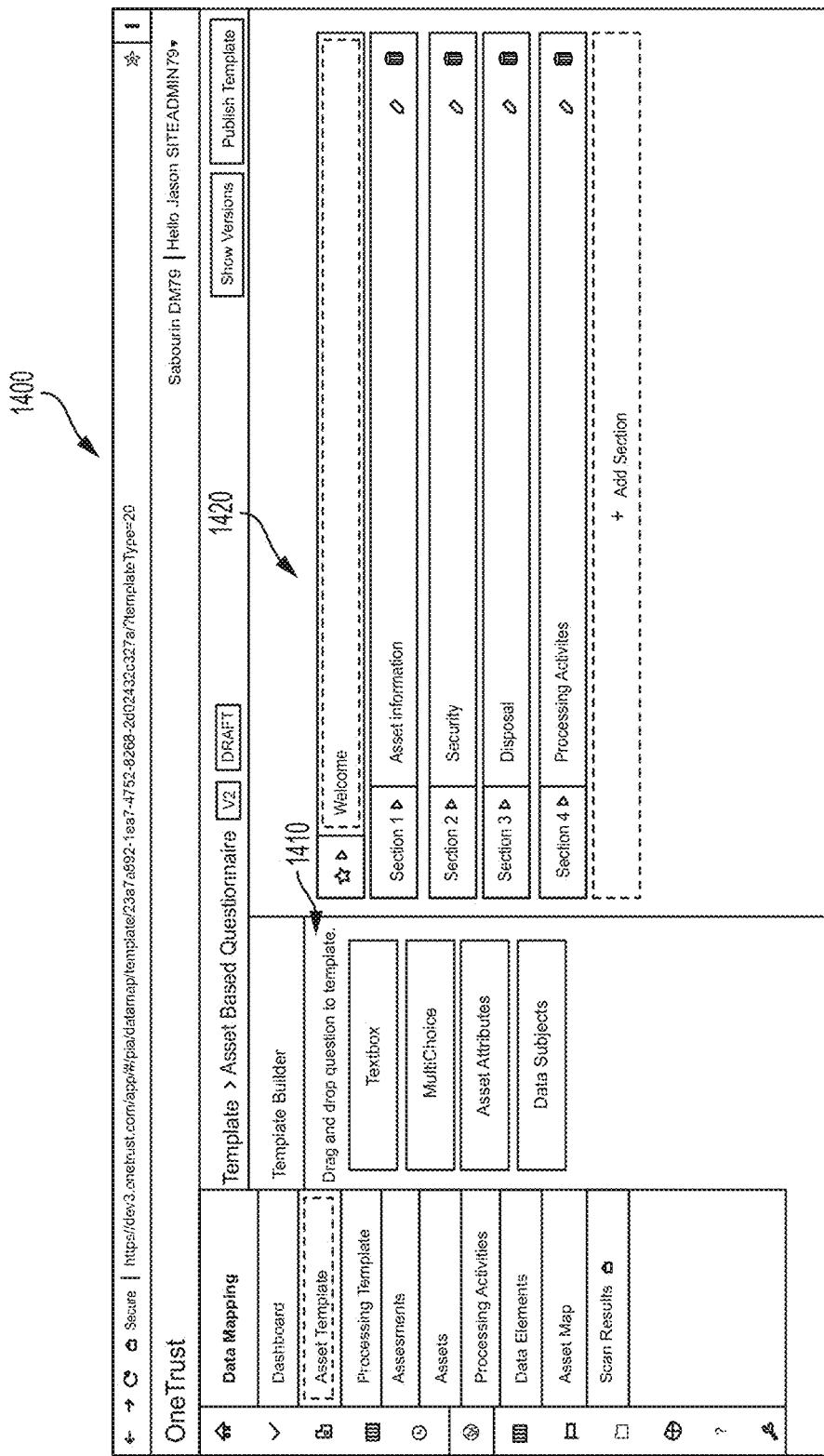

FIGS. 14-25 depict exemplary screen displays that a user may encounter when generating a questionnaire (e.g., one or more questionnaires and/or templates) for populating one or more data elements (e.g., inventory attributes) of a data model for a data asset and/or processing activity. FIG. 14, for example, depicts an exemplary asset based questionnaire template builder 1400. As may be understood from FIG. 14, the template builder may enable a user to generate an asset based questionnaire template that includes one or more sections 1420 related to the asset (e.g., asset information, security, disposal, processing activities, etc.). As may be understood in light of this disclosure, the system may be configured to substantially automatically generate an asset based questionnaire template based at least in part on the one or more unpopulated inventory attributes discussed above. The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 14, the system may provide a user with a draft and drop question template 1410, from which the user may select a question type (e.g., textbox, multiple choice, etc.).

A template for an asset may include, for example: (1) one or more questions requesting general information about the asset; (2) one or more security-related questions about the asset; (3) one or more questions regarding how the data asset disposes of data that it uses; and/or (4) one or more questions regarding processing activities that involve the data asset. In various embodiments, each of these one or more sections may comprise one or more specific questions that may map to particular portions of a data model (e.g., a data map).

Figure 15:
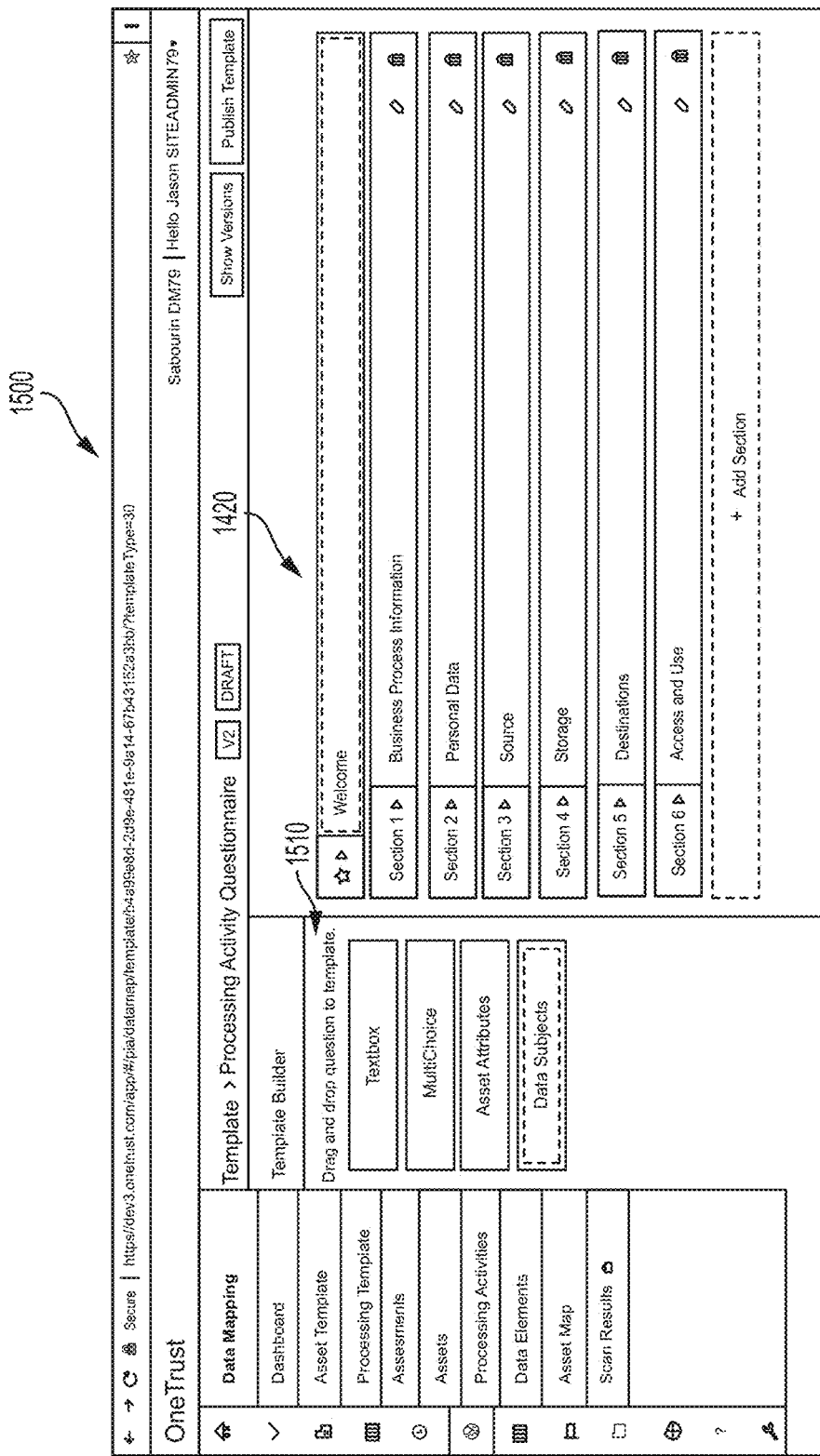

FIG. 15 depicts an exemplary screen display of a processing activity questionnaire template builder 1500. The screen display shown in FIG. 15 is similar to the template builder shown in FIG. 14 with respect to the data asset based template builder. As may be understood from FIG. 15, the template builder may enable a user to generate a processing activity based questionnaire template that includes one or more sections 1520 related to the processing activity (e.g., business process information, personal data, source, storage, destinations, access and use, etc.). As may be understood in light of this disclosure, the system may be configured to substantially automatically generate a processing activity based questionnaire template based at least in part on the one or more unpopulated inventory attributes related to the processing activity (e.g., as discussed above). The system may, for example, be configured to generate a template that is configured to populate the one or more unpopulated attributes (e.g., by eliciting responses, via a questionnaire to one or more questions that are mapped to the attributes within the data inventory).

In various embodiments, the system is configured to enable a user to modify a default template (e.g., or a system-created template) by, for example, adding additional sections, adding one or more additional questions to a particular section, etc. In various embodiments, the system may provide one or more tools for modifying the template. For example, in the embodiment shown in FIG. 15, the system may provide a user with a draft and drop question template 1510, from which the user may select a question type (e.g., textbox, multiple choice, asset attributes, data subjects, etc.). The system may be further configured to enable a user to publish a completed template (e.g., for use in a particular assessment). In other embodiments, the system may be configured to substantially automatically publish the template.

In various embodiments, a template for a processing activity may include, for example: (1) one or more questions related to the type of business process that involves a particular data asset;

(2) one or more questions regarding what type of personal data is acquired from data subjects for use by a particular data asset; (3) one or more questions related to a source of the acquired personal data; (4) one or more questions related to how and/or where the personal data will be stored and/or for how long; (5) one or more questions related to one or more other data assets that the personal data will be transferred to; and/or (6) one or more questions related to who will have the ability to access and/or use the personal data.

Figure 16:
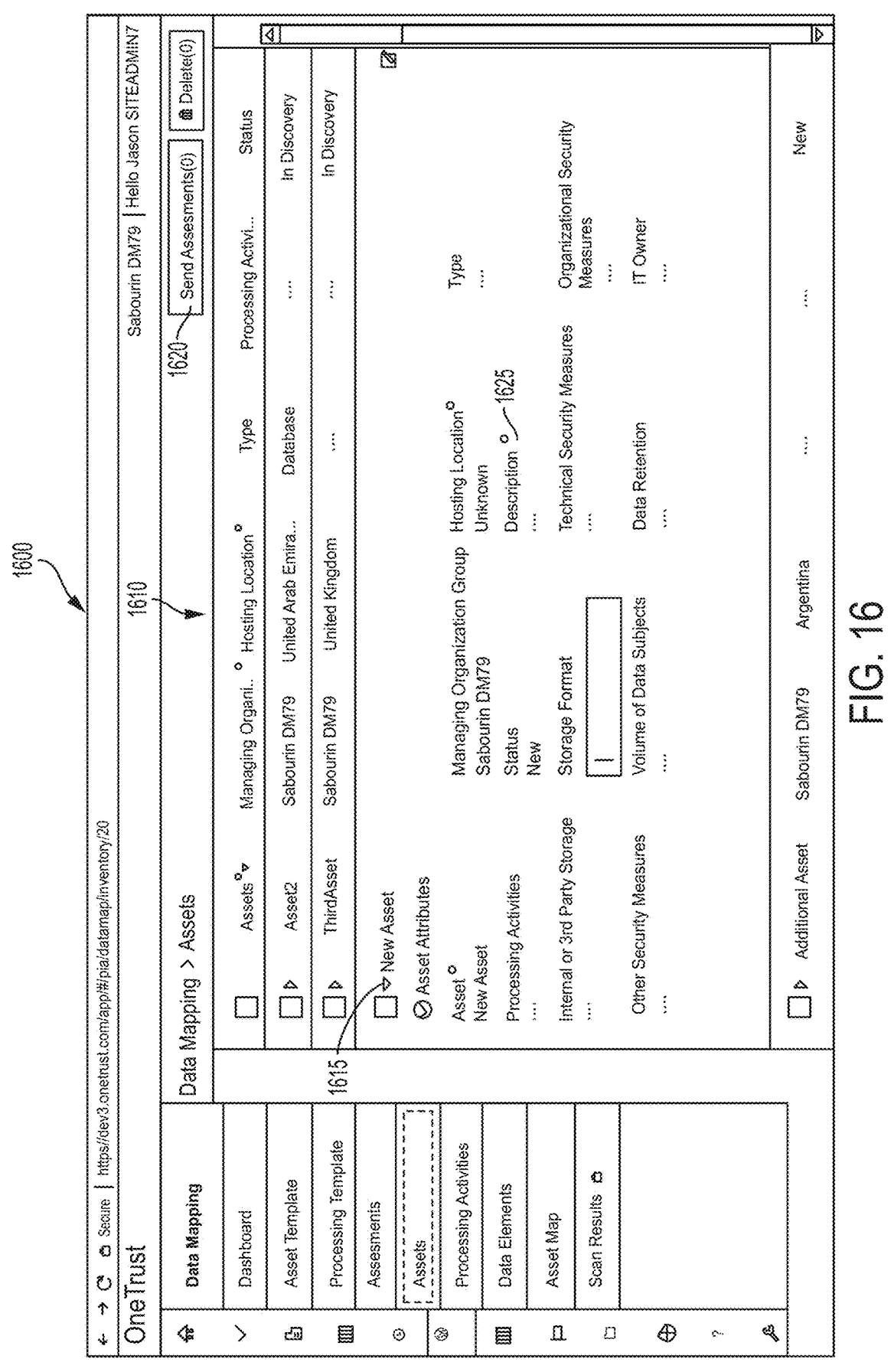

Continuing to FIG. 16, an exemplary screen display 1600 depicts a listing of assets 1610 for a particular entity. These may, for example, have been identified as part of the data model generation system described above. As may be understood from this figure, a user may select a drop down indicator 1615 to view more information about a particular asset. In the exemplary embodiment shown in FIG. 16, the system stores the managing organization group for the "New Asset", but is missing some additional information (e.g., such as a description 1625 of the asset). In order to fill out the missing inventory attributes for the "New Asset", the system, in particular embodiments, is configured to enable a user to select a Send Assessment indicia 1620 in order to transmit an assessment related to the selected asset to an individual tasked with providing one or more pieces of information related to the asset (e.g., a manager, or other individual with knowledge of the one or more inventory attributes).

In response to the user selecting the Send Assessment indicia 1620, the system may create the assessment based at least in part on a template associated with the asset, and transmit the assessment to a suitable individual for completion (e.g., and/or transmit a request to the individual to complete the assessment).

Figure 17:
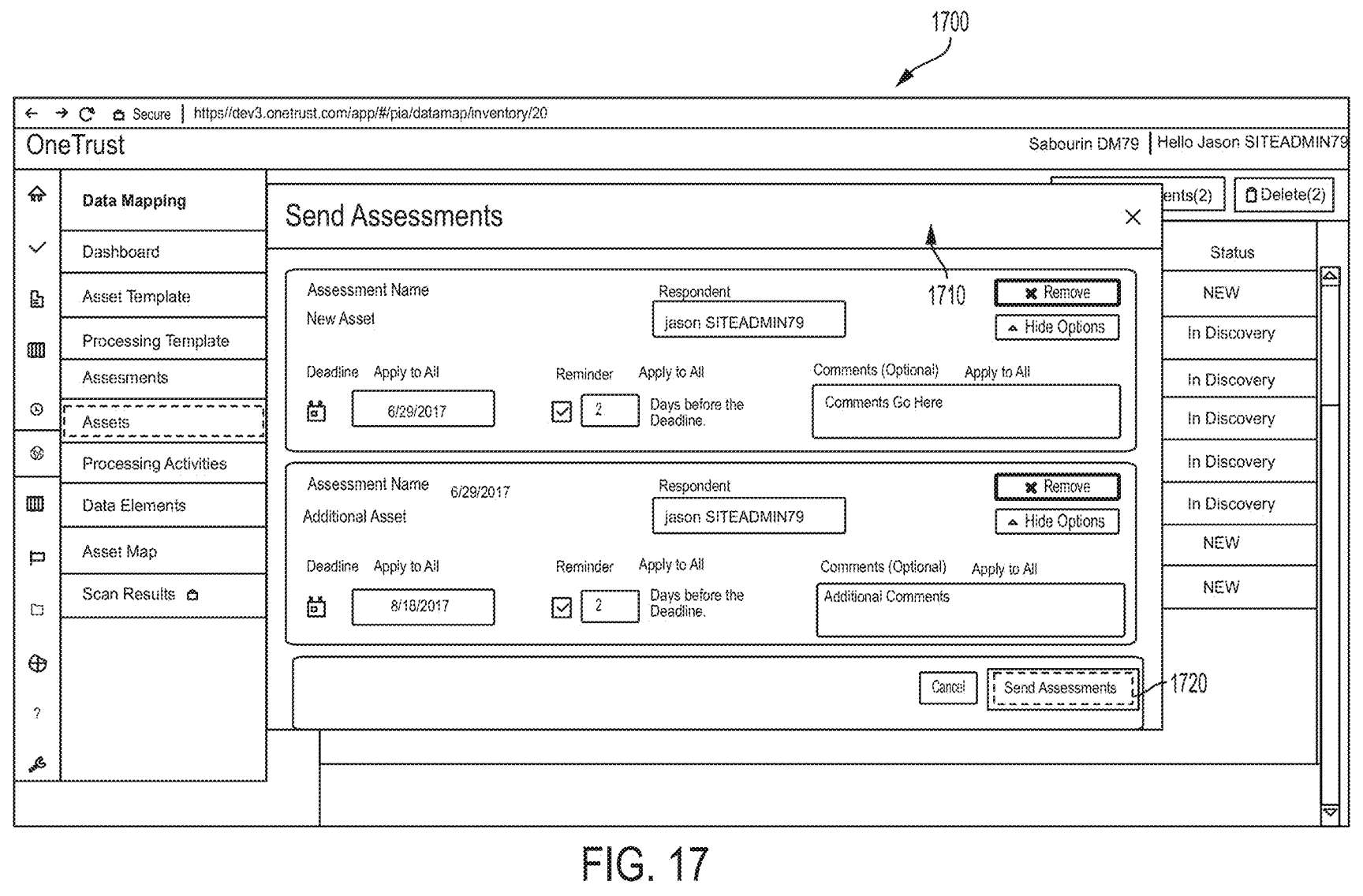

FIG. 17 depicts an exemplary assessment transmission interface 1700 via which a user can transmit one or more assessments for completion. As shown in this figure, the user may assign a respondent, provide a deadline, indicate a reminder time, and provide one or more comments using an assessment request interface 1710. The user may then select a Send Assessment(s) indicia 1720 in order to transmit the assessment.

Figure 18:
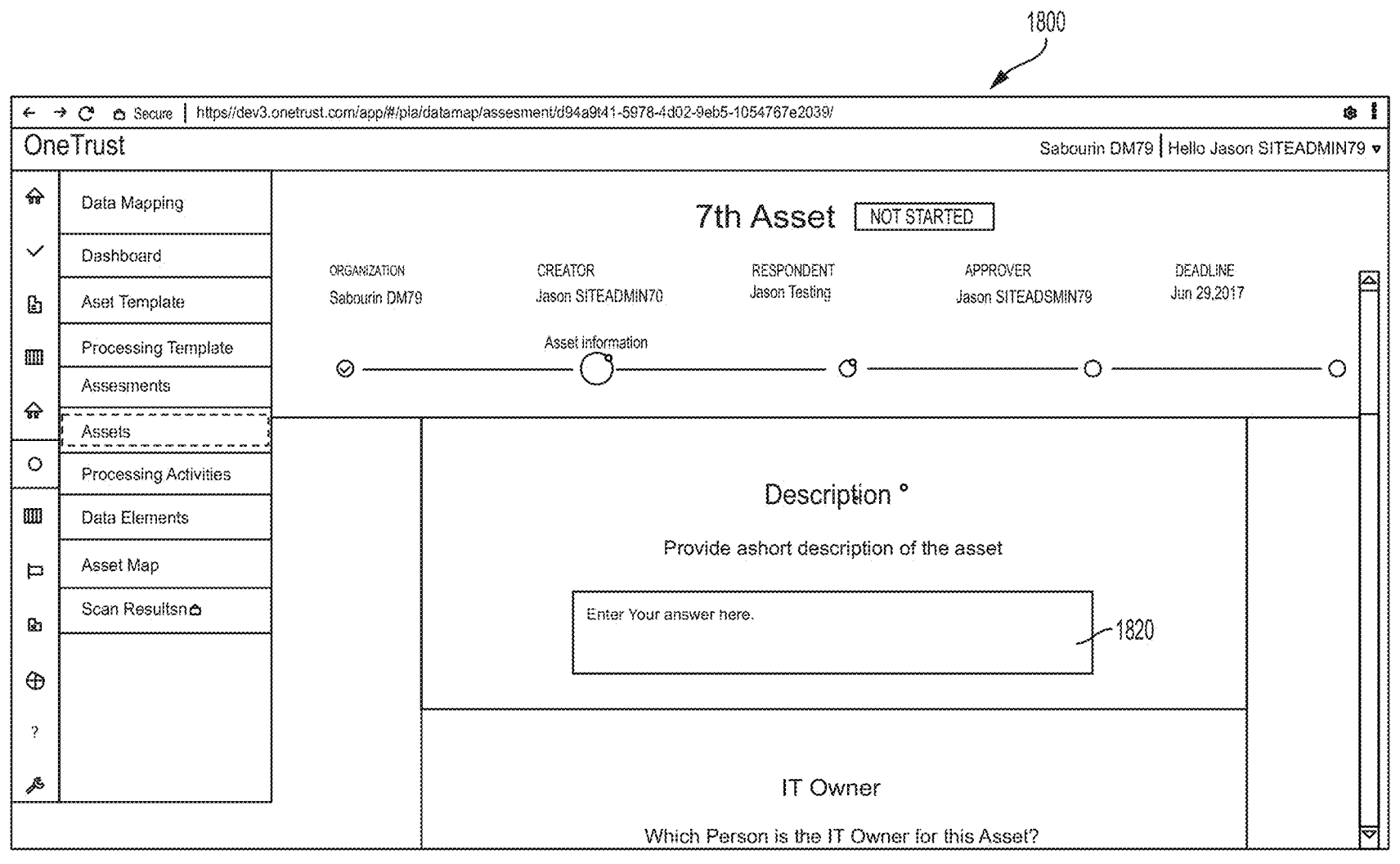
Figure 19:
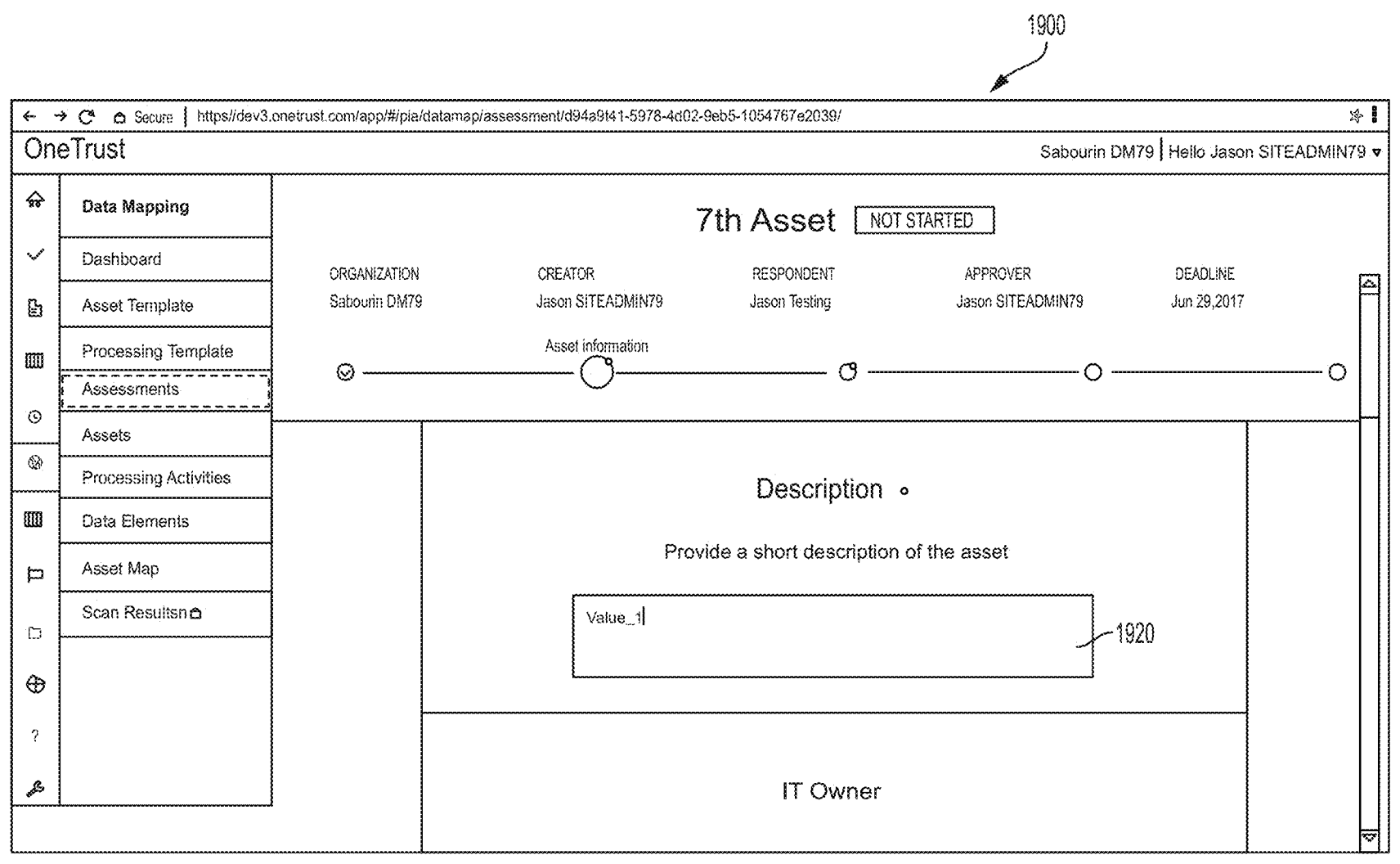

FIG. 18 depicts an exemplary assessment 1800 which a user may encounter in response to receiving a request to complete the assessment as described above with respect to FIGS. 16 and 17. As shown in FIG. 18, the assessment 1800 may include one or more questions that map to the one or more unpopulated attributes for the asset shown in FIG. 16. For example, the one or more questions may include a question related to a description of the asset, which may include a free form text box 1820 for providing a description of the asset. FIG. 19 depicts an exemplary screen display 1900 with the text box 1920 completed, where the description includes a value of "Value_1". As shown in FIGS. 18 and 19, the user may have renamed "New Asset" (e.g., which may have included a default or placeholder name) shown in FIGS. 16 and 17 to "$7^{th}$ Asset."

Figure 20:
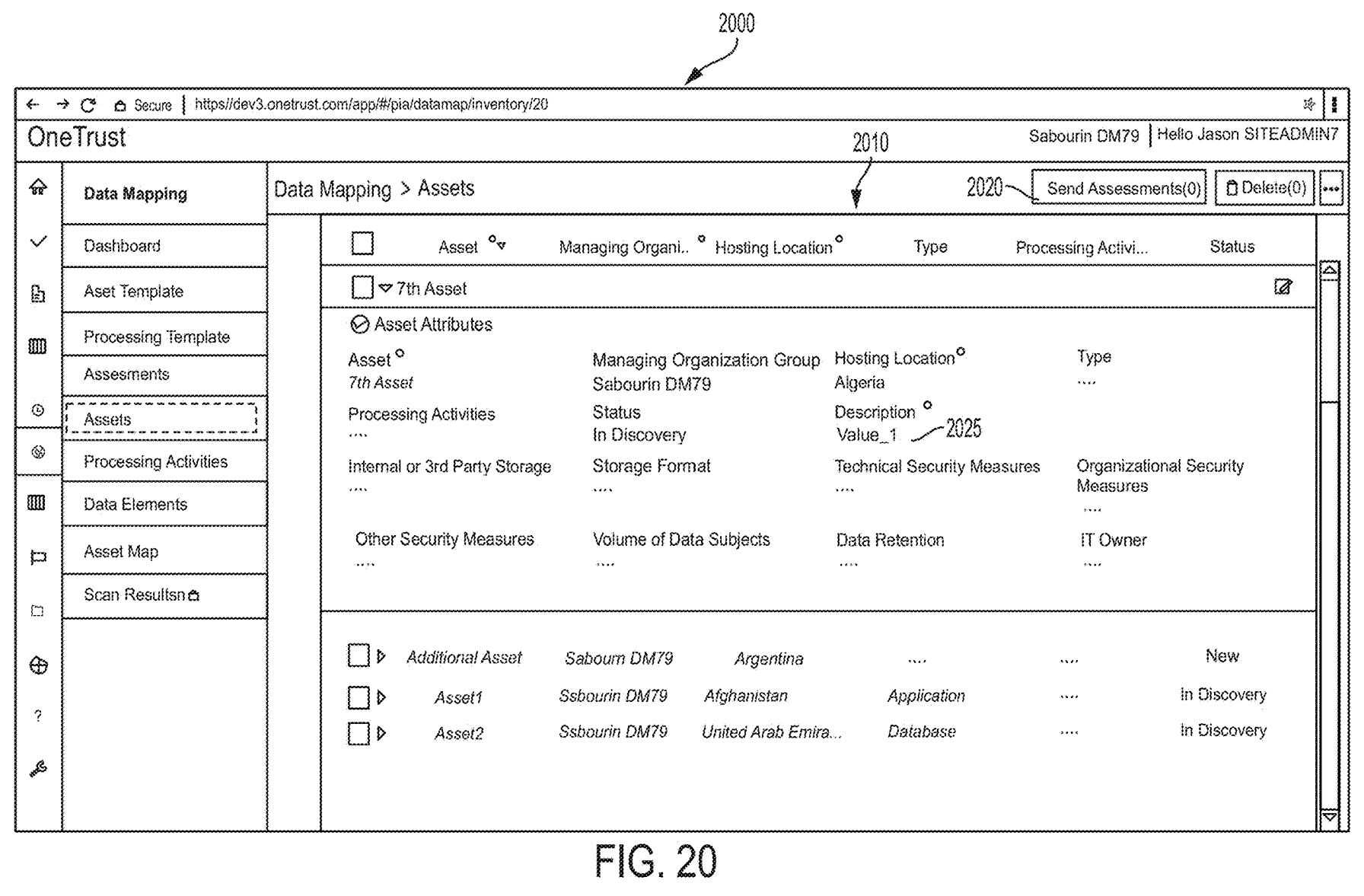

Continuing to FIG. 20, the exemplary screen display 2000 depicts the listing of assets 2010 from FIG. 16 with some additional attributes populated. For example, the Description 2025 (e.g., "Value_1") provided in FIG. 19 has been added to the inventory. As may be understood in light of this disclosure, in response to a user providing the description via the assessment shown in FIGS. 18 and 19, the system may be configured to map the provided description to the attribute value associated with the description of the asset in the data inventory. The system may have then modified the data inventory for the asset to include the description attribute. In various embodiments, the system is configured to store the modified data inventory as part of a data model (e.g., in computer memory).

Figure 21:
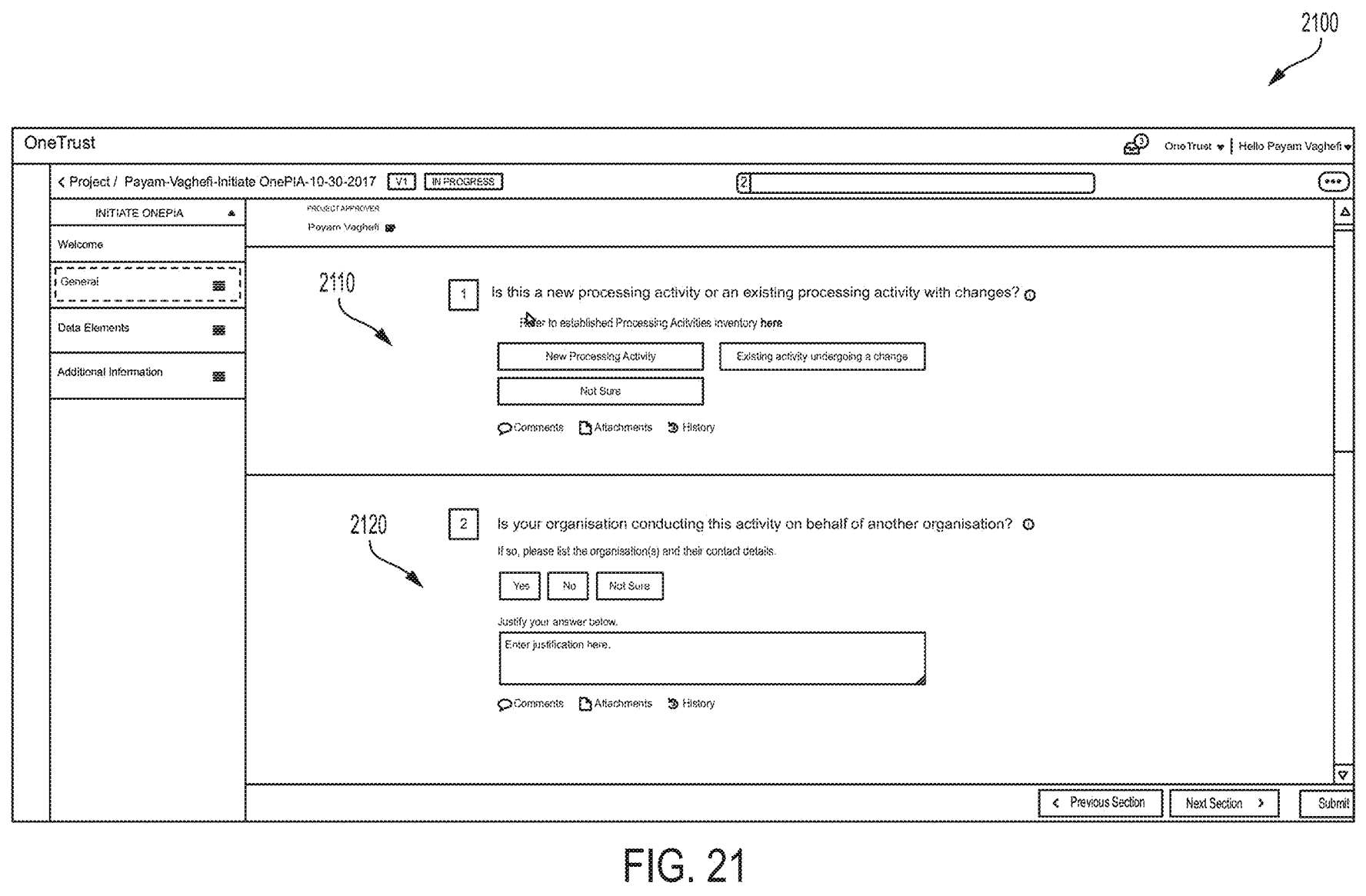

FIGS. 21-24 depict exemplary screen displays showing exemplary questions that make up part of a processing activity questionnaire (e.g., assessment). FIG. 21 depicts an exemplary interface 2100 for responding to a first question 2110 and a second question 2120. As shown in FIG. 21, the first question 2110 relates to whether the processing activity is a new or existing processing activity. The first question 2110 shown in FIG. 21 is a multiple choice question. The second question 2120 relates to whether the organization is conducting the activity on behalf of another organization. As shown in this figure, the second question 2120 includes both a multiple choice portion and a free-form response portion.

Figure 22:
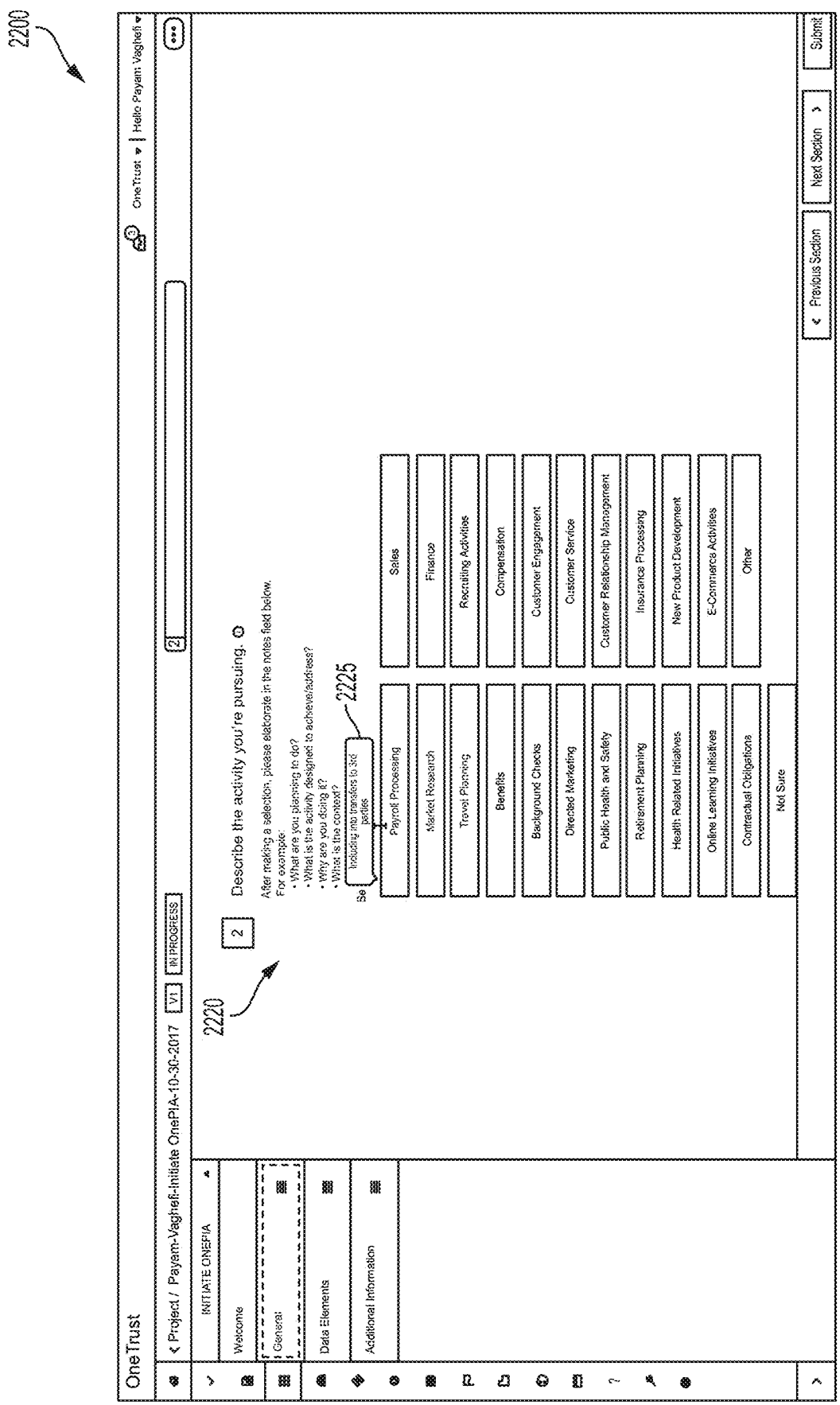

As discussed above, in various embodiments, the system may be configured to modify a questionnaire in response to (e.g., based on) one or more responses provided by a user completing the questionnaire. In particular embodiments, the system is configured to modify the questionnaire substantially on-the-fly (e.g., as the user provides each particular answer). FIG. 22 depicts an interface 2200 that includes a second question 2220 that differs from the second question 2120 shown in FIG. 21. As may be understood in light of this disclosure, in response to the user providing a response to the first question 2110 in FIG. 21 that indicates that the processing activity is a new processing activity, the system may substantially automatically modify the second question 2120 from FIG. 21 to the second question 2220 from FIG. 22 (e.g., such that the second question 2220 includes one or more follow up questions or requests for additional information based on the response to the first question 2110 in FIG. 21).

As shown in FIG. 22, the second question 2220 requests a description of the activity that is being pursued. In various embodiments (e.g., such as if the user had selected that the processing activity was an existing one), the system may not modify the questionnaire to include the second question 2220 from FIG. 22, because the system may already store information related to a description of the processing activity at issue. In various embodiments, any suitable question described herein may include a tooltip 2225 on a field name (e.g., which may provide one or more additional pieces of information to guide a user's response to the questionnaire and/or assessment).

Figure 23:
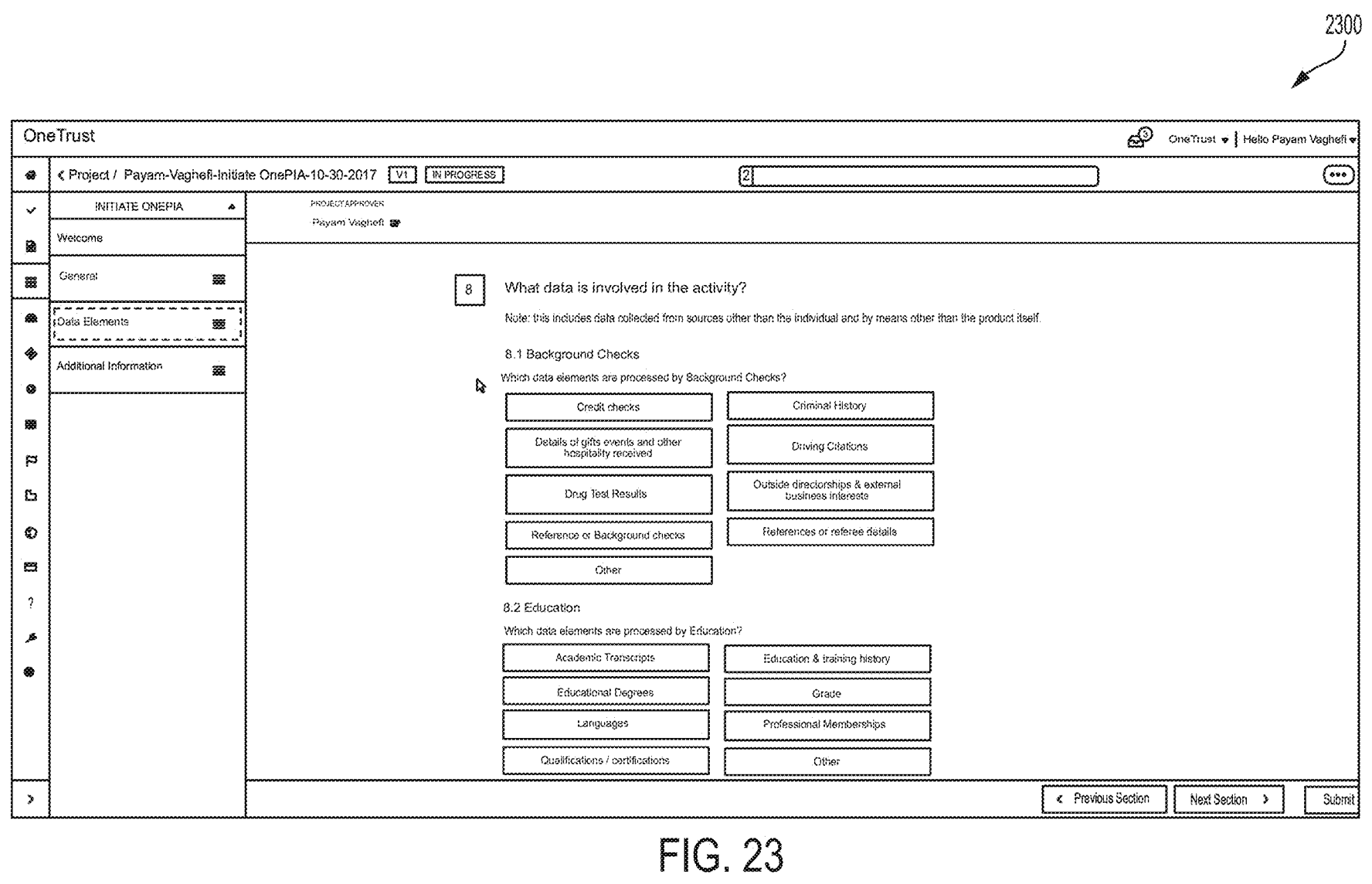
Figure 24:
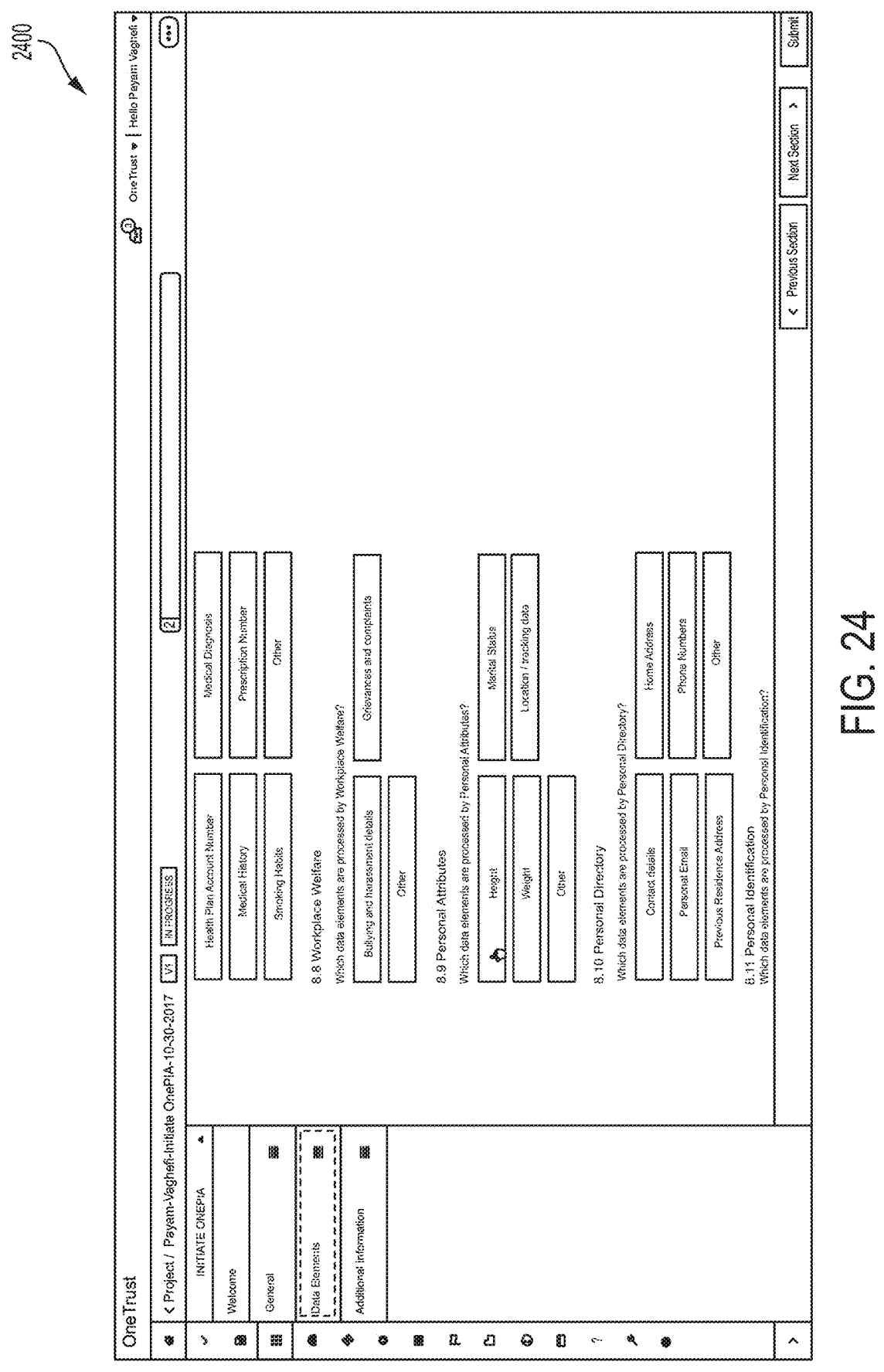

FIGS. 23 and 24 depict additional exemplary assessment questions. The questions shown in these figures relate to, for example, particular data elements processed by various aspects of a processing activity.

Figure 25:
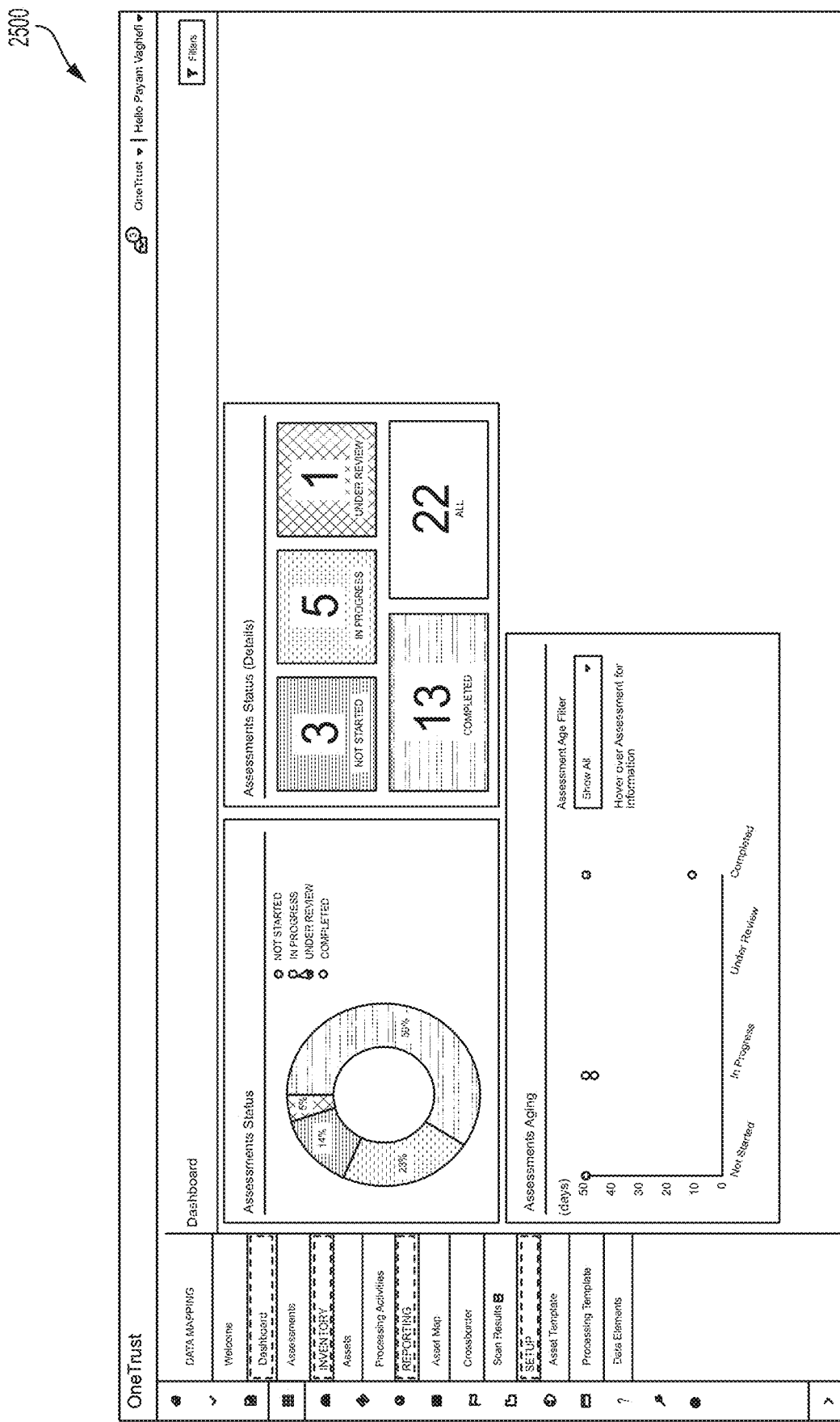

FIG. 25 depicts a dashboard 2500 that includes an accounting of one or more assessments that have been completed, are in progress, or require completion by a particular organization. The dashboard 2500 shown in this figure is configured to provide information relate to the status of one or more outstanding assessments. As may be understood in light of this disclosure, because of the volume of assessment requests, it may be necessary to utilize one or more third party organizations to facilitate a timely completion of one or more assessment requests. In various embodiments, the dashboard may indicate that, based on a fact that a number of assessments are still in progress or incomplete, that a particular data model for an entity, data asset, processing activity, etc. remains incomplete. In such embodiments, an incomplete nature of a data model may raise one or more flags or indicate a risk that an entity may not be in compliance with one or more legal or industry requirements related to the collection, storage, and/or processing of personal data.

Intelligent Identity Scanning Module

Figure 26:
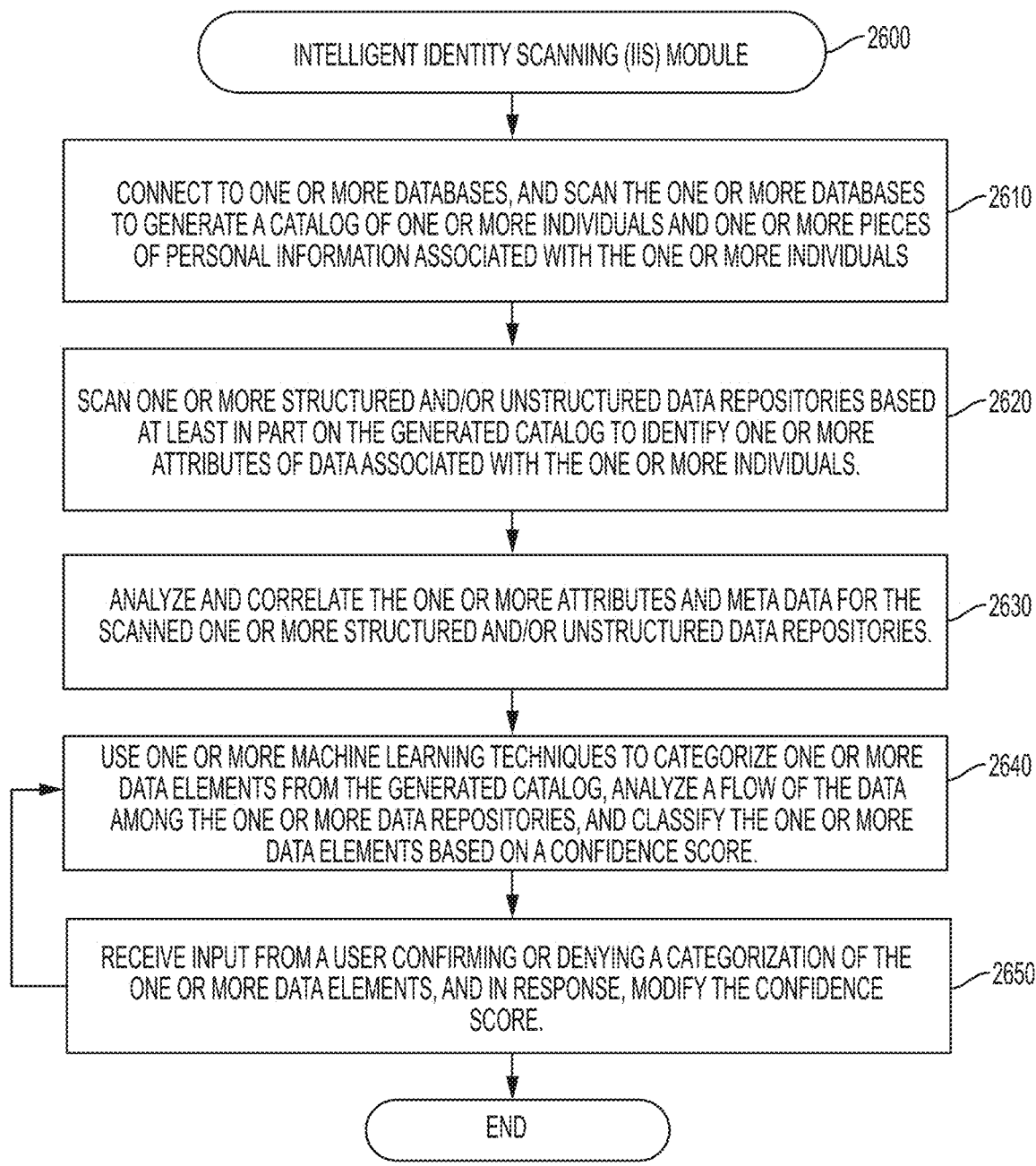
FIG. 26 is a flowchart showing an example of steps performed by an Intelligent Identity Scanning Module.

Turning to FIG. 26, in particular embodiments, the Intelligent Identity Scanning Module 2600 is configured to scan one or more data sources to identify personal data stored on one or more network devices for a particular organization, analyze the identified personal data, and classify the personal data (e.g., in a data model) based at least in part on a confidence score derived using one or more machine learning techniques. The confidence score may be and/or comprise, for example, an indication of the probability that the personal data is actually associated with a particular data subject (e.g., that there is at least an 80% confidence level that a particular phone number is associated with a particular individual.)

When executing the Intelligent Identity Scanning Module 2600, the system begins, at Step 2610, by connecting to one or more databases or other data structures, and scanning the one or more databases to generate a catalog of one or more individuals and one or more pieces of personal information associated with the one or more individuals. The system may, for example, be configured to connect to one or more databases associated with a particular organization (e.g., one or more databases that may serve as a storage location for any personal or other data collected, processed, etc. by the particular organization, for example, as part of a suitable processing activity. As may be understood in light of this disclosure, a particular organization may use a plurality of one or more databases (e.g., the One or More Databases 140 shown in FIG. 1), a plurality of servers (e.g., the One or More Third Party Servers 160 shown in FIG. 1), or any other suitable data storage location in order to store personal data and other data collected as part of any suitable privacy campaign, privacy impact assessment, processing activity, etc.

In particular embodiments, the system is configured to scan the one or more databases by searching for particular data fields comprising one or more pieces of information that may include personal data. The system may, for example, be configured to scan and identify one of more pieces of personal data such as: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable personal information discussed herein. In particular embodiments, the system is configured to scan for a particular type of personal data (e.g., or one or more particular types of personal data).

The system may, in various embodiments, be further configured to generate a catalog of one or more individuals that also includes one or more pieces of personal information (e.g., personal data) identified for the individuals during the scan. The system may, for example, in response to discovering one or more pieces of personal data in a particular storage location, identify one or more associations between the discovered pieces of personal data. For example, a particular database may store a plurality of individuals' names in association with their respective telephone numbers. One or more other databases may include any other suitable information.

The system may, for example, generate the catalog to include any information associated with the one or more individuals identified in the scan. The system may, for example, maintain the catalog in any suitable format (e.g., a data table, etc.).

In still other embodiments, in addition to connecting to a database, the system may be configured to: (1) access an application through one or more application programming interfaces (APIs); (2) use one or more screen scraping techniques on an end user page to identify and analyze each field on the page; and/or (3) connect to any other suitable data structure in order to generate the catalog of individuals and personal information associated with each of the individuals. In some embodiments, the system may be configured to analyze one or more access logs and applications set up through a system active directory or SSO portal for which one or more applications might contain certain data for user groups. The system may then be configured to analyze an email environment to identify one or more links to particular business applications, which may, for example, be in use by an entity and contain certain data. In still other embodiments, the system may be configured to analyze one or more system log files (Syslog) from a security environment to capture which particular applications an entity may be using in order to discover such applications.

Continuing to Step 2620, the system is configured to scan one or more structured and/or unstructured data repositories based at least in part on the generated catalog to identify one or more attributes of data associated with the one or more individuals. The system may, for example, be configured to utilize information discovered during the initial scan at Step 2610 to identify the one or more attributes of data associated with the one or more individuals.

For example, the catalog generated at Step 2610 may include a name, address, and phone number for a particular individual. The system may be configured, at Step 2620, to scan the one or more structured and/or unstructured data repositories to identify one or more attributes that are associated with one or more of the particular individual's name, address and/or phone number. For example, a particular data repository may store banking information (e.g., a bank account number and routing number for the bank) in association with the particular individual's address. In various embodiments, the system may be configured to identify the banking information as an attribute of data associated with the particular individual. In this way, the system may be configured to identify particular data attributes (e.g., one or more pieces of personal data) stored for a particular individual by identifying the particular data attributes using information other than the individual's name.

Returning to Step 2630, the system is configured to analyze and correlate the one or more attributes and metadata for the scanned one or more structured and/or unstructured data repositories. In particular embodiments, the system is configured to correlate the one or more attributes with metadata for the associated data repositories from which the system identified the one or more attributes. In this way, the system may be configured to store data regarding particular data repositories that store particular data attributes.

In particular embodiments, the system may be configured to cross-reference the data repositories that are discovered to store one or more attributes of personal data associated with the one or more individuals with a database of known data assets. In particular embodiments, the system is configured to analyze the data repositories to determine whether each data repository is part of an existing data model of data assets that collect, store, and/or process personal data. In response to determining that a particular data repository is not associated with an existing data model, the system may be configured to identify the data repository as a new data asset (e.g., via asset discovery), and take one or more actions (e.g., such as any suitable actions described herein) to generate and populate a data model of the newly discovered data asset. This may include, for example: (1) generating a data inventory for the new data asset; (2) populating the data inventory with any known attributes associated with the new data asset; (3) identifying one or more unpopulated (e.g., unknown) attributes of the data asset; and (4) taking any suitable action described herein to populate the unpopulated data attributes.

In particular embodiments, the system my, for example: (1) identify a source of the personal data stored in the data repository that led to the new asset discovery; (2) identify one or more relationships between the newly discovered asset and one or more known assets; and/or (3) etc.

Continuing to Step 2640, the system is configured to use one or more machine learning techniques to categorize one or more data elements from the generated catalog, analyze a flow of the data among the one or more data repositories, and/or classify the one or more data elements based on a confidence score as discussed below.

Continuing to Step 2650, the system, in various embodiments, is configured to receive input from a user confirming or denying a categorization of the one or more data elements, and, in response, modify the confidence score. In various embodiments, the system is configured to iteratively repeat Steps 2640 and 2650. In this way, the system is configured to modify the confidence score in response to a user confirming or denying the accuracy of a categorization of the one or more data elements. For example, in particular embodiments, the system is configured to prompt a user (e.g., a system administrator, privacy officer, etc.) to confirm that a particular data element is, in fact, associated with a particular individual from the catalog. The system may, in various embodiments, be configured to prompt a user to confirm that a data element or attribute discovered during one or more of the scans above were properly categorized at Step 2640.

In particular embodiments, the system is configured to modify the confidence score based at least in part on receiving one or more confirmations that one or more particular data elements or attributes discovered in a particular location during a scan are associated with particular individuals from the catalog. As may be understood in light of this disclosure, the system may be configured to increase the confidence score in response to receiving confirmation that particular types of data elements or attributes discovered in a particular storage location are typically confirmed as being associated with particular individuals based on one or more attributes for which the system was scanning.

Exemplary Intelligent Identity Scanning Technical Platforms

Figure 27:
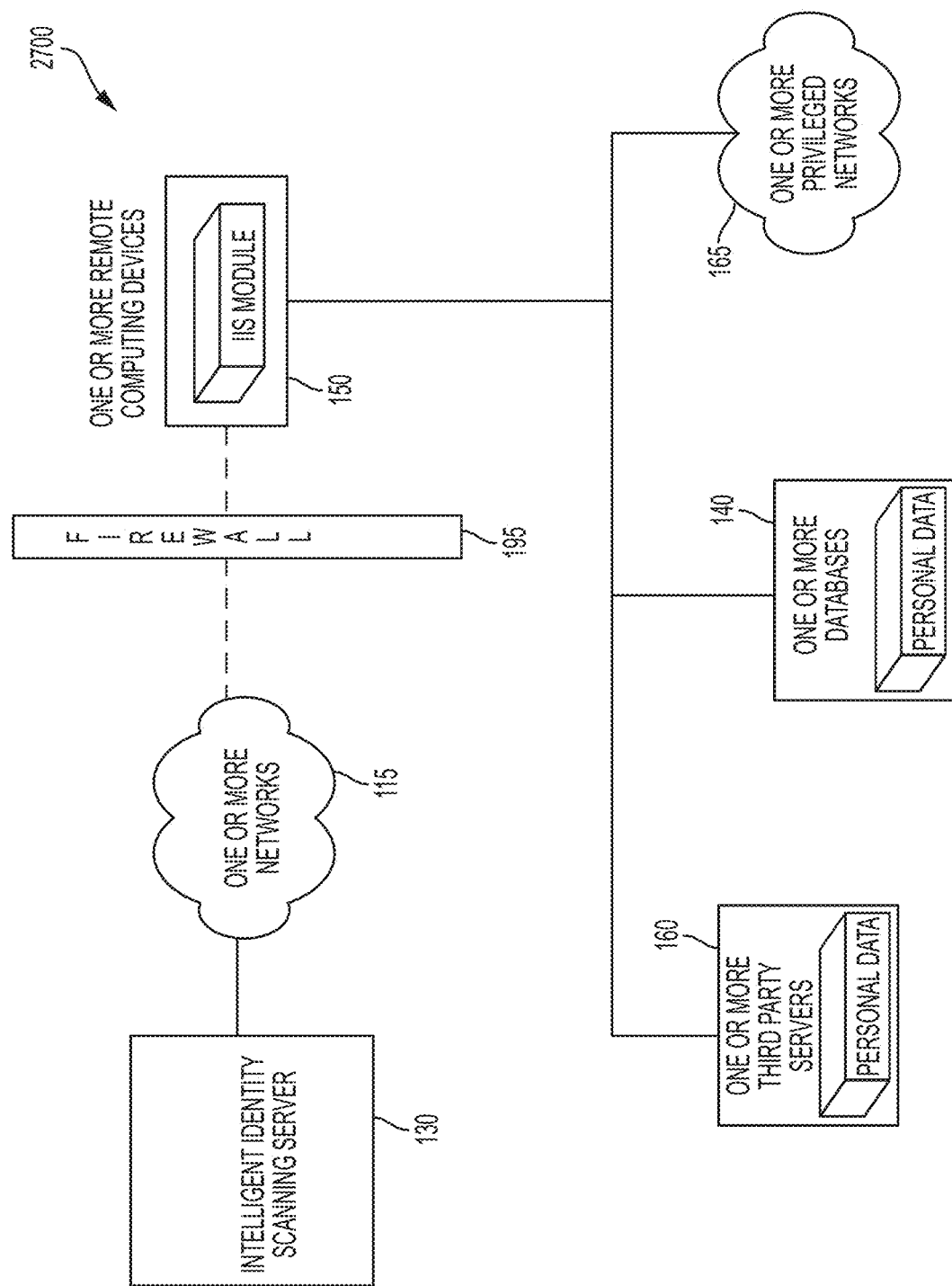
FIG. 27 is schematic diagram of network architecture for an intelligent identity scanning system 2700 according to a particular embodiment.

FIG. 27 depicts an exemplary technical platform via which the system may perform one or more of the steps described above with respect to the Intelligent Identity Scanning Module 2600. As shown in the embodiment in this figure, an Intelligent Identity Scanning System 2600 comprises an Intelligent Identity Scanning Server 130, such as the Intelligent Identity Scanning Server 130 described above with respect to FIG. 1. The Intelligent Identity Scanning Server 130 may, for example, comprise a processing engine (e.g., one or more computer processors). In some embodiments, the Intelligent Identity Scanning Server 130 may include any suitable cloud hosted processing engine (e.g., one or more cloud-based computer servers). In particular embodiments, the Intelligent Identity Scanning Server 130 is hosted in a Microsoft Azure cloud.

In particular embodiments, the Intelligent Identity Scanning Server 130 is configured to sit outside one or more firewalls (e.g., such as the firewall 195 shown in FIG. 26). In such embodiments, the Intelligent Identity Scanning Server 130 is configured to access One or More Remote Computing Devices 150 through the Firewall 195 (e.g., one or more firewalls) via One or More Networks 115 (e.g., such as any of the One or More Networks 115 described above with respect to FIG. 1).

In particular embodiments, the One or More Remote Computing Devices 150 include one or more computing devices that make up at least a portion of one or more computer networks associated with a particular organization. In particular embodiments, the one or more computer networks associated with the particular organization comprise one or more suitable servers, one or more suitable databases, one or more privileged networks, and/or any other suitable device and/or network segment that may store and/or provide for the storage of personal data. In the embodiment shown in FIG. 27, the one or more computer networks associated with the particular organization may comprise One or More Third Party Servers 160, One or More Databases 140, etc. In particular embodiments, the One or More Remote Computing Devices 150 are configured to access one or more segments of the one or more computer networks associated with the particular organization. In some embodiments, the one or more computer networks associated with the particular organization comprise One or More Privileged Networks 165. In still other embodiments, the one or more computer networks comprise one or more network segments connected via one or more suitable routers, one or more suitable network hubs, one or more suitable network switches, etc.

As shown in FIG. 27, various components that make up one or more parts of the one or more computer networks associated with the particular organization may store personal data (e.g., such as personal data stored on the One or More Third Party Servers 160, the One or More Databases 140, etc.). In various embodiments, the system is configured to perform one or more steps related to the Intelligent Identity Scanning Server 2600 in order to identify the personal data for the purpose of generating the catalog of individuals described above (e.g., and/or identify one or more data assets within the organization's network that store personal data)

As further shown in FIG. 27, in various embodiments, the One or More Remote Computing Devices 150 may store a software application (e.g., the Intelligent Identity Scanning Module). In such embodiments, the system may be configured to provide the software application for installation on the One or More Remote Computing Devices 150. In particular embodiments, the software application may comprise one or more virtual machines. In particular embodiments, the one or more virtual machines may be configured to perform one or more of the steps described above with respect to the Intelligent Identity Scanning Module 2600 (e.g., perform the one or more steps locally on the One or More Remote Computing Devices 150).

In various embodiments, the one or more virtual machines may have the following specifications: (1) any suitable number of cores (e.g., 4, 6, 8, etc.); (2) any suitable amount of memory (e.g., 4 GB, 8 GB, 16 GB etc.); (3) any suitable operating system (e.g., CentOS 7.2); and/or (4) any other suitable specification. In particular embodiments, the one or more virtual machines may, for example, be used for one or more suitable purposes related to the Intelligent Identity Scanning System 2700. These one or more suitable purposes may include, for example, running any of the one or more modules described herein, storing hashed and/or non-hashed information (e.g., personal data, personally identifiable data, catalog of individuals, etc.), storing and running one or more searching and/or scanning engines (e.g., Elasticsearch), etc.

In various embodiments, the Intelligent Identity Scanning System 2700 may be configured to distribute one or more processes that make up part of the Intelligent Identity Scanning Process (e.g., described above with respect to the Intelligent Identity Scanning Module 1800). The one or more software applications installed on the One or More Remote Computing Devices 150 may, for example, be configured to provide access to the one or more computer networks associated with the particular organization to the Intelligent Identity Scanning Server 130. The system may then be configured to receive, from the One or more Remote Computing Devices 150 at the Intelligent Identity Scanning Server 130, via the Firewall 195 and One or More Networks 115, scanned data for analysis.

In particular embodiments, the Intelligent Identity Scanning System 2700 is configured to reduce an impact on a performance of the One or More Remote Computing Devices 150, One or More Third Party Servers 160 and other components that make up one or more segments of the one or more computer networks associated with the particular organization. For example, in particular embodiments, the Intelligent Identity Scanning System 2700 may be configured to utilize one or more suitable bandwidth throttling techniques. In other embodiments, the Intelligent Identity Scanning System 2700 is configured to limit scanning (e.g., any of the one or more scanning steps described above with respect to the Intelligent Identity Scanning Module 2600) and other processing steps (e.g., one or more steps that utilize one or more processing resources) to non-peak times (e.g., during the evening, overnight, on weekends and/or holidays, etc.). In other embodiments, the system is configured to limit performance of such processing steps to backup applications and data storage locations. The system may, for example, use one or more sampling techniques to decrease a number of records required to scan during the personal data discovery process.

Figure 28:
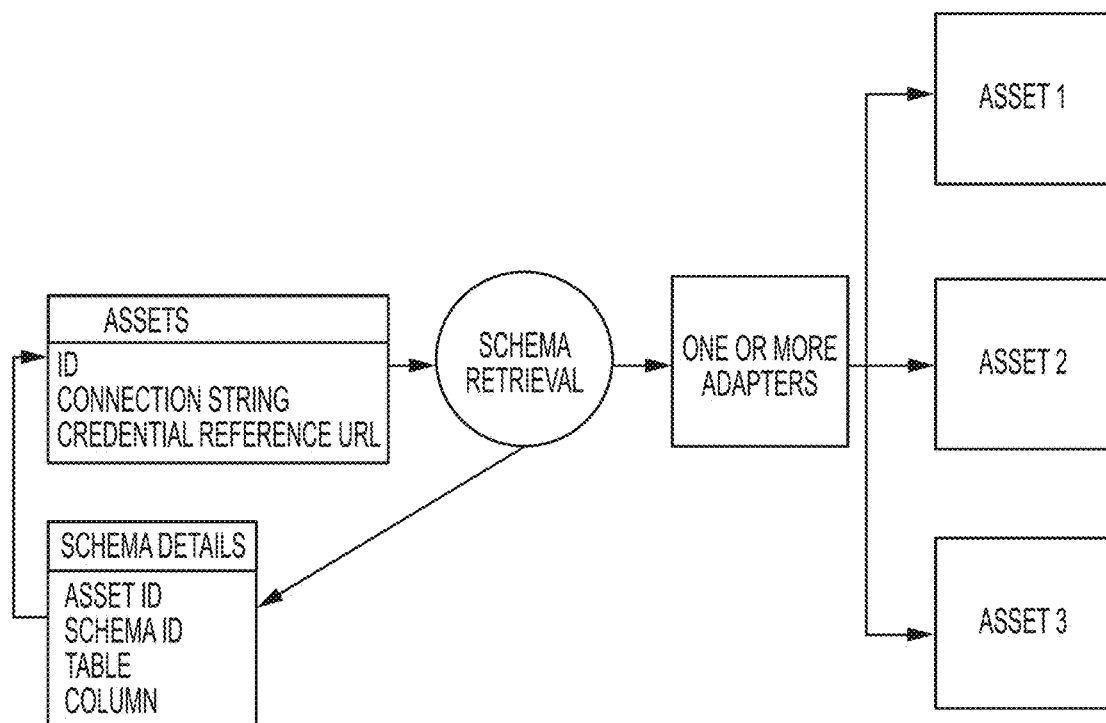
FIG. 28 is a schematic diagram of an asset access methodology utilized by an intelligent identity scanning system 2700 in various embodiments of the system.

FIG. 28 depicts an exemplary asset access methodology that the system may utilize in order to access one or more network devices that may store personal data (e.g., or other personally identifiable information). As may be understood from this figure, the system may be configured to access the one or more network devices using a locally deployed software application (e.g., such as the software application described immediately above). In various embodiments, the software application is configured to route identity scanning traffic through one or more gateways, configure one or more ports to accept one or more identity scanning connections, etc.

As may be understood from this figure, the system may be configured to utilize one or more credential management techniques to access one or more privileged network portions. The system may, in response to identifying particular assets or personally identifiable information via a scan, be configured to retrieve schema details such as, for example, an asset ID, Schema ID, connection string, credential reference URL, etc. In this way, the system may be configured to identify and store a location of any discovered assets or personal data during a scan.

Data Subject Access Request Fulfillment Module

Figure 29:
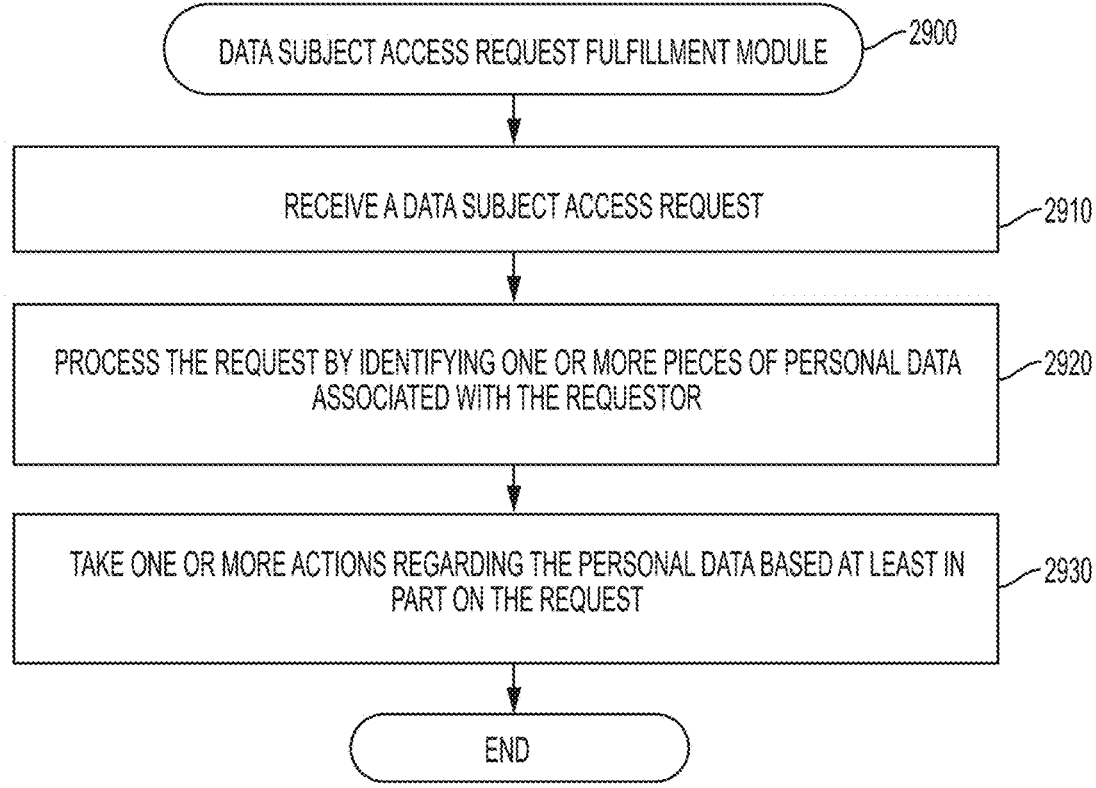
FIG. 29 is a flowchart showing an example of processes performed by a Data Subject Access Request Fulfillment Module 2900 according to various embodiments.

Turning to FIG. 29, in particular embodiments, a Data Subject Access Request Fulfillment Module 2900 is configured to receive a data subject access request, process the request, and fulfill the request based at least in part on one or more request parameters. In various embodiments, an organization, corporation, etc. may be required to provide information requested by an individual for whom the organization stores personal data within a certain time period (e.g., 30 days). As a particular example, an organization may be required to provide an individual with a listing of, for example: (1) any personal data that the organization is processing for an individual, (2) an explanation of the categories of data being processed and the purpose of such processing; and/or (3) categories of third parties to whom the data may be disclosed.

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.).

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, a data subject access request fulfillment system may utilize one or more data model generation and population techniques (e.g., such as any suitable technique described herein) to create a centralized data map with which the system can identify personal data stored, collected, or processed for a particular data subject, a reason for the processing, and any other information related to the processing.

Turning to FIG. 21, when executing the Data Subject Access Request Module 2100, the system begins, at Step 2110, by receiving a data subject access request. In various embodiments, the system receives the request via a suitable web form. In certain embodiments, the request comprises a particular request to perform one or more actions with any personal data stored by a particular organization regarding the requestor. For example, in some embodiments, the request may include a request to view one or more pieces of personal data stored by the system regarding the requestor. In other embodiments, the request may include a request to delete one or more pieces of personal data stored by the system regarding the requestor. In still other embodiments, the request may include a request to update one or more pieces of personal data stored by the system regarding the requestor. In still other embodiments, the request may include a request based on any suitable right afforded to a data subject, such as those discussed above.

Continuing to Step 2120, the system is configured to process the request by identifying and retrieving one or more pieces of personal data associated with the requestor that are being processed by the system. For example, in various embodiments, the system is configured to identify any personal data stored in any database, server, or other data repository associated with a particular organization. In various embodiments, the system is configured to use one or more data models, such as those described above, to identify this personal data and suitable related information (e.g., where the personal data is stored, who has access to the personal data, etc.). In various embodiments, the system is configured to use intelligent identity scanning (e.g., as described above) to identify the requestor's personal data and related information that is to be used to fulfill the request.

In still other embodiments, the system is configured to use one or more machine learning techniques to identify such personal data. For example, the system may identify particular stored personal data based on, for example, a country in which a website that the data subject request was submitted is based, or any other suitable information.

In particular embodiments, the system is configured to scan and/or search one or more existing data models (e.g., one or more current data models) in response to receiving the request in order to identify the one or more pieces of personal data associated with the requestor. The system may, for example, identify, based on one or more data inventories (e.g., one or more inventory attributes) a plurality of storage locations that store personal data associated with the requestor. In other embodiments, the system may be configured to generate a data model or perform one or more scanning techniques in response to receiving the request (e.g., in order to automatically fulfill the request).

Returning to Step 2130, the system is configured to take one or more actions based at least in part on the request. In some embodiments, the system is configured to take one or more actions for which the request was submitted (e.g., display the personal data, delete the personal data, correct the personal data, etc.). In particular embodiments, the system is configured to take the one or more actions substantially automatically. In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Data Subject Access Request User Experience

Figure 30:
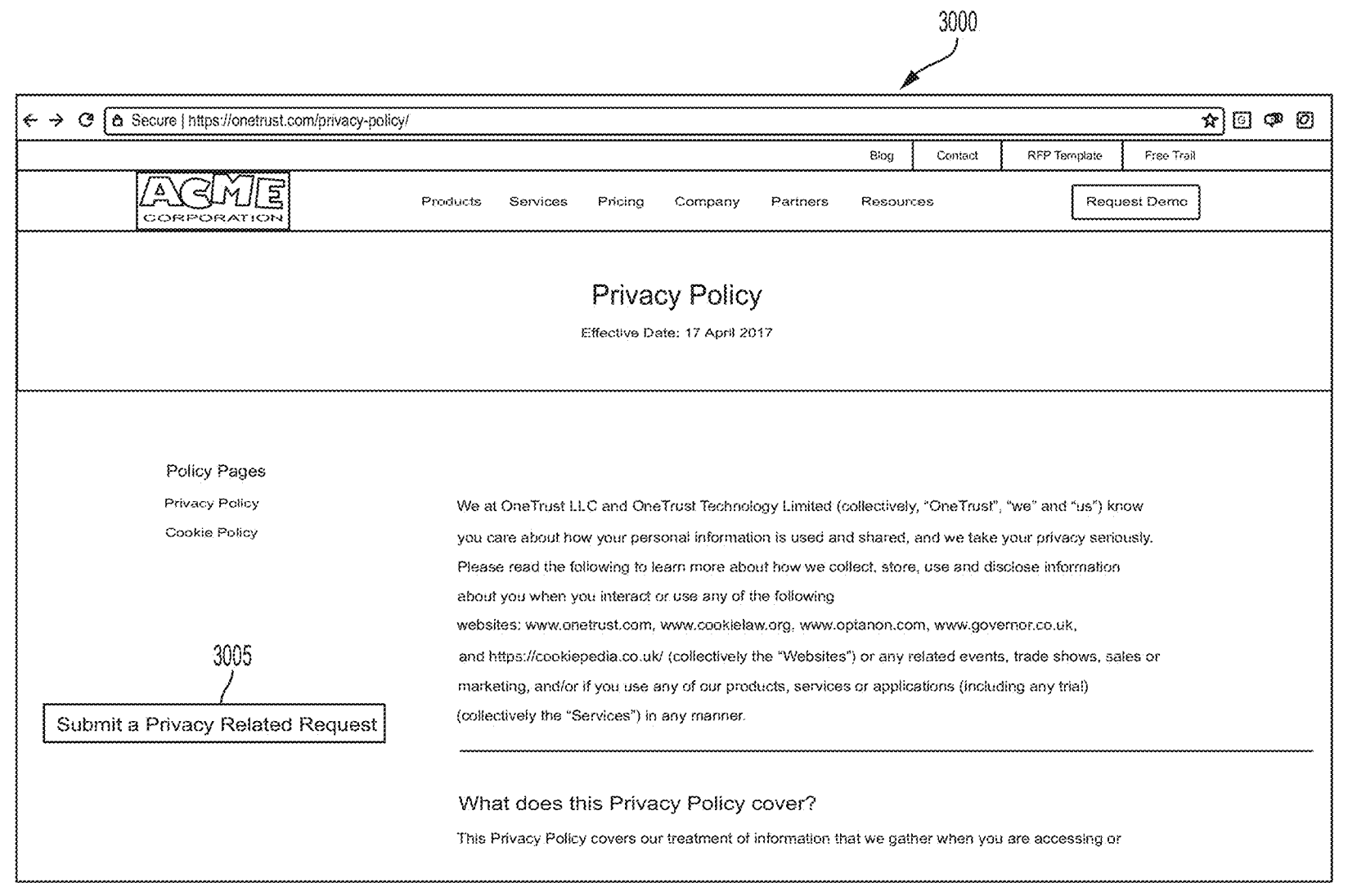
Figure 31:
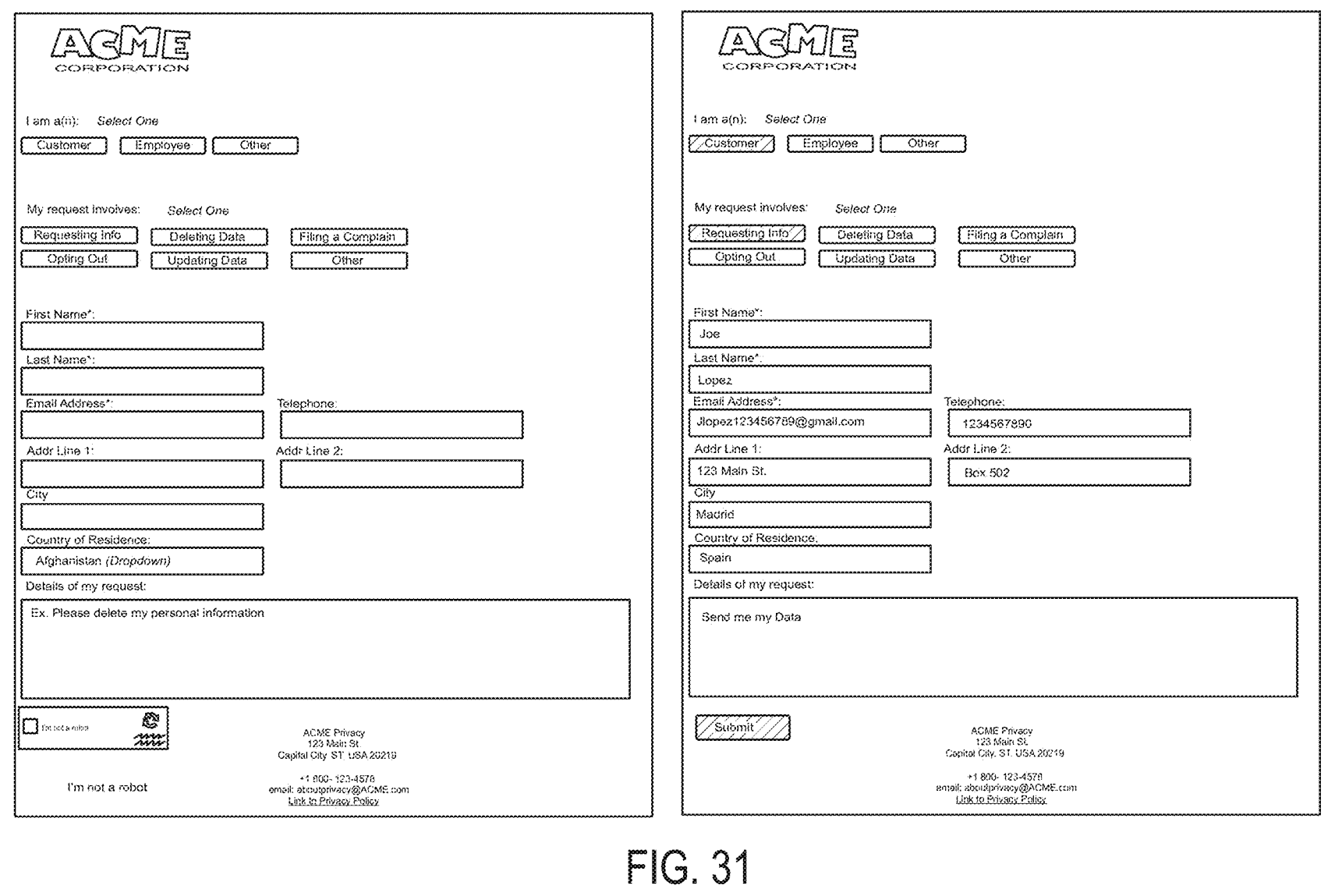

FIGS. 30-31 depict exemplary screen displays that a user may view when submitting a data subject access request. As shown in FIG. 30, a website 30000 associated with a particular organization may include a user-selectable indicia 3005 for submitting a privacy-related request. A user desiring to make such a request may select the indicia 3005 in order to initiate the data subject access request process.

FIG. 31 depicts an exemplary data subject access request form in both an unfilled and filled out state. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; and/or (8) one or more details associated with the request.

As discussed in more detail above, a data subject may submit a subject access request, for example, to request a listing of any personal information that a particular organization is currently storing regarding the data subject, to request that the personal data be deleted, to opt out of allowing the organization to process the personal data, etc.

Alternative Embodiments

In particular embodiments, a data modeling or other system described herein may include one or more features in addition to those described. Various such alternative embodiments are described below.

Processing Activity and Data Asset Assessment Risk Flagging

In particular embodiments, the questionnaire template generation system and assessment system described herein may incorporate one or more risk flagging systems. FIGS. 32-35 depict exemplary user interfaces that include risk flagging of particular questions within a processing activity assessment. As may be understood from these figures, a user may select a flag risk indicia to provide input related to a description of risks and mitigation of a risk posed by one or more inventory attributes associated with the question. As shown in these figures, the system may be configured to substantially automatically assign a risk to a particular response to a question in a questionnaire. In various embodiments, the assigned risk is determined based at least in part on the template from which the assessment was generated.

In particular embodiments, the system may utilize the risk level assigned to particular questionnaire responses as part of a risk analysis of a particular processing activity or data asset. Various techniques for assessing the risk of various privacy campaigns are described in U.S. patent application Ser. No. 15/256,419, filed Sep. 2, 2016, entitled "Data processing systems and methods for operationalizing privacy compliance and assessing the risk of various respective privacy campaigns," which is hereby incorporated herein in its entirety.

Cross-Border Visualization Generation System

In particular embodiments, a Cross-Border Visualization Generation System is configured to analyze one or more data systems (e.g., data assets), identify data transfers between/among those systems, determine whether any particular regulations apply to the identified data transfers, and generate a visual representation of physical locations of the one or more data systems and the one or more data transfers between them. The system may, for example, color-code one or more lines or indicators showing a transfer of data between a first and second data system. The one or more indicators may convey, for example: (1) whether the data transfer is secure; (2) a type or level of security that is applied to the transfers; (3) one or more regulations that apply to the transfer; and/or (4) any other suitable information related to the transfer of particular data between the first and second data system.

Figure 36:
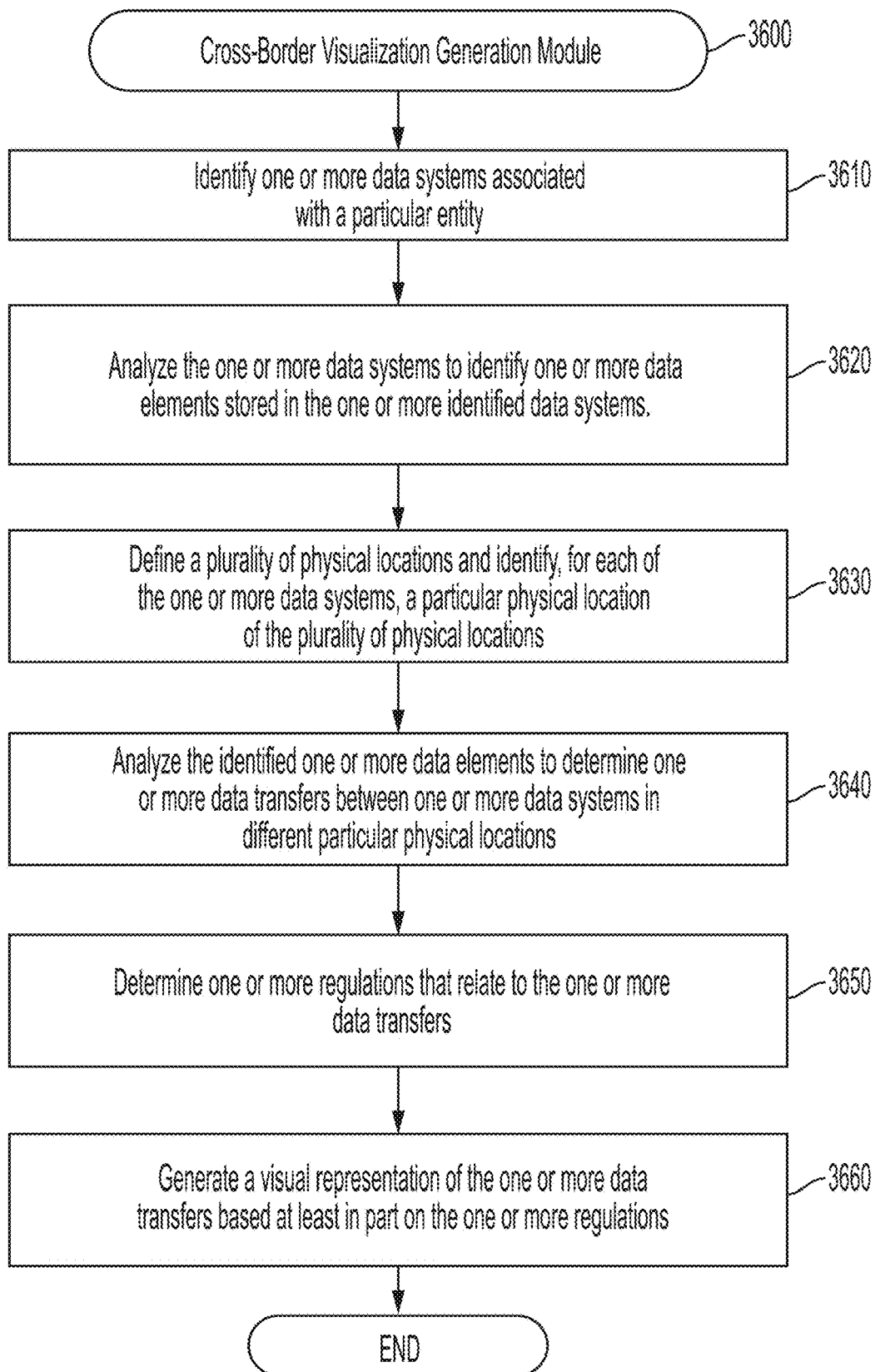
FIG. 36 is a flowchart showing an example of processes performed by a Cross-Border Visualization Generation Module 3600 according to various embodiments.

Various processes performed by the Cross-Border Visualization Generation System may be implemented by a Cross-Border Visualization Generation Module 3600. Referring to FIG. 36, in particular embodiments, the system, when executing the Cross-Border Visualization Generation Module 3600, is configured to: (1) identify data systems associated with a particular entity; (2) determine a location of the data systems; (3) identity one or more transfers of particular data elements between particular data systems of the one or more data systems; (4) determine one or more regulations that relate to the one or more data transfers; and (5) generate a visual representation of the one or more data transfers based at least in part on the one or more regulations.

When executing the Cross-Border Visualization Generation Module 3600, the system begins, at Step 3610, by identifying one or more data systems (e.g., data assets) associated with a particular entity. The particular entity may include, for example, a particular organization, company, sub-organization, etc. In particular embodiments, the one or more data assets (e.g., data systems) may include, for example, any entity that collects, processes, contains, and/or transfers data (e.g., such as a software application, "internet of things" computerized device, database, website, datacenter, server, etc.). For example, a first data asset may include any software or device utilized by a particular entity for such data collection, processing, transfer, storage, etc. In various embodiments, the first data asset may be at least partially stored on and/or physically located in a particular location. For example, a server may be located in a particular country, jurisdiction, etc. A piece of software may be stored on one or more servers in a particular location, etc.

In particular embodiments, the system is configured to identify the one or more data systems using one or more data modeling techniques. As discussed more fully above, a data model may store the following information: (1) the entity that owns and/or uses a particular data asset (e.g., such as a primary data asset, an example of which is shown in the center of the data model in FIG. 4); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify the one or more data systems associated with the particular entity.

Continuing to Step 3620, the system is configured to analyze the one or more data assets (e.g., data systems) to identify one or more data elements stored in the one or more identified data systems. In particular embodiments, the system is configured to identify one or more data elements stored by the one or more data systems that are subject to transfer (e.g., transfer to the one or more data systems such as from a source asset, transfer from the one or more data systems to a destination asset, etc.). In particular embodiments, the system is configured to identify a particular data element that is subject to such transfer (e.g., such as a particular piece of personal data or other data). In some embodiments, the system may be configured to identify any suitable data element that is subject to transfer and includes personal data. The system may be configured to identify such transfer data using any suitable technique described herein.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

As may be understood from this disclosure, the transfer of personal data may trigger one or more regulations that govern such transfer. In particular embodiments, personal data may include any data which relate to a living individual who can be identified: (1) from the data; or (2) from the data in combination with other information which is in the possession of, or is likely to come into the possession of a particular entity. In particular embodiments, a particular entity may collect, store, process, and/or transfer personal data for one or more customers, one or more employees, etc.

In various embodiments, the system is configured to use one or more data models of the one or more data assets (e.g., data systems) to analyze one or more data elements associated with those assets to determine whether the one or more data elements include one or more data elements that include personal data and are subject to transfer. In particular embodiments, the transfer may include, for example: (1) an internal transfer (e.g., a transfer from a first data asset associated with the entity to a second data asset associated with the entity); (2) an external transfer (e.g., a transfer from a data asset associated with the entity to a second data asset associated with a second entity); and/or (3) a collective transfer (e.g., a transfer to a data asset associated with the entity from an external data asset associated with a second entity).

Next, at Step 3630, the system is configured to define a plurality of physical locations and identify, for each of the one or more data systems, a particular physical location of the plurality of physical locations. In some embodiments, the system is configured to define the plurality of physical locations based at least in part on input from a user. The system may, for example, define each of the plurality of physical locations based at least in part on one or more geographic boundaries. These one or more geographic boundaries may include, for example: (1) one or more countries; (2) one or more continents; (3) one or more jurisdictions (e.g., such as one or more legal jurisdictions); (4) one or more territories; (5) one or more counties; (6) one or more cities; (7) one or more treaty members (e.g., such as members of a trade, defense, or other treaty); and/or (8) any other suitable geographically distinct physical locations.

The system may then be configured to identify, for each of the one or more data systems identified at Step 3610, an associated physical location. For example, the system may be configured to determine in which of the one or more defined plurality of physical locations each particular data system is physically located. In particular embodiments, the system is configured to determine the physical location based at least in part on one or more data attributes of a particular data asset (e.g., data system) using one or more data modeling techniques (e.g., using one or more suitable data modeling techniques described herein). In some embodiments, the system may be configured to determine the physical location of each data asset based at least in part on an existing data model that includes the data asset. In still other embodiments, the system may be configured to determine the physical location based at least in part on an IP address and/or domain of the data asset (e.g., in the case of a computer server or other computing device) or any other identifying feature of a particular data asset.

Returning to Step 3640, the system is configured to analyze the identified one or more data elements to determine one or more data transfers between one or more data systems in different particular physical locations. The system may, for example, analyze a data model based on each particular data asset to identify one or more data transfers between and/or among the one or more data assets (e.g., data systems). For example, as may be understood from FIG. 4, a particular asset (e.g., storage asset) may receive data, for example, from a data subject, a collection asset, or other suitable source (e.g., data asset). The particular asset may further, in some embodiments, transfer data to a transfer asset (e.g., an asset to which the particular asset transfers data). The system may be configured to identify such data transfers between and/or among one or more data assets for the purpose of generating a visual representation of such data transfers.

Continuing to Step 3650, the system is configured to determine one or more regulations that relate to (e.g., apply to) the one or more data transfers. As may understood in light of this disclosure, one or more regulations (e.g., industry regulations, legal regulations, etc.) may govern the transfer of personal data (e.g., between one or more jurisdictions, physical locations, and the like). In particular, the one or more regulations may impose one or more minimum standards on the handling of the transfer of such personal data in the interest of protecting the privacy of one or more data subjects or other individuals with whom the personal data is associated. In particular instances, it may be inevitable (e.g., as a result of the sharing of customer data, the centralization of IT services, etc.) that a particular entity or company (e.g., a particular entity whose business activities span a plurality of jurisdictions or locations) will undertake one or more data transfers that may triggers the one or more regulations.

In particular embodiments, the one or more regulations described above may include one or more transfer restrictions. In various embodiments, the one or more transfer restrictions may restrict transfer from a first location (e.g., jurisdiction) to a second location (e.g., jurisdiction) absent an adequate level of privacy protection. A particular exemplary transfer restriction may, for example, require data transferred from a first location to a second location to be subject to the same level of privacy protection at the second location that the data enjoys in the first location. For example, the first location may, for example, place any suitable limit on the collection and storage of personal data (e.g., one or more time limits, one or more encryption requirements, etc.). In particular embodiments, the one or more regulations may include a transfer restriction that prohibits transfer of personal data from the first location to a second location unless the second location places limits on the collection and storage of personal data that are at least as stringent as the first location.

In various embodiments, the system may, for example: (1) analyze one or more first storage restrictions on personal data stored in a first data asset; (2) analyze one or more second storage restrictions on personal data stored in a second data asset to which the first data asset transfers personal data; and (3) compare the one or more first storage restrictions with the one or more second storage restrictions. The system may then, for example, flag a transfer of data from the first data asset to the second data asset based at least in part on the comparison. For example, in response to determining that the one or more second restrictions are less stringent than the one or more first restrictions, the system may flag the transfer as risky or noncompliant. In another example, in response to determining that the one or more second restrictions are at least as stringent as the one or more first restrictions, the system may flag (e.g., automatically flag) the transfer as acceptable or compliant.

In particular embodiments, the system may be configured to substantially automatically determine that a transfer to a particular location is adequate. The system may, for example, store a listing (e.g., in memory) of one or more locations (e.g., countries) deemed automatically adequate as destinations of transferred personal data. In such embodiments, the one or more regulations may include a regulation that any location on the 'safe list' provides adequate privacy protection for personal data. The system may then substantially automatically determine that a transfer of data that includes a 'safe list' location as a target destination in a transfer would automatically meet an adequacy standard for data transfer. In a particular example, the one or more locations on the 'safe list' may include one or more countries (e.g., Argentina, Canada, Israel, Switzerland, Uruguay, Jersey, Guernsey, the Isle of Man, etc.).

In various other embodiments, the one or more regulations may include a regulation that a transfer of personal data to a location that is part of a safe harbor is acceptable. In various embodiments, a safe harbor may include a commitment to adhere to a set of safe harbor principles related to data protection. In a particular example, a United States company wishing to identify as a safe harbor entity may be required to self-certify to the U.S. Department of Commerce that it adheres to the Safe Harbor principles and to make a public declaration of the adherence.

In particular other embodiments, the system may identify a particular privacy shield arrangement between a first and second location in order to determine an adequacy of a transfer of data from the first location to the second location. In particular, a privacy shield arrangement may facilitate monitoring of an entity's compliance with one or more commitments and enforcement of those commitments under the privacy shield. In particular, an entity entering a privacy shield arrangement may, for example: (1) be obligated to publicly commit to robust protection of any personal data that it handles; (2) be required to establish a clear set of safeguards and transparency mechanisms on who can access the personal data it handles; and/or (3) be required to establish a redress right to address complaints about improper access to the personal data.

In a particular example of a privacy shield, a privacy shield between the United States and Europe may involve, for example: (1) establishment of responsibility by the U.S. Department of Commerce to monitor an entity's compliance (e.g., a company's compliance) with its commitments under the privacy shield; and (2) establishment of responsibility of the Federal Trade Commission having enforcement authority over the commitments. In a further example, the U.S. Department of Commerce may designate an ombudsman to hear complaints from Europeans regarding U.S. surveillance that affects personal data of Europeans.

In some embodiments, the one or more regulations may include a regulation that allows data transfer to a country or entity that participates in a safe harbor and/or privacy shield as discussed herein. The system may, for example, be configured to automatically identify a transfer that is subject to a privacy shield and/or safe harbor as 'low risk.'

In some embodiments, the one or more regulations may include a regulation that a location that is not deemed automatically adequate as a data transfer target (e.g., a location to which data is being transferred) may be deemed adequate by entering one or more contracts (e.g., standard clauses) with an entity that is the source of the transferred data. For example, the system may automatically determine that a particular data transfer is adequate by identifying a contract that exists between a first entity and a second entity, where the first entity is transferring data from a first asset to a second asset associated with the second entity. In various embodiments, the one or more data elements that make up a data model (e.g., for the first data asset) may indicate the existence of any contracts that the first entity has executed related to the transfer of data with one or more other entities. In various embodiments, the system is configured to analyze the one or more contracts to determine whether the one or more contracts apply to a particular data transfer of the one or more transfers identified at Step 3640.

In particular embodiments, the one or more contracts may include one or more third party beneficiary rights to the one or more data subjects whose personal data is subject to transfer. In such embodiments, such contracts may, for example, be enforced by an exporting entity (e.g., the entity that is transferring the data) as well as the data subject themselves.

In particular embodiments, a further method of legitimizing a transfer of data between one or more data assets may include implementing one or more binding corporate rules. In particular embodiments, the one or more binding corporate rules may be approved by a regulating authority. In such embodiments, the one or more regulations referred to in step 3650 may include one or more regulations related to the existence of one or more binding corporate rules (e.g., that have been approved by a regulating authority).

In various embodiments, the one or more binding corporate rules may include a scheme that involves an entity (e.g., corporate group) setting up an internal suite of documents that set out how the entity intends to provide adequate safeguards to individuals whose personal data is being transferred to a second location (e.g., country). In particular embodiments, the one or more binding corporate rules may include one or more safeguards that are no less than those required by the location in which the personal data is originally stored.

At Step 3660, the system continues by generating a visual representation of the one or more data transfers based at least in part on the one or more regulations. The system may, for example, generate a visual representation of a map that includes the plurality of physical locations described above. The system may then indicate, on the visual representation, a location of each of the one or more data systems (e.g., using a suitable marker or indicia). In particular embodiments, the system may color code one or more of the plurality of physical locations based on, for example, an existence of a privacy shield, a prevailing legal requirement for a particular jurisdiction, etc.

In various embodiments, the system may be configured to generate, on the map, a visual representation of a data transfer between at least a first data asset and a second data asset (e.g., where the first and second data asset are in two different physical locations). For example, the system may generate a linear representation of the transfer, or other suitable representation. In particular embodiments, they system is configured to color code the visual representation of the transfer based at least in part on the physical locations, one or more regulations, etc. In still other embodiments, the system is configured to color code the visual representation of the transfer based at least in part on the one or more regulations that the system has determined apply to the transfer (e.g., one or more binding corporate rules, privacy shield, etc.). This may, for example, indicate a legal basis of each particular identified data transfer.

In various embodiments, the system may be configured to substantially automatically flag a particular transfer of data as problematic (e.g., because the transfer does not comply with an applicable regulation). For example, a particular regulation may require data transfers from a first asset to a second asset to be encrypted. The system may determine, based at least in part on the one or more data elements, that the transfer is not encrypted. In response, the system may flag the transfer as High risk (e.g., using a particular color such as red). In various other embodiments, the system may be configured to determine a risk level of a particular transfer based at least in part on the physical location of each of the data assets, the one or more regulations, the type of data being transferred (e.g., whether the data contains personal data), etc.

In particular embodiments, the visual representation may be used by a particular entity to demonstrate compliance with respect to one or more regulations related to the transfer of personal data. In such embodiments, the visual representation may serve as a report that indicates the legal basis of any transfer performed by the entity (e.g., and further serve as documentation of the entity's compliance with one or more legal regulations).

Risk Identification for Cross-Border Data Transfers

In various embodiments, the Cross-Border Visualization Generation System may identify one or more risk associated with a cross-border data transfer. In various embodiments, a data transfer record may be created for each transfer of data between a first asset in a first location and a second asset in a second location where the transfer record may also include information regarding the type of data being transferred, a time of the data transfer, an amount of data being transferred, etc. The system may apply data transfer rules to each data transfer record. The data transfer rules may be configurable to support different privacy frameworks (e.g., a particular data subject type is being transferred from a first asset in the European Union to a second asset outside of the European Union) and organizational frameworks (e.g., to support the different locations and types of data assets within an organization). The applied data transfer rules may be automatically configured by the system (e.g., when an update is applied to privacy rules in a country or region) or manually adjusted by the particular organization (e.g., by a privacy officer of the organization). The data transfer rules to be applied may vary based on the data being transferred. For example, if the data being transferred includes personal data, then particular data transfer rules may be applied (e.g., encryption level requirements, storage time limitations, access restrictions, etc.).

In particular embodiments, the system may perform a data transfer assessment on each data transfer record based on the data transfer rules to be applied to each data transfer record. The data transfer assessment performed by the system may identify risks associated with the data transfer record, and in some embodiments, a risk score may be calculated for the data transfer. For example, a data transfer that contains sensitive data that includes a customer credit card, has a source location in one continent (e.g., at a merchant), and has a destination location in a different continent (e.g., in a database), may have a high risk score because of the transfer of data between two separate continents and the sensitivity of the data being transferred.

The risk score may be calculated in any suitable way, and may include risk factors such as a source location of the data transfer, a destination location of the data transfer, the type of data being transferred, a time of the data transfer, an amount of data being transferred, etc. Additionally, the system may apply weighting factors (e.g., custom weighting factors or automatically determined ones) to the risk factors. Further, in some implementation, the system can include a threshold risk score where a data transfer may be terminated (e.g., automatically) if the data transfer risk score indicates a higher risk than the threshold risk score (e.g., the data transfer risk score being higher than the threshold risk score). When the data transfer risk score indicates a lower risk than the threshold risk score, then the system may process the data transfer. In some implementations, if one or more of the risk factors indicate a heightened risk for the data transfer, then the system can notify an individual associated with the particular organization. For example, the individual associated with the particular organization may enable the data transfer to process, flag the data transfer for further evaluation (e.g., send the data transfer information to another individual for input), or terminate the data transfer, among other actions.

The system may process the data transfer after evaluating the data transfer assessment and/or the risk score for the data transfer. Additionally, in some implementations, the system may initiate the data transfer via a secure terminal or secure link between a computer system of the source location and a computer system of the destination location where the system to prevent interception of the data or unwarranted access to the additional information.

Cross-Border Visualization Generation User Experience

Figure 37:
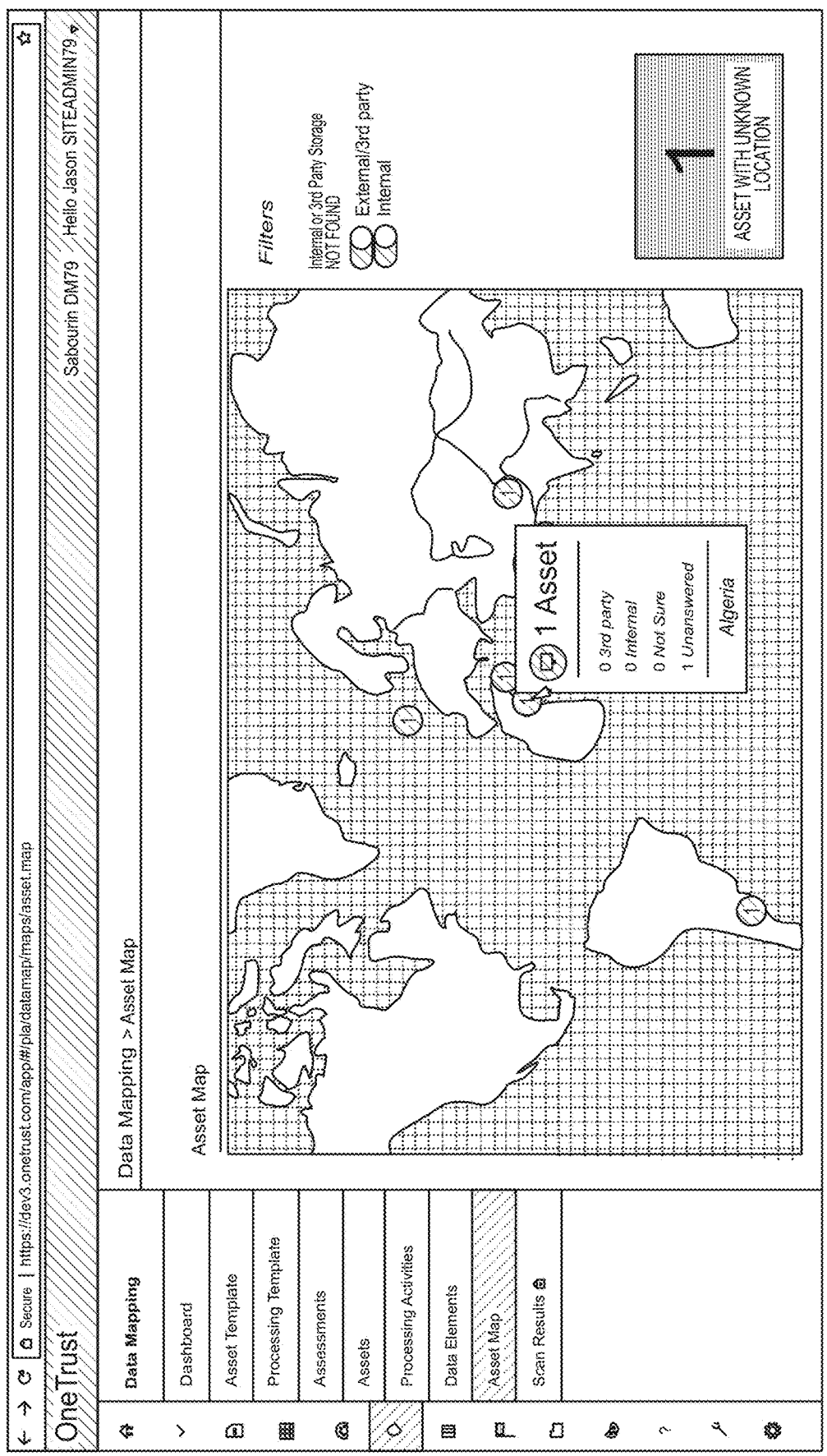
FIGS. 37-38 depict exemplary screen displays and graphical user interfaces (GUIs) according to various embodiments of the system, which may display information associated with the system or enable access to, or interaction with, the system by one or more users (e.g., related to cross-border visualization).
Figure 38:
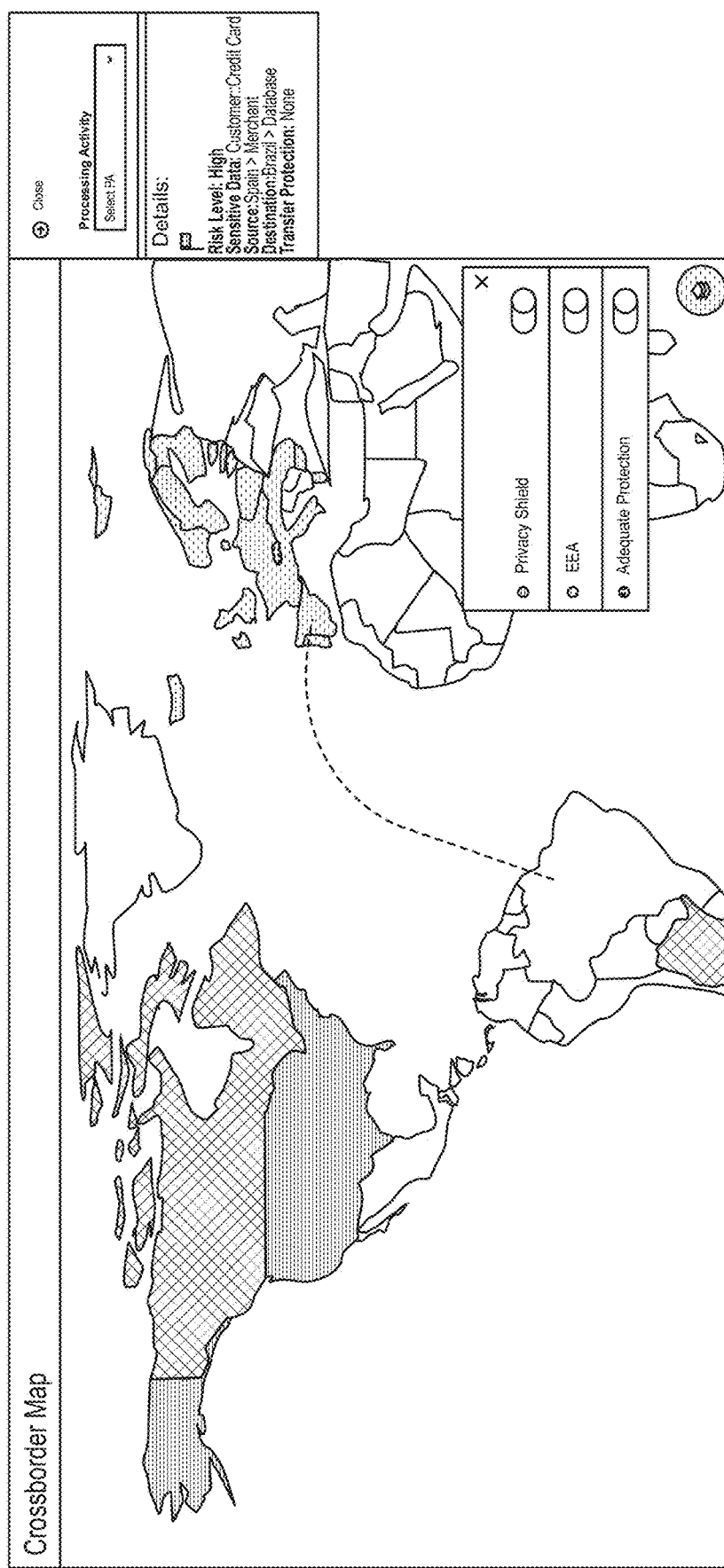

FIGS. 37-38 depict exemplary screen displays that a user may view when reviewing a cross-border visualization generated by the system as described above. As shown in FIG. 37, the system may be configured to generate a visual representation of an asset map (e.g., a data asset map, data system map, etc.). As may be understood from this Figure, the system may be configured to generate a map that indicates a location of one or more data assets for a particular entity. In the embodiment shown in this figure, locations that contain a data asset are indicated by circular indicia that contain the number of assets present at that location. In the embodiment shown in this figure, the locations are broken down by country. In particular embodiments, the asset map may distinguish between internal assets (e.g., first party servers, etc.) and external/third party assets (e.g., third party owned servers that the entity utilizes for data storage, transfer, etc.).

In some embodiments, the system is configured to indicate, via the visual representation, whether one or more assets have an unknown location (e.g., because the data model described above may be incomplete with regard to the location). In such embodiments, the system may be configured to: (1) identify the asset with the unknown location; (2) use one or more data mapping techniques described herein to determine the location (e.g., pinging the asset); and (3) update a data model associated with the asset to include the location.

As shown in FIG. 38, the system may be further configured to indicate, via a suitable line or other visual, a transfer of data between a first asset in a first location and a second asset in a second location. As may be understood from this figure, the transfer indicated by the line has a "High" risk level, contains sensitive data that includes a customer credit card, has a source location of Spain (e.g., at a merchant), and has a destination location of Brazil (e.g., in a database). In various other embodiments, the system may generate a visual representation that includes a plurality of transfers between a plurality of asset locations.

Adaptive Execution on a Data Model

In various embodiments, a Data Model Adaptive Execution System may be configured to take one or more suitable actions to remediate an identified risk trigger in view of one or more regulations (e.g., one or more legal regulations, one or more binding corporate rules, etc.). For example, in order to ensure compliance with one or more legal or industry standards related to the collection and/or storage of private information (e.g., personal data), an entity may be required to modify one or more aspects of a way in which the entity collects, stores, and/or otherwise processes personal data (e.g., in response to a change in a legal or other requirement). In order to identify whether a particular change or other risk trigger requires remediation, the system may be configured to assess a relevance of the risk posed by the potential risk trigger and identify one or more processing activities or data assets that may be affected by the risk.

Figure 39:
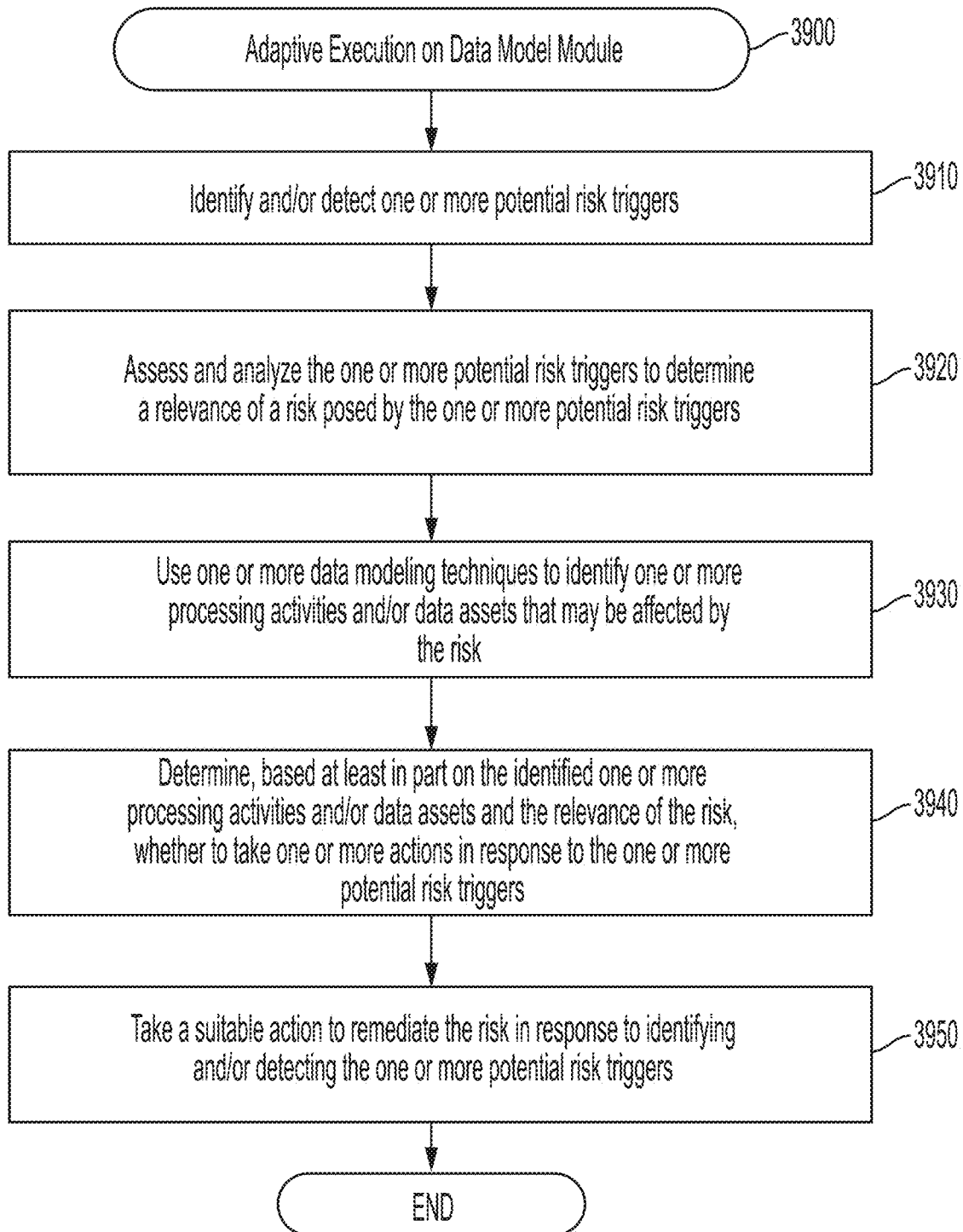
FIG. 39 is a flowchart showing an example of processes performed by an Adaptive Execution on a Data Model Module 3900 according to various embodiments.

Certain functionality of a Data Model Adaptive Execution System may be implemented via an Adaptive Execution on a Data Model Module 3900. A particular embodiment of the Adaptive Execution on a Data Model Module 3900 is shown in FIG. 39. When executing the Adaptive Execution on a Data Model Module 3900, the system may be configured, at Step 3910, to identify and/or detect one or more potential risk triggers. In particular embodiments, the system is configured to identify one or more potential risk triggers in response to receiving a notification of a security breach (e.g., data breach) of one or more data assets (e.g., one or more data assets utilized by a particular organization). For example, in response to receiving an indication that Salesforce (e.g., a customer relationship management platform) has had a data breach, the system may identify one or more potential risk triggers in the form of any data that the system receives from, or processes via Salesforce.

In still other embodiments, the system is configured to identify one or more potential risk triggers in response to determining (e.g., receiving an input or indication) that one or more legal or industry requirements that relate to the collection, storage, and/or processing of personal data have changed. For example, a particular legal regulation related to an amount of time that personal data can be stored, an encryption level required to be applied to personal data, etc. may change. As another example, a safe harbor arrangement (e.g., such as the safe harbor arrangement discussed above) may be determined to be inadequate justification for a transfer of data between a first and second location. In this example, the system may be configured to receive an indication that 'safe harbor' is no longer an adequate justification for data transfer from a first asset in a first location to a second asset in a second location.

Continuing to Step 3920, the system is configured to assess and analyze the one or more potential risk triggers to determine a relevance of a risk posed by the one or more potential risk triggers. The system may, for example, determine whether the one or more potential risk triggers are related to one or more data assets (e.g., one or more data elements of one or more data assets) and/or processing activities associated with a particular entity. When analyzing the one or more potential risk triggers to determine a relevance of a risk posed by the one or more potential risk triggers, the system may be configured to utilize (e.g., use) a formula to determine a risk level of the identified one or more potential risk triggers. The system may, for example, determine the risk level based at least in part on: (1) an amount of personal data affected by the one or more potential risk triggers; (2) a type of personal data affected by the one or more potential risk triggers; (3) a number of data assets affected by the one or more potential risk triggers; and/or (4) any other suitable factor.

For example, in response to identifying a data breach in Salesforce, the system may, for example: (1) determine whether one or more systems associated with the entity utilize Salesforce; and (2) assess the one or more systems utilized by Salesforce to evaluate a risk posed by the data breach. The system may, for example, determine that the entity utilizes Salesforce in order to store customer data such as name, address, contact information, etc. In this example, the system may determine that the Salesforce data breach poses a high risk because the data breach may have resulted in a breach of personal data of the entity's customers (e.g., data subjects).

In still another example, in response to determining that safe harbor is no longer a valid justification for a data transfer between two locations, the system may be configured to: (1) determine whether one or more data transfers involving one or more data assets associated with the particular entity are currently justified via a safe harbor arrangement; and (2) in response to determining that the one or more data transfers are currently justified via a safe harbor arrangement, assessing a risk of the one or more transfers in view of the determined inadequacy of safe harbor as a data transfer justification. In particular embodiments, the system may identify one or more supplemental justifications and determine that the determined inadequacy of safe harbor poses a low risk. In other embodiments, the system may be configured to determine that the determined inadequacy of safe harbor poses a high risk (e.g., because the system is currently performing one or more data transfers that may be in violation of one or more legal, internal, or industry regulations related to data transfer).

Returning to Step 3930, the system is configured to use one or more data modeling techniques to identify one or more processing activities and/or data assets that may be affected by the risk. As discussed above, the system may utilize a particular data model that maps and/or indexes data associated with a particular data asset. The data model may, for example, define one or more data transfers, one or more types of data, etc. that are associated with a particular data asset and/or processing activity. In some embodiments, the system is configured to use the data model to identify one or more data assets and/or processing activities that may be affected by the risk assessed at Step 3920. In various embodiments, the system is configured to identify, using any suitable data modeling technique described herein, one or more pieces of personal data that the system is configured to collect, store, or otherwise process that may be affected by the one or more potential risk triggers.

Next, at Step 3940, the system is configured to determine, based at least in part on the identified one or more processing activities and/or data assets and the relevance of the risk, whether to take one or more actions in response to the one or more potential risk triggers. In particular embodiments, the system may, for example: (1) determine to take one or more actions in response to determining that a calculated risk level is above a threshold risk level; (2) determine to take the one or more actions in response to determining that the one or more potential risk triggers may place the entity in violation of one or more regulations (e.g., legal and/or industry regulations); etc.

In some embodiments, the system may determine whether to take one or more actions based at least in part on input from one or more individuals associated with the entity. The one or more individuals may include, for example, one or more privacy officers, one or more legal representatives, etc. In particular embodiments, the system is configured to receive input from the one or more individuals, and determine whether to take one or more actions in response to the input.

Continuing to Step 3950, the system is configured to take one or more suitable actions to remediate the risk in response to identifying and/or detecting the one or more potential risk triggers.

In particular embodiments, the one or more actions may include, for example: (1) adjusting one or more data attributes of a particular data asset (e.g., an encryption level of data stored by the data asset, one or more access permissions of data stored by the particular data asset, a source of data stored by the particular data asset, an amount of time the data is stored by a particular asset, etc.); (2) generating a report indicating the risk level and the identified one or more risk triggers; (3) providing the report to one or more individuals (e.g., a privacy officer or other individual); and/or (4) taking any other suitable action, which may, for example, be related to the identified one or more potential risk triggers.

Automatic Risk Remediation Process

In various embodiments, a system may be configured to substantially automatically determine whether to take one or more actions in response to one or more identified risk triggers as discussed above in the context of the Adaptive Execution on a Data Model Module 3900. In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, when determining whether to take one or more actions in response to the one or more potential risk triggers (e.g., as discussed above with respect to Step 3940 of the Adaptive Execution on a Data Model Module): (1) compare the potential risk trigger to one or more previous risks triggers experienced by the particular entity at a previous time; (2) identify a similar previous risk trigger (e.g., one or more previous risk triggers related to a similar change in regulation, breach of data, type of issue identified, etc.); (3) determine the relevance of the current risk trigger based at least in part on a determined relevance of the previous risk trigger; and (4) determine whether to take one or more actions to the current risk trigger based at least in part on one or more determined actions to take in response to the previous, similar risk trigger.

Similarly, in particular embodiments, the system may be configured to substantially automatically determine one or more actions to take in response to a current potential risk trigger based on one or more actions taken by one or more similarly situated entities to one or more previous, similar risk triggers. For example, the system may be configured to: (1) compare the potential risk trigger to one or more previous risk triggers experienced by one or more similarly situated entities at a previous time; (2) identify a similar previous risk trigger (e.g., one or more previous risk triggers related to a similar change in regulation, breach of data, and/or type of issue identified, etc. from the one or more previous risk triggers experienced by the one or more similarly-situated entities at the previous time; (3) determine the relevance of the current risk trigger based at least in part on a determined relevance of the previous risk trigger (e.g., a relevance determined by the one or more similarly situated entities); and (4) determine one or more actions to take in response to the current risk trigger based at least in part on one or more previously determined actions to take in response to the previous, similar risk trigger (e.g., one or more determined actions by the one or more similarly situated entities at the previous time).

In various embodiments, the one or more similarly-situated entities may include, for example: (1) one or more other entities in a geographic location similar to a geographic location of the entity that has identified the one or more potential risk triggers (e.g., a similar country, jurisdiction, physical location, etc.); (2) one or more other entities in a similar industry (e.g., banking, manufacturing, electronics, etc.); (3); one or more entities of a similar size (e.g., market capitalization, number of employees, etc.); (4) one or more entities that are governed by one or more similar regulations (e.g., such as any suitable regulation discussed herein); and/or (5) any other suitably similarly situated entity.

In various embodiments, the system is configured to use one or more machine learning techniques to analyze one or more risk levels assigned to previously identified risk triggers, determine a suitable response to similar, currently-identified risk triggers based on previously determined responses, etc.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In a particular example of a reactive system for automatically determining a suitable action to take in response to an identified risk trigger, the system may take one or more suitable actions in response to identifying a data beach in Salesforce (e.g., as discussed above). In particular embodiments, the system may, for example: (1) substantially automatically identify one or more actions taken by the system in response to a similar data breach of one or more different vendors; and (2) determine a suitable action to take in response to the data breach based on the one or more actions taken in response to the similar data breach. The similar data breach may include, for example, a breach in data of a similar type, or any other similar breach.

In another example, the system may be configured to identify one or more similarly situated entities that have experienced a data breach via Salesforce or other similar vendor. The system, may, for example, be configured to determine a suitable action to take based at least in part on an action taken by such a similar entity to a similar data breach. In still another example, the system may be configured, based on one or more previous determinations related to a data breach by a vendor (e.g., such as by Salesforce) to take no action in response to the identified risk trigger (e.g., because the identified risk may pose no or minimal danger).

Systems and Methods for Automatically Remediating Identified Risks

A data model generation and population system, according to particular embodiments, is configured to generate a data model (e.g., one or more data models) that maps one or more relationships between and/or among a plurality of data assets utilized by a corporation or other entity (e.g., individual, organization, etc.) in the context, for example, of one or more business processes. In particular embodiments, each of the plurality of data assets (e.g., data systems) may include, for example, any entity that collects, processes, contains, and/or transfers data (e.g., such as a software application, "internet of things" computerized device, database, website, data-center, server, etc.). For example, a first data asset may include any software or device (e.g., server or servers) utilized by a particular entity for such data collection, processing, transfer, storage, etc.

In particular embodiments, a system may be configured to generate and maintain one or more disaster recovery plans for particular data assets based on one or more relationships between/among one or more data assets operated and/or utilized by a particular entity.

In various embodiments, a system may be configured to substantially automatically determine whether to take one or more actions in response to one or more identified risk triggers. For example, an identified risk trigger include any suitable risk trigger such as that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In some embodiments, in response to a change or update is made to one or more processing activities and/or data assets (e.g., a database associated with a particular organization), the system may use data modeling techniques to update the risk remediation data for use in facilitating an automatic assessment of and/or response to future identified risk triggers. For example, the system may be configured to use a data map and/or data model described herein to, for example: (1) particular systems that may require some remedial action in response to an identified breach/incident for one or more related systems; (2) automatically generate a notification to an individual to update a disaster recovery plan for those systems; and/or (3) automatically generate a disaster recovery plan that includes one or more actions in response to identifying an incident in one or more related systems identified using the data mapping techniques described herein. In various embodiments, in response to modification of a privacy campaign, processing activity, etc. of the particular organization (e.g., add, remove, or update particular information), the system may update the risk remediation data for use in facilitating an automatic assessment of and/or response to future identified risk triggers. For example, the system may be configured to (1) identify one or more changes to one or more relationships between/among particular data assets in response to a change in one or more business processes; and (2) modify (e.g., and/or generate a notification to modify) one or more disaster recovery plans for any affected data assets.

In particular embodiments, the system may, for example, be configured to: (1) access risk remediation data for an entity that identifies one or more suitable actions to remediate a risk in response to identifying one or more data assets of the entity that may be affected by one or more potential risk triggers; (2) receive an indication of an update to the one or more data assets; (3) identify one or more potential updated risk triggers for an entity; (4) assess and analyze the one or more potential updated risk triggers to determine a relevance of a risk posed to the entity by the one or more potential updated risk triggers; (5) use one or more data modeling techniques to identify one or more data assets associated with the entity that may be affected by the risk; and (6) update the risk remediation data to include the one or more actions to remediate the risk in response to identifying the one or more potential updated risk triggers.

Webform Crawling to Map Processing Activities in a Data Model

In particular embodiments, a data mapping system (e.g., such as any suitable data mapping and/or modeling system described herein) may be configured to generate a data model that maps one or more relationships between and/or among a plurality of data assets utilized by a corporation or other entity (e.g., individual, organization, etc.) in the context, for example, of one or more business processes and/or processing activities. In various embodiments, when generating the data model, the system may identify one or more webforms utilized by the system in the collection and processing of personal data and determine one or more particular data assets and/or processing activities that utilize such data. Although in the course of this description, the system is described as crawling (e.g., and/or scanning) one or more webforms, it should be understood that other embodiments may be utilized to scan, crawl or analyze any suitable electronic form in order to map any data input via the electronic form in any suitable manner.

In particular embodiments, the system may be configured to use one or more website scanning tools to, for example: (1) identify a webform (e.g., on a website associated with a particular entity or organization); (2) robotically complete the webform; (3) and analyze the completed webform to determine one or more particular processing activities, and/or business processes, etc. that use one or more pieces of data submitted via the webform.

As may be understood in light of this disclosure, one or more legal and/or industry regulations may require an entity to, for example, maintain a record of one or more processing activities undertaken by the entity that includes: (1) a name and contact details of a controller responsible for the processing activity; (2) a purpose of the processing; (3) a description of one or more categories of data subjects and/or of one or more categories of personal data collected as part of the processing activity; (4) one or more categories of recipients to whom the personal data may be disclosed, including recipients in one or more second countries or other locations; (5) one or more transfers of the personal data to a second country or an international organization; (6) a time limit for erasure of the personal data, if applicable; (7) an identification of one or more security measures taken in the collection and/or storage of the personal data; and/or (8) any other suitable information.

Figure 43:
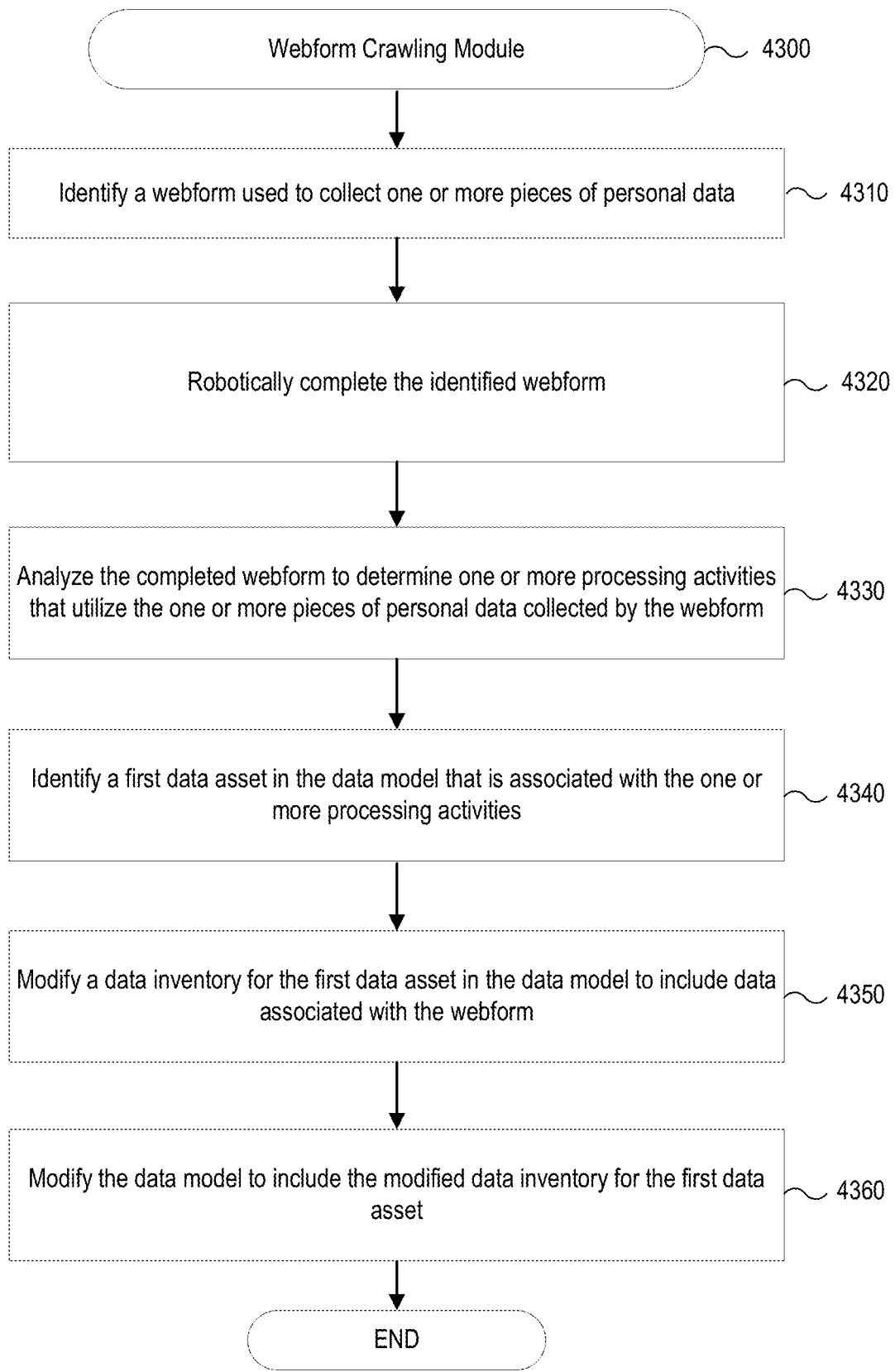
FIG. 43 is a flowchart showing an example of processes performed by a Webform Crawling Module 4300 according to various embodiments.

As may be further understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). Additionally, one or more sub-organizations (e.g., subgroups) of an organization or entity may initiate a processing activity that involves the collection of personal data without vetting the new processing activity with a privacy compliance officer or other individual within the company tasked with ensuring compliance with one or more prevailing privacy regulations. In this way, a particular organization may collect and store personal data in a plurality of different locations which may include one or more known and/or unknown locations, or may collect personal data for a purpose that is not immediately apparent (e.g., using one or more webforms). As such, it may be desirable for an entity to implement a system that is configured to scan one or more webforms that collect personal data to identify which particular processing activity (e.g., or processing activities) that personal data is utilized in the context of Various processes are performed by the Data Access Webform Crawling System and may be implemented by a Webform Crawling Module 4300. Referring to FIG. 43, in particular embodiments, the system, when executing the Webform Crawling Module 4300, is configured to: (1) identify a webform used to collect one or more pieces of personal data; (2) robotically complete the identified webform; (3) analyze the completed webform to determine one or more processing activities that utilize the one or more pieces of personal data collected by the webform; (4) identify a first data asset in the data model that is associated with the one or more processing activities; (5) modify a data inventory for the first data asset in the data model to include data associated with the webform; and (6) modify the data model to include the modified data inventory for the first data asset.

When executing the Webform Crawling Module 4300, the system begins, at Step 4310, by identifying a webform used to collect one or more pieces of personal data. The system may use one or more website scanning tools to identify the webform. The webform may be a website associated with a particular entity or organization. For example, the webform may be a "Contact Us" form that is on the particular organization's website or any other type of webform associated with the particular organization. At Step 4320, the system is configured to robotically complete the identified webform. The identified webform may be completed by using a virtual profile that emulates a user profile, and the virtual profile may include an e-mail address. The system may monitor the e-mail account associated with the e-mail address for a confirmation e-mail related to the completion of the identified webform where the system may receive and interact with the confirmation e-mail. Additionally, the system may analyze (e.g., scrape) the confirmation e-mail for the data associated with the webform. The data associated with the webform may identify one or more processing activities and one or more pieces of personal data collected by the webform.

Next, at Step 4330, the system is configured to analyze the completed webform to determine one or more processing activities that utilize the one or more pieces of personal data collected by the webform. In some implementations, the system may analyze one or more pieces of computer code associated with the webform to determine the one or more processing activities that utilize the one or more pieces of personal data collected by the webform. Further, the system may analyze the one or more pieces of computer code to identify a storage location to which the one or more pieces of personal data collected by the webform are routed. At Step 4340, the system is configured to identify a first data asset in the data model that is associated with the one or more processing activities. In some implementations, the system may identify a processing activity based on the storage location of the identified one or more pieces of personal data, and an asset may be associated with a particular storage location.

Continuing to Step 4350, the system is configured to modify a data inventory for the first data asset in the data model to include data associated with the webform. The system may include an indication that the one or more processing activities operate with data included in the first data asset. Additionally, the system may indicate that the one or more pieces of personal data are utilized by the identified one or more processing activities.

At Step 4360, the system continues by modifying the data model to include the modified data inventory for the first data asset. In some implementations, the system may include a mapping of the first data asset to the one or more processing activities that utilize the one more pieces of personal data. The mapping may be based on the analysis of the computer code associated with the webform. Moreover, in some implementations, the system may add the first data asset to a third-party data repository, and the first data asset may include an electronic link to the webform. The third-party repository is further discussed below.

Central Consent Repository

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, such data may not have or may no longer have a legal basis for the organization or entity to continue to store the data. As such, organizations and entities may require improved systems and methods to maintain an inventory of data assets utilized to process and/or store personal data for which a data subject has provided consent for such storage and/or processing.

In various embodiments, the system is configured to provide a third-party data repository system to facilitate the receipt and centralized storage of personal data for each of a plurality of respective data subjects, as described herein. Additionally, the third-party data repository system is configured to interface with a centralized consent receipt management system.

In various embodiments, the system may be configured to, for example: (1) identify a webform used to collect one or more pieces of personal data, (2) determine a data asset of a plurality of data assets of the organization where input data of the webform is transmitted, (3) add the data asset to the third-party data repository with an electronic link to the webform, (4) in response to a user submitting the webform, create a unique subject identifier to submit to the third-party data repository and the data asset along with the form data provided by the user in the webform, (5) submit the unique subject identifier and the form data provided by the user in the webform to the third-party data repository and the data asset, and (6) digitally store the unique subject identifier and the form data provided by the user in the webform in the third-party data repository and the data asset.

In some embodiments, the system may be further configured to, for example: (1) receive a data subject access request from the user (e.g., a data subject rights' request, a data subject deletion request, etc.), (2) access the third-party data repository to identify the unique subject identifier of the user, (3) determine which data assets of the plurality of data assets of the organization include the unique subject identifier, (4) access personal data of the user stored in each of the data assets of the plurality of data assets of the organization that include the unique subject identifier, and (5) take one or more actions based on the data subject access request (e.g., delete the accessed personal data for a data subject deletion request).

The system may, for example: (1) generate, for each of a plurality of data subjects, a respective unique subject identifier in response to submission, by each data subject, of a particular webform; (2) maintain a database of each respective unique subject identifier; and (3) electronically link each respective unique subject identifier to each of: (A) a webform initially submitted by the user; and (B) one or more data assets that utilize data received from the data subject via the webform.

Figure 44:
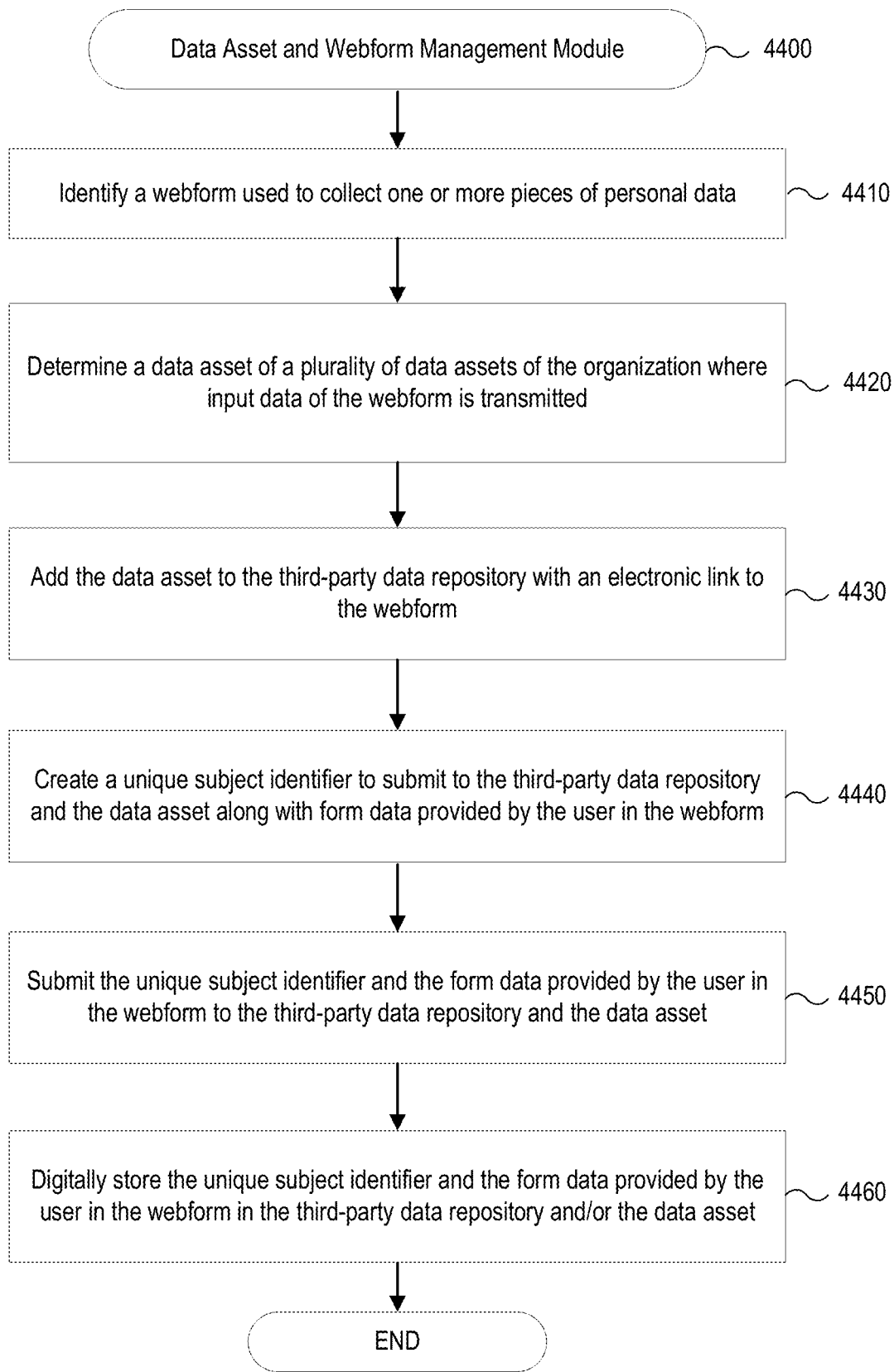
FIG. 44 is a flowchart showing an example of processes performed by a Data Asset and Webform Management Module 4400 according to yet another embodiment.

The Webform Crawling Data System may also implement a Data Asset and Webform Management Module 4400. Referring to FIG. 44, in particular embodiments, the system, when executing the Data Asset and Webform Management Module 4400, is configured for: (1) identifying a webform used to collect one or more pieces of personal data; (2) determining a data asset of a plurality of data assets of the organization where input data of the webform is transmitted; (3) adding the data asset to the third-party data repository with an electronic link to the webform; (4) in response to a user submitting the webform, creating a unique subject identifier to submit to the third-party data repository and the data asset along with form data provided by the user in the webform; (5) submitting the unique subject identifier and the form data provided by the user in the webform to the third-party data repository and the data asset; and (6) digitally storing the unique subject identifier and the form data provided by the user in the webform in the third-party data repository and the data asset.

When executing the Data Asset and Webform Management Module 4400, the system begins, at Step 4410, by identifying a webform used to collect one or more pieces of personal data. In particular embodiments, the system may be configured to use one or more website scanning tools to, for example, identify a webform. The webform may be a website associated with a particular entity or organization. For example, the webform may be a "Contact Us" form that is on the particular organization's website or any other type of webform associated with the particular organization.

At Step 4420, the system is configured to determine a data asset of a plurality of data assets of the organization where input data of the webform is transmitted. The system may perform the determination by identifying where the input data of the webform is transmitted (e.g., Salesforce). Continuing to Step 4430, the system is configured to add the data asset to the third-party data repository with an electronic link to the webform. The system may provide the third-party data repository with a reference to the data asset, or in some implementations, the system may provide the one or more pieces of personal data that were transmitted to the one or more data assets to the third-party repository. The system may associate the electronic link to the webform with the identified data asset that includes the one or more pieces of personal data.

Returning to Step 4440, the system is configured to create a unique subject identifier to submit to the third-party data repository and the data asset along with form data provided by the user in the webform in response to a user submitting the webform. In response to a user inputting form data (e.g., name, address, credit card information, etc.) at the webform and submitting the webform, the system may, based on the link to the webform, create a unique subject identifier to identify the user. The unique subject identifier may be any type of numerical, alphabetical, or any other type of identifier to identify the user.

Continuing to Step 4450, the system is configured to submit the unique subject identifier and the form data provided by the user in the webform to the third-party data repository and the data asset. The system is configured to submit the unique subject identifier to the third-party data repository and the data asset along with the form data. Further, the system may use the unique subject identifier of a user to access and update each of the data assets of the particular organization (i.e., including the other data assets of the particular organization where the form data is not transmitted). For example, in response to a user submitting a data subject access request to delete personal data the particular organization has stored of the user, the system may use the unique subject identifier of the user to access and retrieve the user's personal data stored in all of the data assets (e.g., Salesforce, Eloqua, Marketo, etc.) utilized by the particular organization. At Step 4460, the system continues by digitally storing the unique subject identifier and the form data provided by the user in the webform in the third-party data repository and the data asset.

Further, in some implementations, the system may be configured to receive a data subject access request from the user. The data subject access request may be one or more different types of data subject access requests, and may be, for example, a data subject deletion request or a data subject rights request. Upon the system receiving the data subject access request, the system may be configured to access the third-party data repository to identify the unique subject identifier of the user, determine which data assets of the plurality of data assets of the organization include the unique subject identifier, and access personal data of the user stored in each of the data assets of the plurality of data assets of the organization that include the unique subject identifier. Upon the data subject access request being a data subject deletion request, then the system may delete the accessed personal data of the user stored in each of the data assets of the plurality of data assets of the organization that include the unique subject identifier. When the data subject access request is a data subject rights request, the system may generate a data subject rights request report that includes the accessed personal data of the user stored in each of the data assets of the plurality of data assets of the organization that include the unique subject identifier. Further, the data subject rights request report may be transmitted to the user. In some implementations, the system may transmit the data subject rights request report to the user via a secure electronic link.

Webform Generation User Experience

FIG. 40 depicts an exemplary webform that a particular entity may include on a website for completion by one or more customers or users of the website. As may be understood from FIG. 40, the webform may collect personal data such as, for example: (1) first name; (2) last name; (3) organization name; (4) country of residence; (5) state; (6) phone number; (7) e-mail address; (8) website; and/or (9) any other suitable personal data. As may be further understood from this Figure, an entity (e.g., or a system controlled by the entity) may use the webform to collect such personal data as part of one or more processing activities (e.g., e-mail marketing, online surveys, event marketing, etc.). In various embodiments, the system may be configured to scan a particular webform to identify a particular processing activity for which the entity is collecting the personal data.

In various embodiments, the system may, for example: (1) robotically fill out the webform (e.g., using one or more virtual profiles); (2) analyze one or more pieces of computer code associated with the webform (e.g., javascript, HTML, etc.); and (3) map one or more business processes that utilize the data collected via the webform based at least in part on the analyzed one or more pieces of computer code. In particular embodiments, a particular entity that utilizes a webform to collect personal data for use in a particular processing activity (e.g., business process) may analyze one or more pieces of computer code associated with the webform to determine: (1) one or more systems associated with the entity to which data entered the webform is routed (e.g., one or more data assets that serve as a destination asset to data entered via the webform); (2) a purpose for the collection of the data entered via the webform (e.g., a processing activity that utilizes the destination asset discussed above;

(3) a type of data collected via the webform; and/or (4) any other suitable information related to the collection of data via the webform.

In particular embodiments, a system may be configured to transmit a webform completion confirmation e-mail to a user that completes the webform. In various embodiments, the system may be configured to analyze the e-mail or other message to identify one or more business processes that utilize the data collected by the webform (e.g., by analyzing/scraping one or more contents of the e-mail or other message). The system may then determine a purpose of the data collection and/or an associated processing activity based at least in part on the analysis.

Scanning Electronic Correspondence to Facilitate Automatic Data Subject Access Request Submission In various embodiments, any system described herein may be configured for: (1) analyzing electronic correspondence associated with a data subject (e.g., the emails within one or more email in-boxes associated with the data subject, or a plurality of text messages); (2) based on the analysis, identifying one or more entities (e.g., corporate entities) that that the data subject does not actively do business with (e.g., as evidenced by the fact that the data subject no longer opens emails from the entity, has set up a rule to automatically delete emails received from the entity, has blocked texts from the entity, etc.); (3) in response to identifying the entity as an entity that the data subject no longer does business with, at least substantially automatically generating a data subject access request and, optionally, automatically submitting the data subject access request to the identified entity.

The system may, for example, be configured to determine whether the data subject still uses one or more services from a particular e-mail sender (e.g., service provider) based at least in part on one more determined interactions of the data subject with one or more e-mails, or other electronic correspondence, from the service provider (e.g., whether the data subject reads the e-mail, selects one or more links within the e-mail, deletes the e-mail without reading it, etc.). The system may then substantially automatically generate and/or complete a data subject access request on behalf of the data subject that includes a request to be forgotten (e.g., a request for the entity to delete some or all of the data subject's personal data that the entity is processing).

For purposes of simplicity, various embodiments will now be described in which the system scans a plurality of emails associated with a data subject in order to identify one or more entities that the data subject no longer does business with. However, it should be understood that, in other embodiments, the same or similar techniques may be used in analyzing other types of electronic or other correspondence to identify entities that the data subject no longer does business with. For example, the system may analyze text messages, social media posts, scans of paper mail, or any other correspondence and/or other documents associated with the data subject to determine whether the data subject does business with particular entities. In various embodiments, the system bases this determination on its analysis of multiple different types of electronic correspondence between the data subject and one or more entities (which may include one-way correspondence in which the recipient of a particular correspondence doesn't respond, or two-way correspondence, in which the recipient of the correspondence responds to the correspondence).

Figure 41:
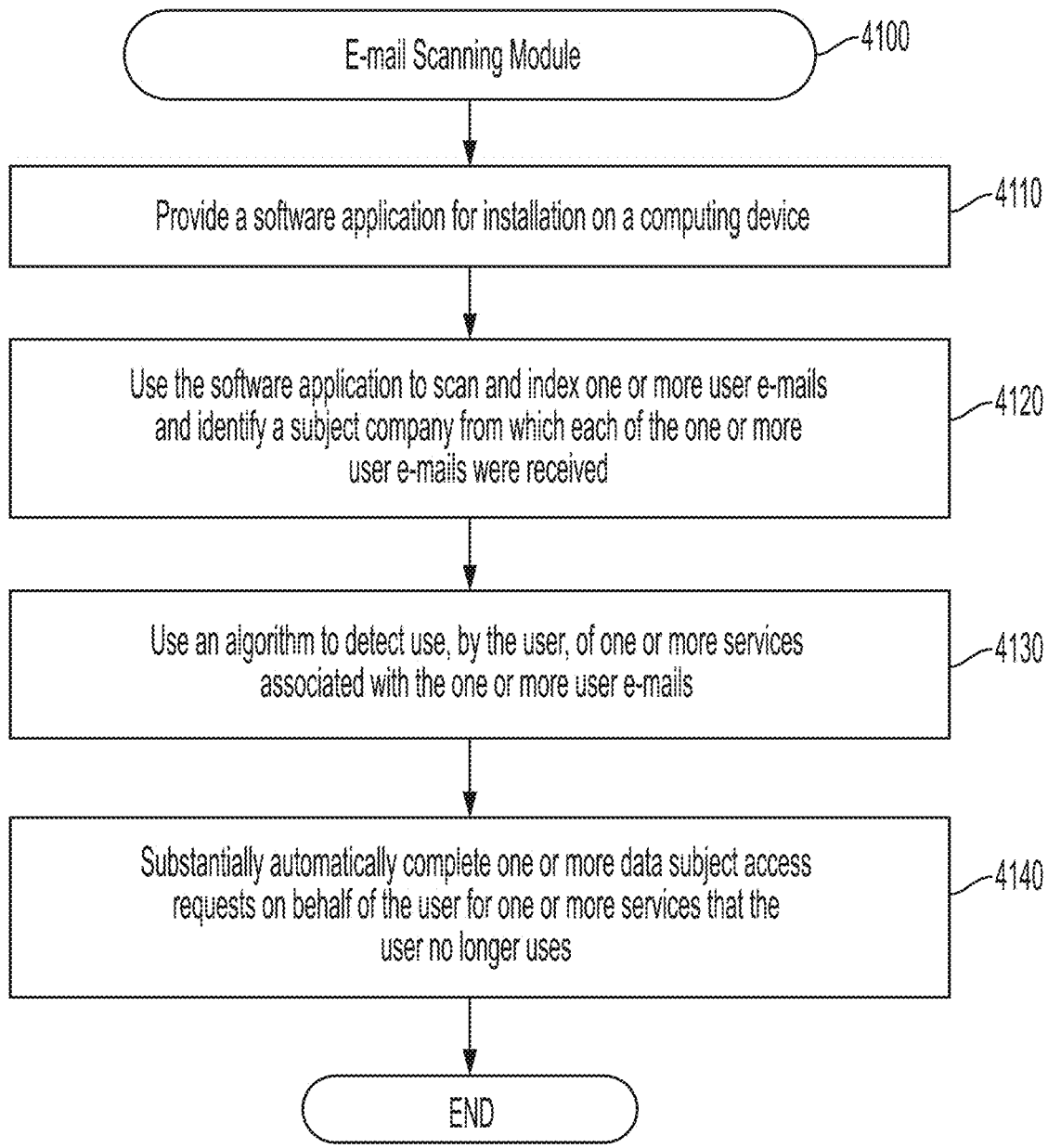
FIG. 41 is a flowchart showing an example of processes performed by an E-mail Scanning Module 4100 according to various embodiments.

In various embodiments, various functions performed by an E-mail Scanning System may be implemented via an E-mail Scanning Module 4100. FIG. 41 depicts an E-mail Scanning Module 4100 according to a particular embodiment, which may be executed, for example, on any of the servers 110, 120, 130, 160 shown in FIG. 1, or on one or more remote computing devices 150. When executing an exemplary E-mail Scanning Module 4100, the system begins, at Step 4110, by providing a software application for installation on a computing device. In particular embodiments, the software application may be configured to integrate with an e-mail service (e.g., gmail, yahoo, live, Microsoft Exchange, etc.) in order to provide access to a data subject's e-mail (e.g., a data subject's e-mail). In particular embodiments, the software application may be embodied as a software plugin that interfaces with a particular software application (e.g., Microsoft Outlook) in order to provide access to the data subject's e-mail to the systems. In other embodiments, the software application may be embodied as a browser plugin for use with a web browser to provide access to the data subject's web-based e-mail service. In particular embodiments, the system is configured to provide the software application for installation on a data subject's computing device (e.g., mobile computing device, etc.). In such embodiments, the software application may be embodied as a client-side software application that executes one or more of the processes described below on a client computing device (e.g., such as the data subject's computing device on which the data subject accesses his or her e-mails).

In still other embodiments, the system is configured to provide the software application for installation on one or more suitable servers (e.g., one or more suitable servers that host a particular e-mail service). In particular embodiments, for example, the system is configured to: (1) receive authorization from a data subject to access his or her e-mails; and (2) use a software application installed on one or more remote servers to perform one or more of the functions described below. In such embodiments, the system may be configured to provide the software application to the one or more remote servers. In particular other embodiments, the system may be at least partially integrated in one or more remote servers (e.g., via a direct server integration). In such embodiments, the system may be at least partially integrated with one or more remote e-mail servers (e.g., one or more remote servers that store and/or process a data subject's emails).

Returning to Step 4120, the system is configured to use the software application to scan and optionally index one or more data subject e-mails, and then analyze information derived from the emails to identify a subject entity (e.g., corporate or non-corporate entity) from which each of the one or more data subject e-mails was received by a data subject. The system may, for example, be configured to scan and/or index the data subject's emails to identify one or more subject entities as the sender of the emails. In particular embodiments, the one or more subject entities may include one or more subject entities (e.g., corporate entities) that would be required to respond to a data subject access request, if received from the data subject. For example, the one or more subject entities may include any subject company that collects, stores, or otherwise processes the data subject's personal data. The system may, for example, be configured to identify particular e-mails of the data subject's indexed e-mails that were received from any suitable entity (e.g., Target, Home Depot, etc.). The system may, for example, scan an e-mail's subject field, body, sender, etc. to identify, for example: (1) a name of the subject company; (2) an e-mail domain associated with the subject company; and/or (3) any other suitable information which may identify the subject entity as the sender of the e-mail.

In some embodiments, the system may be configured to identify e-mail messages from a subject entity based at least in part on an email mailbox in which the messages are located in the data subject's e-mail account. For example, the data subject's e-mail account may already pre-sort incoming messages into one or more categories (e.g., which may include, for example, a promotions category, a junk category, etc.). In such embodiments, the system may be configured to limit the one or more e-mails that the system scans and/or indexes to e-mails that have been identified as promotional in nature (or that have been placed into any other pre-defined category, such as Spam) by the data subject's e-mail service.

Continuing to Step 4130, the system is configured to use an algorithm to determine whether the data subject actively does business with the entity. In particular embodiments, the system is configured to make this determination based at least in part on (e.g., partially or entirely on): (1) whether the data subject opens any of the one or more e-mails received from the subject company; (2) how long the data subject spends reviewing one or more of the e-mails that the data subject does open from the subject company; (3) whether the data subject deletes one or more of the e-mails from the subject company without reading them; (4) what portion (e.g., percentage) of e-mails received from the subject company the data subject opens; (5) whether the data subject selects one or more links contained in one or more e-mails received from the subject company; (6) how much time the data subject spends viewing a website to which a link is provided in the one or more e-mails from the subject company; (7) whether the data subject has set up a rule (e.g., a software-based rule) to auto-delete or block emails from the subject company; (8) whether the data subject has set up a rule (e.g., a software-based rule) to redirect emails received from the subject company to a specific folder or other location (e.g., a folder designated for commercial correspondence, or a folder designated for unwanted correspondence); (9) whether the data subject has submitted a request to the particular entity for the particular entity not to send emails to the data subject; (10) whether the data subject has submitted a request to the particular entity for the particular entity not to send text messages to the data subject; (11) whether the data subject has submitted a request to the particular entity for the particular entity not to call the data subject; and/or (12) any other suitable information related to the data subject's use of one or more services, or purchase of goods, related to the one or more e-mails or other electronic correspondence received by the data subject from the subject company. In particular embodiments, the system is configured to automatically (e.g., using one or more computer processors) determine the information of any of the items listed above (e.g., whether the data subject has set up a rule to redirect emails received from the subject company to a specific folder) using any suitable technique.

As noted above, the system may, in addition, or alternatively, make the determination described above by analyzing electronic correspondence other than emails, such as texts, social media postings, etc. that involve the data subject and the entity. For example, the system may determine that the data subject no longer actively does business with a particular entity if the data subject configures software (e.g., messaging software on the data subject's smartphone) to block texts from the particular entity.

In various embodiments, the system is configured to utilize an algorithm that takes into account one or more of the various factors discussed above to determine whether the data subject still actively does business with the subject entity (e.g., and therefore would likely be interested in continuing to receive e-mails from the subject company). In doing so, the system may assign any appropriate value to each of the factors in determining whether to determine that the data subject no longer does business with the subject entity. Similarly, the system may allow the calculation to be customized by allowing users to assign weighting factors to each particular variable.

As a simple example, the system may use the following formula to determine whether the data subject does business with a particular entity:

$$\text{Data Subject Disengagement Rating} = (\text{Emails Opened Value}) + (\text{Texts Read Value}) + (\text{Emails Automatically Deleted Value}) + (\text{Texts Blocked Value})$$

In a particular example, the system is configured to determine that the data subject no longer actively does business with the entity if the Data Subject Disengagement Rating is above 80. In this example, the system may assign: (1) a value of 80 to the Emails Read Value if the data subject opens fewer than 5% of emails received from the from the entity; (2) a value of 50 to the Emails Read Value if the data subject opens between 5%-25% of emails received from the entity; and (3) a value of 0 to the Emails Read Value if the data subject opens over 25% of emails received from the from the entity. The system may assign similar values to the other variables based on the user's other email and text related activities. For example, the system may assign a value of 100 to Text Blocked Value if the data subject has actively blocked (e.g., via software instructions) texts from the entity, and a value of 0 to Text Blocked Value if the data subject has not actively blocked texts from the entity. Similarly, the system may assign a value of 100 to Emails Automatically Deleted Value if the data subject has set software to automatically delete (e.g., immediately delete or route to a junk folder) emails from the entity, and a value of 0 to Emails Automatically Deleted Value if the data subject has not initiated such a setting.

As noted above, the system may allow users to customize the calculation above by assigning a weighting value to any of the values included in the Data Subject Disengagement Rating calculation. For example, the system may allow the user to assign a weighting value of 1.2 to Emails Opened Value if that particular user believes that this factor should be weighted 20% higher than usual in the calculation.

In various embodiments, the system is configured to, in response to determining that the data subject no longer actively does business with the entity, automatically generate, populate, and/or submit a data subject access request to the entity. In various embodiments, the data subject access request may include: (1) a request to delete some or all of the data subject's personal data that is being processed by the entity (e.g., in the form of a "right to be forgotten" request); (2) a request to rectify inaccurate personal data of the data subject that is being processed by the entity; (3) a request to access of a copy of personal information of the data subject processed by the entity; (4) a request to restrict the processing of the data subject's data by the entity; and/or (5) a request to transfer the data subject's data from the entity to a specified controller.

As a particular example, the system may generate a focused request to have the entity delete all of the data subject's personal data that the entity is processing in conjunction with a particular service offered by the entity. For example, at Step 4140, the system is configured to substantially automatically complete one or more data subject access requests on behalf of the data subject for one or more services that the data subject no longer uses.

Figure 42:
FIG. 42 depicts an exemplary screen display and graphical user interface (GUI) according to various embodiments of the system, which may display information associated with the system or enable access to, or interaction with, the system by one or more users.

FIG. 42 depicts an exemplary data subject access request form that the system may substantially automatically generate, complete and/or submit for the data subject on the data subject's behalf. As shown in this figure, the system may complete information such as, for example: (1) what type of requestor the data subject is (e.g., employee, customer, etc.); (2) what the request involves (e.g., deleting data, etc.); (3) the requestor's first name; (4) the requestor's last name; (5) the requestor's email address; (6) the requestor's telephone number; (7) the requestor's home address; and/or (8) one or more details associated with the request. In particular embodiments, the system is configured to use an index of information about a particular entity or service to automate filling out the data subject access request.

In various embodiments, the system may receive at least some data from the data subject in order to complete the data subject access request. In other embodiments, the system is configured to scan one or more e-mails from the subject company to obtain one or more particular pieces of information for use in filling out the data subject access request (e.g., by identifying a shipping address in a particular e-mail, billing address, first name, last name, and/or phone number of the data subject from a previous order that the data subject placed with the subject company, etc.). In particular embodiments, the system may automatically identify all of the information needed to populate the data subject access request by identifying the information from within one or more individual electronic correspondence associated with the data subject (e.g., one or more texts or emails from the entity to the data subject).

In particular embodiments, the system may be configured to send a message to the data subject (e.g., via e-mail) prior to automatically completing the data subject access request. The message may, for example, require the data subject to confirm that the data subject would like the system to complete the request on the data subject's behalf. In various embodiments, in response to the data subject confirming that the data subject would like the system to complete the request, the system automatically populates the request and submits the request to the entity on the data subject's behalf.

In other embodiments, the system may automatically submit the request without explicit authorization from the data subject (e.g., the data subject may have provided a blanket authorization for submitting such requests when configuring the system's settings.)

In some embodiments, the Email Scanning System may comprise a third party system that is independent from the one or more subject entities. In such embodiments, the Email Scanning System may be implemented as part of a service for data subjects who may desire to exercise one or more privacy rights, but who aren't necessarily aware of which companies may be storing or processing their personal data, or who don't want to spend the time to submit data subject access requests manually. Similarly, various embodiments of the system may be implemented as part of a service that advantageously provides a data subject with an automated way of submitting data subject access requests to subject companies whose services the data subject no longer uses.

In still other embodiments, the system may be provided by a subject entity (e.g., company) for use by data subjects. Because subject companies are subject to requirements (e.g., in the form of laws and regulations) related to the storage and processing of personal data, it may benefit the subject company to no longer burden itself with storing or processing data related to a data subject that is no longer purchasing the subject entity's goods or utilizing the subject entity's services (e.g., that is no longer actively engaged with the entity). In such embodiments, the system may be configured to: (1) substantially automatically submit the data subject access request; and (2) respond to and fulfill the data subject access request (e.g., the same system or related systems utilized by a particular subject entity may be configured to both submit and fulfill the data subject access request). In other embodiments, the subject entity may unilaterally modify (e.g., edit or delete) the data subject's personal data within one or more of its systems in response to determining that the data subject does not actively do business with the subject entity.

In particular embodiments for example, in response to the system submitting a request to delete the data subject's personal data from a subject entity's systems, the system may: (1) automatically determine where the data subject's personal data, which is processed by the subject entity, is stored; and (2) in response to determining the location of the data (e.g., which may be on multiple computing systems), automatically facilitate the deletion of the data subject's personal data from the various systems (e.g., by automatically assigning one or more tasks to delete data across one or more computer systems to effectively delete the data subject's personal data from the systems). In particular embodiments, the step of facilitating the deletion of the personal data may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Automated Data Subject Verification

In various embodiments, before a data subject request can be processed, the data subject's identity may need to be verified. In various embodiments, the system provides a mechanism to automatically detect the type of authentication required for a particular data subject based on the type of Data Subject Access Request being made and automatically issues a request to the data subject to verify their identity against that form of identification. For example, a subject rights request might only require two types of authentication, but a deletion request may require four types of data to verify authentication. The system may automatically detect which is type of authentication is required based on the DSAR and send an appropriate request to the data subject to verify their identity.

Stated more particularly, when processing a data subject access request, the system may be configured to verify an identity of the data subject prior to processing the request (e.g., or as part of the processing step). In various embodiments, confirming the identity of the data subject may, for example, limit a risk that a third-party or other entity may gain unlawful or unconsented to access to the requestor's personal data. The system may, for example, limit processing and fulfillment of requests relating to a particular data subject to requests that are originated by (e.g., received from) the particular data subject. When processing a data subject access request, the system may be configured to use various reasonable measures to verify the identity of the data subject who requests access (e.g., in particular in the context of online services and online identifiers). In particular embodiments, the system is configured to substantially automatically validate an identity of a data subject when processing the data subject access request.

For example, in particular embodiments, the system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc. Various exemplary techniques for authenticating a data subject are discussed more fully below.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In various embodiments, the system is configured to interface with (e.g., transmit a search request to) one or more credit reporting agencies (e.g., Experian, Equifax, TransUnion, etc.) to confirm that a person with one or more characteristics provided by the data subject exists. The system may, for example, interface with such credit reporting agencies via a suitable plugin (e.g., software plugin). Additionally, there might be a verification on behalf of a trusted third-party system (e.g., the controller).

In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. The system may be configured to interface with one or more such third-party systems to confirm that a person with one or more characteristics provided by the data subject exists.

After the step of confirming the existence of a person with the one or more characteristics provided by the data subject, the system may be configured to confirm that the person making the data subject access request is, in fact, the data subject. The system may, for example, verify that the requestor is the data subject by prompting the requestor to answer one or more knowledge-based authentication questions (e.g., out-of-wallet questions). In particular embodiments, the system is configured to utilize one or more third-party services as a source of such questions (e.g., any of the suitable third-party sources discussed immediately above). The system may use third-party data from the one or more third-party sources to generate one or more questions. These one or more questions may include questions that a data subject should know an answer to without knowing the question ahead of time (e.g., one or more previous addresses, a parent or spouse name and/or maiden name, etc.).

FIG. 46 depicts an exemplary identity verification questionnaire. As may be understood from this figure, an identity verification questionnaire may include one or more questions whose responses include data that the system may derive from one or more credit agencies or other third-party data aggregation services (e.g., such as previous street addresses, close associates, previous cities lived in, etc.). In particular embodiments, the system is configured to provide these one or more questions to the data subject in response to receiving the data subject access request. In other embodiments, the system is configured to prompt the data subject to provide responses to the one or more questions at a later time (e.g., during processing of the request). In particular other embodiments, the system is configured to substantially automatically compare one or more pieces of information provided as part of the data subject access request to one or more pieces of data received from a third-party data aggregation service in order to substantially automatically verify the requestor's identity.

In still other embodiments, the system may be configured to prompt a requestor to provide one or more additional pieces of information in order to validate the requestor's identity. This information may include, for example: (1) at least a portion of the requestor's social security number (e.g., last four digits); (2) a name and/or place of birth of the requestor's father; (3) a name, maiden name, and/or place of birth of the requestor's mother; and/or (4) any other information which may be useful for confirming the requestor's identity (e.g., such as information available on the requestor's birth certificate). In other embodiments, the system may be configured to prompt the requestor to provide authorization for the company to check the requestor's social security or other private records (e.g., credit check authorization, etc.) to obtain information that the system may use to confirm the requestor's identity. In other embodiments, the system may prompt the user to provide one or more images (e.g., using a suitable mobile computing device) of an identifying document (e.g., a birth certificate, social security card, driver's license, etc.).

The system may, in response to a user providing one or more responses that matches information that the system receives from one or more third-party data aggregators or through any other suitable background, credit, or other search, substantially automatically authenticate the requestor as the data subject. The system may then continue processing the data subject's request, and ultimately fulfill their request.

In particular embodiments, such as embodiments in which the requestor includes a business (e.g., as in a business to business data subject access request), the system may be configured to authenticate the requesting business using one or more company verification techniques. These one or more company validation techniques may include, for example, validating a vendor contract (e.g., between the requesting business and the company receiving the data subject access request); receiving a matching token, code, or other unique identifier provided by the company receiving the data subject access request to the requesting business; receiving a matching file in possession of both the requesting business and the company receiving the data subject access request; receiving a signed contract, certificate (e.g., digital or physical), or other document memorializing an association between the requesting business and the company receiving the data subject access request; and/or any other suitable method of validating that a particular request is actually made on behalf of the requesting business (e.g., by requesting the requesting business to provide one or more pieces of information, one or more files, one or more documents, etc. that may only be accessible to the requesting business).

In other embodiments, the system may be configured to authenticate a request via integration with a company's employee or customer (e.g., consumer) authentication process. For example, in response to receiving a data subject access request that indicates that the data subject is an employee of the company receiving the data subject access request, the system may be configured to prompt the employee to login to the company's employee authentication system (e.g., Okta, Azure, AD, etc.) In this way, the system may be configured to authenticate the requestor based at least in part on the requestor successfully logging into the authentication system using the data subject's credentials. Similarly, in response to receiving a data subject access request that indicates that the data subject is a customer of the company receiving the data subject access request, the system may be configured to prompt the customer to login to an account associated with the company (e.g., via a consumer portal authentication process). In a particular example, this may include, for example, an Apple ID (for data subject access requests received by Apple). In this way, the system may be configured to authenticate the requestor based at least in part on the requestor successfully logging into the authentication system using the data subject's credentials. In some embodiments, the system may be configured to require the requestor to login using two-factor authentication or other suitable existing employee or consumer authentication process.

Data Subject Blacklist

In various embodiments, a particular organization may not be required to respond to a data subject access request that originates (e.g., is received from) a malicious requestor. A malicious requestor may include, for example: (1) a requestor (e.g., an individual) that submits excessive or redundant data subject access requests; (2) a group of requestors such as researchers, professors, students, NGOs, etc. that submit a plurality of requests for reasons other than those reasons provided by policy, law, etc.; (3) a competitor of the company receiving the data subject access request that is submitting such requests to tie up the company's resources unnecessarily; (4) a terrorist or other organization that may spam requests to disrupt the company's operation and response to valid requests; and/or (5) any other request that may fall outside the scope of valid requests made for reasons proscribed by public policy, company policy, or law. In particular embodiments, the system is configured to maintain a blacklist of such malicious requestors.

In particular embodiments, the system is configured to track a source of each data subject access request and analyze each source to identify sources from which: (1) the company receives a large volume of requests; (2) the company receives a large number of repeat requests; (3) etc. These sources may include, for example: (1) one or more particular IP addresses; (2) one or more particular domains; (3) one or more particular countries; (4) one or more particular institutions; (5) one or more particular geographic regions; (6) etc. In various embodiments, in response to analyzing the sources of the requests, the system may identify one or more sources that may be malicious (e.g., are submitting excessive requests).

In various embodiments, the system is configured to maintain a database of the identified one or more sources (e.g., in computer memory). In particular embodiments, the database may store a listing of identities, data sources, etc. that have been blacklisted (e.g., by the system). In particular embodiments, the system is configured to, in response to receiving a new data subject access request, cross reference the request with the blacklist to determine if the requestor is on the blacklist or is making the request from a blacklisted source. The system may then, in response to determining that the requestor or source is blacklisted, substantially automatically reject the request. In particular embodiments, the blacklist cross-referencing step may be part of the requestor authentication (e.g., verification) discussed above. In various embodiments, the system may be configured to analyze request data on a company by company basis to generate a blacklist. In other embodiments, the system may analyze global data (e.g., all data collected for a plurality of companies that utilize the data subject access request fulfillment system) to generate the blacklist.

In particular embodiments, the system may be configured to fulfill data subject access requests for the purpose of providing a data subject with information regarding what data the company collects and for what purpose, for example, so the data subject can ensure that the company is collecting data for lawful reasons. As such, the system may be configured to identify requestors and other sources of data requests that are made for other reasons (e.g., one or more reasons that would not obligate the company to respond to the request). These reasons may include, for example, malicious or other reasons such as: (1) research by an academic institution by one or more students or professors; (2) anticompetitive requests by one or more competitors; (3) requests by disgruntled former employees for nefarious reasons; (4) etc.

In particular embodiments, the system may, for example, maintain a database (e.g., in computer memory) of former employees. In other embodiments, the system may, for example: (1) identify a plurality of IP addresses associated with a particular entity (e.g., academic organization, competitor, etc.); and (2) substantially automatically reject a data subject access request that originates from the plurality of IP addresses. In such embodiments, the system may be configured to automatically add such identified IP addresses and/or domains to the blacklist.

In still other embodiments, the system is configured to maintain a listing of blacklisted names of particular individuals. These may include, for example, one or more individuals identified (e.g., by an organization or other entity) as submitting malicious data subject access requests).

Figure 47:
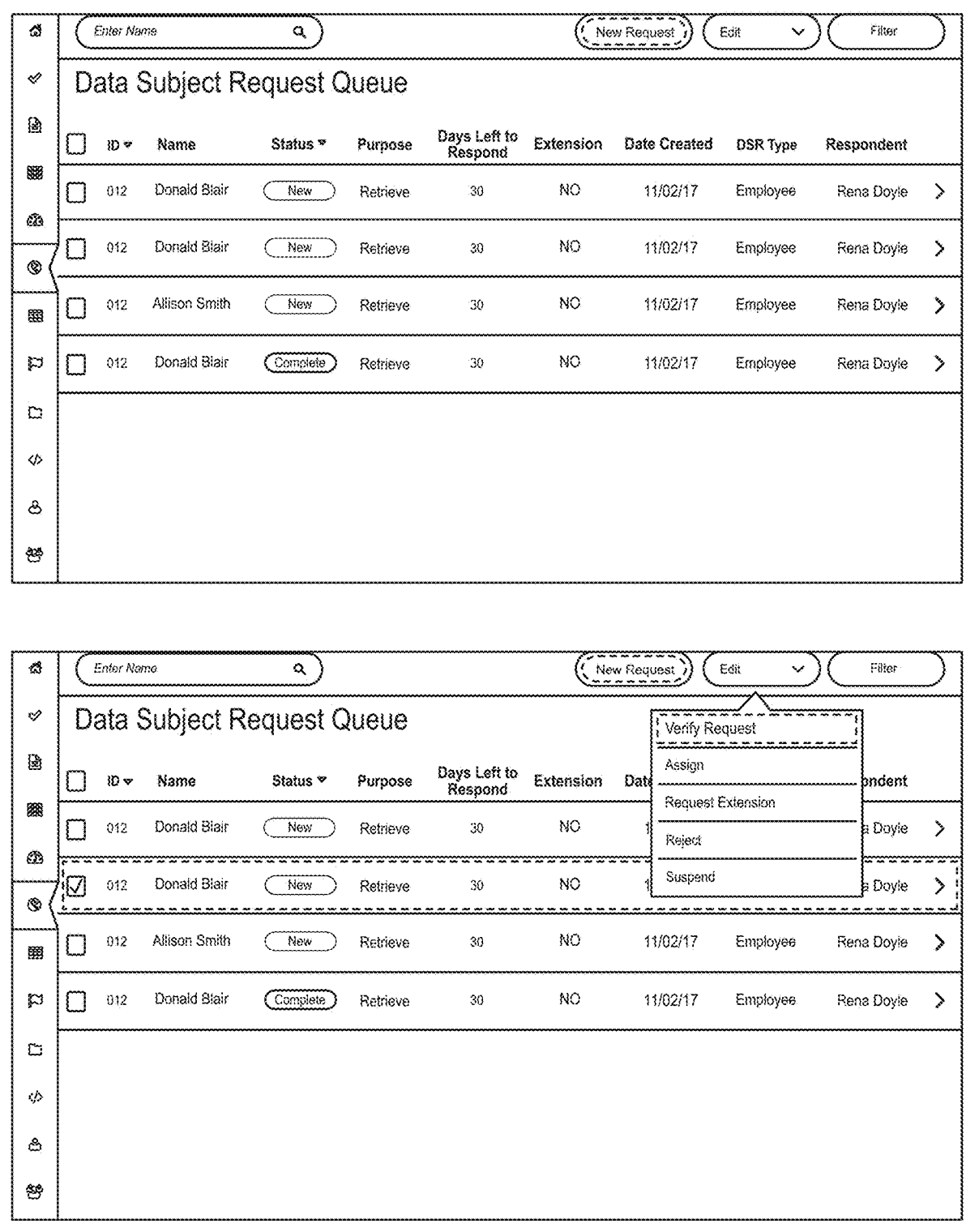
Figure 48:
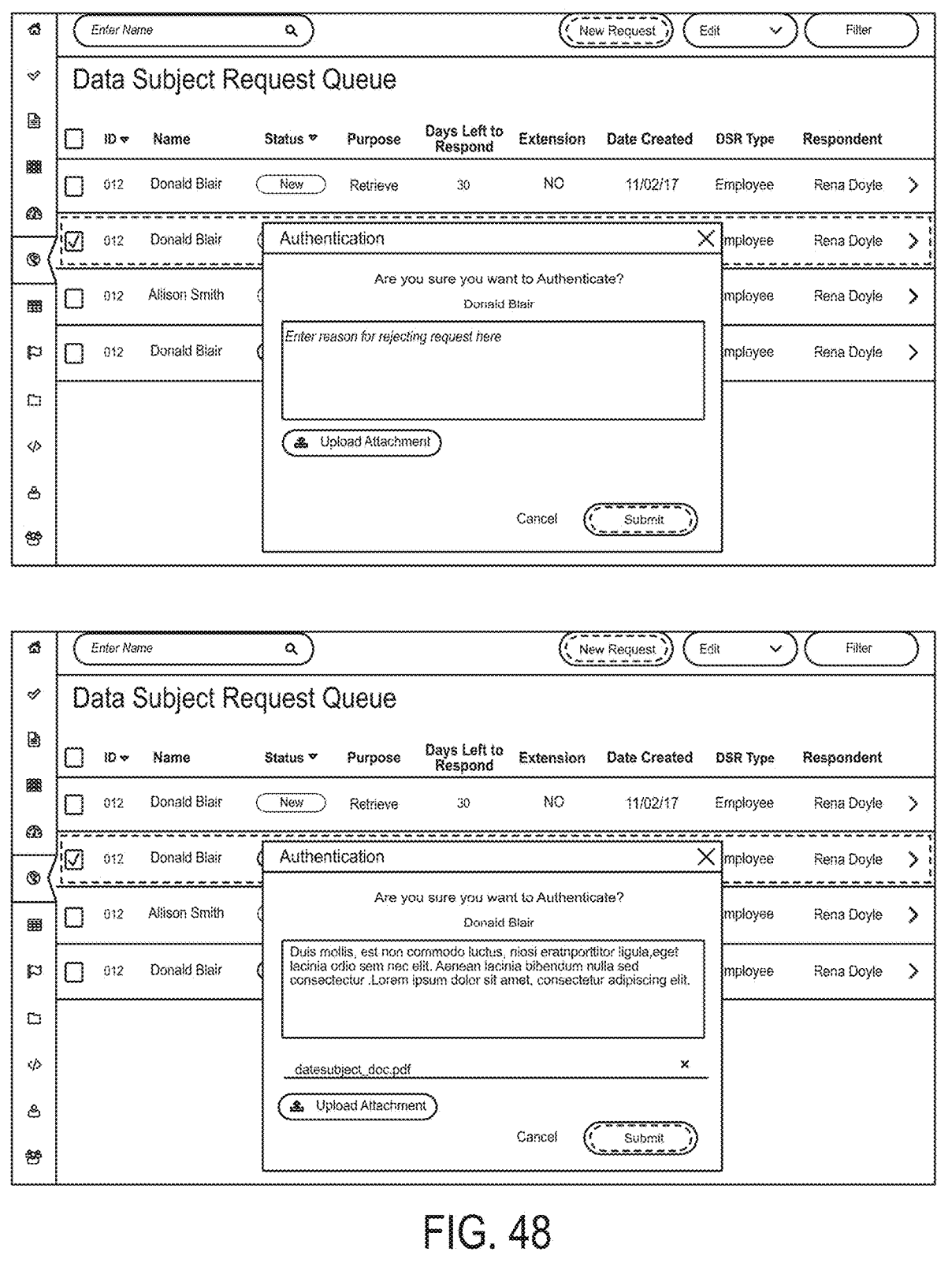

FIG. 47 depicts a queue of pending data subject access requests. As shown in this figure, the first three listed data subject access requests are new and require verification before processing and fulfillment can begin. As shown in this figure, a user (e.g., such as a privacy officer or other privacy controller) may select a particular request, and select an indicia for verifying the request. The user may also optionally select to reject the request. FIG. 48 depicts an authentication window that enables the user to authenticate a particular request. In various embodiments, the user may provide an explanation of why the user is authenticating the request (e.g., because the requestor successfully completed on or more out-of-wallet questions or for any other suitable reason). The user may further submit one or more attachments to support the verification. In this way, the system may be configured to document that the authentication process was performed for each request (e.g., in case there was an issue with improperly fulfilling a request, the company could show that they are following procedures to prevent such improper processing). In other embodiments, the system may enable the user to provide similar support when rejecting a request (e.g., because the requestor was blacklisted, made excessive requests, etc.).

Data Subject Access Request Fulfillment Cost Determination

In various embodiments, as may be understood in light of this disclosure, fulfilling a data subject access request may be particularly costly. In some embodiments, a company may store data regarding a particular data subject in multiple different locations for a plurality of different reasons as part of a plurality of different processing and other business activities. For example, a particular data subject may be both a customer and an employee of a particular company or organization. Accordingly, in some embodiments, fulfilling a data subject access request for a particular data subject may involve a plurality of different information technology (IT) professionals in a plurality of different departments of a particular company or organization. As such, it may be useful to determine a cost of a particular data subject access request (e.g., particularly because, in some cases, a data subject is entitled to a response to their data subject access request as a matter of right at no charge).

In particular embodiments, in response to receiving a data subject access request, the system may be configured to: (1) assign the request to at least one privacy team member; (2) identify one or more IT teams required to fulfill the request (e.g., one or more IT teams associated with one or more business units that may store personal data related to the request); (3) delegate one or more subtasks of the request to each of the one or more IT teams; (4) receive one or more time logs from each individual involved in the processing and fulfillment of the data subject access request; (5) calculate an effective rate of each individual's time (e.g., based at least in part on the individual's salary, bonus, benefits, chair cost, etc.); (6) calculate an effective cost of fulfilling the data subject access request based at least in part on the one or more time logs and effective rate of each of the individual's time; and (7) apply an adjustment to the calculated effective cost that accounts for one or more external factors (e.g., overhead, etc.) in order to calculate a cost of fulfilling the data subject access request.

In particular embodiments, the system is configured to substantially automatically track an amount of time spent by each individual involved in the processing and fulfillment of the data subject access request. The system may, for example, automatically track an amount of time between each individual opening and closing a ticket assigned to them as part of their role in processing or fulfilling the data subject access request. In other embodiments, the system may determine the time spent based on an amount of time provided by each respective individual (e.g., the individual may track their own time and submit it to the system).

In various embodiments, the system is configured to measure a cost of each particular data subject access request received, and analyze one or more trends in costs of, for example: (1) data subject access requests over time; (2) related data subject access requests; (3) etc. For example, the system may be configured to track and analyze cost and time-to-process trends for one or more social groups, one or more political groups, one or more class action groups, etc. In particular, the system may be configured to identify a particular group from which the system receives particularly costly data subject access request (e.g., former and/or current employees, members of a particular social group, members of a particular political group, etc.).

In particular embodiments, the system may be configured to utilize data subject access request cost data when processing, assigning, and/or fulfilling future data subject access requests (e.g., from a particular identified group, individual, etc.). For example, the system may be configured to prioritize requests that are expected to be less costly and time-consuming (e.g., based on past cost data) over requests identified as being likely more expensive. Alternatively, the system may prioritize more costly and time-consuming requests over less costly ones in the interest of ensuring that the system is able to respond to each request in a reasonable amount of time (e.g., within a time required by law, such as a thirty day period, or any other suitable time period).

Customer Satisfaction Integration with Data Subject Access Requests

In various embodiments, the system may be configured to collect customer satisfaction data, for example: (1) as part of a data subject access request submission form; (2) when providing one or more results of a data subject access request to the data subject; or (3) at any other suitable time. In various embodiments, the customer satisfaction data may be collected in the form of a suitable survey, free-form response questionnaire, or other suitable satisfaction data collection format (e.g., thumbs up vs. thumbs down, etc.).

Figure 49:
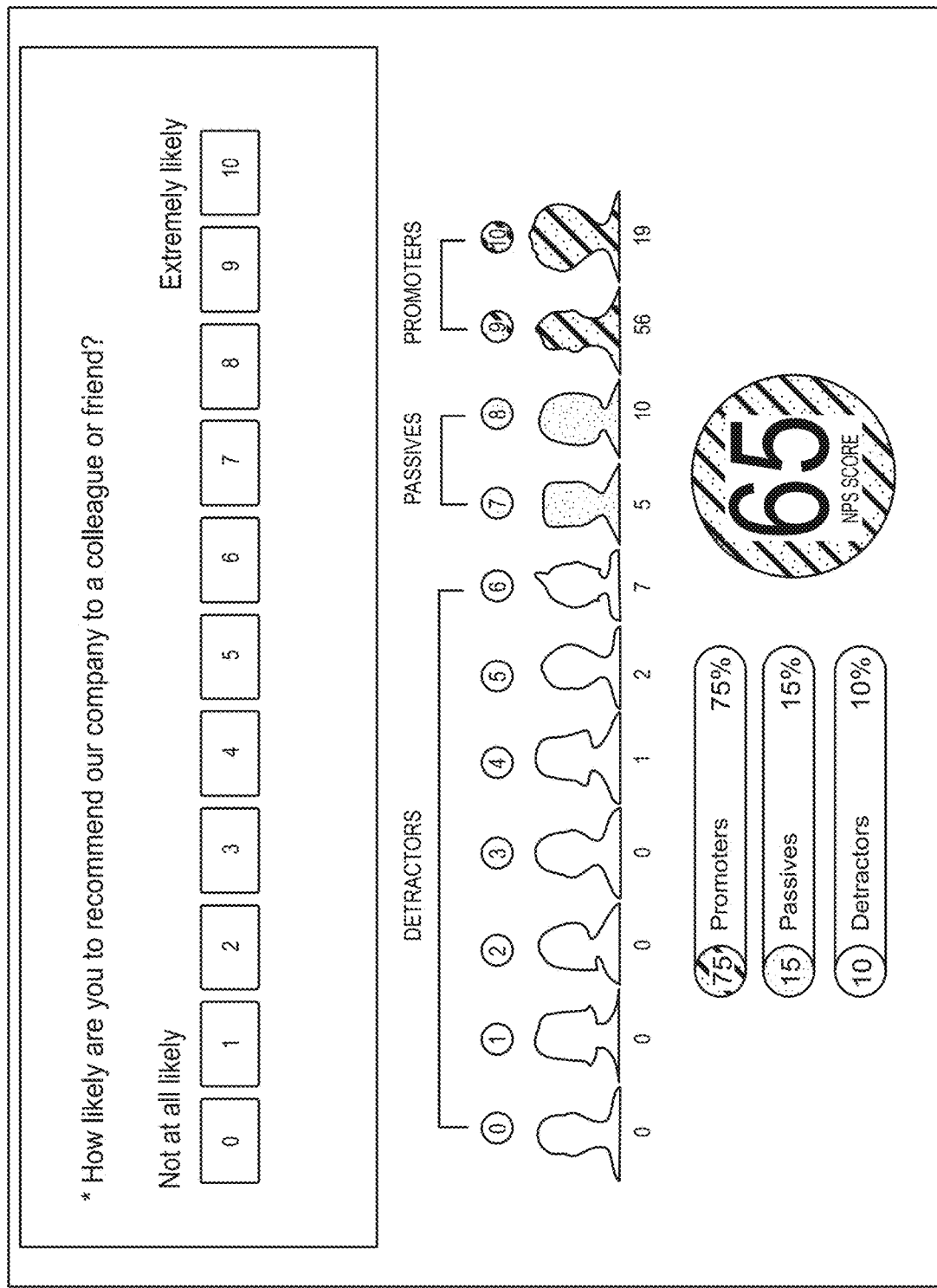

FIG. 49 depicts an exemplary customer satisfaction survey that may be included as part of a data subject access request form, provided along with the results of a data subject access request, provided in one or more messages confirming receipt of a data subject access request, etc. As shown in the figure, the customer satisfaction survey may relate to how likely a customer (e.g., a data subject) is to recommend the company (e.g., to which the data subject has submitted the request) to a friend (e.g., or colleague). In the example shown in FIG. 49, the satisfaction survey may relate to a Net Promoter score (NPS), which may indicate a loyalty of a company's customer relationships. Generally speaking, the Net Promoter Score may measure a loyalty that exists between a provider and a consumer. In various embodiments, the provider may include a company, employer, or any other entity. In particular embodiments, the consumer may include a customer, employee, or other respondent to an NPS survey.

In particular embodiments, the question depicted in FIG. 49 is the primary question utilized in calculating a Net Promoter Score (e.g., "how likely is it that you would recommend our company/product/service to a friend or colleague?"). In particular embodiments, the question is presented with responses ranging from 0 (not at all likely) to 10 (extremely likely). In particular embodiments, the question may include any other suitable scale. As may be understood from FIG. 49, the system may be configured to assign particular categories to particular ratings on the 10 point scale. The system may be configured to track and store responses provided by consumers and calculate an overall NPS score for the provider. The system may be further configured to generate a visual representation of the NPS score, including a total number of responses received for each particular score and category as shown in FIG. 49.

In various embodiments, the system may be configured to measure data related to any other suitable customer satisfaction method (e.g., in addition to NPS). By integrating a customer satisfaction survey with the data subject access request process, the system may increase a number of consumers that provide one or more responses to the customer satisfaction survey. In particular embodiments, the system is configured to require the requestor to respond to the customer satisfaction survey prior to submitting the data subject access request.

Identifying and Deleting Orphaned Data

In particular embodiments, an Orphaned Data Action System is configured to analyze one or more data systems (e.g., data assets), identify one or more pieces of personal data that are one or more pieces of personal data that are not associated with one or more privacy campaigns of the particular organization, and notify one or more individuals of the particular organization of the one or more pieces of personal data that are one or more pieces of personal data that are not associated with one or more privacy campaigns of the particular organization. In various embodiments, one or more processes described herein with respect to the orphaned data action system may be performed by any suitable server, computer, and/or combination of servers and computers.

Figure 50:
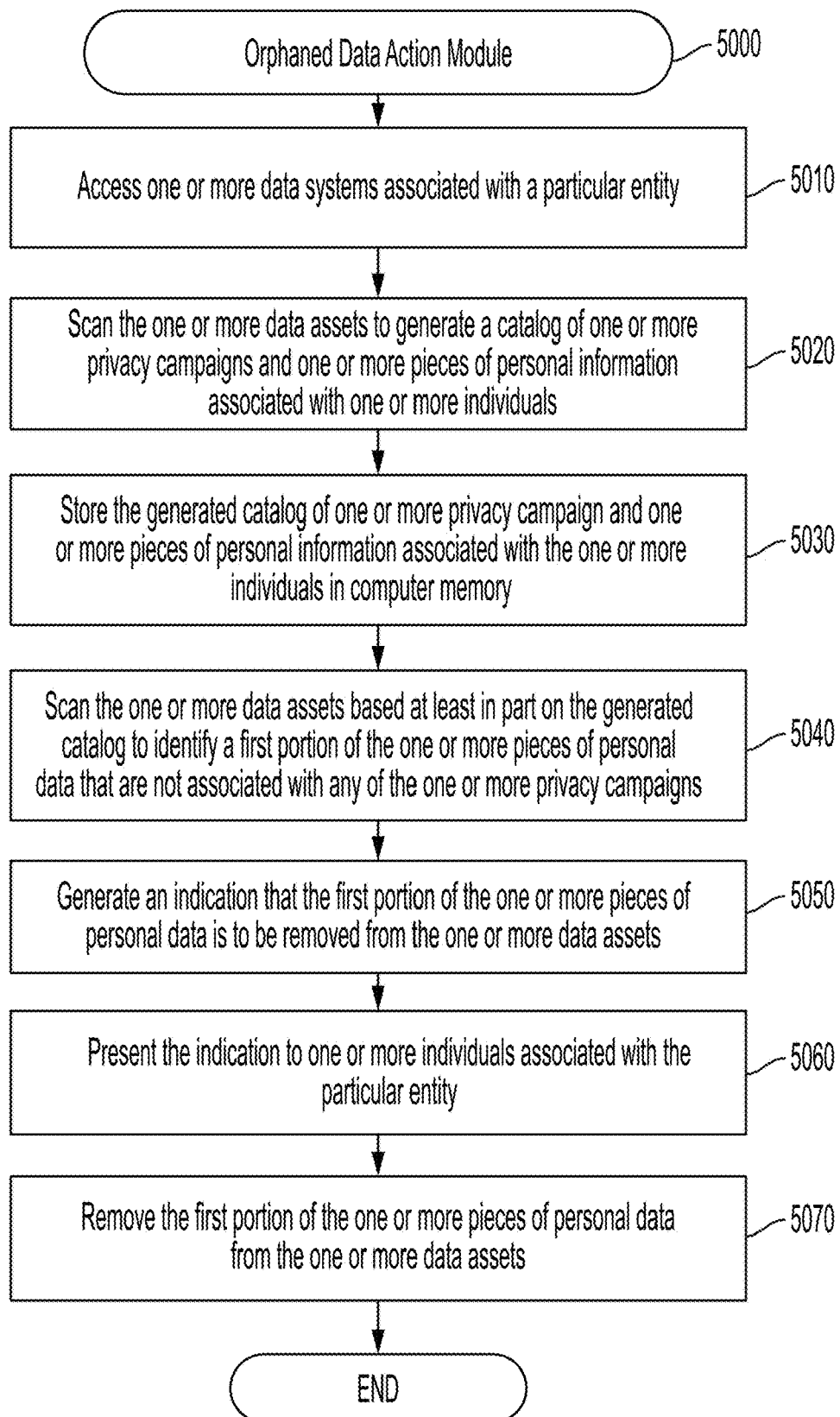
FIG. 50 is a flowchart showing an example of processes performed by an Orphaned Data Action Module 5000 according to various embodiments.

Various processes performed by the Orphaned Data Action System may be implemented by an Orphaned Data Action Module 5000. Referring to FIG. 50, in particular embodiments, the system, when executing the Orphaned Data Action Module 5000, is configured to: (1) access one or more data assets of a particular organization; (2) scan the one or more data assets to generate a catalog of one or more privacy campaigns and one or more pieces of personal information associated with one or more individuals; (3) store the generated catalog in computer memory; (4) scan one or more data assets based at least in part on the generated catalog to identify a first portion of the one or more pieces of personal data that are one or more pieces of personal data that are not associated with the one or more privacy campaigns; (5) generate an indication that the first portion of one or more pieces of personal data that are not associated with the one or more privacy campaigns of the particular organization is to be removed from the one or more data assets; (6) present the indication to one or more individuals associated with the particular organization; and (7) remove the first portion of the one or more pieces of personal data that are not associated with the one or more privacy campaigns of the particular organization from the one or more data assets.

When executing the Orphaned Data Action Module 5000, the system begins, at Step 5010, by accessing one or more data systems associated with the particular entity. The particular entity may include, for example, a particular organization, company, sub-organization, etc. In particular embodiments, the one or more data assets (e.g., data systems) may include, for example, any entity that collects, processes, contains, and/or transfers data (e.g., a software application, "internet of things" computerized device, database, website, data-center, server, etc.). For example, a data asset may include any software or device utilized by a particular entity for data collection, processing, transfer, storage, etc.

In particular embodiments, the system is configured to identify and access the one or more data assets using one or more data modeling techniques. As discussed more fully above, a data model may store the following information: (1) the entity that owns and/or uses a particular data asset; (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify and access the one or more data assets associated with the particular entity.

Continuing to Step 5020, the system is configured to scan the one or more data assets to generate a catalog of one or more privacy campaigns and one or more pieces of personal information associated with one or more individuals. The catalog may include a table of the one or more privacy campaigns within the data assets of the particular entity and, for each privacy campaign, the one or more pieces of personal data stored within the data assets of the particular entity that are associated with the particular privacy campaign. In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some implementations, the system may access, via one or more computer networks, one or more data models that map an association between one or more pieces of personal data stored within one or more data assets of the particular entity and one or more privacy campaigns of the particular entity. As further described herein, the data models may access the data assets of the particular entity and use one or more suitable data mapping techniques to link, or otherwise associate, the one or more pieces of personal data stored within one or more data assets of the particular entity and one or more privacy campaigns of the particular entity. In some implementations, the one or more data models may link, or otherwise associate, a particular individual and each piece of personal data of that particular individual that is stored on one or more data assets of the particular entity.

In some embodiments, the system is configured to generate and populate a data model based at least in part on existing information stored by the system (e.g., in one or more data assets), for example, using one or more suitable scanning techniques. In still other embodiments, the system is configured to access an existing data model that maps personal data stored by one or more organization systems to particular associated processing activities. In some implementations, the system is configured to generate and populate a data model substantially on the fly (e.g., as the system receives new data associated with particular processing activities). For example, a particular processing activity (e.g., privacy campaign) may include transmission of a periodic advertising e-mail for a particular company (e.g., a hardware store). A data model may locate the collected and stored email addresses for customers that elected to receive (e.g., consented to receipt of) the promotional email within the data assets of the particular entity, and then map each of the stored email addresses to the particular processing activity (i.e., the transmission of a periodic advertising e-mail) within the data assets of the particular entity.

Next, at Step 5030, the system is configured to store the generated catalog of one or more privacy campaigns and one or more pieces of personal information associated with one or more individuals. In some implementations, the system may receive an indication that a new processing activity (e.g., privacy campaign) has been launched by the particular entity. In response to receiving the indication, the system may modify the one or more data models to map an association between (i) one or more pieces of personal data associated with one or more individuals obtained in connection with the new privacy campaign and (ii) the new privacy campaign initiated by the particular entity. As the system receives one or more pieces of personal data associated with one or more individuals (e.g., an email address signing up to receive information from the particular entity), then the data model associated with the particular processing activity may associate the received personal data with the privacy campaign. In some implementations, one or more data assets may already include the particular personal data (e.g., email address) because the particular individual, for example, previously provided their email address in relation to a different privacy campaign of the particular entity. In response, the system may access the particular personal data and associate that particular personal data with the new privacy campaign.

At Step 5040, the system is configured to scan one or more data assets based at least in part on the generated catalog to identify a first portion of the one or more pieces of personal data that are one or more pieces of personal data that are not associated with the one or more privacy campaigns. In various embodiments, the system may use the generated catalogue to scan the data assets of the particular entity to identify personal data that has been collected and stored using one or more computer systems operated and/or utilized by a particular organization where the personal data is not currently being used as part of any privacy campaigns, processing activities, etc. undertaken by the particular organization. The one or more pieces of personal data that are not associated with the one or more privacy campaigns may be a portion of the personal data that is stored by the particular entity. In some implementations, the system may analyze the data models to identify the one or more pieces of personal data that are not associated with the one or more privacy campaigns.

When the particular privacy campaign, processing activity, etc. is terminated or otherwise discontinued, the system may determine if any of the associated personal data that has been collected and stored by the particular organization is now orphaned data. In some implementations, in response to the termination of a particular privacy campaign and/or processing activity, (e.g., manually or automatically), the system may be configured to scan one or more data assets based at least in part on the generated catalog or analyze the data models to determine whether any of the personal data that has been collected and stored by the particular organization is now orphaned data (e.g., whether any personal data collected and stored as part of the now-terminated privacy campaign is being utilized by any other processing activity, has some other legal basis for its continued storage, etc.). In some implementations, the system may generate an indication that one or more pieces of personal data that are associated with the terminated one or more privacy campaigns are included in the portion of the one or more pieces of personal data (e.g., orphaned data).

In additional implementations, the system may determine that a particular privacy campaign, processing activity, etc. has not been utilized for a period of time (e.g., a day, a month, a year). In response, the system may be configured to terminate the particular processing activity, processing activity, etc. In some implementations, in response to the system determining that a particular processing activity has not been utilized for a period of time, the system may prompt one or more individuals associated with the particular entity to indicate whether the particular privacy campaign should be terminated or otherwise discontinued.

For example, a particular processing activity may include transmission of a periodic advertising e-mail for a particular company (e.g., a hardware store). As part of the processing activity, the particular company may have collected and stored e-mail addresses for customers that elected to receive (e.g., consented to the receipt of) the promotional e-mails. In response to determining that the particular company has not sent out any promotional e-mails for at least a particular amount of time (e.g., for at least a particular number of months), the system may be configured to: (1) automatically terminate the processing activity; (2) identify any of the personal data collected as part of the processing activity that is now orphaned data (e.g., the e-mail addresses); and (3) automatically delete the identified orphaned data. The processing activity may have ended for any suitable reason (e.g., because the promotion that drove the periodic e-mails has ended). As may be understood in light of this disclosure, because the particular organization no longer has a valid basis for continuing to store the e-mail addresses of the customers once the e-mail addresses are no longer being used to send promotional e-mails, the organization may wish to substantially automate the removal of personal data stored in its computer systems that may place the organization in violation of one or more personal data storage rules or regulations.

Continuing to Step 5050, the system is configured to generate an indication that the portion of one or more pieces of personal data that are not associated with the one or more privacy campaigns of the particular entity is to be removed from the one or more data assets. At Step 5060, the system is configured to present the indication to one or more individuals associated with the particular entity. The indication may be an electronic notification to be provided to an individual (e.g., privacy officer) associated with the particular entity. The electronic notification may be, for example, (1) a notification within a software application (e.g., a data management system for the one or more data assets of the particular entity), (2) an email notification, (3) etc.

In some implementations, the indication may enable the individual (e.g., privacy officer of the particular entity) to select a set of the one or more pieces of personal data of the portion of the one or more pieces of personal data to retain based on one or more bases to retain the set of the one or more pieces of personal data.

In particular embodiments, the system may prompt the one or more individuals to provide one or more bases to retain the first set of the one or more pieces of personal data of the first portion of the one or more pieces of personal data that are not associated with the one or more privacy campaigns. In some implementations, in response to receiving the provided one or more valid bases to retain the first set of the one or more pieces of personal data from the one or more individuals associated with the particular entity, submitting the provided one or more valid bases to retain the first set of the one or more pieces of personal data to one or more second individuals associated with the particular entity for authorization. In response, the system may retain the first set of the one or more pieces of personal data of the first portion of the one or more pieces of personal data from the one or more individuals associated with the particular entity. Further, the system may remove a second set of the one or more pieces of personal data of the first portion of the one or more pieces of personal data that are not associated with the one or more privacy campaigns from the one or more data assets. In particular embodiments, the second set of the one or more pieces of personal data may be different from the first set of the one or more pieces of personal data.

Continuing to Step 5070, the system is configured to remove, by one or more processors, the first portion of the one or more pieces of personal data that are not associated with the one or more privacy campaigns of the particular entity from the one or more data assets.

Data Testing to Confirm Deletion Under a Right to Erasure

In particular embodiments, a Personal Data Deletion System is configured to: (1) at least partially automatically identify and delete personal data that an entity is required to erase under one or more of the conditions discussed above; and (2) perform one or more data tests after the deletion to confirm that the system has, in fact, deleted any personal data associated with the data subject.

Figure 51:
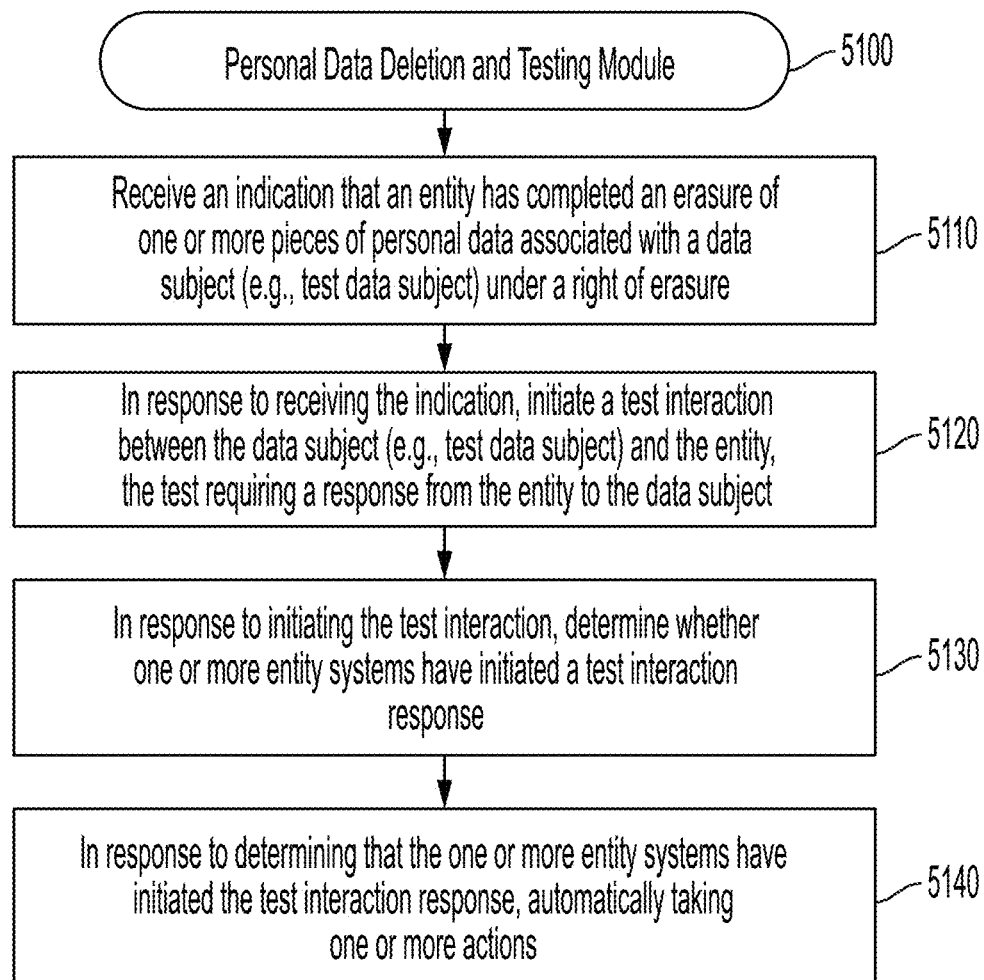
FIG. 51 is a flowchart showing an example of processes performed by a Personal Data Deletion and Testing Module 5100 according to various embodiments.

Various processes performed by the Personal Data Deletion System may be implemented by a Personal Data Deletion and Testing Module 5100. Referring to FIG. 51, in particular embodiments, the system, when executing the Personal Data Deletion and Testing Module 5100, is configured to: (1) receive an indication that the entity has completed an erasure of one or more pieces of personal data associated with the data subject under a right of erasure; (2) initiate a test interaction between the data subject and the entity, the test interaction requiring a response from the entity to the data subject; (3) determine whether one or more system associated with the entity have initiated a test interaction response to the data subject based at least in part on the test interaction; (4) in response to determining that the one or more systems associated with the entity have initiated the test interaction response, (a) determine that the entity has not completed the erasure of the one or more pieces of personal data associated with the data subject and (b) automatically take one or more actions with regard to the personal data associated with the data subject.

When executing the Personal Data Deletion and Testing Module 5100, the system begins, at Step 5110, by receiving an indication that the entity has completed an erasure of one or more pieces of personal data associated with the data subject under a right of erasure. The particular entity may include, for example, a particular organization, company, sub-organization, etc. In particular embodiments, the one or more computers systems may be configured to store (e.g., in memory) an indication that the data subject's request to delete any of their personal data stored by the one or more computers systems has been processed. Under various legal and industry policies/standards, the organization may have a certain period of time (e.g., a number of days) in order to comply with the one or more requirements related to the deletion or removal of personal data in response to receiving a request from the data subject or in response to identifying one or more of the conditions requiring deletion discussed above. In response to the receiving an indication that the deletion request for the data subject's personal data has been processed or the certain period of time (described above) has passed, the system may be configured to perform a data test to confirm the deletion of the data subject's personal data.

Continuing to Step 5120, in response to receiving the indication that the entity has completed the erasure, the system is configured to initiate a test interaction between the data subject and the entity, the test interaction requiring a response from the entity to the data subject. In particular embodiments, when performing the data test, the system may be configured to provide an interaction request to the entity on behalf of the data subject. In particular embodiments, the interaction request may include, for example, a request for one or more pieces of data associated with the data subject (e.g., account information, etc.). In various embodiments, the interaction request is a request to contact the data subject (e.g., for any suitable reason). The system may, for example, be configured to substantially automatically complete a contact-request form (e.g., a webform made available by the entity) on behalf of the data subject. In various embodiments, when automatically completing the form on behalf of the data subject, the system may be configured to only provide identifying data, but not to provide any contact data. In response to submitting the interaction request (e.g., submitting the webform), the system may be configured to determine whether the one or more computers systems have generated and/or transmitted a response to the data subject. The system may be configured to determine whether the one or more computers systems have generated and/or transmitted the response to the data subject by, for example, analyzing one or more computer systems associated with the entity to determine whether the one or more computer systems have generated a communication to the data subject (e.g., automatically) for transmission to an e-mail address or other contact method associated with the data subject, generated an action-item for an individual to contact the data subject at a particular contact number, etc.

To perform the data test, for example, the system may be configured to: (1) access (e.g., manually or automatically) a form for the entity (e.g., a web-based "Contact Us" form); (2) input a unique identifier associated with the data subject (e.g., a full name or customer ID number) without providing contact information for the data subject (e.g., mailing address, phone number, email address, etc.); and (3) input a request, within the form, for the entity to contact the data subject to provide information associated with the data subject (e.g., the data subject's account balance with the entity). In response to submitting the form to the entity, the system may be configured to determine whether the data subject is contacted (e.g., via a phone call or email) by the one or more computers systems (e.g., automatically). In some implementations, completing the contact-request form may include providing one or more pieces of identifying data associated with the data subject, the one or more pieces of identifying data comprising data other than contact data. In response to determining that the data subject has been contacted following submission of the form, the system may determine that the one or more computers systems have not fully deleted the data subject's personal data (e.g., because the one or more computers systems must still be storing contact information for the data subject in at least one location).

In particular embodiments, the system is configured to generate one or more test profiles for one or more test data subjects. For each of the one or more test data subjects, the system may be configured to generate and store test profile data such as, for example: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable test data. The system may then be configured to at least initially consent to processing or collection of personal data for the one or more test data subjects by the entity. The system may then request deletion of data of any personal data associated with a particular test data subject. In response to requesting the deletion of data for the particular test data subject, the system may then take one or more actions using the test profile data associated with the particular test data subjects in order to confirm that the one or more computers systems have, in fact, deleted the test data subject's personal data (e.g., any suitable action described herein). The system may, for example, be configured to: (1) initiate a contact request on behalf of the test data subject; (2) attempt to login to one or more user accounts that the system had created for the particular test data subject; and/or (3) take any other action, the effect of which could indicate a lack of complete deletion of the test data subject's personal data.

Next, at Step 5130, in response to initiating the test interaction, the system is configured to determine whether one or more system associated with the entity have initiated a test interaction response to the data subject based at least in part on the test interaction. In response to determining that the entity has generated a response to the test interaction, the system may be configured to determine that the entity has not complied with the data subject's request (e.g., deletion of their personal data from the one or more computers systems). For example, if the test interaction requests for the entity to locate and provide any personal data the system has stored related to the data subject, then by the system providing a response that includes one or more pieces of personal data related to the data subject, the system may determine that the one or more computers systems have not complied with the request. As described above, the request may be an erasure of one or more pieces of personal data associated with the data subject under a right of erasure. In some implementations, the test interaction response may be any response that includes any one of the one or more pieces of personal data the system indicated was erased under the right of erasure. In some implementations, the test interaction response may not include response that indicates that the one or more pieces of personal data the system indicated was erased under the right of erasure was not found or accessed by the system.

At Step 5140, in response to determining that the one or more systems associated with the entity have initiated the test interaction response the system is configured to (a) determine that the one or more computers systems have not completed the erasure of the one or more pieces of personal data associated with the data subject, and (b) automatically take one or more actions with regard to the personal data associated with the data subject. In response to determining that the one or more computers systems have not fully deleted a data subject's (e.g., or test data subject's) personal data, the system may then be configured, in particular embodiments, to: (1) flag the data subject's personal data for follow up by one or more privacy officers to investigate the lack of deletion; (2) perform one or more scans of one or more computing systems associated with the entity to identify any residual personal data that may be associated with the data subject; (3) generate a report indicating the lack of complete deletion; and/or (4) take any other suitable action to flag the data subject, personal data, initial request to be forgotten, etc. for follow up.

In various embodiments, the one or more actions may include: (1) identifying the one or more pieces of personal data associated with the data subject that remain stored in the one or more computer systems of the entity; (2) flagging the one or more pieces of personal data associated with the data subject that remain stored in the one or more computer systems of the entity; and (3) providing the flagged one or more pieces of personal data associated with the data subject that remain stored in the one or more computer systems of the entity to an individual associated with the entity.

In various embodiments, the system may monitor compliance by a particular entity with a data subject's request to delete the data subject's personal data from the one or more computers systems associated with a particular entity. The system may, for example, be configured to test to ensure the data has been deleted by: (1) submitting a unique token of data through a webform to a system (e.g., mark to); (2) in response to passage of an expected data retention time, test the system by calling into the system after the passage of the data retention time to search for the unique token. In response to finding the unique token, the system may be configured to determine that the data has not been properly deleted.

The system may provide a communication to the entity that includes a unique identifier associated with the data subject, is performed without using a personal communication data platform, prompts the entity to provide a response by contacting the data subject via a personal communication data platform. In response to providing the communication to the entity, the system may determine whether the data subject has received a response via the personal communication data platform. The system may, in response to determining that the data subject has received the response via the personal communication data platform, determine that the one or more computers systems have not complied with the data subject's request for deletion of their personal data. In response, the system may generate an indication that the one or more computers systems have not complied with the data subject's request for deletion of their personal data by the entity, and digitally store the indication that the one or more computers systems have not complied with the data subject's request for deletion of their personal data in computer memory.

Automatic Preparation for Remediation

In particular embodiments, a Risk Remediation System is configured to substantially automatically determine whether to take one or more actions in response to one or more identified risk triggers. For example, an identified risk trigger may be that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

Figure 52:
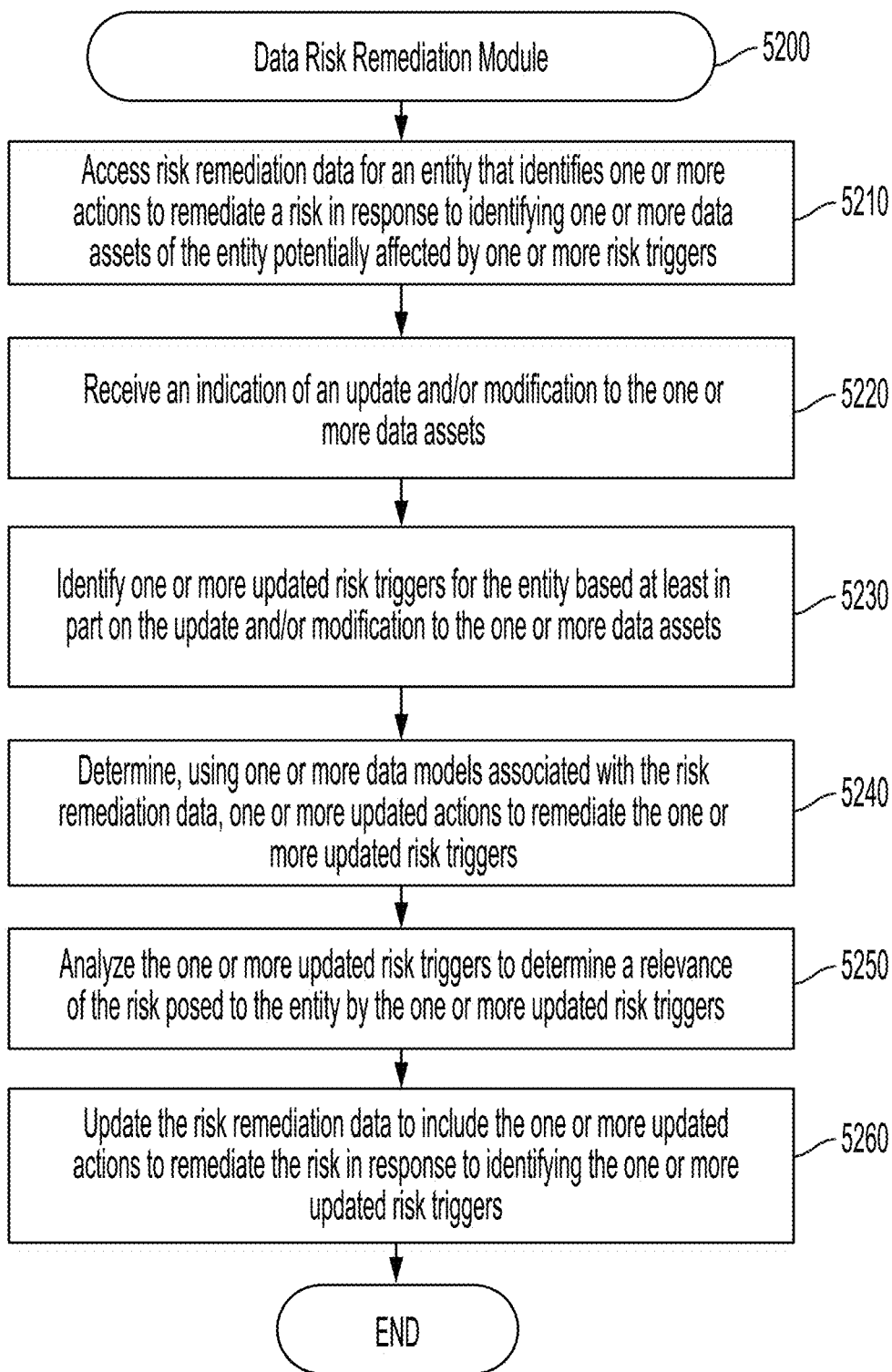
FIG. 52 is a flowchart showing an example of processes performed by a Data Risk Remediation Module 5200 according to various embodiments.

Various processes performed by the Risk Remediation System may be implemented by a Data Risk Remediation Module 5200. Referring to FIG. 52, in particular embodiments, the system, when executing the Data Risk Remediation Module 5200, is configured to access risk remediation data for an entity that identifies one or more actions to remediate a risk in response to identifying one or more data assets of the entity potentially affected by one or more risk triggers, receive an indication of an update to the one or more data assets, identify one or more updated risk triggers for an entity based at least in part on the update to the one or more data assets, determine, by using one or more data models associated with the risk remediation data, one or more updated actions to remediate the one or more updated risk triggers, analyze the one or more updated risk triggers to determine a relevance of the risk posed to the entity by the one or more updated risk triggers, and update the risk remediation data to include the one or more updated actions to remediate the risk in response to identifying the one or more updated risk triggers.

When executing the Data Risk Remediation Module 5200, the system begins, at Step 5210, by accessing risk remediation data for an entity that identifies one or more actions to remediate a risk in response to identifying one or more data assets of the entity potentially affected by one or more risk triggers. The particular entity may include, for example, a particular organization, company, sub-organization, etc. The one or more data assets may include personal data for clients or customers. In embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some implementations, the system may include risk remediation data associated with one or more data assets. The risk remediation data may be default or pre-configured risk remediation data that identifies one or more actions to remediate a risk in response to identifying one or more data assets of the entity potentially affected by one or more risk triggers. In some implementations, the system may have previously updated and/or continuously update the risk remediation data. The risk remediation data may be updated and/or based on aggregate risk remediation data for a plurality of identified risk triggers from one or more organizations, which may include the entity.

The system may analyze the aggregate risk remediation data to determine a remediation outcome for each of the plurality of identified risk triggers and an associated entity response to the particular identified risk trigger of the plurality of identified risk triggers. The remediation outcome is an indication of how well the entity response addressed the identified risk trigger. For example, the remediation outcome can be a numerical (e.g., 1 to 10), an indication of the risk trigger after the entity response was performed (e.g., "high," "medium," or "low"). In response to analyzing the aggregate risk remediation data to determine a remediation outcome for each of the plurality of identified risk triggers and an associated entity response to the particular identified risk trigger of the plurality of identified risk triggers, generating the data model of the one or more data models.

One or more data models for the system may be generated to indicate a recommended entity response based on each identified risk trigger. The one or more risk remediation models base be generated in response to analyzing the aggregate risk remediation data to determine a remediation outcome for each of the plurality of identified risk triggers and an associated entity response to the particular identified risk trigger of the plurality of identified risk triggers. Additionally, the risk remediation data for the entity may include the one or more risk remediation data models with an associated one or more data assets of the entity.

Continuing to Step 5220, the system is configured to receive an indication of an update to the one or more data assets. In particular embodiments, the system may indicate that a modification has been performed to the one or more data assets. In various embodiments, when a privacy campaign, processing activity, etc. of the particular organization is modified (e.g., add, remove, or update particular information), then the system may the risk remediation data for use in facilitating an automatic assessment of and/or response to future identified risk triggers. The modification may be an addition (e.g., additional data stored to the one or more data assets), a deletion (e.g., removing data stored to the one or more data assets), or a change (e.g., editing particular data or rearranging a configuration of the data associated with the one or more data assets. At Step 5230, the system is configured to identify one or more updated risk triggers for an entity based at least in part on the update to the one or more data assets. The updated risk triggers may be anything that exposes the one or more data assets of the entity to, for example, a data breach or a loss of data, among others. For example, an identified risk trigger may be that a data asset for an organization is hosted in only one particular location thereby increasing the scope of risk if the location were infiltrated (e.g., via cybercrime).

At Step 5240, the system is configured to determine, by using one or more data models associated with the risk remediation data, one or more updated actions to remediate the one or more updated risk triggers. As previously described above, the one or more data models for the system may be generated to indicate a recommended entity response based on each identified risk trigger. The one or more risk remediation models base be generated in response to analyzing the aggregate risk remediation data to determine a remediation outcome for each of the plurality of identified risk triggers and an associated entity response to the particular identified risk trigger of the plurality of identified risk triggers.

At Step 5250, the system is configured to analyze the one or more updated risk triggers to determine a relevance of the risk posed to the entity by the one or more updated risk triggers. In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger. In some embodiments, the system is configured to determine, based at least in part on the one or more data assets and the relevance of the risk, whether to take one or more updated actions in response to the one or more updated risk triggers, and take the one or more updated actions to remediate the risk in response to identifying the one or more updated risk triggers.

Additionally, in some implementations, the system may calculate a risk level based at least in part on the one or more updated risk triggers. The risk level may be compared to a threshold risk level for the entity. The threshold risk level may be pre-determined, or the entity may be able to adjust the threshold risk level (e.g., based on the type of data stored in the particular data asset, a number of data assets involved, etc.). In response to determining that the risk level is greater than or equal to the threshold risk level (i.e., a risk level that is defined as riskier than the threshold risk level or as risky as the threshold risk level), updating the risk remediation data to include the one or more updated actions to remediate the risk in response to identifying the one or more updated risk triggers. The risk level may be, for example, a numerical value (e.g., 1 to 10) or a described value (e.g., "low," "medium," or "high"), among others. In some implementations, calculating the risk level may be based at least in part on the one or more updated risk triggers further comprises comparing the one or more updated risk triggers to (i) one or more previously identified risk triggers, and (ii) one or more previously implemented actions to the one or more previously identified risk triggers.

At Step 5260, the system continues by updating the risk remediation data to include the one or more updated actions to remediate the risk in response to identifying the one or more updated risk triggers. In various embodiments, the system may automatically (e.g., substantially automatically) update the risk remediation data.

In various embodiments, the system may identify one or more risk triggers for an entity based at least in part on the update to the first data asset of the entity, and in turn, identify a second data asset of the entity potentially affected by the one or more risk triggers based at least in part on an association of a first data asset and the second data asset. The system may then determine, by using one or more data models, one or more first updated actions to remediate the one or more updated risk triggers for the first data asset, and determine, by using one or more data models, one or more second updated actions to remediate the one or more updated risk triggers for the second data asset. In some implementations, the one or more first updated actions to remediate the one or more updated risk triggers for the first data asset may be the same as or different from one or more second updated actions to remediate the one or more updated risk triggers for the second data asset. Further, the system may generate (or update) risk remediation data of the entity to include the one or more first updated actions and the one or more second updated actions to remediate the one or more potential risk triggers.

Central Consent Repository Maintenance and Data Inventory Linking

In particular embodiments, a Central Consent System is configured to provide a third-party data repository system to facilitate the receipt and centralized storage of personal data for each of a plurality of respective data subjects, as described herein. Additionally, the Central Consent System is configured to interface with a centralized consent receipt management system.

Figure 53:
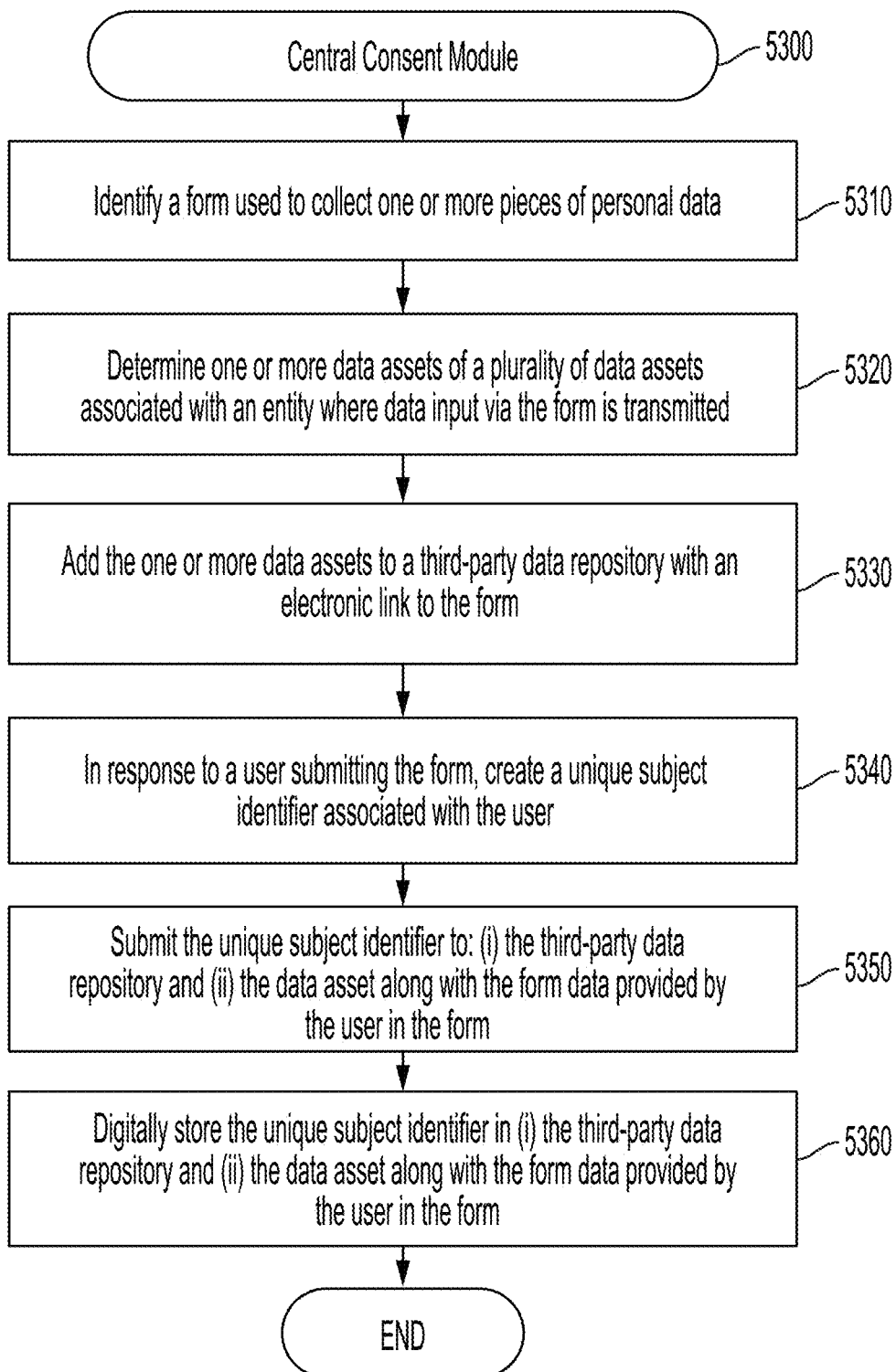
FIG. 53 is a flowchart showing an example of processes performed by a Central Consent Module 5300 according to various embodiments.

Various processes performed by the Central Consent System may be implemented by a Central Consent Module 5300. Referring to FIG. 53, in particular embodiments, the system, when executing the Central Consent Module 5300, is configured to: identify a form used to collect one or more pieces of personal data, determine a data asset of a plurality of data assets of the organization where input data of the form is transmitted, add the data asset to the third-party data repository with an electronic link to the form in response to a user submitting the form, create a unique subject identifier associated with the user, transmit the unique subject identifier (i) to the third-party data repository and (ii) along with the form data provided by the user in the form, to the data asset, and digitally store the unique subject identifier (i) in the third-party data repository and (ii) along with the form data provided by the user in the form, in the data asset.

When executing the Central Consent Module 5300, the system begins, at Step 5310, by identifying a form used to collect one or more pieces of personal data. The particular entity may include, for example, a particular organization, company, sub-organization, etc. In particular embodiments, the one or more data assets (e.g., data systems) may include, for example, any processor or database that collects, processes, contains, and/or transfers data (e.g., such as a software application, "internet of things" computerized device, database, website, data-center, server, etc.). The one or more forms may ask for personal data, and the one or more data assets may store personal data for clients or customers. In embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In particular embodiments, the system is configured to identify a form via one or more method that may include one or more website scanning tools (e.g., web crawling). The system may also receive an indication that a user is completing a form (e.g., a webform via a website) associated with the particular organization (e.g., a form to complete for a particular privacy campaign).

The form may include, for example, one or more fields that include the user's e-mail address, billing address, shipping address, and payment information for the purposes of collected payment data to complete a checkout process on an e-commerce website. The system may, for example, be configured to track data on behalf of an entity that collects and/or processes personal data related to: (1) who consented to the processing or collection of personal data (e.g., the data subject themselves or a person legally entitled to consent on their behalf such as a parent, guardian, etc.); (2) when the consent was given (e.g., a date and time); (3) what information was provided to the consenter at the time of consent (e.g., a privacy policy, what personal data would be collected following the provision of the consent, for what purpose that personal data would be collected, etc.); (4) how consent was received (e.g., one or more copies of a data capture form, webform, etc. via which consent was provided by the consenter); (5) when consent was withdrawn (e.g., a date and time of consent withdrawal if the consenter withdraws consent); and/or (6) any other suitable data related to receipt or withdrawal of consent.

Continuing to Step 5320, the system is configured to determine one or more data assets of a plurality of data assets of the organization where input data of the form is transmitted. In particular embodiments, the system may determine one or more data assets of the organization that receive the form data provided by the user in the form (e.g., webform). In particular embodiments, the system is configured to identify the one or more data assets using one or more data modeling techniques. As discussed more fully above, a data model may store the following information: (1) the entity that owns and/or uses a particular data asset (e.g., such as a primary data asset, an example of which is shown in the center of the data model in FIG. 4); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) to identify the one or more data assets associated with the particular entity that receive and/or store particular form data.

At Step 5330, the system is configured to add the one or more data assets to the third-party data repository with an electronic link to the form. In particular embodiments, a third-party data repository system may electronically link the form to the one or more data assets that processor or store the form data of the form. Next, at Step 5340, in response to a user submitting the form, the system is configured to create a unique subject identifier associated with the user. The system is configured to generate, for each data subject that completes the form (e.g., a webform), a unique identifier. The system may, for example: (1) receive an indication that the form has been completed with the form including a piece of personal data; (2) identify a data subject associated with the piece of personal data; (3) determine whether the central repository system is currently storing data associated with the data subject; and (4) in response to determining that one or more data assets of the plurality of data assets is not currently storing data associated with the data subject (e.g., because the data subject is a new data subject), generate the unique identifier.

In particular embodiments, the unique identifier may include any unique identifier such as, for example: (1) any of the one or more pieces of personal data collected, stored, and/or processed by the system (e.g., name, first name, last name, full name, address, phone number, e-mail address, etc.); (2) a unique string or hash comprising any suitable number of numerals, letters, or combination thereof; and/or (3) any other identifier that is sufficiently unique to distinguish between a first and second data subject for the purpose of subsequent data retrieval. In particular embodiments, the system is configured to assign a permanent identifier to each particular data subject. In other embodiments, the system is configured to assign one or more temporary unique identifiers to the same data subject.

In particular embodiments, the system is configured to: (1) receive an indication of completion of a form associated with the organization by a data subject; (2) determine, based at least in part on searching a unique subject identifier database (e.g., a third-party data repository), whether a unique subject identifier has been generated for the data subject; (3) in response to determining that a unique subject identifier has been generated for the data subject, accessing the unique subject identifier database; (4) identify the unique subject identifier of the data subject based at least in part on form data provided by the data subject in the completion of the form associated with the organization; and (5) update the unique subject identifier database to include an electronic link between the unique subject identifier of the data subject with each of (i) the form (e.g., including the form data) submitted by the data subject of each respective unique subject identifier, and (ii) one or more data assets that utilize the form data of the form received from the data subject. In this way, as an entity collects additional data for a particular unique data subject (e.g., having a unique subject identifier, hash, etc.), the third party data repository system is configured to maintain a centralized database of data collected, stored, and or processed for each unique data subject (e.g., indexed by unique subject identifier). The system may then, in response to receiving a data subject access request from a particular data subject, fulfill the request substantially automatically (e.g., by providing a copy of the personal data, deleting the personal data, indicating to the entity what personal data needs to be deleted from their system and where it is located, etc.). The system may, for example, automatically fulfill the request by: (1) identifying the unique subject identifier associated with the unique data subject making the request; and (2) retrieving any information associated with the unique data subject based on the unique subject identifier.

Continuing to Step 5350, the system is configured to transmit the unique subject identifier (i) to the third-party data repository and (ii) along with the form data provided by the user in the form, to the data asset. At Step 5360, the system is configured to digitally store the unique subject identifier (i) in the third-party data repository and (ii) along with the form data provided by the user in the form, in the data asset. As may understood in light of this disclosure, the system may then be configured to facilitate the receipt and centralized storage of personal data for each of a plurality of respective data subjects and the associated one or more data assets that process or store the form data provided by the data subject.

In particular embodiments, the system may be further configured for receiving a data subject access request from the user, accessing the third-party data repository to identify the unique subject identifier of the user, determining which one or more data assets of the plurality of data assets of the organization include the unique subject identifier, and accessing personal data (e.g., form data) of the user stored in each of the one or more data assets of the plurality of data assets of the organization that include the unique subject identifier. In particular embodiments, the data subject access request may be a subject's rights request where the data subject may be inquiring for the organization to provide all data that the particular organization has obtained on the data subject or a data subject deletion request where the data subject is requesting for the particular organization to delete all data that the particular organization has obtained on the data subject.

In particular embodiments, when the data subject access request is a data subject deletion request, in response to accessing the personal data of the user stored in each of the one or more data assets of the plurality of data assets of the organization that include the unique subject identifier, the system deletes the personal data of the user stored in each of the one or more data assets of the plurality of data assets of the organization that include the unique subject identifier. In some embodiments, when the data subject access request is a data subject deletion request, the system may be configured to: (1) in response to accessing the personal data of the user stored in each of the one or more data assets of the plurality of data assets, automatically determine that a first portion of personal data of the user stored in the one or more data assets has one or more legal bases for continued storage; (2) in response to determining that the first portion of personal data of the user stored in the one or more data assets has one or more legal bases for continued storage, automatically maintain storage of the first portion of personal data of the user stored in the one or more data assets;

(3) in response to determining that the first portion of personal data of the user stored in the one or more data assets has one or more legal bases for continued storage, automatically maintaining storage of the first portion of personal data of the user stored in the one or more data assets; and (4) automatically facilitating deletion of a second portion of personal data of the user stored in the one or more data assets for which one or more legal bases for continued storage cannot be determined, wherein the first portion of the personal data of the user stored in the one or more data assets is different from the second portion of personal data of the user stored in the one or more data assets.

In still other embodiments, the system is configured to scan a domain, site, or other suitable application or location to identify one or more cookies, one or more pixels, one or more forms, one or more JavaScript elements, etc. In particular embodiments, the system may identify one or more vendor elements (e.g., third-party vendors) implemented at a particular webpage in order to map a consent transaction between a user and the third-party vendor to the user via a unique ID generated during a particular browser session, application access, login, etc.

Data Transfer Risk Identification and Analysis

In particular embodiments, a Data Transfer Risk Identification System is configured to analyze one or more data systems (e.g., data assets), identify data transfers between/among those systems, apply data transfer rules to each data transfer record, perform a data transfer assessment on each data transfer record based on the data transfer rules to be applied to each data transfer record, and calculate a risk score for the data transfer based at least in part on the one or more data transfer risks associated with the data transfer record.

Figure 54:
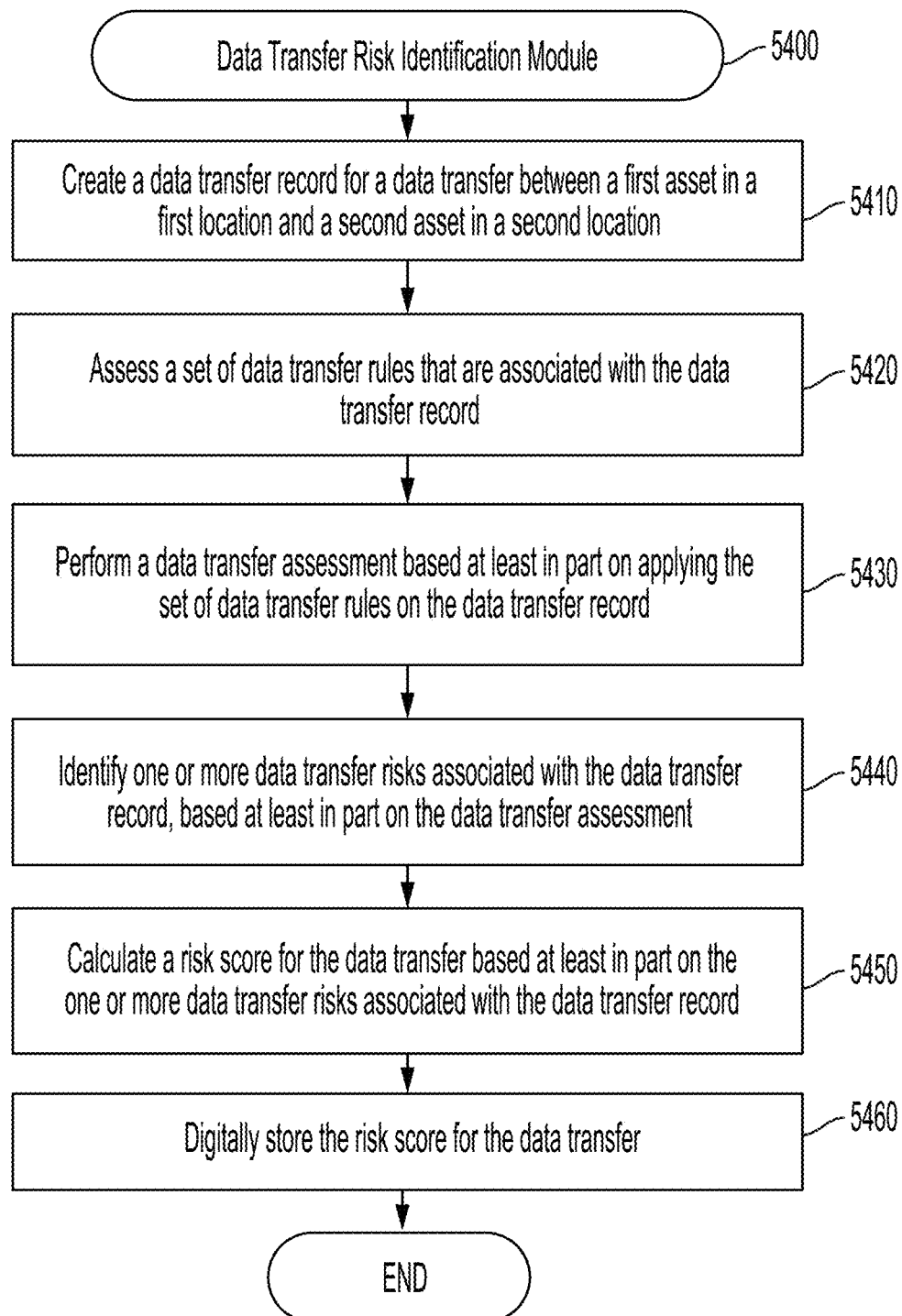
FIG. 54 is a flowchart showing an example of processes performed by a Data Transfer Risk Identification Module 5400 according to various embodiments.

Various processes performed by the Data Transfer Risk Identification System may be implemented by Data Transfer Risk Identification Module 5400. Referring to FIG. 54, in particular embodiments, the system, when executing the Data Transfer Risk Identification Module 5400, is configured for: (1) creating a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

When executing the Data Transfer Risk Identification Module 5400, the system begins, at Step 5410, by creating a data transfer record for a data transfer between a first asset in a first location and a second asset in a second location. The data transfer record may be created for each transfer of data between a first asset in a first location and a second asset in a second location where the transfer record may also include information regarding the type of data being transferred, a time of the data transfer, an amount of data being transferred, etc. In some embodiments, the system may access a data transfer record that may have already been created by the system.

In various embodiments, the system may be configured to determine in which of the one or more defined plurality of physical locations each particular data system is physically located. In particular embodiments, the system is configured to determine the physical location based at least in part on one or more data attributes of a particular data asset (e.g., data system) using one or more data modeling techniques (e.g., using one or more suitable data modeling techniques described herein). In some embodiments, the system may be configured to determine the physical location of each data asset based at least in part on an existing data model that includes the data asset. In still other embodiments, the system may be configured to determine the physical location based at least in part on an IP address and/or domain of the data asset (e.g., in the case of a computer server or other computing device) or any other identifying feature of a particular data asset.

In particular embodiments, the system is configured to identify one or more data elements stored by the one or more data systems that are subject to transfer (e.g., transfer to the one or more data systems such as from a source asset, transfer from the one or more data systems to a destination asset, etc.). In particular embodiments, the system is configured to identify a particular data element that is subject to such transfer (e.g., such as a particular piece of personal data or other data). In some embodiments, the system may be configured to identify any suitable data element that is subject to transfer and includes personal data.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some embodiments, with regard to the location of the one or more data assets, the system may define a geographic location of the one or more data assets. For example, define each of the plurality of physical locations based at least in part on one or more geographic boundaries. These one or more geographic boundaries may include, for example: (1) one or more countries; (2) one or more continents; (3) one or more jurisdictions (e.g., such as one or more legal jurisdictions); (4) one or more territories; (5) one or more counties; (6) one or more cities; (7) one or more treaty members (e.g., such as members of a trade, defense, or other treaty); and/or (8) any other suitable geographically distinct physical locations.

Continuing to Step 5420, the system is configured for accessing a set of data transfer rules that are associated with the data transfer record. The system may apply data transfer rules to each data transfer record. The data transfer rules may be configurable to support different privacy frameworks (e.g., a particular data subject type is being transferred from a first asset in the European Union to a second asset outside of the European Union) and organizational frameworks (e.g., to support the different locations and types of data assets within an organization). The applied data transfer rules may be automatically configured by the system (e.g., when an update is applied to privacy rules in a country or region) or manually adjusted by the particular organization (e.g., by a privacy officer of the organization). The data transfer rules to be applied may vary based on the data being transferred.

As may be understood from this disclosure, the transfer of personal data may trigger one or more regulations that govern such transfer. In particular embodiments, personal data may include any data which relate to a living individual who can be identified: (1) from the data; or (2) from the data in combination with other information which is in the possession of, or is likely to come into the possession of a particular entity. In particular embodiments, a particular entity may collect, store, process, and/or transfer personal data for one or more customers, one or more employees, etc.

In various embodiments, the system is configured to use one or more data models of the one or more data assets (e.g., data systems) to analyze one or more data elements associated with those assets to determine whether the one or more data elements include one or more data elements that include personal data and are subject to transfer. In particular embodiments, the transfer may include, for example: (1) an internal transfer (e.g., a transfer from a first data asset associated with the entity to a second data asset associated with the entity); (2) an external transfer (e.g., a transfer from a data asset associated with the entity to a second data asset associated with a second entity); and/or (3) a collective transfer (e.g., a transfer to a data asset associated with the entity from an external data asset associated with a second entity).

The particular entity may include, for example, a particular organization, company, sub-organization, etc. In particular embodiments, the one or more data assets (e.g., data systems) may include, for example, any entity that collects, processes, contains, and/or transfers data (e.g., such as a software application, "internet of things" computerized device, database, website, data-center, server, etc.). For example, a first data asset may include any software or device utilized by a particular entity for such data collection, processing, transfer, storage, etc. In various embodiments, the first data asset may be at least partially stored on and/or physically located in a particular location. For example, a server may be located in a particular country, jurisdiction, etc. A piece of software may be stored on one or more servers in a particular location, etc.

In particular embodiments, the system is configured to identify the one or more data systems using one or more data modeling techniques. As discussed more fully above, a data model may store the following information: (1) the entity that owns and/or uses a particular data asset (e.g., such as a primary data asset, an example of which is shown in the center of the data model in FIG. 4); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify the one or more data systems associated with the particular entity.

Next, at Step 5430, the system is configured for performing a data transfer assessment based at least in part on applying the set of data transfer rules on the data transfer record. The data transfer assessment performed by the system may identify risks associated with the data transfer record. At Step 5440, the system is configured for identifying one or more data transfer risks associated with the data transfer record, based at least in part on the data transfer assessment. The one or more data transfer risks may include, for example, a source location of the first location of the one or more first data asset of the data transfer, a destination location of the second location of the one or more second data asset of the data transfer, one or more type of data being transferred as part of the data transfer (e.g., personal data or sensitive data), a time of the data transfer (e.g., date, day of the week, time, month, etc.), an amount of data being transferred as part of the data transfer.

Continuing to Step 5450, the system is configured for calculating a risk score for the data transfer based at least in part on the one or more data transfer risks associated with the data transfer record. The risk score may be calculated in a multitude of ways, and may include one or more data transfer risks such as a source location of the data transfer, a destination location of the data transfer, the type of data being transferred, a time of the data transfer, an amount of data being transferred, etc. Additionally, the system may apply weighting factors (e.g., manually or automatically determined) to the risk factors. Further, in some implementations, the system may include a threshold risk score where a data transfer may be terminated if the data transfer risk score indicates a higher risk than the threshold risk score (e.g., the data transfer risk score being higher than the threshold risk score).

In some embodiments, the system may compare the risk score for the data transfer to a threshold risk score, determine that the risk score for the data transfer is a greater risk than the threshold risk score, and in response to determining that the risk score for the data transfer is a greater risk than the threshold risk score, taking one or more action. The one or more action may include, for example, provide the data transfer record to one or more individuals (e.g., a privacy officer) for review of the data transfer record where the one or more individuals may make a decision to approve the data transfer or terminate the data transfer. In some implementations, the system may automatically terminate the data transfer.

In some implementations, the system may generate a secure link between one or more processors associated with the first asset in the first location and one or more processors associated with the second asset in the second location, and the system may further provide the data transfer via the secure link between the one or more processors associated with the first asset in the first location and the one or more processors associated with the second asset in the second location.

In various embodiments, the system may determine a weighting factor for each of the one or more data transfer risks, determine a risk rating for each of the one or more data transfer risks, and calculate the risk level for the data transfer based upon, for each respective one of the one or more data transfer risks, the risk rating for the respective data transfer risk and the weighting factor for the respective data transfer risk.

At Step 5460, the system continues by digitally storing the risk score for the data transfer. In various embodiments, the system may continue by transferring the data between the first asset in the first location and the second asset in the second location. In some embodiments, the system may be configured to substantially automatically flag a particular transfer of data as problematic (e.g., because the transfer does not comply with an applicable regulation). For example, a particular regulation may require data transfers from a first asset to a second asset to be encrypted.

Although one or more transfers discussed herein are described in the context of a data transfer between a first and second data asset in distinct locations, it should be understood that, in other embodiments, the data transfer may include a transfer of data between a data asset in a first location and a user in a second location (e.g., a user accessing the data at the first data asset in the first location). In still other embodiments, the transfer(s) may involve a transfer between a first data asset in a first location and one or more systems related to one or more entity partners, etc.

Automated Classification of Personal Information from Documents

In any embodiment described herein, an automated classification system may be configured to substantially automatically classify one or more pieces of personal information in one or more documents (e.g., one or more text-based documents, one or more spreadsheets, one or more PDFs, one or more webpages, etc.). In particular embodiments, the system may be implemented in the context of any suitable privacy compliance system, which may, for example, be configured to calculate and assign a sensitivity score to a particular document based at least in part on one or more determined categories of personal information (e.g., personal data) identified in the one or more documents. As understood in the art, the storage of particular types of personal information may be governed by one or more government or industry regulations. As such, it may be desirable to implement one or more automated measures to automatically classify personal information from stored documents (e.g., to determine whether such documents may require particular security measures, storage techniques, handling, whether the documents should be destroyed, etc.).

Figure 55:
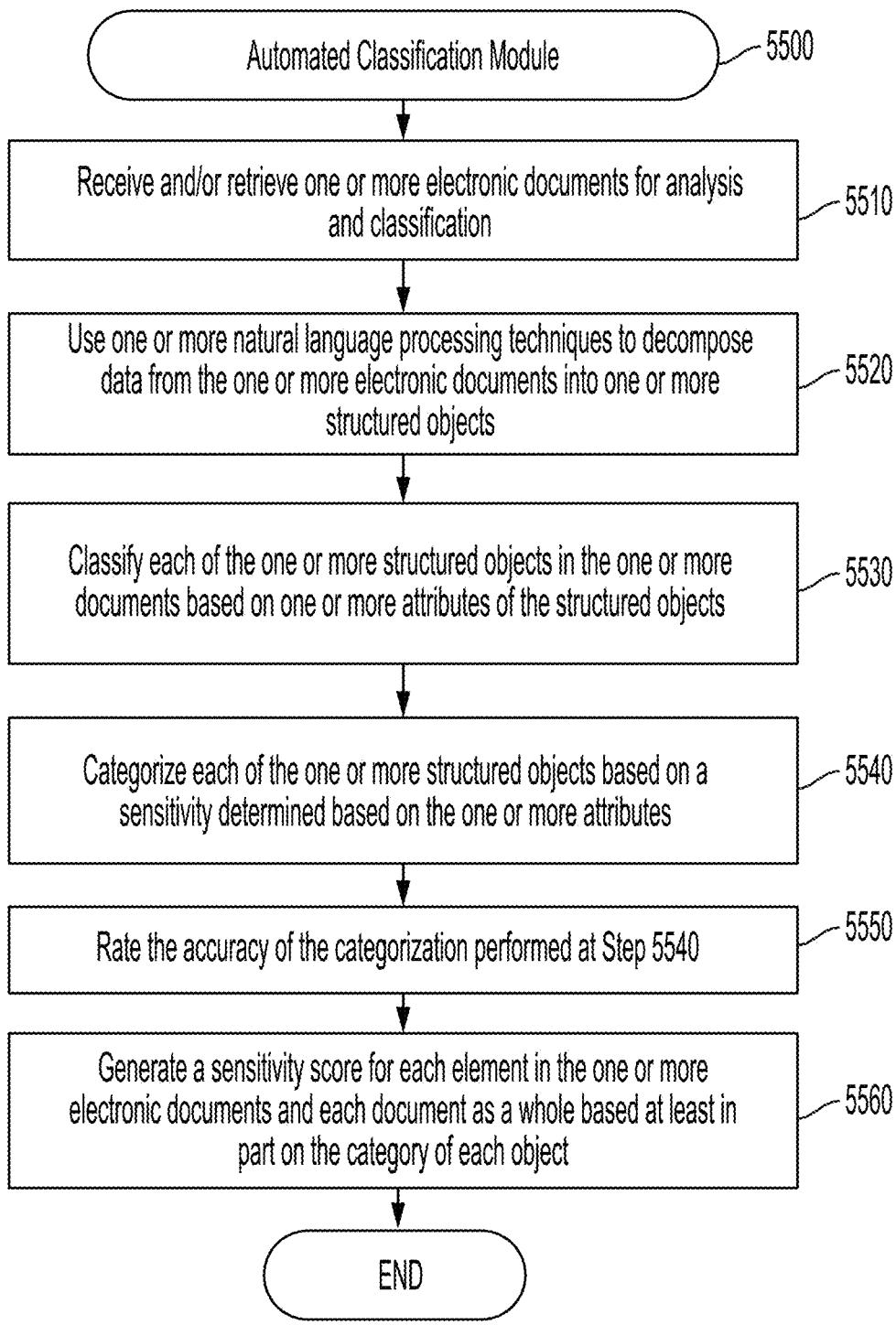
FIG. 55 is a is a flowchart showing an example of a process performed by an Automated Classification Module 5500 according to particular embodiments.

FIG. 55 is a flowchart of process steps that the system may perform in the automatic classification of personal information in an electronic document. When executing the Automated Classification Module 5500, the system begins, at Step 5510, by receiving and/or retrieving one or more electronic documents for analysis and classification. The system may, for example, receive a particular document from a user for analysis. In other embodiments, the system may be configured to automatically scan electronic documents stored on a system (e.g., on one or more servers, in one or more databases, or in any other suitable location) to classify any personal information that may be stored therein. In various embodiments, the one or more electronic documents may include, for example: (1) one or more PDFs; (2) one or more spreadsheets; (3) one or more text-based documents; (4) one or more audio files; (5) one or more video files; (6) one or more webpages; and/or (7) any other suitable type of document.

FIG. 56 depicts an exemplary electronic document that the system may receive and/or retrieve for analysis. As may be understood from FIG. 56 (e.g., a PDF or other text-based document), the electronic document contains employee information such as: (1) first name; (2) last name; (3) social security number; (3) address; (4) marital status; (5) phone number; (6) employer information; (7) etc.

Continuing to Step 5520, the system is configured to use one or more natural language processing techniques to determine data from the one or more electronic documents into one or more structured objects. The system may, for example, use one or more optical character recognition (OCR) techniques to identify particular text in the electronic documents. In some embodiments, the system may be configured to use one or more audio processing techniques to identify one or more words in an audio recording, etc.

The system, in particular embodiments, may be configured to: (1) parse the document to identify context for particular identified text (e.g., identify context based at least in part on proximity to other identified text, etc.); (2) parse out labels from the document; and (3) parse out values for the various labels. The system may, for example, identify particular categories of information contained in document. As may be understood from FIG. 3, the system may be configured to identify particular labels such as, for example: (1) first name; (2) last name; (3) city; and (4) so on. The system may be further configured to identify values associated with each label such as: (1) DOE for last name; (2) JOHN for first name; (3) etc. The system may be configured to determine these values based on, for example: (1) a proximity of the values to the labels; (2) a position of the values relative to the labels; (3) one or more natural language processing techniques (e.g., the system may be configured to identify John as a name, and then associate John with the identified label for name, etc.). The system may then be further configured to electronically associate the identified values with their respective labels (e.g., in computer memory).

Figure 57:
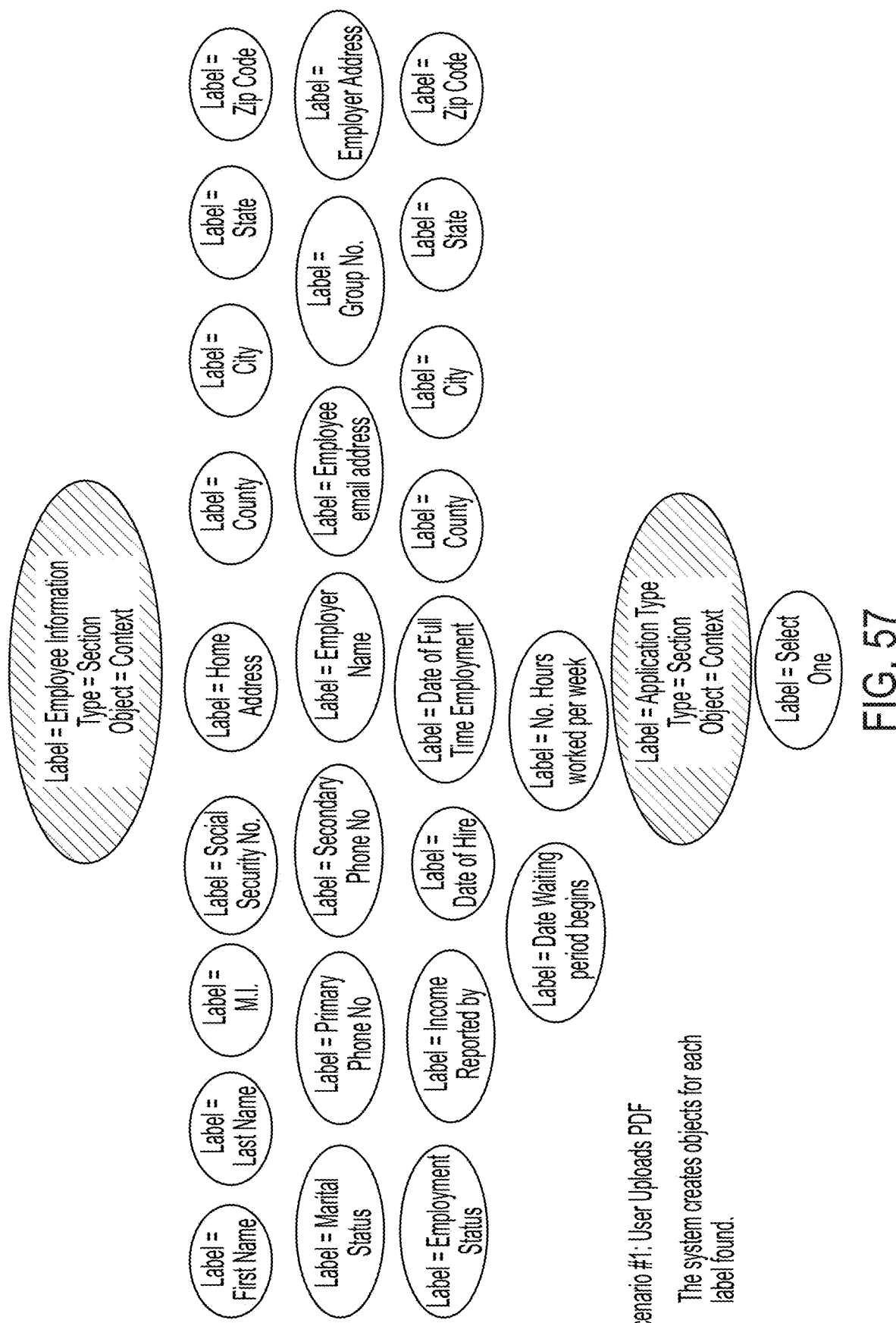
FIG. 57 depicts a visual representation of a plurality of objects that the system may create for each particular label identified in a document.

In any embodiment described herein, the system may then generate a classification of one or more structured objects identified using the natural language processing techniques described above. For example, the system may be configured to generate a catalog of labels identified in the electronic document. FIG. 57 depicts an illustration of one or more object that the system has generated based on the document shown in FIG. 56 as a result of the scanning described above.

Figure 58:
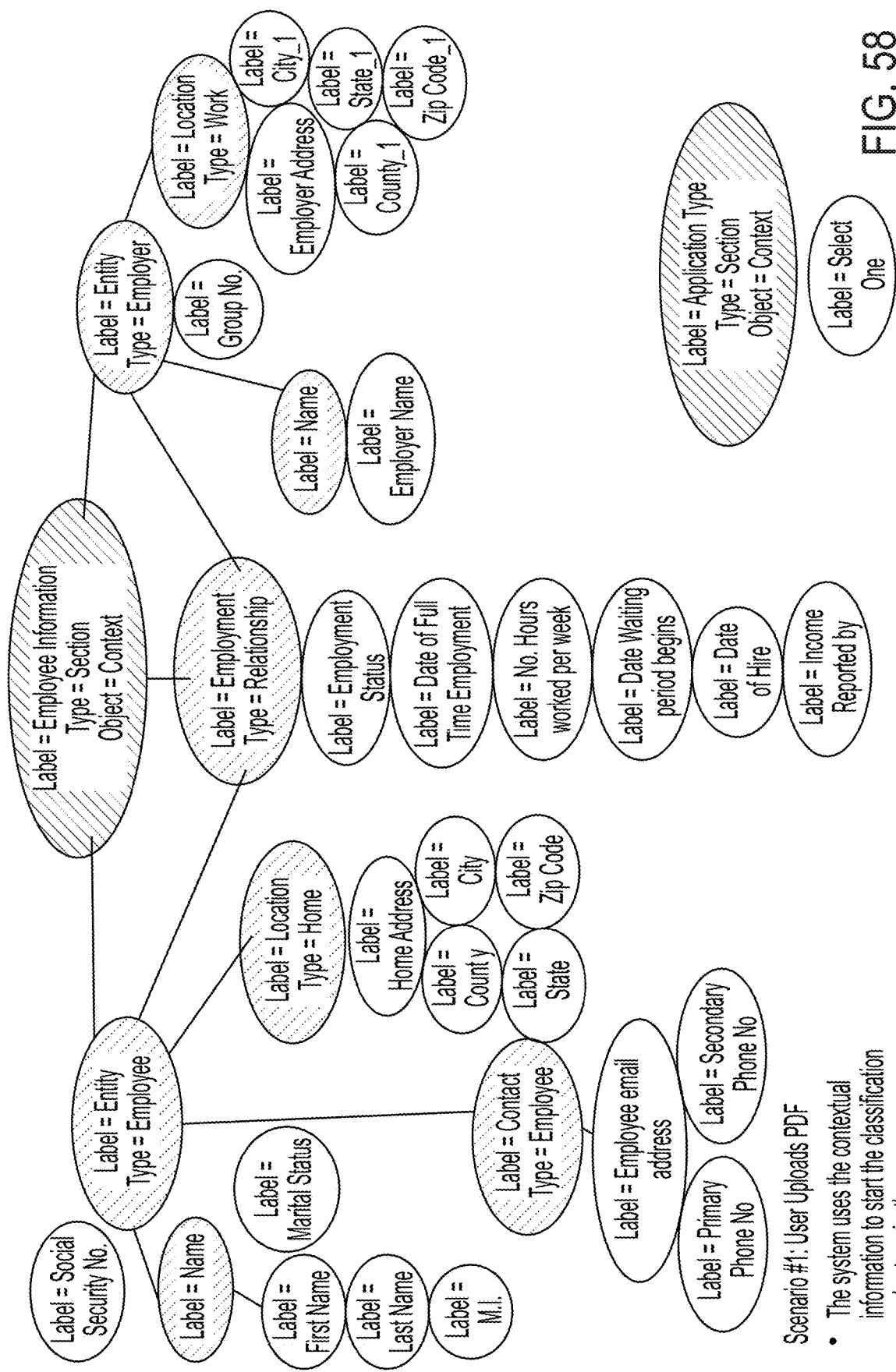
FIGS. 58-60 depict a visual representation of the system creating a classification and categorization of objects using contextual information from the document.

Continuing to Step 5530, the system is configured to classify each of the one or more structured objects based on one or more attributes of the structured objects. For example, the system may be configured to use contextual information, sentiment, and/or syntax to classify each of the structured objects. FIG. 58 depicts an exemplary classification of the structured objects cataloged from FIG. 57. As may be understood from this Figure, the system may be configured to group objects based in part on a type of information. For example, the various objects related to an individual's name (e.g., first name, last name, etc.) may be grouped into a single classification. The system may, for example, be configured to automatically classify the one or more objects based on: (1) the object's proximity in the particular document; (2) one or more headings identified in the document; and/or (3) any other suitable factor. For example, in various embodiments, the system is configured to use one or more machine learning and/or natural language techniques to identify a relation between objects.

Figure 59:
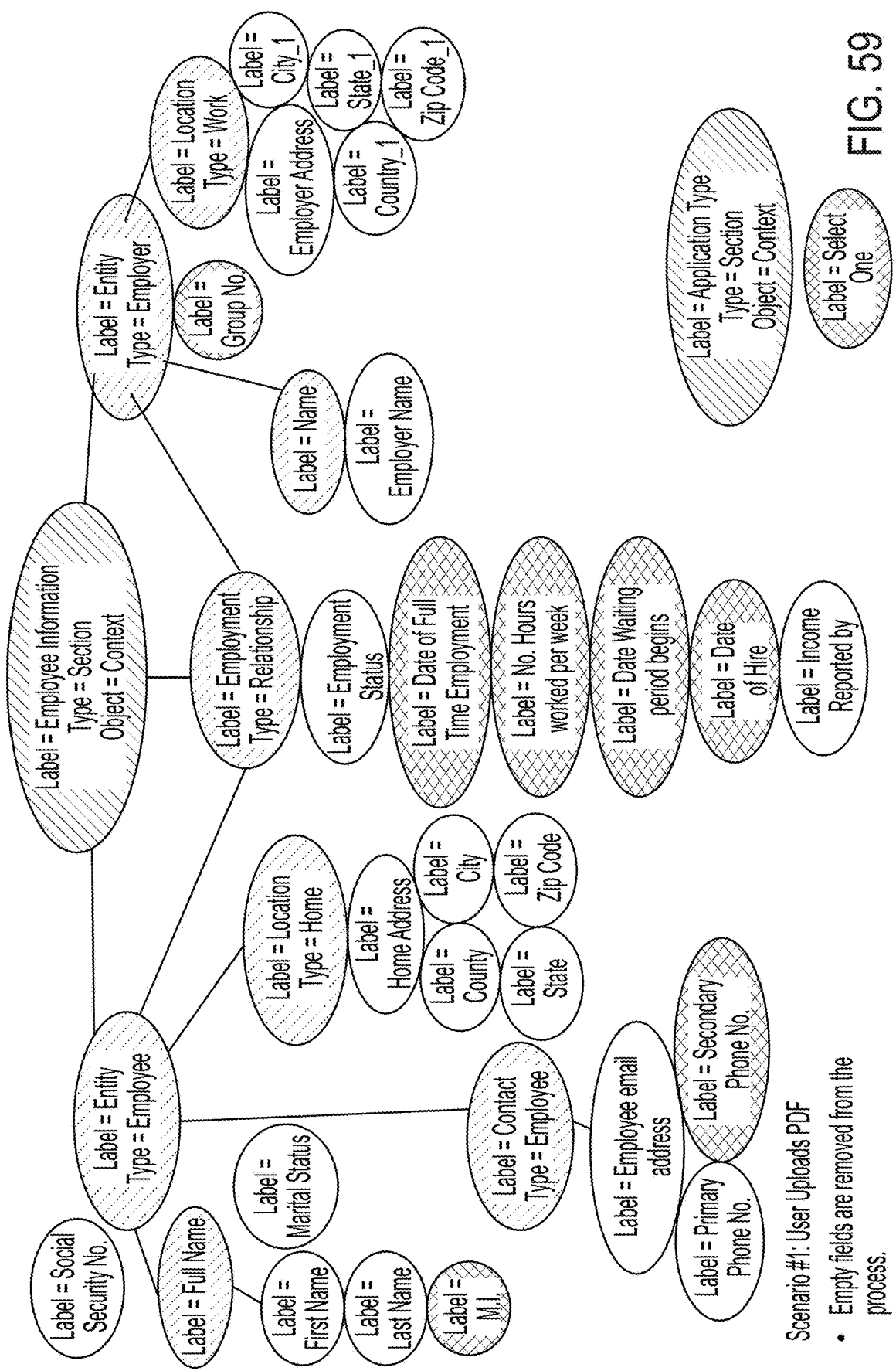
Figure 60:
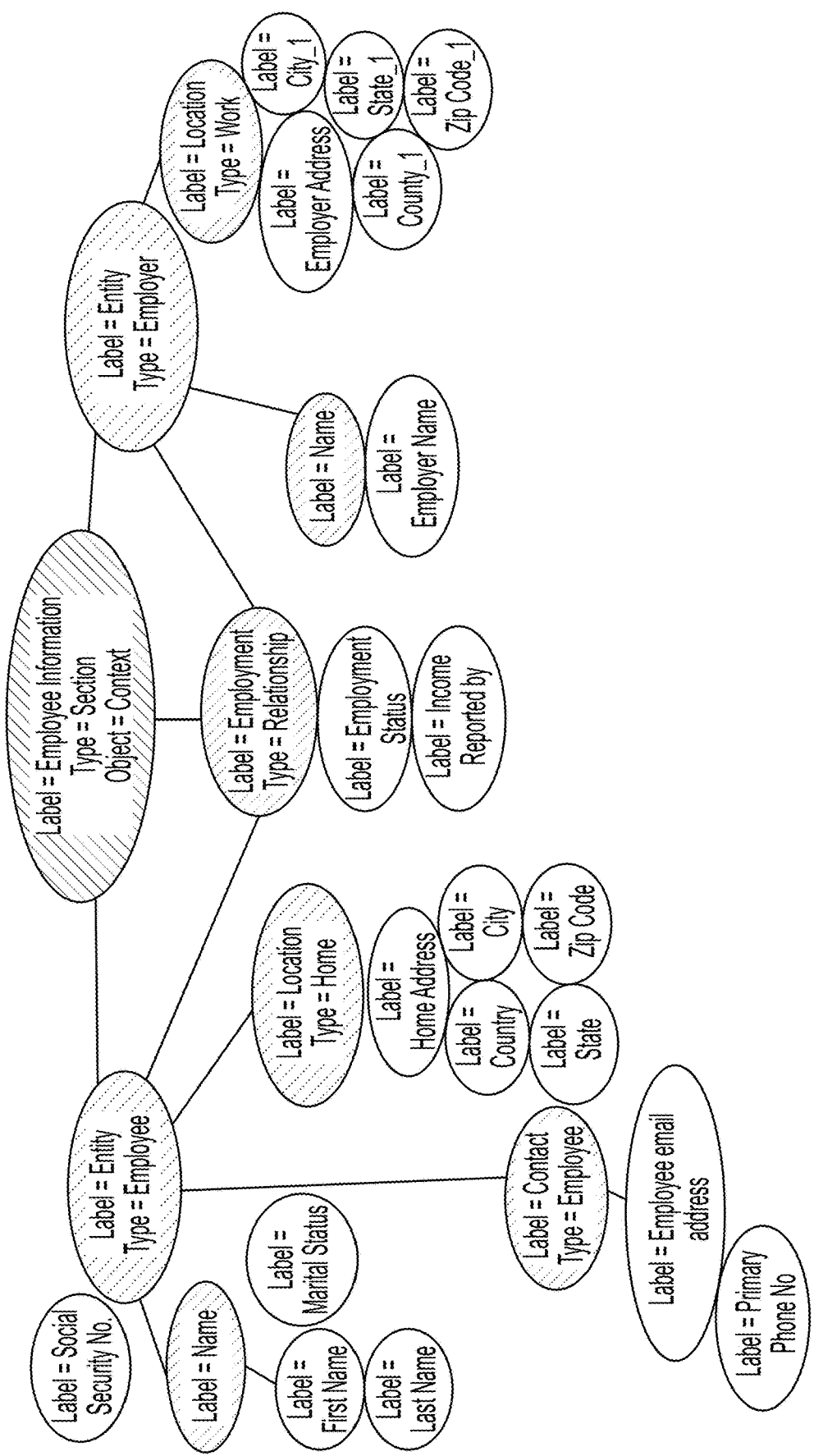

The system may then be configured to identify one or more objects without associated values and remove those objects from the classification. FIGS. 59-60 depict a visual representation of objects without associated values from the PDF shown in FIG. 56 being blacked out and removed from the classification. The system may, for example, be configured to generate an initial classification based on the document, and then modify the classification based on one or more identified values in the specific document.

Continuing to Step 5540, the system is configured to categorize each of the one or more structured objects based at least in part on a sensitivity of information determined based on the one or more attributes of the objects. The system may be configured to determine the categorization based on sensitivity based on, for example: (1) one or more predefined sensitivities for particular categories of information; (2) one or more user-defined sensitivities; (3) one or more sensitivities determined automatically based on one or more prevailing industry or government regulations directed toward the type of information associated with the objects; (4) etc.

FIG. 62 depicts an exemplary mapping of values and structured objects based on a sensitivity of the structured objects. As may be understood from this figure, the system is configured to cross-reference the categorization of structured objects with a database of personal data classification, which may, for example, identify a sensitivity of particular categories of structured objects (e.g., personally identifiable information, sensitive personal data, partial PII, personal data, not personal data, etc.). The system may then be configured to map the results as shown in FIG. 62.

Next, at Step 5550, the system is configured to rate the accuracy of the categorization performed at Step 5540. The system may, for example, be configured to rate the categorization by comparing the categorization determined for a similar electronic document (e.g., a second electronic document that includes the same form filled out by another individual than John Doe). In other embodiments, the system may be configured to rate the accuracy of the categorization based on one or more attributes (e.g., one or more values) of the structured objects. The system may, for example, analyze the value for a particular object to determine an accuracy of the categorization of the object. For example, an object for first name may be categorized as "employee information," and the system may be configured to analyze a value associated with the object to determine whether the categorization is accurate (e.g., analyze the value to determine whether the value is, in fact, a name). The system may, for example, determine that the accuracy of the categorization is relatively low in response to determining that a value for the "first name" object contains a number string or a word that is not traditionally a name (e.g., such as 'attorney' or another job title, a phone number, etc.). The system may determine a character type (e.g., set of numbers, letters, a combination of numbers and letters, etc.) for each object and a character type for each value of the object to determine the accuracy of the categorization. The character type for each object and each value of the object may be compared to determine the accuracy of the categorization by the system.

Continuing to Step 5560, the system is configured to generate a sensitivity score for each element in the one or more electronic documents and each document as a whole based at least in part on the category and sensitivity of each object. The system may, for example, assign a relative sensitivity to the document based on each relative sensitivity score assigned to each object identified in the document. The system may, in various embodiments, calculate a sensitivity score for each object based at least in part on a confidence in the accuracy of the categorization of the object and the sensitivity assigned to the particular categorization.

CONCLUSION

Although embodiments above are described in reference to various privacy management systems, it should be understood that various aspects of the system described above may be applicable to other privacy-related systems, or to other types of systems, in general.

Also, although various embodiments are described as having the system analyze a data subject's interaction with email, text messages (e.g., SMS or MMS messages), or other electronic correspondence to determine whether the data subject actively does business with a particular entity, in other embodiments, the system may make this determination without analyzing electronic correspondence (e.g., emails or texts) or a data subject's interaction with electronic correspondence. For example, in particular embodiments, the system may automatically determine whether a data subject has requested that a particular entity not send emails to the data subject and, at least partially in response to making this determination, automatically generate, populate, and/or submit a data subject access request to the particular entity. Such a data subject access request may include, for example, any of the various data subject access requests described above (e.g., a request to delete all of the data subject's personal data that is being processed by the particular entity). The system may execute similar functionality in response to determining that the data subject has requested that the particular entity not send text (e.g., SMS or MMS) messages to the data subject, call the data subject, etc.

It should be understood that, in various embodiments, the system may generate, populate, and/or submit any of the data subject access requests referenced above electronically (e.g., via a suitable computing network).

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for managing a plurality of data assets of an organization shared with a third-party data repository, the method comprising:
   identifying a form used to collect one or more pieces of personal data;
   determining one or more data assets of a plurality of data assets of the organization where input data of the form is transmitted;
   adding the one or more data assets to the third-party data repository with an electronic link to the form;
   in response to a user submitting the form, creating a unique subject identifier associated with the user;
   transmitting the unique subject identifier to the third-party data repository along with the form data provided by the user in the form, to the data asset;
   digitally storing the unique subject identifier in the third-party data repository and along with the form data provided by the user in the form, in the data asset;
   receiving a data subject access request from the user, wherein the data subject access request comprises a type of data subject access request and the type of data subject access request is a data subject deletion request;
   accessing the third-party data repository to identify the unique subject identifier of the user;
   determining which one or more data assets of the plurality of data assets of the organization include the unique subject identifier;
   accessing personal data of the user stored in each of the one or more data assets of the plurality of data assets of the organization that include the unique subject identifier;
   in response to accessing the personal data of the user stored in each of the one or more data assets of the plurality of data assets, automatically determining that a first portion of personal data of the user stored in the one or more data assets has one or more legal bases for continued storage;
   in response to determining that the first portion of personal data of the user stored in the one or more data assets has one or more legal bases for continued storage, automatically maintaining storage of the first portion of personal data of the user stored in the one or more data assets;
   automatically facilitating deletion of a second portion of personal data of the user stored in the one or more data assets for which one or more legal bases for continued storage cannot be determined, wherein the first portion of the personal data of the user stored in the one or more data assets is different from the second portion of personal data of the user stored in the one or more data assets; and
   automatically marking as free one or more memory addresses associated with the second portion of personal data of the user stored in the one or more data assets associated with the user.

2. The computer-implemented data processing method of claim 1, wherein the type of data subject access request is a data subject deletion request and further comprising:
   in response to accessing the personal data of the user stored in each of the one or more data assets of the plurality of data assets of the organization that include the unique subject identifier, deleting the personal data of the user stored in each of the one or more data assets of the plurality of data assets of the organization that include the unique subject identifier.

3. The computer-implemented data processing method of claim 1, wherein identifying a form used to collect one or more pieces of personal data is performed by using one or more website scanning tools.

4. The computer-implemented data processing method of claim 1, wherein the third-party data repository comprises a link to each of the one or more data assets of the plurality of data assets of the organization that include the unique subject identifier of the user.

5. The computer-implemented data processing of claim 1, wherein the third-party data repository stores the unique subject identifier in a database of a plurality of unique subject identifiers.

6. The computer-implemented data processing method of claim 1, wherein automatically marking as free one or more memory addresses associated with the second portion of personal data of the user stored in the one or more data assets associated with the user comprises deleting a directory entry associated with the second portion of personal data.

7. A computer-implemented data processing method for managing a plurality of data assets of an organization with a unique subject identifier database, the method comprising:
   receiving an indication of completion of a form associated with the organization by a data subject;
   determining, based at least in part on searching a unique subject identifier database, whether a unique subject identifier has been generated for the data subject;
   in response to determining that a unique subject identifier has not been generated for the data subject, generating a unique subject identifier for the data subject;
   storing the unique subject identifier for the data subject in the unique subject identifier database, wherein the unique subject identifier database electronically links each respective unique subject identifier to each of: (i) the form associated with the organization submitted by the data subject of each respective unique subject identifier, and (ii) one or more data assets that utilize form data of the form received from the data subject;
   receiving a data subject access request from the data subject, wherein the data subject access request comprises a data subject deletion request;
   in response to receiving the data subject access request from the data subject, accessing the unique subject identifier database to identify the unique subject identifier of the data subject;
   determining which one or more data assets of the plurality of data assets of the organization are electronically linked to the unique subject identifier;
   accessing personal data of the data subject stored in each of the one or more data assets of the plurality of data assets of the organization that are electronically linked to the unique subject identifier;
   in response to accessing the personal data of the data subject stored in each of the one or more data assets of the plurality of data assets, automatically determining that a first portion of personal data of the data stored in the one or more data assets has one or more legal bases for continued storage;
   in response to determining that the first portion of personal data of the data subject stored in the one or more data assets has one or more legal bases for continued storage, automatically maintaining storage of the first portion of personal data of the data subject stored in the one or more data assets; and
   automatically facilitating deletion of a second portion of personal data of the data subject stored in the one or more data assets for which one or more legal bases for continued storage cannot be determined, wherein the first portion of the personal data of the data subject stored in the one or more data assets is different from the second portion of personal data of the data subject stored in the one or more data assets.

8. The computer-implemented data processing method of claim 7, wherein the type of data subject access request is a data subject deletion request and further comprising:
in response to accessing the personal data of the data subject stored in each of the one or more data assets of the plurality of data assets of the organization that include the unique subject identifier, deleting the personal data of the data subject stored in each of the one or more data assets of the plurality of data assets of the organization that include the unique subject identifier.

9. The computer-implemented data processing method of claim 7, further comprising:
in response to determining that a unique subject identifier has been generated for the data subject, accessing the unique subject identifier database; and
identifying the unique subject identifier of the data subject based at least in part on form data provided by the data subject in the completion of the form associated with the organization.

10. The computer-implemented data processing method of claim 9, further comprising:
updating the unique subject identifier database to include an electronic link between the unique subject identifier of the data subject and each of (i) the form submitted by the data subject of each respective unique subject identifier, and (ii) one or more data assets that utilize the form data of the form received from the data subject.

11. The computer-implemented data processing method of claim 7, wherein automatically facilitating deletion of a second portion of personal data of the data subject stored in the one or more data assets for which one or more legal bases for continued storage cannot be determined comprises overwriting the second portion of personal data in memory.

12. The computer-implemented data processing method of claim 7, wherein automatically facilitating deletion of a second portion of personal data of the data subject stored in the one or more data assets for which one or more legal bases for continued storage cannot be determined comprises marking the second portion of personal data for overwrite.

13. A computer-implemented data processing method for managing a plurality of data assets of an organization with a unique subject identifier database, the method comprising:
receiving an indication of completion of a form associated with the organization by a data subject;
determining, based at least in part on searching a unique subject identifier database, whether a unique subject identifier has been generated for the data subject;
in response to determining that a unique subject identifier has been generated for the data subject, accessing the unique subject identifier database;
identifying the unique subject identifier of the data subject based at least in part on form data provided by the data subject in the completion of the form associated with the organization;
updating the unique subject identifier database to include an electronic link between the unique subject identifier of the data subject and each of (i) the form submitted by the data subject of each respective unique subject identifier, and (ii) one or more data assets that utilize the form data of the form received from the data subject;
receiving a data subject access request from the data subject, wherein the data subject access request comprises a type of data subject access request, and wherein the type of data subject access request is selected from a group consisting of:
a subject's rights request, and
a data subject deletion request;
accessing the unique subject identifier database to identify the unique subject identifier of the data subject;
determining which one or more data assets of the plurality of data assets of the organization include the unique subject identifier of the data subject; and
accessing personal data of the data subject stored in each of the one or more data assets of the plurality of data assets of the organization that include the unique subject identifier;
in response to accessing the personal data of the data subject stored in each of the one or more data assets of the plurality of data assets, automatically determining that a first portion of personal data of the data subject stored in the one or more data assets has one or more legal bases for continued storage;
in response to determining that the first portion of personal data of the data subject stored in the one or more data assets has one or more legal bases for continued storage, automatically maintaining storage of the first portion of personal data of the data subject stored in the one or more data assets;
automatically facilitating deletion of a second portion of personal data of the data subject stored in the one or more data assets for which one or more legal bases for continued storage cannot be determined, wherein the first portion of the personal data of the data subject stored in the one or more data assets is different from the second portion of personal data of the data subject stored in the one or more data assets; and
automatically marking one or more memory addresses associated with the second portion of personal data of the data subject stored in the one or more data assets associated with the data subject as free.

14. The computer-implemented data processing method of claim 13, wherein the type of data subject access request is a data subject deletion request and further comprising:
in response to accessing the personal data of the data subject stored in each of the one or more data assets of the plurality of data assets of the organization that include the unique subject identifier, deleting the personal data of the data subject stored in each of the one or more data assets of the plurality of data assets of the organization that include the unique subject identifier.

15. The computer-implemented data processing of claim 13, wherein the unique subject identifier database is a part of a third-party data repository.

16. The computer-implemented data processing method of claim 13, wherein automatically marking one or more memory addresses associated with the second portion of personal data of the data subject stored in the one or more data assets associated with the data subject as free comprises deleting a directory entry associated with the second portion of personal data.

* * * * *